United States Patent
Heinen et al.

(10) Patent No.: US 11,024,088 B2
(45) Date of Patent: Jun. 1, 2021

(54) AUGMENTED AND VIRTUAL REALITY

(71) Applicant: HoloBuilder, Inc., Aachen (DE)

(72) Inventors: Simon Heinen, Aachen (DE); Lars Tholen, Aachen (DE); Mostafa Akbari-Hochberg, San Francisco, CA (US); Gloria Indra Dhewani Abidin, Aachen (DE)

(73) Assignee: HoloBuilder, Inc., Aachen (DE)

( * ) Notice: Subject to any disclaimer, the term of this patent is extended or adjusted under 35 U.S.C. 154(b) by 255 days.

(21) Appl. No.: 16/304,672

(22) PCT Filed: May 26, 2017

(86) PCT No.: PCT/EP2017/062777
§ 371 (c)(1),
(2) Date: Nov. 26, 2018

(87) PCT Pub. No.: WO2017/215899
PCT Pub. Date: Dec. 21, 2017

(65) Prior Publication Data
US 2020/0312029 A1 Oct. 1, 2020

Related U.S. Application Data

(60) Provisional application No. 62/342,808, filed on May 27, 2016.

(51) Int. Cl.
| | | |
|---|---|---|
| *G06T 19/00* | (2011.01) | |
| *G06T 15/04* | (2011.01) | |
| *G06T 17/20* | (2006.01) | |

(52) U.S. Cl.
CPC .......... *G06T 19/006* (2013.01); *G06T 15/04* (2013.01); *G06T 17/20* (2013.01)

(58) Field of Classification Search
CPC ............. G06T 19/006; G06T 17/20; G06T 2207/10028; G06T 2207/30244;
(Continued)

(56) References Cited

U.S. PATENT DOCUMENTS

| | | | |
|---|---|---|---|
| 2005/0190972 A1 | 9/2005 | Thomas et al. | |
| 2012/0194642 A1* | 8/2012 | Lie ..................... | G06T 5/003 |
| | | | 348/43 |

(Continued)

FOREIGN PATENT DOCUMENTS

| | | |
|---|---|---|
| EP | 2854104 A1 | 4/2015 |
| EP | 3629302 A1 | 4/2020 |
| GB | 2574795 A | 12/2019 |

OTHER PUBLICATIONS

M. Z. Zia et al., "Comparative design space exploration of dense and semi-dense SLAM," 2016 IEEE International Conference on Robotics and Automation (ICRA), Stockholm, 2016, pp. 1292-1299, doi: 10.1109/ICRA.2016.7487261.

(Continued)

*Primary Examiner* — Xilin Guo
(74) *Attorney, Agent, or Firm* — DLA Piper LLP (US)

(57) ABSTRACT

A method for creating an augmented reality scene, the method comprising, by a computing device with a processor and a memory, receiving a first video image data and a second video image data; calculating an error value for a current pose between the two images by comparing the pixel colors in the first video image data and the second video image data; warping pixel coordinates into a second video image data through the use of the map of depth hypotheses for each pixel; varying the pose between the first video image data and the second video image data to find a warp that corresponds to a minimum error value; calculating, using the estimated poses, a new depth measurement for (Continued)

each pixel that is visible in both the first video image data and the second video image data.

9 Claims, 97 Drawing Sheets

(58) Field of Classification Search
CPC ....... G06T 15/205; G06T 15/20; G05T 15/04; H04N 13/271
See application file for complete search history.

(56) References Cited

U.S. PATENT DOCUMENTS

| | | | | |
|---|---|---|---|---|
| 2013/0093760 | A1* | 4/2013 | Kwon | H04N 13/264 345/419 |
| 2015/0123973 | A1* | 5/2015 | Larsen | G06T 17/20 345/427 |
| 2017/0177937 | A1* | 6/2017 | Harmsen | G06K 9/00624 |
| 2018/0329927 | A1 | 11/2018 | Garg et al. | |

OTHER PUBLICATIONS

Koch et al., "Realistic Surface Reconstruction of 3D Scenes from Uncalibrated Image Sequences", First published: Aug. 9, 2000, J. Visual. Comput. Animat., K.U.Leuven, Dept. Elektrotechniek, ESAT-PSI, Kardinaal Mercierlaan 94, B-3001 Leuven, Belgium, 11: 115-127, 11 pages, https://doi.org/10.1002/1099-1778(200007)11:3<115::AID-VIS228>3.0 CO;2-2.

* cited by examiner

AUGMENTED AND VIRTUAL REALITY

CROSS-REFERENCE TO RELATED APPLICATIONS

This application claims benefit/priority of PCT/EP2017/062777 filed May 27, 2017, which in turns claims priority to U.S. provisional patent application No. 62/342,808 filed May 27, 2016, both of which are incorporated herein by referenced in their entireties.

FIELD

The field includes image capture, augmentation and displays as well as building arrangements of displays of augmented and/or virtual reality.

BACKGROUND

Virtual reality and augmented reality displays may be created and developed by large corporations for commercial use. However, everyday users may not access or develop such displays. Programming, camera integration and architecture hurdles exist for everyday users to create augmented and virtual reality platforms which can include their own pictures, videos, object selection and the like.

SUMMARY

Systems and methods here may bring creation and development tools to everyday users to allow them to create virtual and/or augmented reality scenes with their own images and/or provided images. In some embodiments, augmented reality development systems are include, using a computer processor in communication with a data storage and a network the computer processor including instructions to, receive image data over the network, map the received image data in a scene, insert tracking markers into the mapped image data scene, receive instructions over the network to insert objects into the mapped image data scene, send, over the network, the image data scene with tracking markers and the objects to a client device for display of the image data scene. In some embodiments, the computing processor includes further instructions to receive a second image data over the network, map the second image data in a second scene; insert tracking markers into the second mapped image data scene, receive instructions over the network to insert objects into the second mapped image data scene, store the mapped image data scene and the second mapped image data scene in the data storage indicating their relationship as linked scenes, send, over the network, the image data scene and second image data scene with tracking markers and the objects to a client device for display of the image data scene and second image data scene, wherein the display of the image data scene and second image data scene may be linked. Additionally or alternatively, the objects are animated objects. Additionally or alternatively the objects are received over the network. Additionally or alternatively the objects are selected from a predefined set of objects. Additionally or alternatively the image data is a 360 degree image. Additionally or alternatively the object includes functionality to trigger an event. Additionally or alternatively the map of the image data includes computer instructions to, generate an estimated depth map of a keyframe of the image data scene using estimated depth values of pixels in the keyframe; and generate a point cloud using the estimated depth map of the keyframe.

In some example embodiments, augmented reality systems are disclosed including using a computer processor in communication with a data storage, a camera, a network, and a display the computer processor including instructions to, receive an image data scene over the network, receive tracking markers for the image data scene, receive objects for the image data scene; cause display of, an image from the camera, the image data scene and the received objects using the tracking markers. Additionally or alternatively the computer processor further includes instructions to, receive a second image data scene over the network, receive second tracking markers for the second image data scene; receive second objects for the second image data scene; cause display of, the image from the camera, the second image data scene and the received second objects using the second tracking markers.

In some example embodiments, virtual reality development systems are disclosed including using a computer processor in communication with a data storage and a network the computer processor including instructions to, receive instructions over the network image data, map the image data, receive instructions over the network to insert markers into the mapped image data; cause display, over the network, of the markers in a display of the image data, receive instructions over the network to insert objects into the mapped image data, cause display, over the network, of the objects in the display of the image data.

Additionally or alternatively the received image data is two dimensional image data. Additionally or alternatively the received image data is three dimensional image data. Additionally or alternatively other features may include, object occlusion, floor plans, timelines, added annotations such as text, drawings, 3D images, display features such as projections, screens, split screens, networked viewers, live streaming; multi-user displays, audio stereo, stability, face detection, zooming, distortion, and others.

Alternatively or additionally methods and systems are disclosed for creating an augmented reality scene, the system comprising by a computing device with a processor and a memory, receiving a first video image data and a second video image data, calculating an error value for a current pose between the two images by comparing the pixel colors in the first video image data and the second video image data, warping pixel coordinates into a second video image data through the use of the map of depth hypotheses for each pixel, varying the pose between the first video image data and the second video image data to find a warp that corresponds to a minimum error value, calculating, using the estimated poses, a new depth measurement for each pixel that is visible in both the first video image data and the second video image data. Some embodiments further comprising, creating a map of depth hypotheses for a subset of pixels in the first video image data. Some embodiments further comprising, updating the map of depth hypotheses in the first video image data with information from the new depth measurement. Some embodiments further comprising, selecting as a keyframe, the video image data, inserting the keyframe into a connected graph. Some embodiments further comprising, analyzing the connected graph to find a globally optimal pose for the keyframe. Some embodiments further comprising, using the globally optimal pose for the keyframe to correct scale drift in the second video image data. Some embodiments wherein the calculation of the globally optimal pose is by, estimating similarity transforms between the keyframe and a second keyframe. Some embodiments further comprising, receiving sensor data regarding position information, processing the received sensor data into factors in the connected graph. Some embodiments wherein the sensor data is generated by at least one of a gyroscope, an accelerometer, a compass or a GPS. Some embodiments further comprising, marginalizing the connected graphs into probability distributions, using the probability distributions in estimating poses for new frames.

Alternatively or additionally, methods and systems here are for creating an augmented reality scene, comprising, by a computing device with a processor and memory, receiving image data over a network, the image data being generated from a camera including multiple frames, estimating a depth map of a keyframe of the multiple frames of the received image data using estimated depth values of pixels in the keyframe, generating a point cloud using the estimated depth map of the keyframe, and generating a 3D mesh using the generated point cloud. Some embodiments the keyframe is a frame with a depth map and a position Some embodiments further comprising, by the computer, for non keyframe frames, calculating a relative position to a keyframe using the depth map and position of the keyframe, and refining the keyframe depth map. In some embodiments the 3D mesh is generated by, computing a normal vector for each point in the point cloud, based on neighboring points; orienting the computed normal vector of each point toward the camera pose of the keyframe that the point belongs to. In some embodiments the 3D mesh includes multiple keyframe images, wherein the multiple keyframe images are overlapping keyframes merged to a single texture. In some embodiments the merging of multiple keyframes to a single texture is by weighting a keyframe distance to a mesh surface and a keyframe angle relative to the mesh surface. Some embodiments further comprising, by the computer, trimming the 3D mesh using known data structures, and applying texture to a generated 3D model. Some embodiments further comprising, by the computer, filtering the point cloud using a voxel tree to remove noise points. Some embodiments further comprising, by the computer, receiving a second image data over the network, receiving second tracking markers for the second image data, receiving second objects for the second image data, causing display of, the image, the second image data and the received second objects using the second tracking markers.

Alternatively or additionally, methods and systems here are for creating a virtual reality scene, the system comprising, by a computing device with a processor and a memory, receiving a first resolution image data, receiving a second resolution image data, segmenting an object by identifying a particular shape from pixels in the first resolution image data and the second resolution image data, causing display of an image using both the segmented object from the first resolution image data and image data other than the segmented object from the second resolution image data.

Alternatively or additionally, methods and systems here are for creating a virtual reality scene, the system comprising, by a computing device with a processor and a memory, receiving image data, fragmenting the image data using a pattern, identifying an area of the image data to load first, associating the fragmented pattern portions with the area of the image data to load first, causing display of the fragmented pattern portions identified to load first, and causing display of a remainder of the fragmented pattern portions.

Alternatively or additionally methods and systems here are for creating an augmented reality scene, the system comprising, by a computing device with a processor and a memory, receiving a first image data, wherein the first image data is a 360 degree image data and the computer is further configured to apply the first image data as texture to a sphere object for display, and receiving a second image data, comparing the first image data and the second image data to correlate features common to both calculating depth of the correlated features of the first and second images, and using the calculated depth of the correlated features to render a stereoscopic image display. Some embodiments further comprising, by the computer, applying a filter to the first image data and the second image data, wherein the filter identifies objects in the first and second image data and compares their positions, merging the first and second filtered image data for display. Some embodiments wherein the filter removes moving objects. Some embodiments wherein the filter removes changing light conditions.

Alternatively or additionally, methods and systems here are for creating a virtual reality scene, the system comprising, by a computing device with a processor and a memory, receiving a image data, wherein the image data is a 360 degree image data and the computer is further configured to apply the image data as texture to an object for display, and receiving an indication of a first and second position in the image data, using the received first and second position in the image to define a canvas within the image data, receiving information regarding a camera height from a floor at the time the image data was captured, calculating angles from the received first and second positions and the height of the camera, and calculating distances between the first and second positions in the display of the image data Some embodiments further comprising, by the computer, mapping objects in the display of image data, calculating angles of objects in the display of image data. Some embodiments further comprising, by the computer, receiving a floor plan for the image data, receiving placement of the received image data onto a position in the floor plan, calculating distances between a first and a second position in the floor plan. Some embodiments further comprising, by the computer, calculating a rotation angle of the camera using the camera height, angles between the canvas and a second canvas, and the floor, applying a correction to the calculated rotation angle of the camera to the image data for display.

BRIEF DESCRIPTIONS

For a better understanding of the embodiments described in this application, reference should be made to the Detailed Description below, in conjunction with the following drawings in which like reference numerals refer to corresponding parts throughout the figures.

Figure 1A:
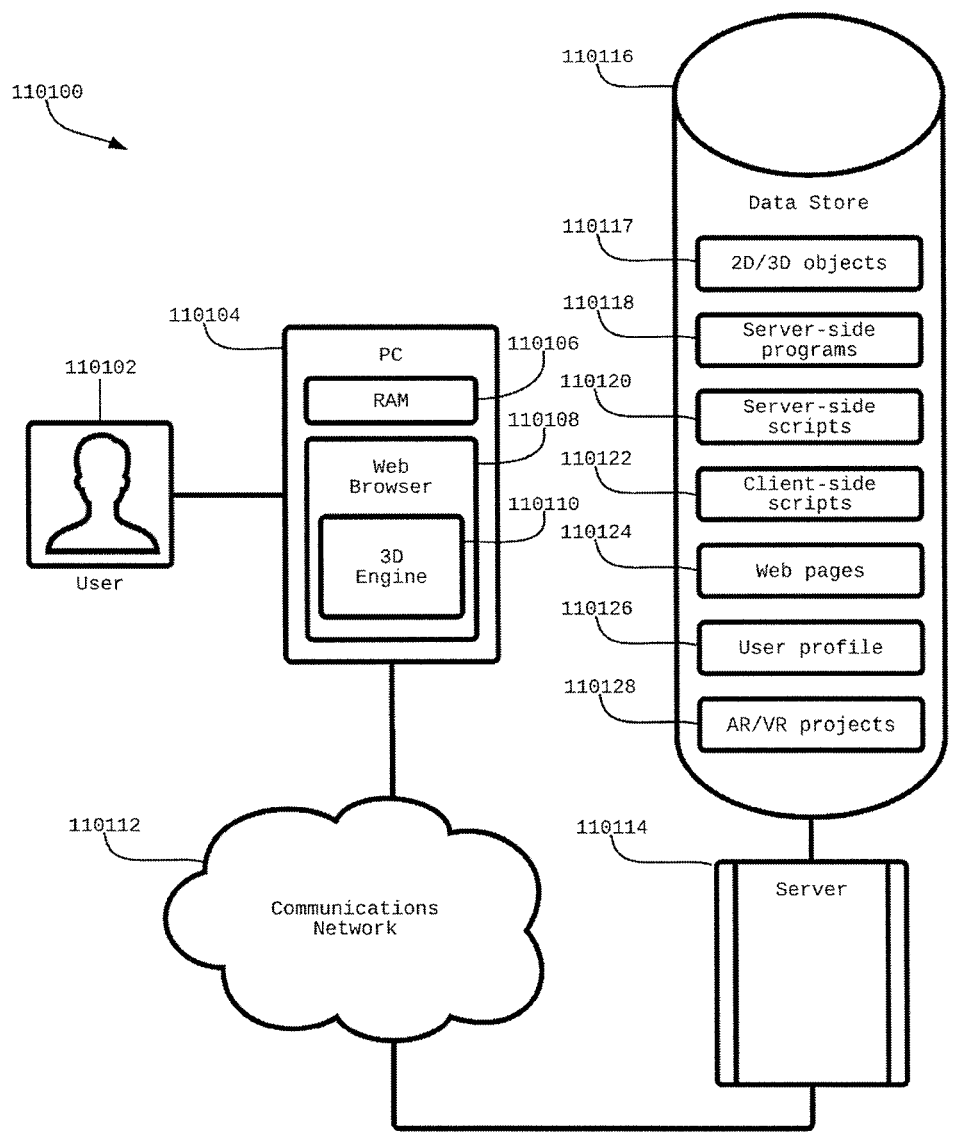
FIG. 1a is an illustration of the overall system architecture in accordance with certain aspects described herein.
Figure 1B:
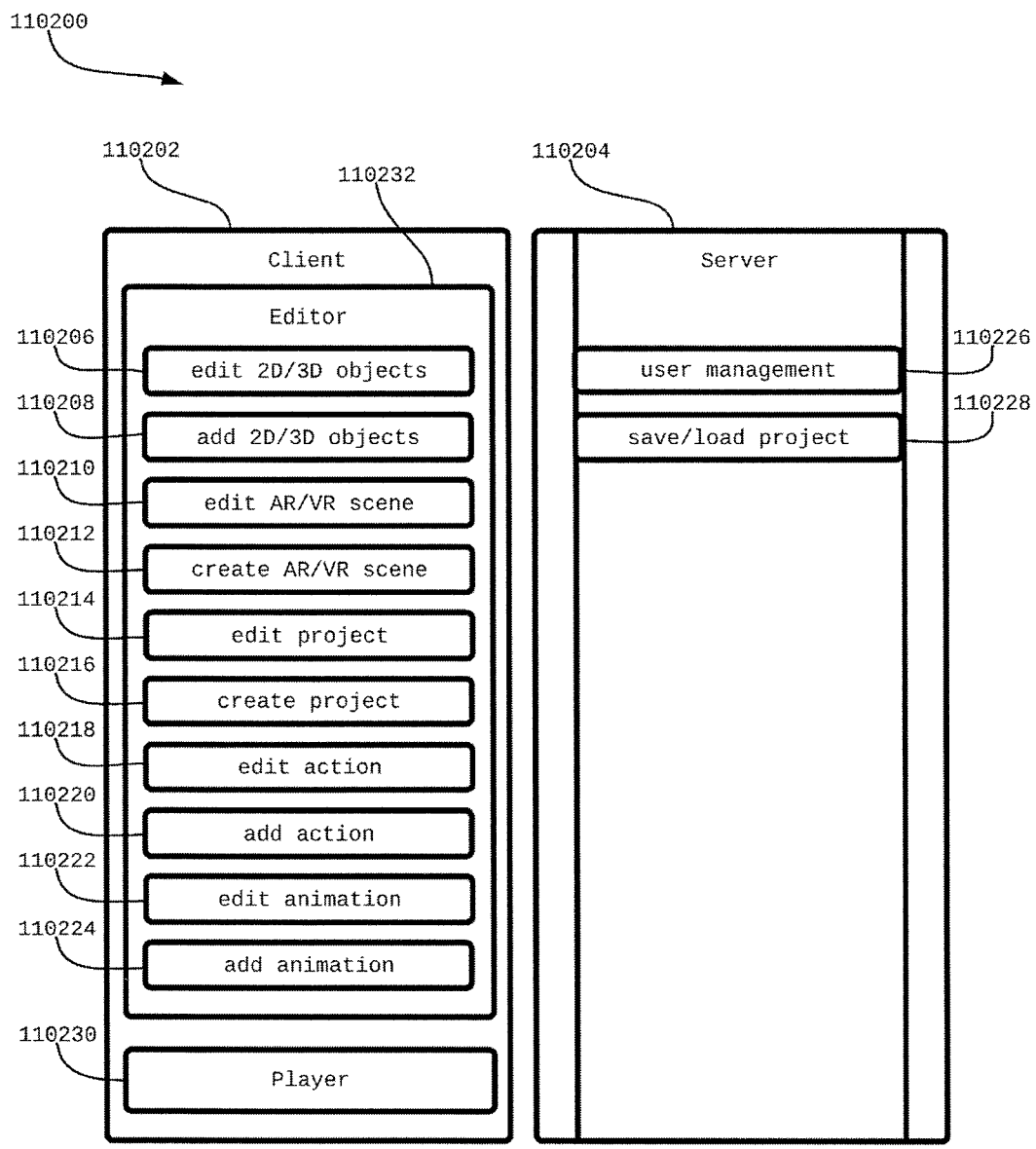
FIG. 1b is an illustration of the components and functionalities contained in the system in accordance with certain aspects described herein.
Figure 1C:
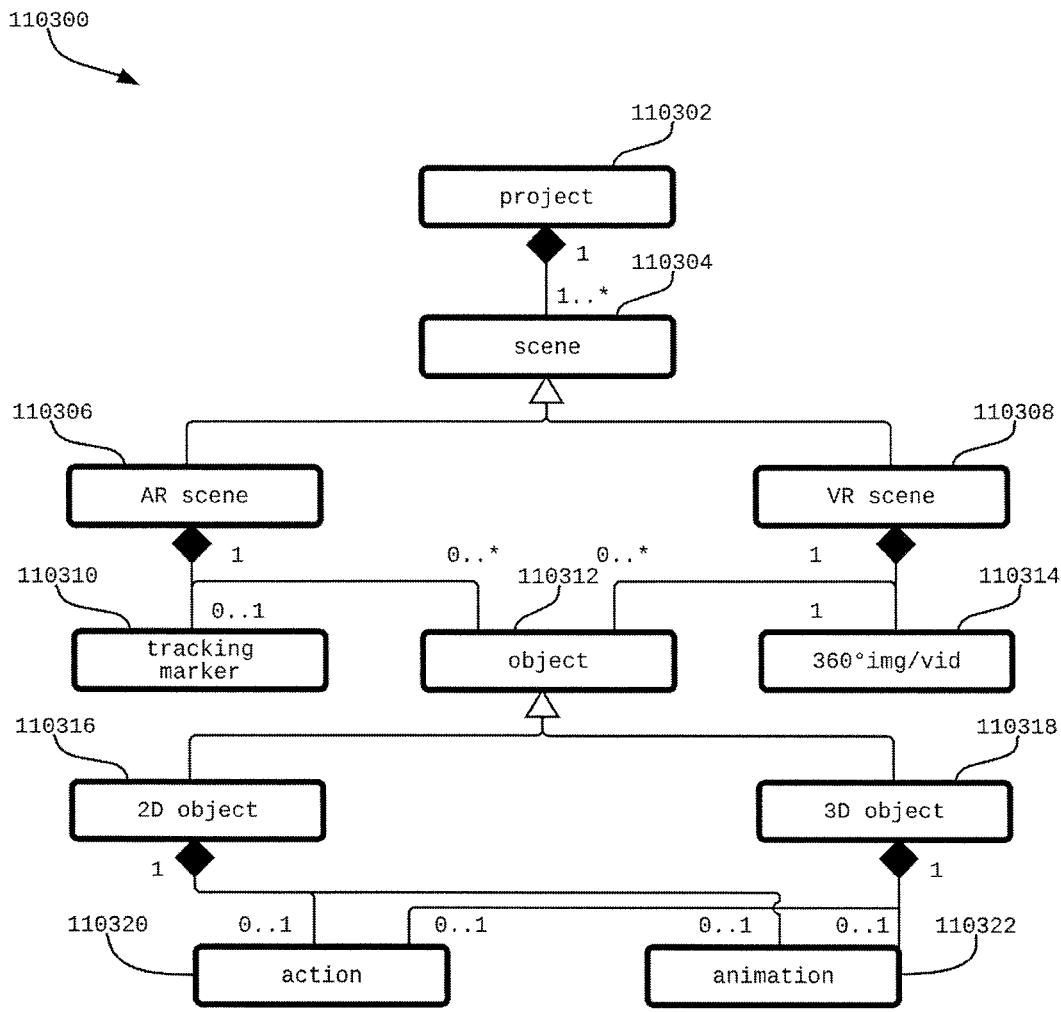
FIG. 1c is a UML class diagram illustrating the structure of a Holo containing one or more AR and/or VR scenes in accordance with certain aspects described herein.
Figure 1D:
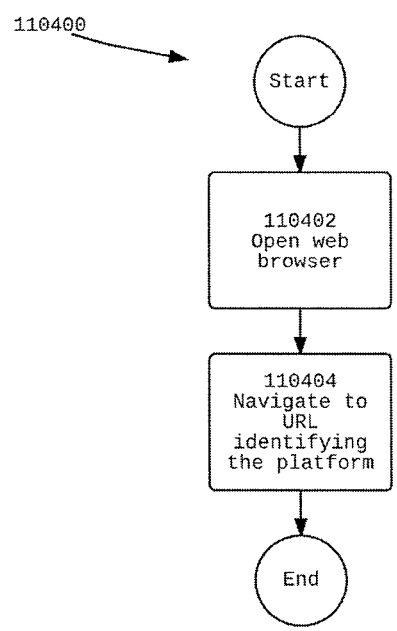
FIG. 1d is a flowchart illustrating the workflow for accessing the system in accordance with certain aspects described herein.
Figure 1E:
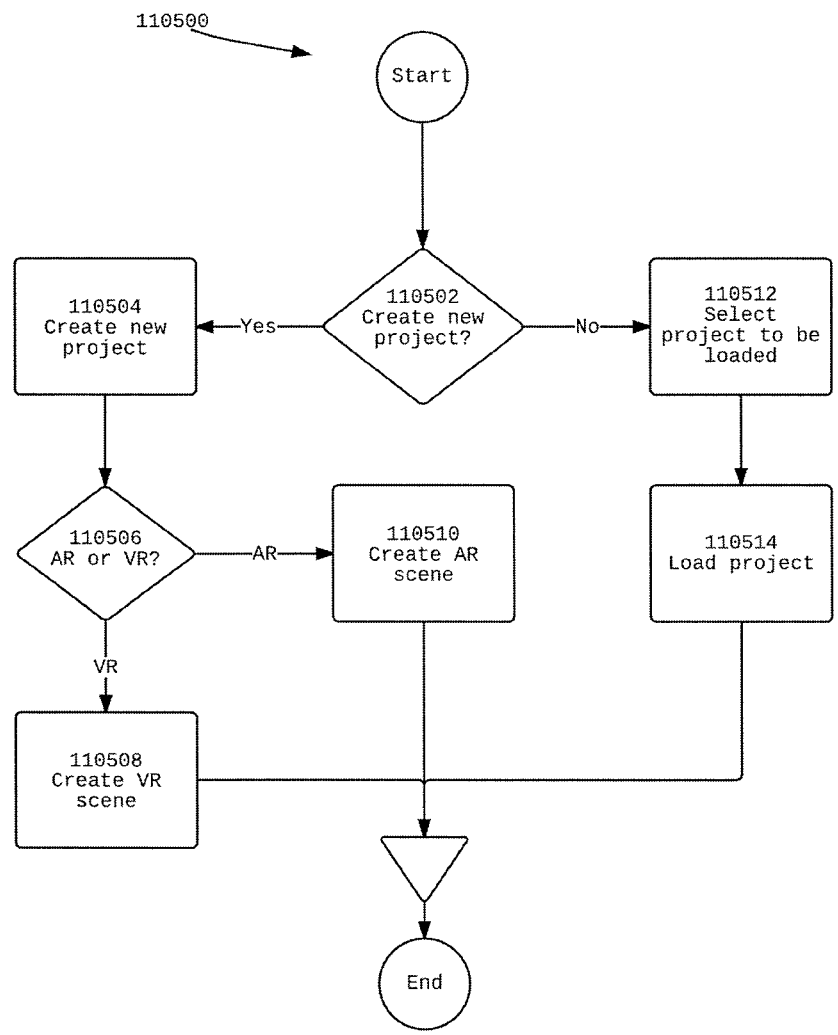
FIG. 1e is a flowchart illustrating the method for creating a Holo containing one or more AR and/or VR scenes in accordance with certain aspects described herein.
Figure 1F:
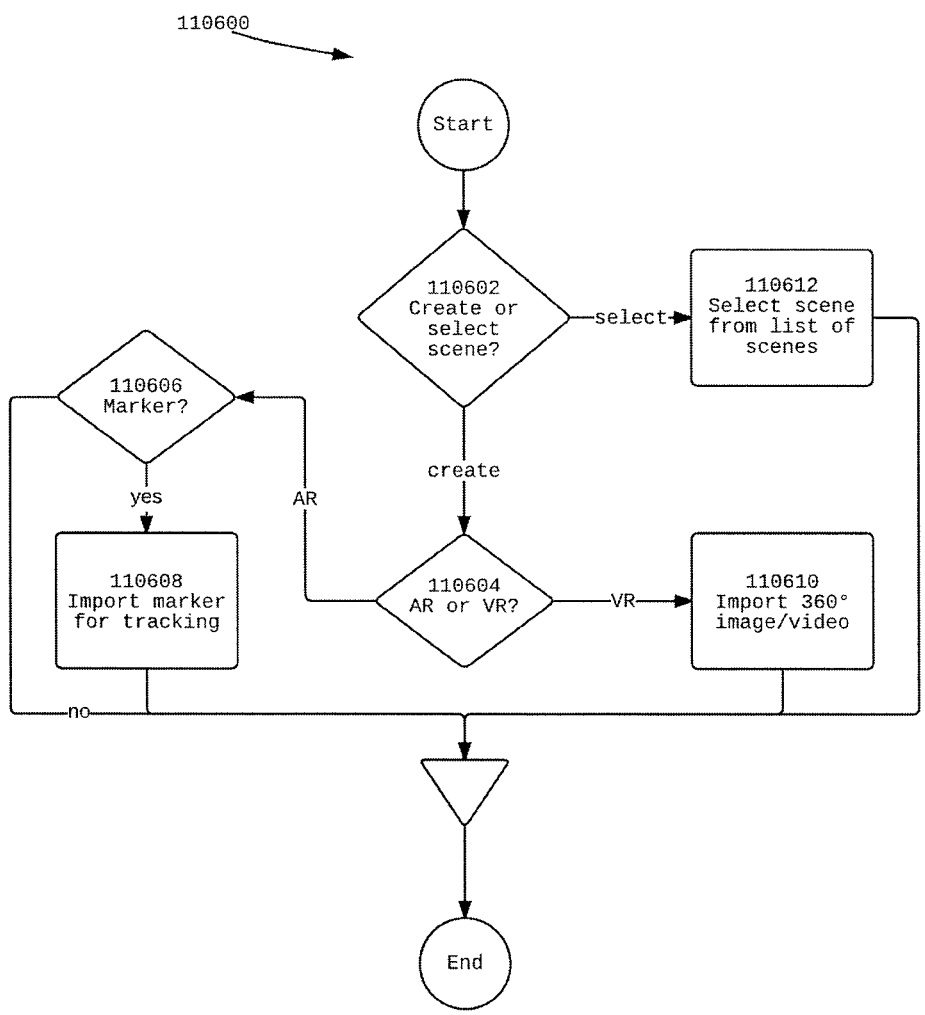
Figure 1G:
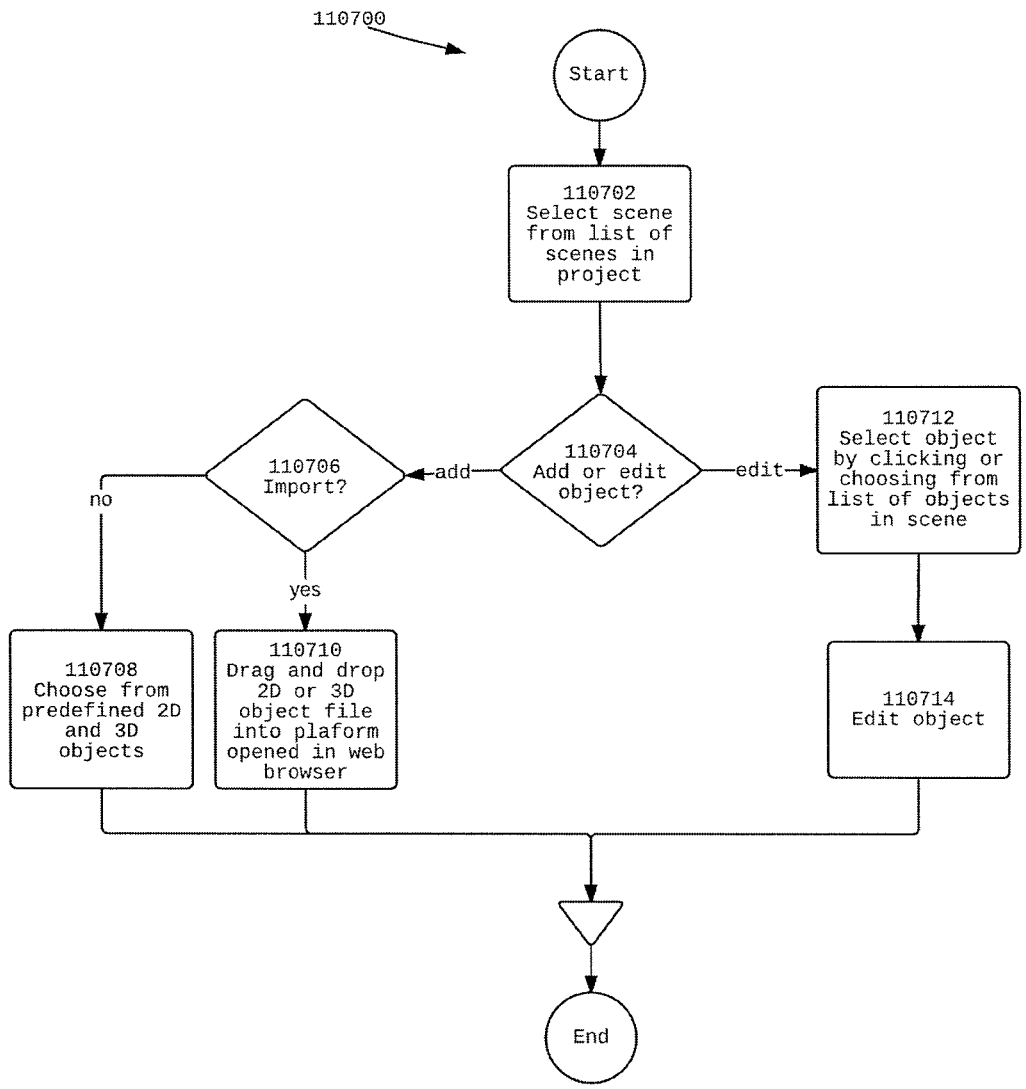
Figure 1H:
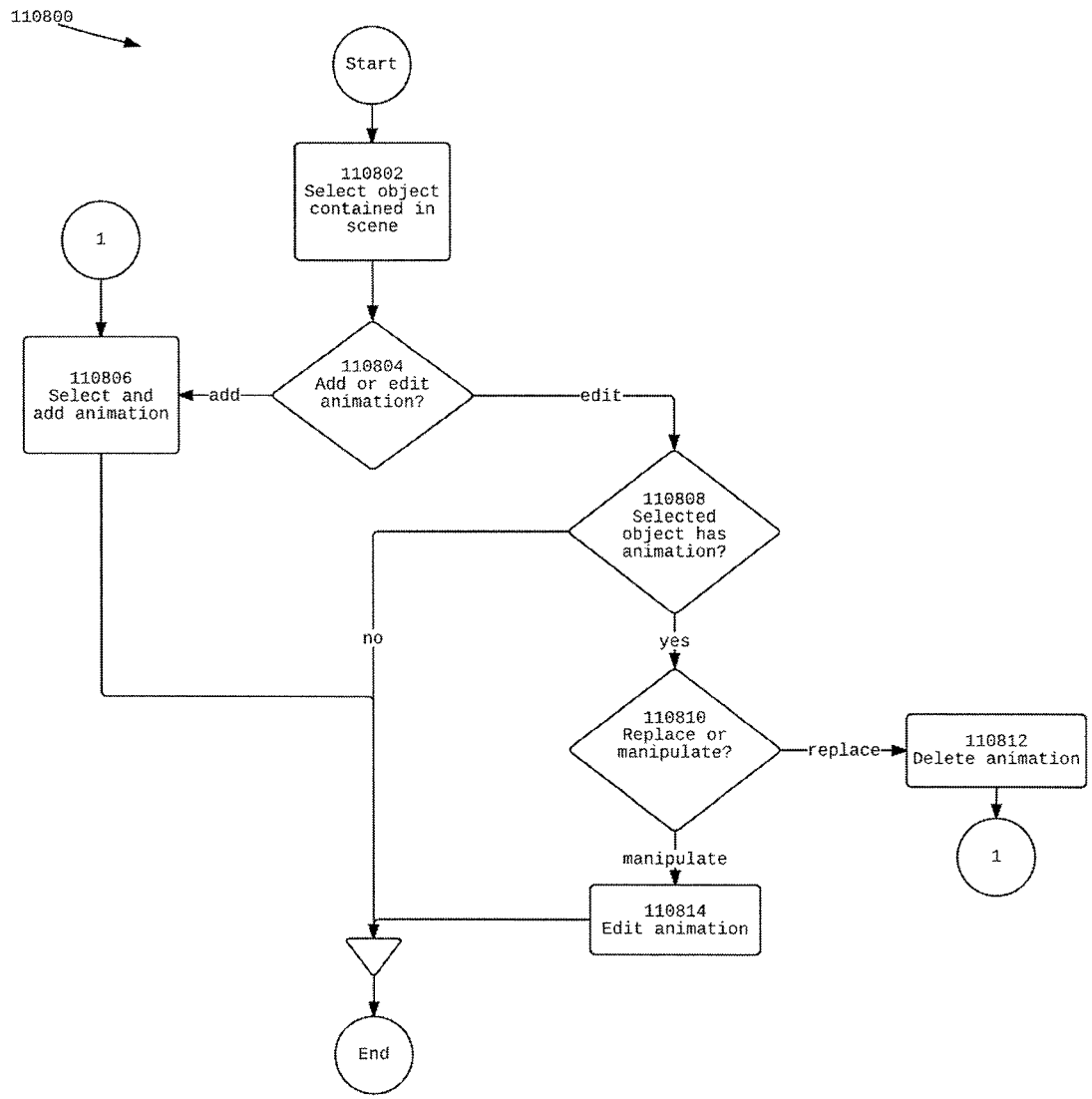
Figure 1I:
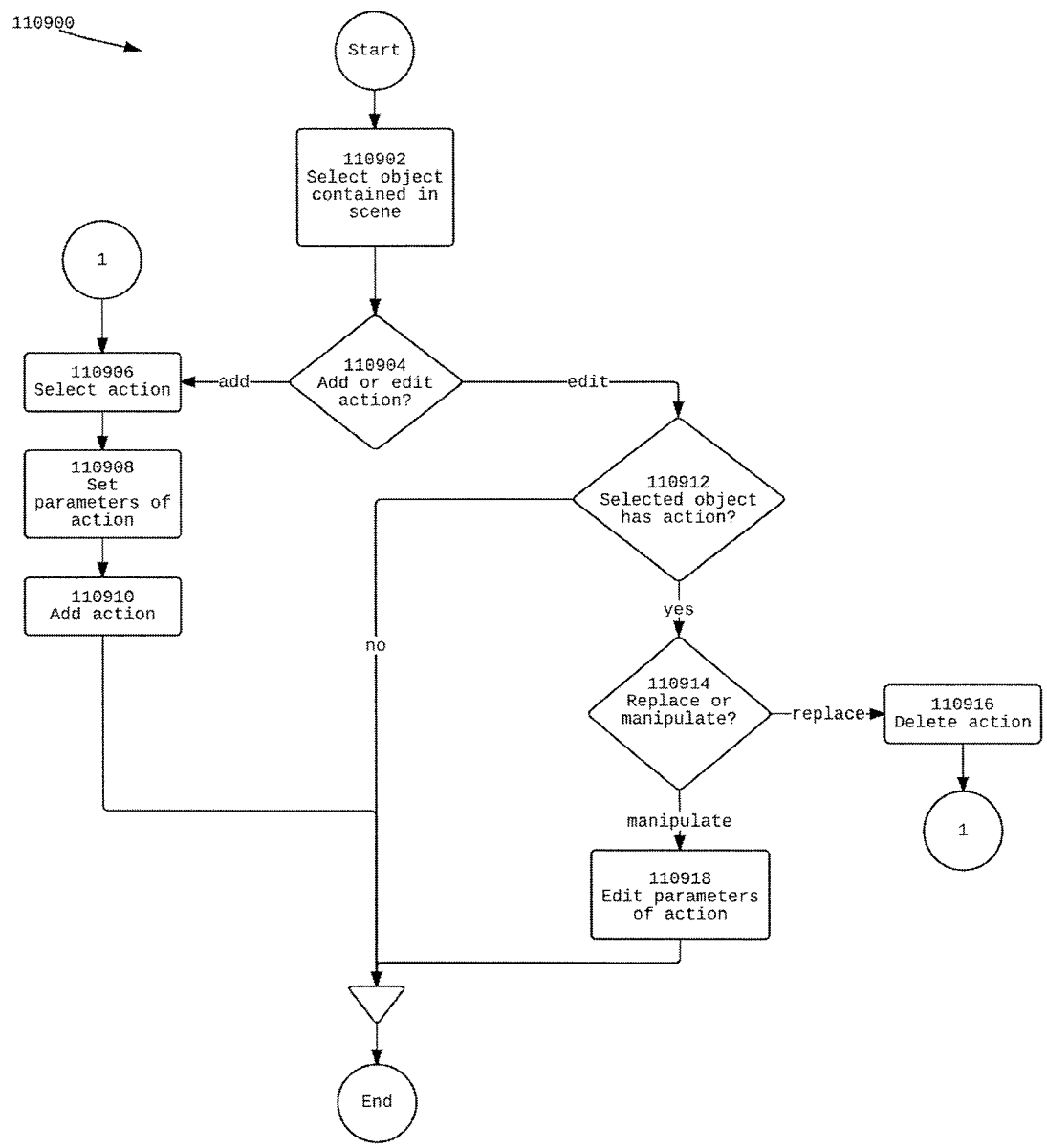
Figure 1J:
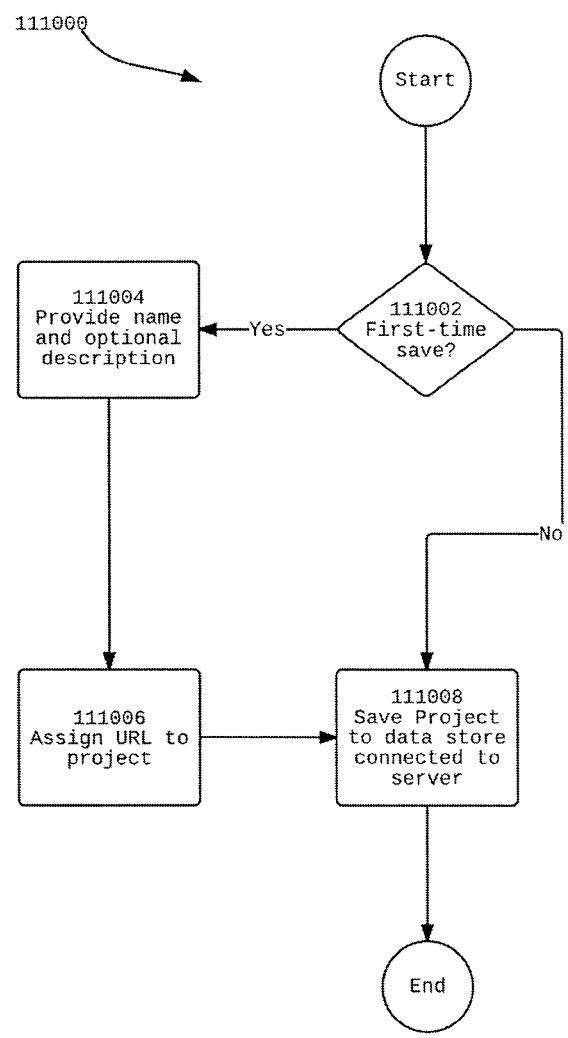
Figure 1K:
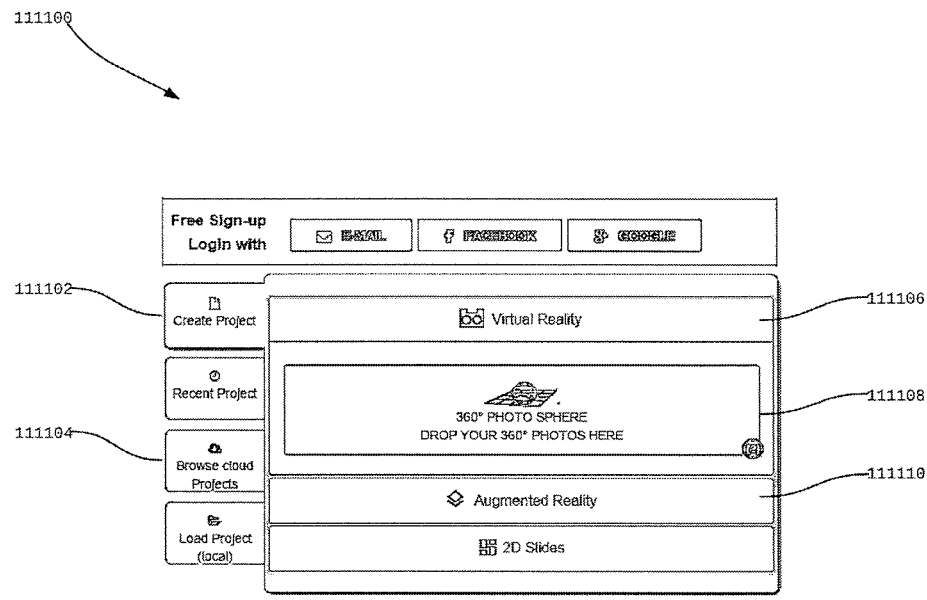
Figure 1M:
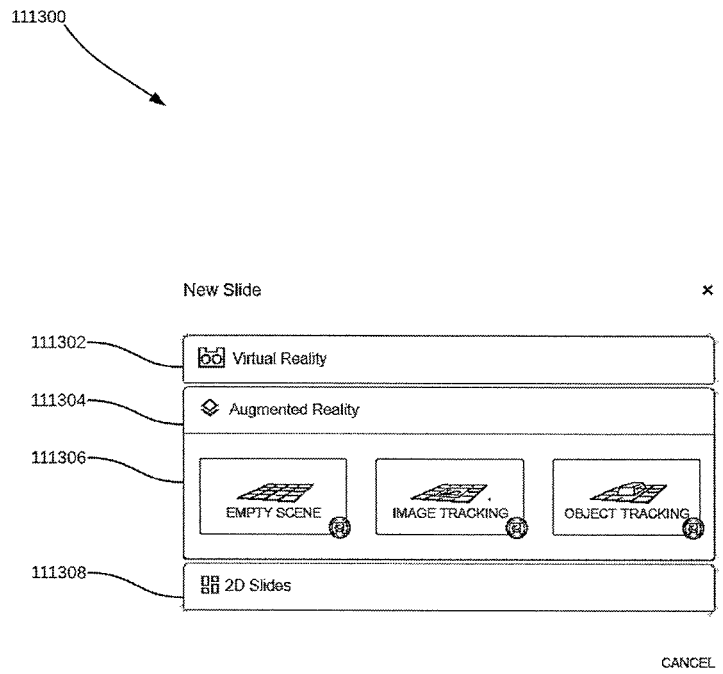
Figure 11:
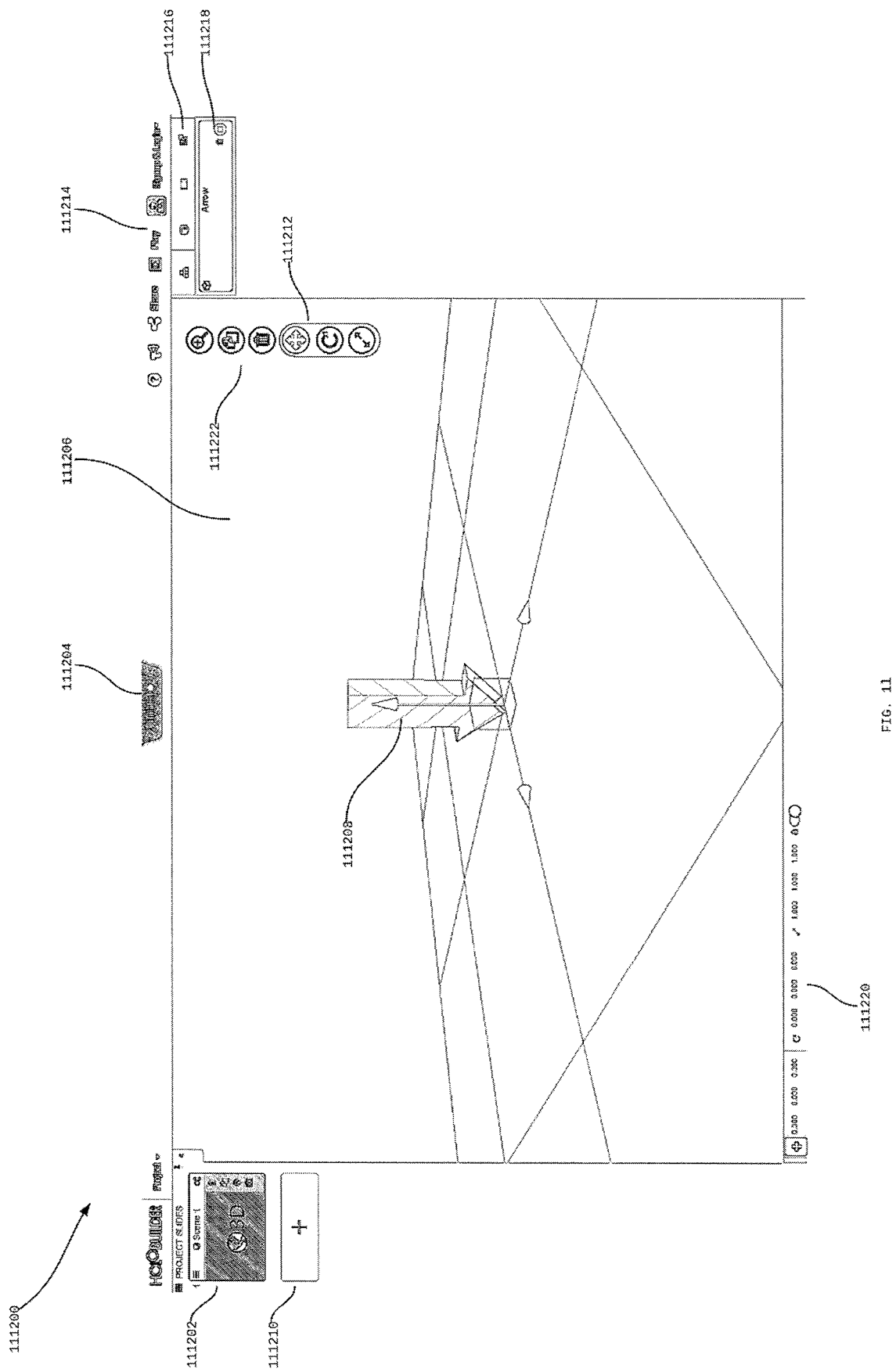
Figure 1N:
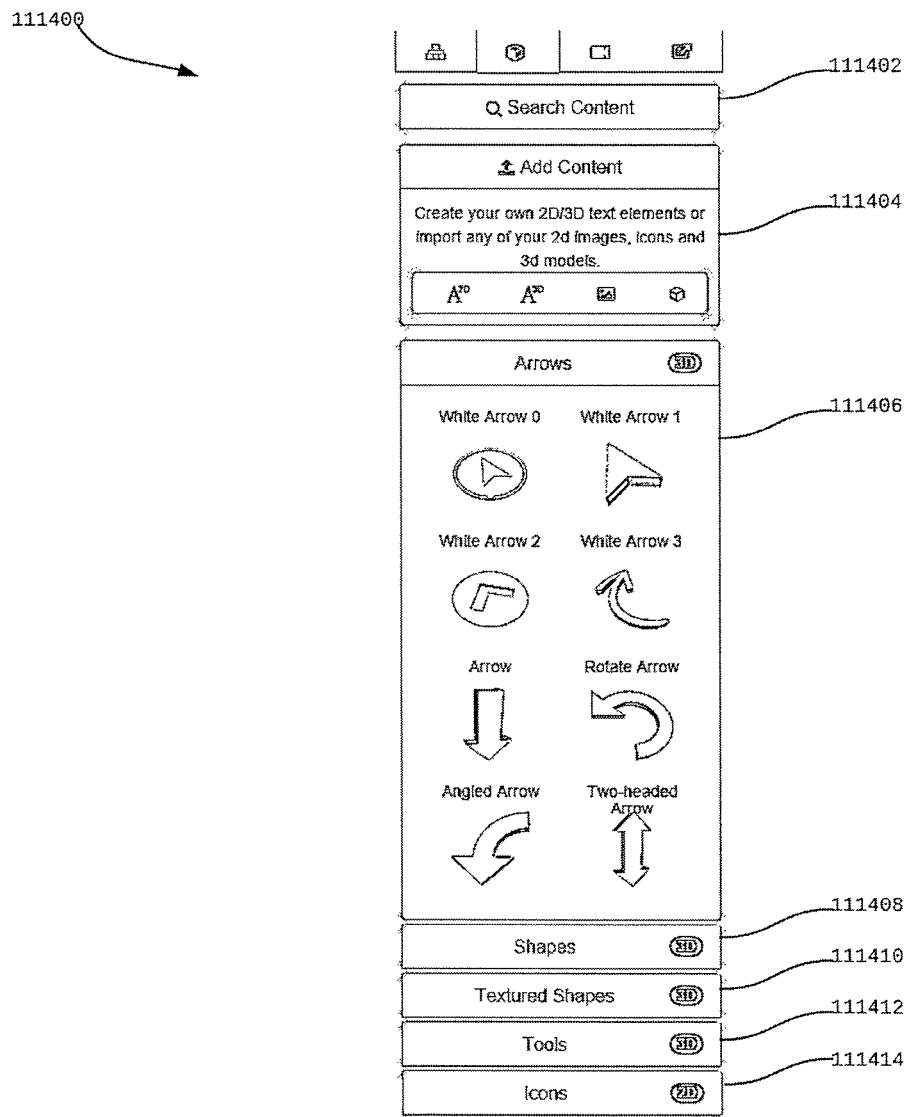
Figure 1O:
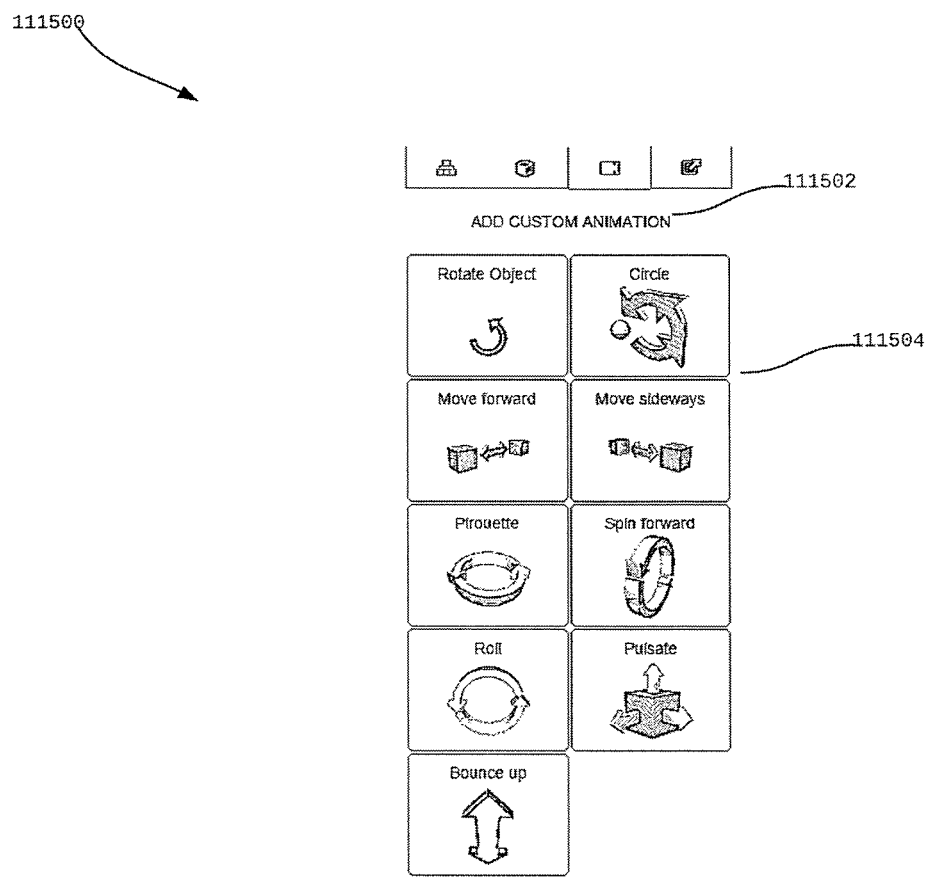
Figure 1P:
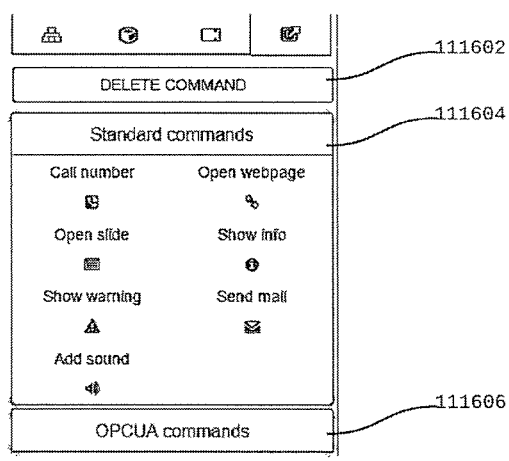
Figure 1Q:
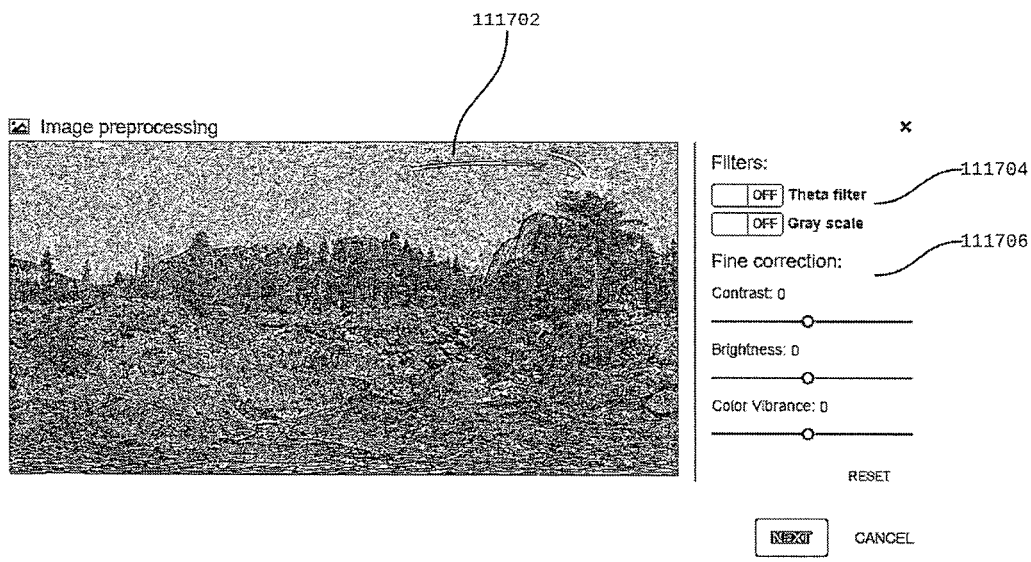
Figure 1R:
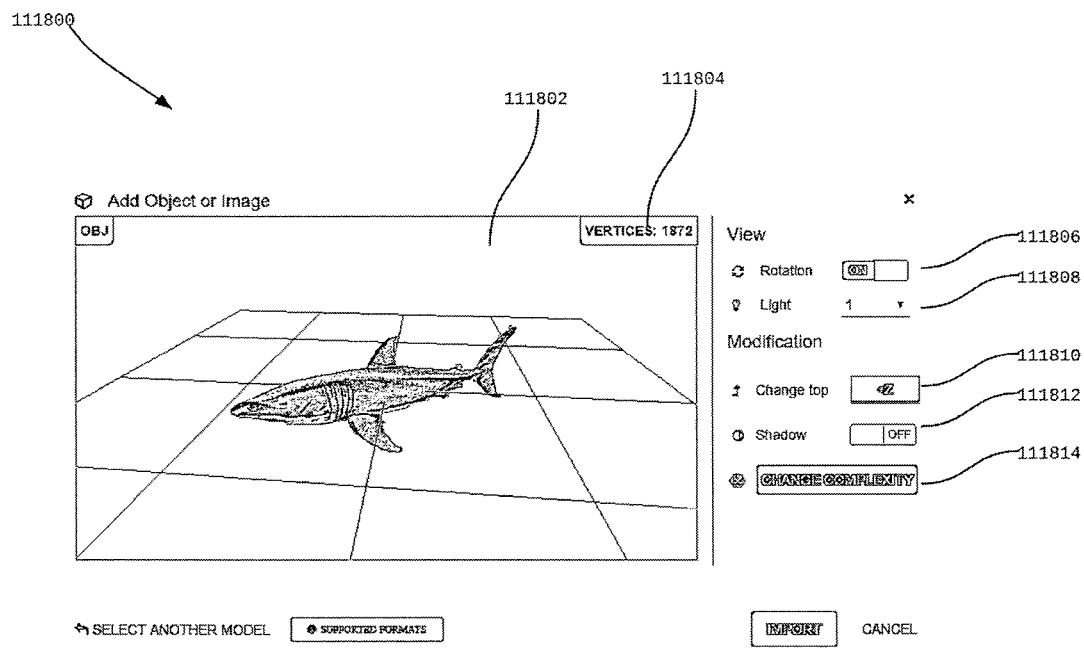
Figure 1S:
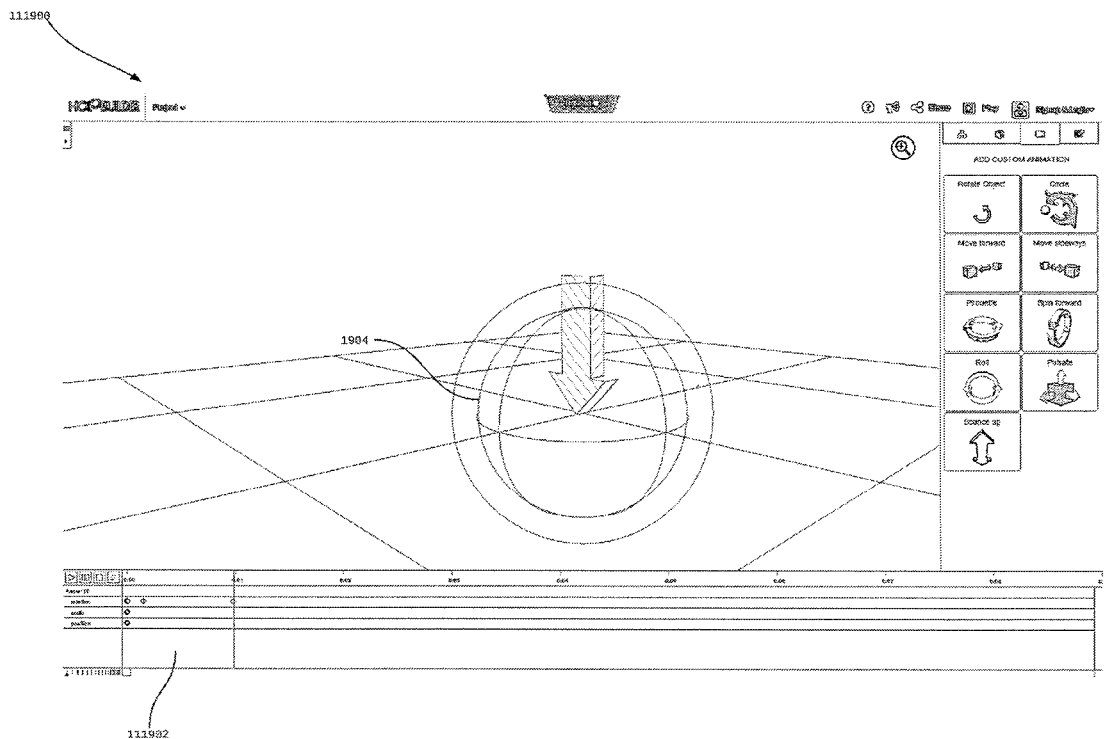
Figure 1T:
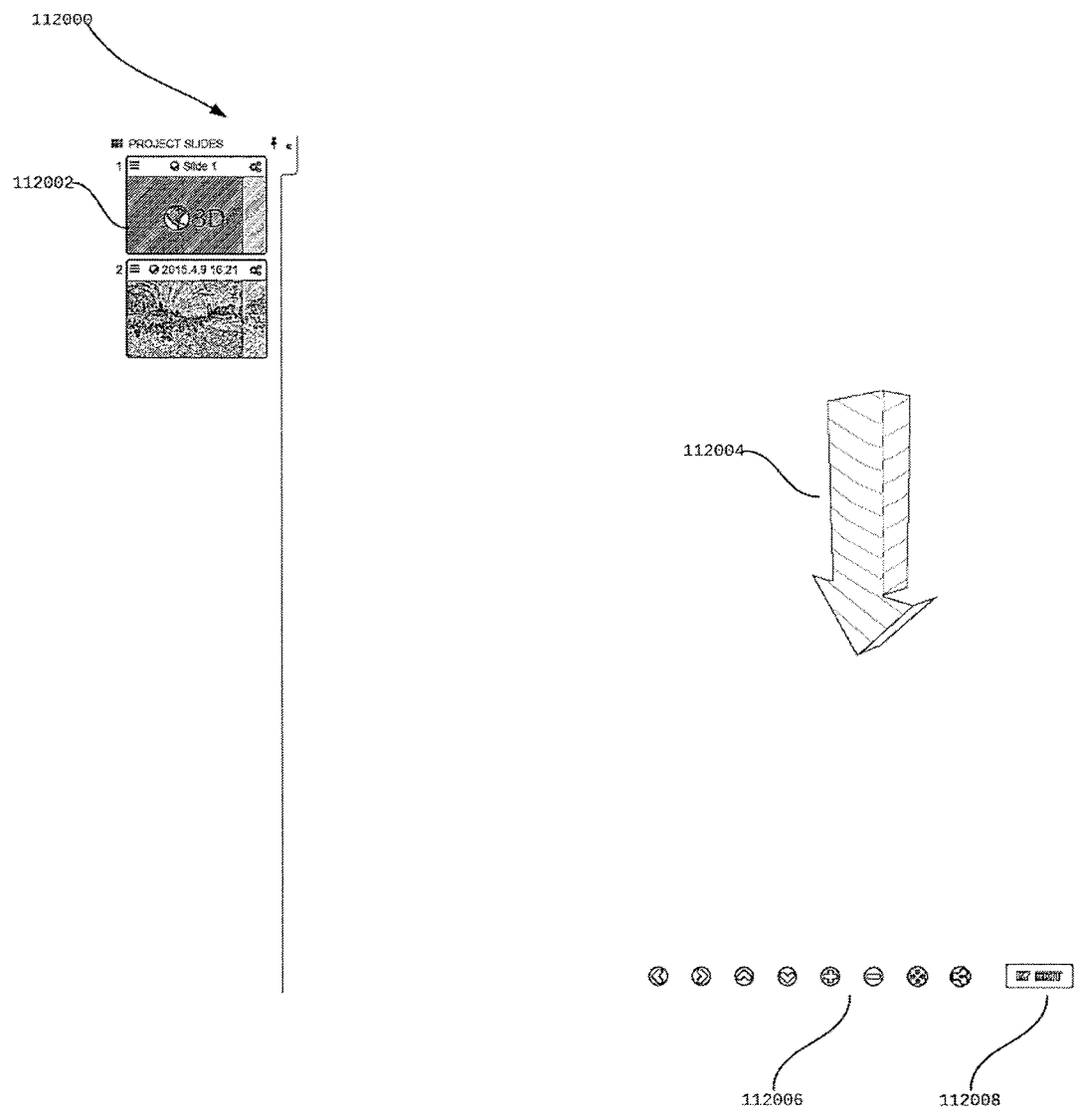

FIG. if is a flowchart illustrating the method for creating or selecting an AR or VR scene within a Holo in accordance with certain aspects described herein;

FIG. 1g is a flowchart illustrating the method for adding a 2D or 3D object to an AR or VR scene or selecting and editing an existing 2D or 3D object within an AR or VR scene in accordance with certain aspects described herein;

FIG. 1h is a flowchart illustrating the method for adding an animation to a 2D or 3D object or editing an existing animation associated with a 2D or 3D object in accordance with certain aspects described herein;

FIG. 1i is a flowchart illustrating the method for adding a triggerable action to a 2D or 3D object or editing an existing triggerable action associated with a 2D or 3D object in accordance with certain aspects described herein;

FIG. 1j is a flowchart illustrating the method for saving a Holo containing one or more AR and/or VR scenes in accordance with certain aspects described herein;

FIG. 1k illustrates a user interface for creating a new Holo containing one or more AR and/or VR scenes in accordance with certain aspects described herein;

FIG. 1l illustrates a user interface for creating and editing AR and VR content in accordance with certain aspects described herein;

FIG. 1m illustrates a user interface for creating a new AR or VR scene within a Holo in accordance with certain aspects described herein;

FIG. 1n illustrates a user interface for adding 2D and 3D objects to an AR or VR scene within a Holo in accordance with certain aspects described herein;

FIG. 1o illustrates a user interface for adding an animation to a 2D or 3D object or editing an existing animation associated with a 2D or 3D object in accordance with certain aspects described herein;

FIG. 1p illustrates a user interface for adding a triggerable action to a 2D or 3D object or editing an existing triggerable action associated with a 2D or 3D object in accordance with certain aspects described herein;

FIG. 1q illustrates a user interface for preprocessing a 360° image before it is added to a VR scene within a Holo in accordance with certain aspects described herein;

FIG. 1r illustrates a user interface for preprocessing a 3D object before it is added to an AR or VR scene within a Holo in accordance with certain aspects described herein;

FIG. 1s illustrates a user interface for creating or editing a custom animation associated with a 2D or 3D object contained in an AR or VR scene within a Holo in accordance with certain aspects described herein; and FIG. 1t illustrates a user interface for consuming previously created AR and/or VR content directly in the web browser in accordance with certain aspects described herein.

Figure 2A:
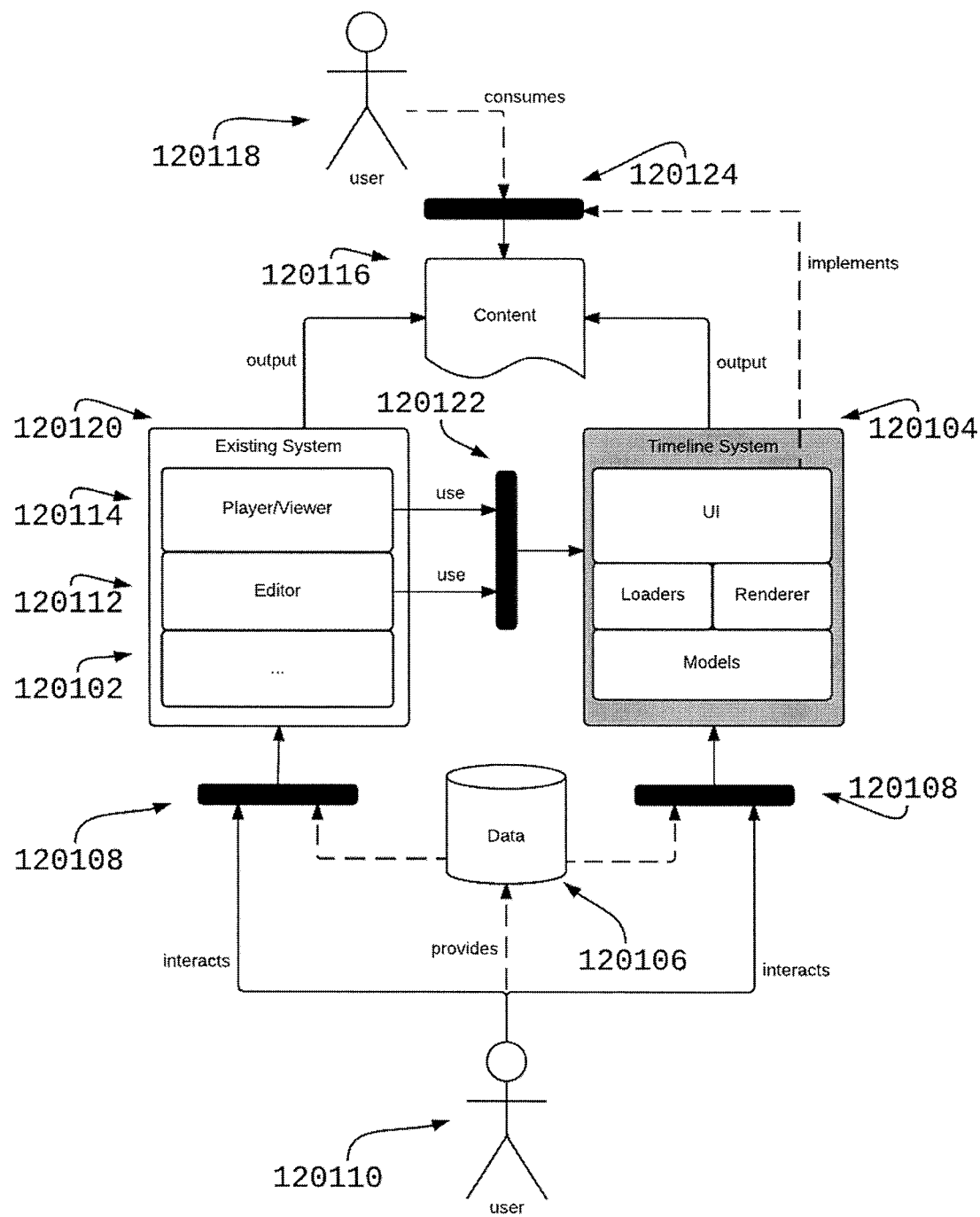
Figure 2B:
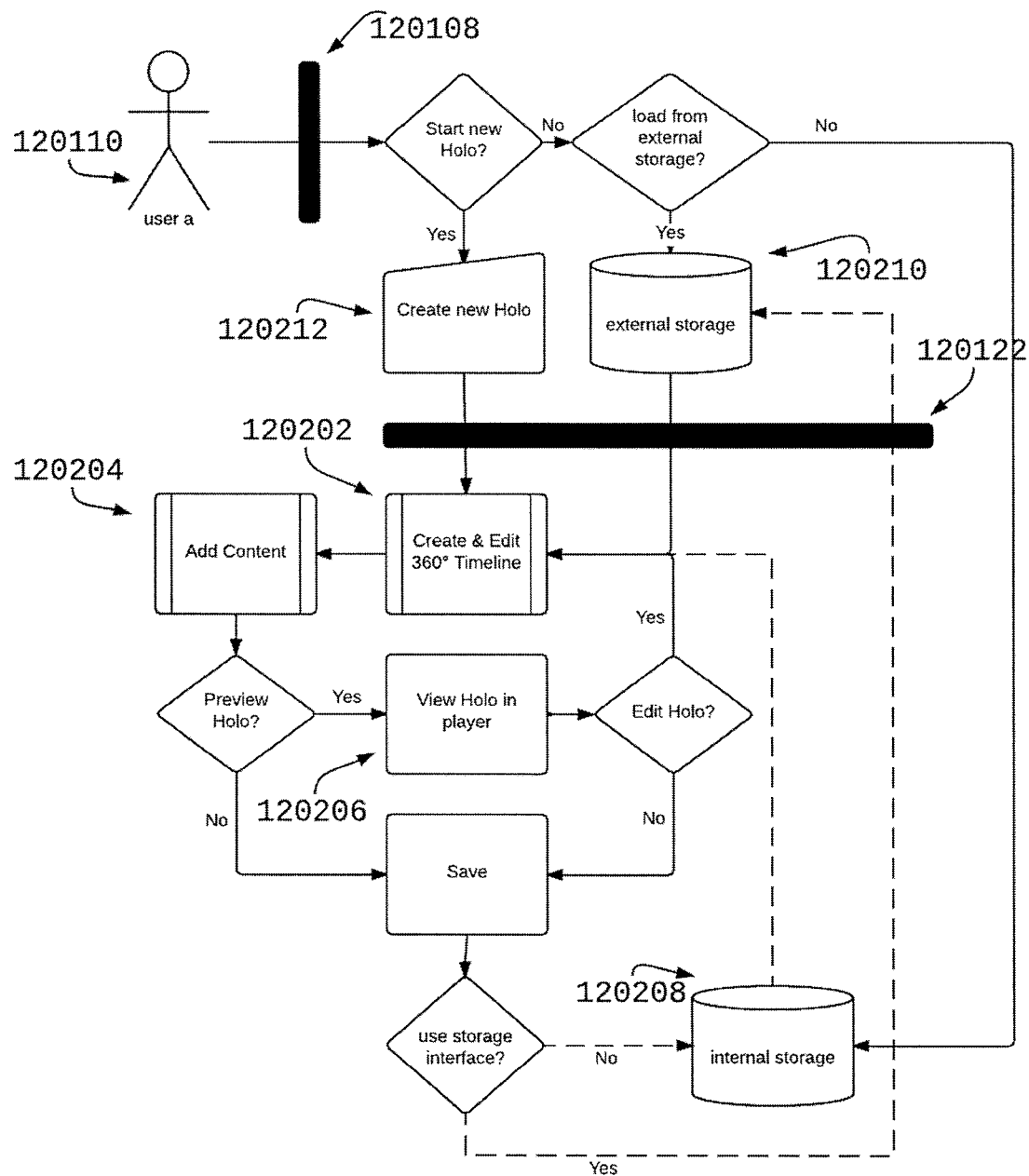
Figure 2C:
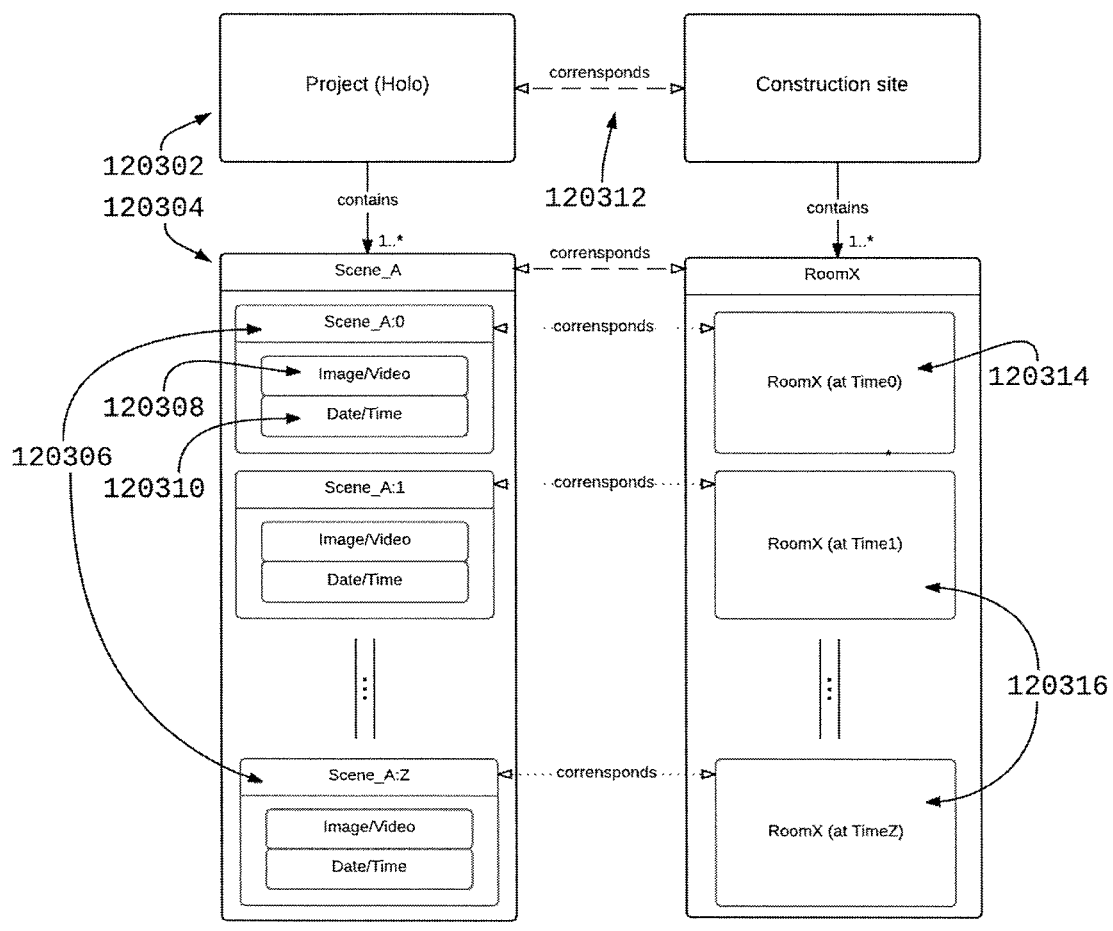
Figure 2D:
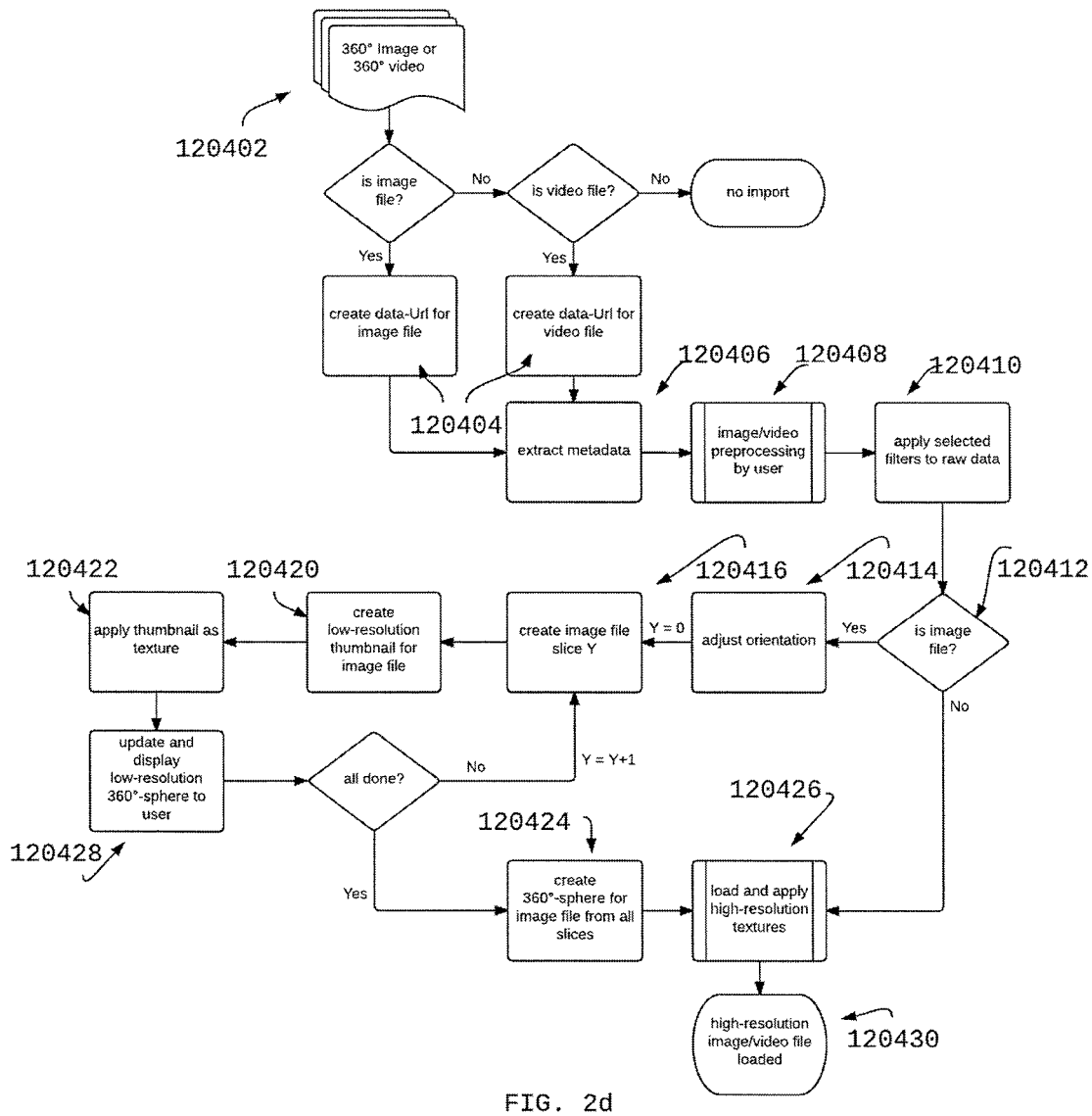
Figure 2E:
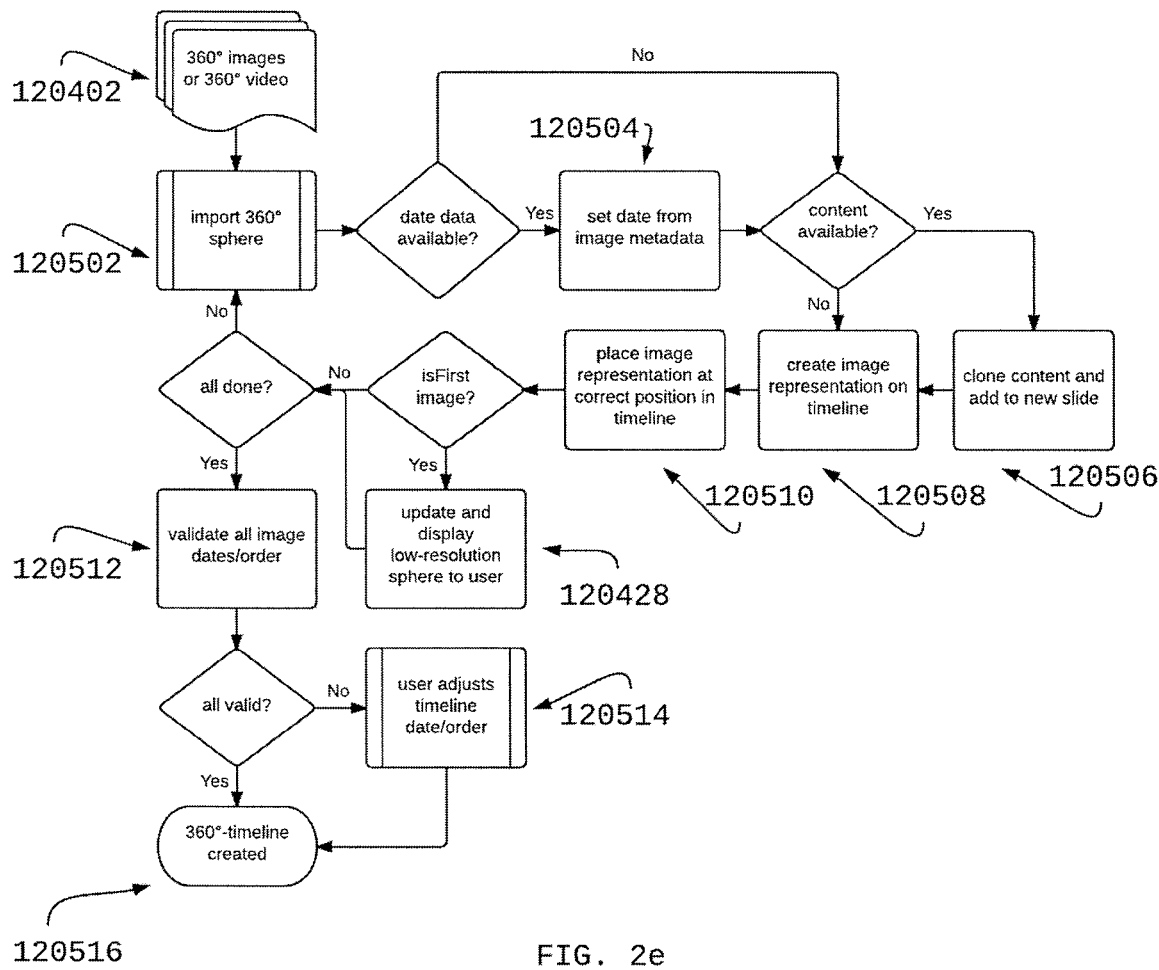
Figure 2F:
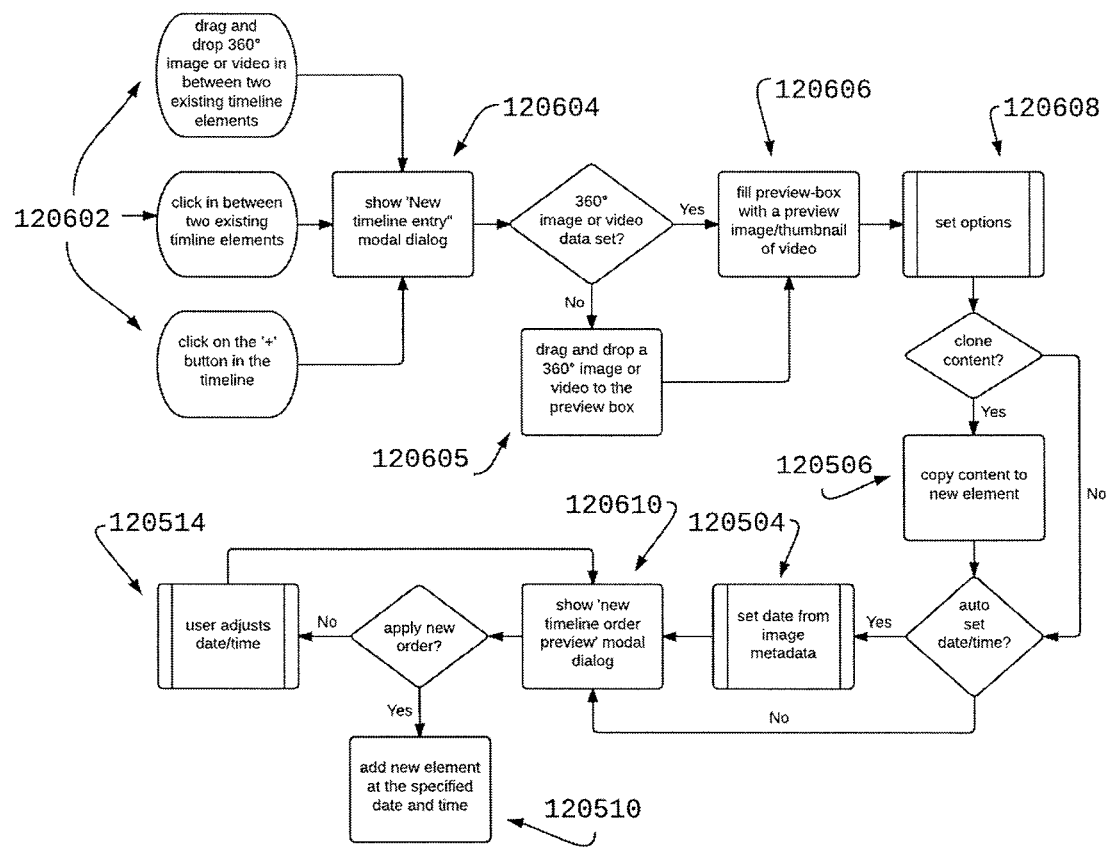
Figure 2G:
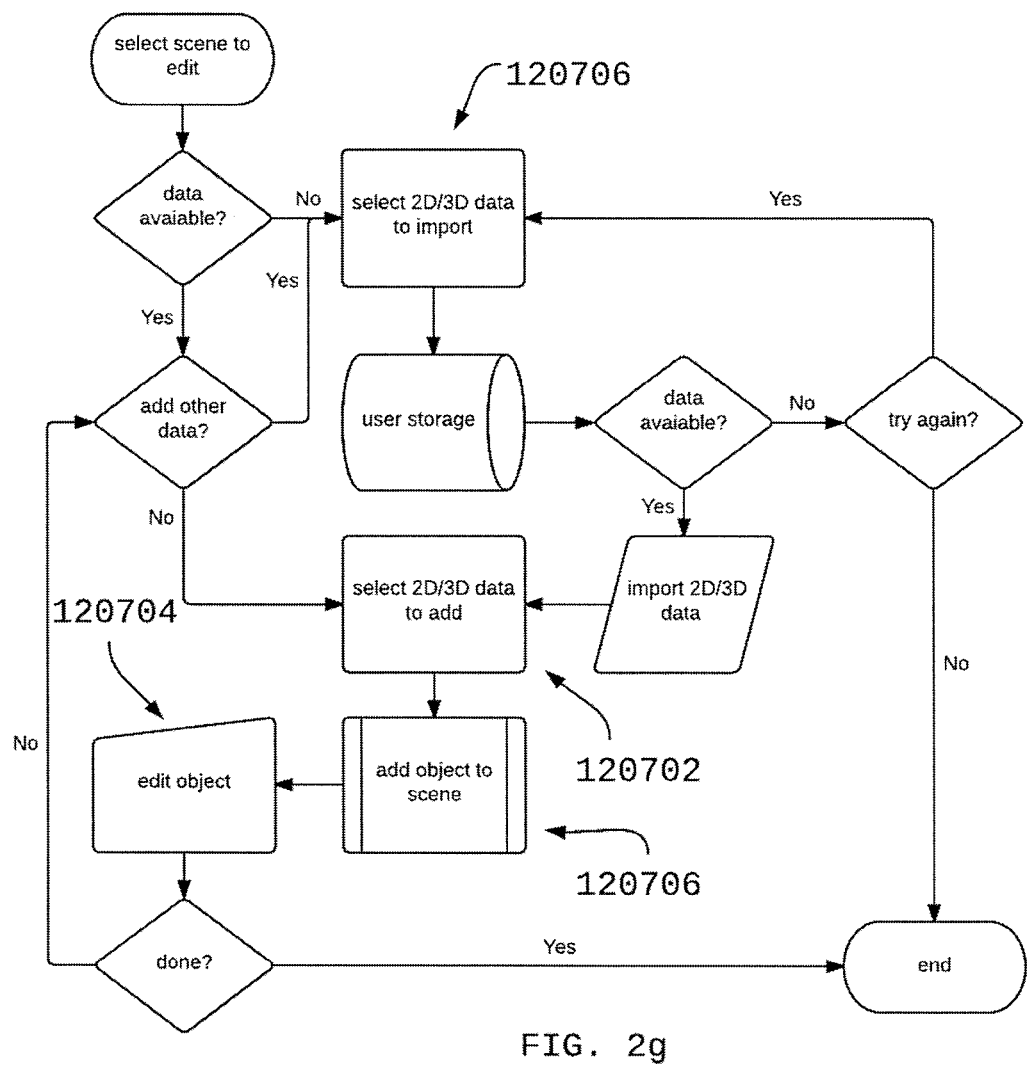
Figure 2H:
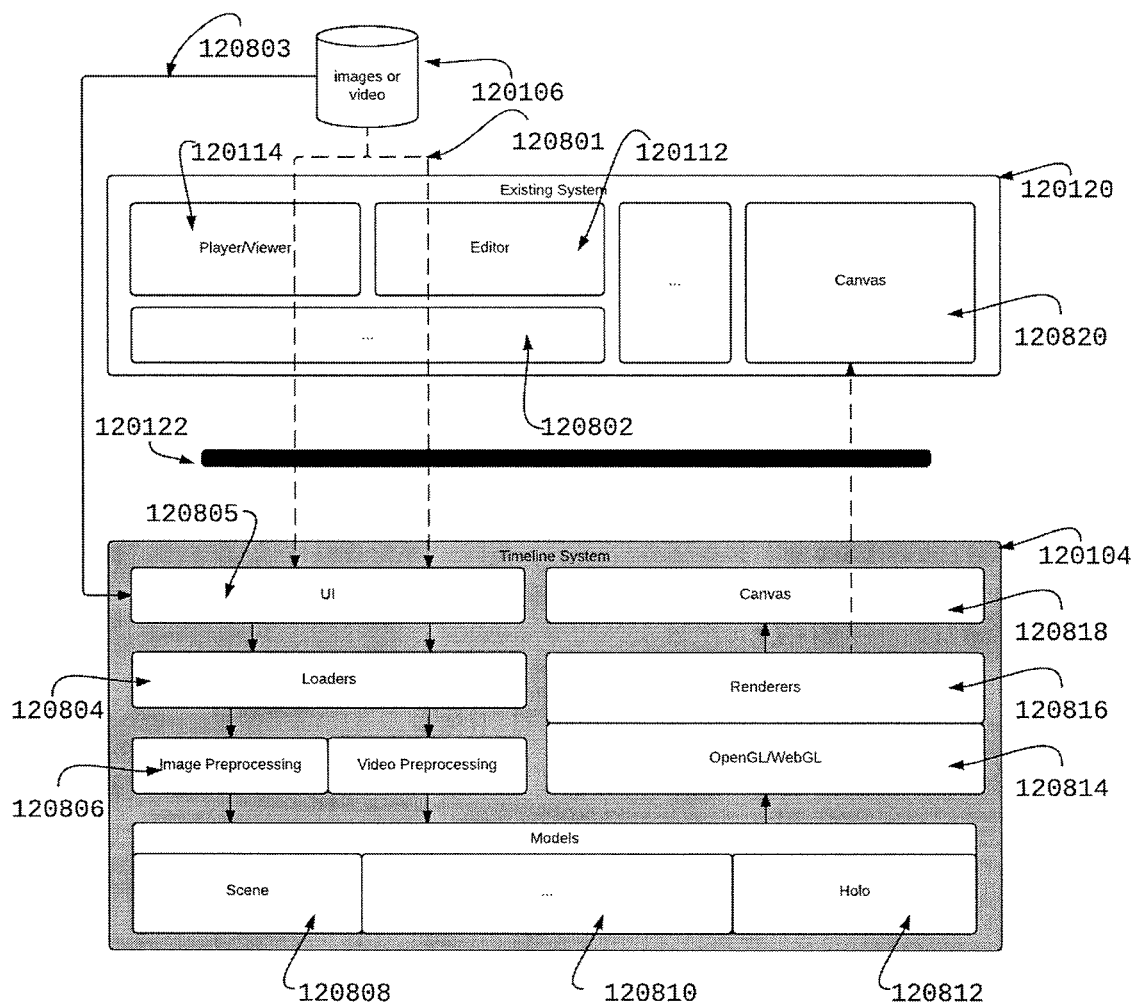
Figure 2I:
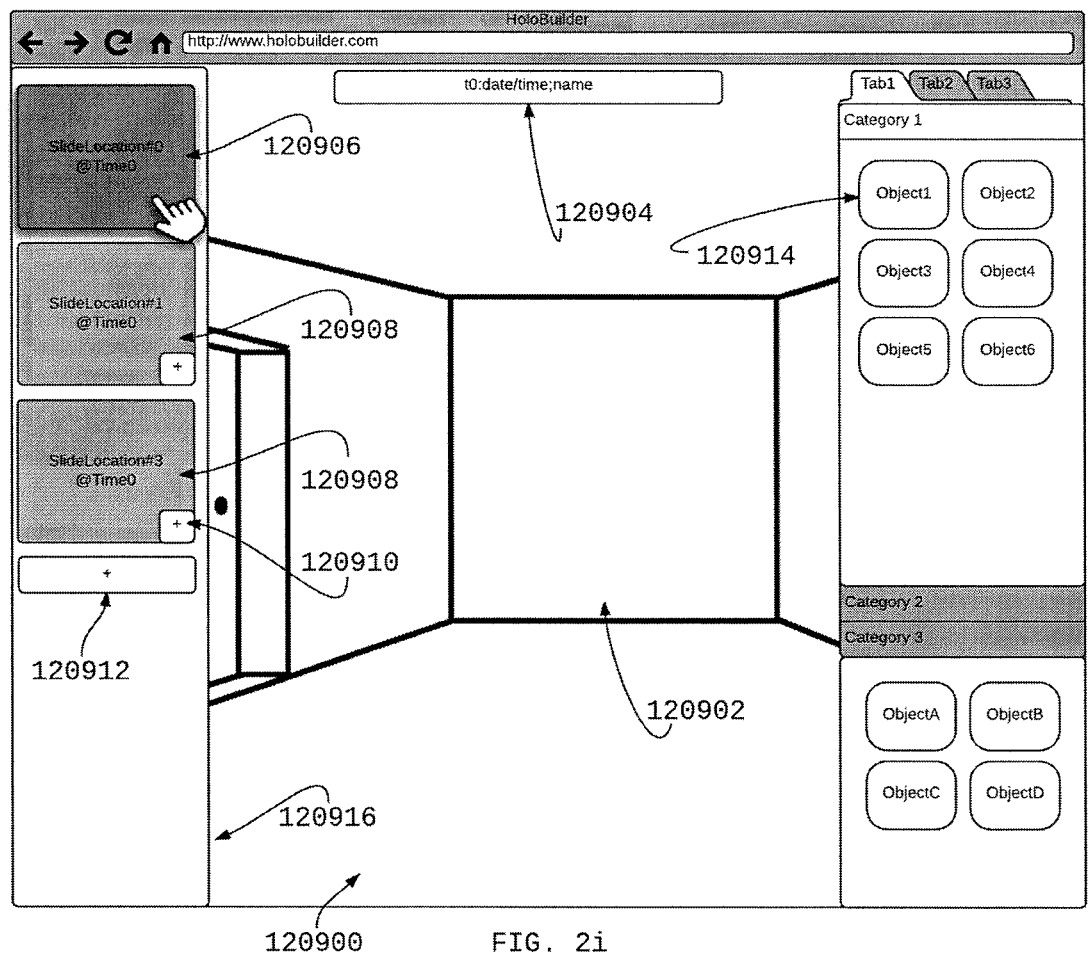
Figure 2J:
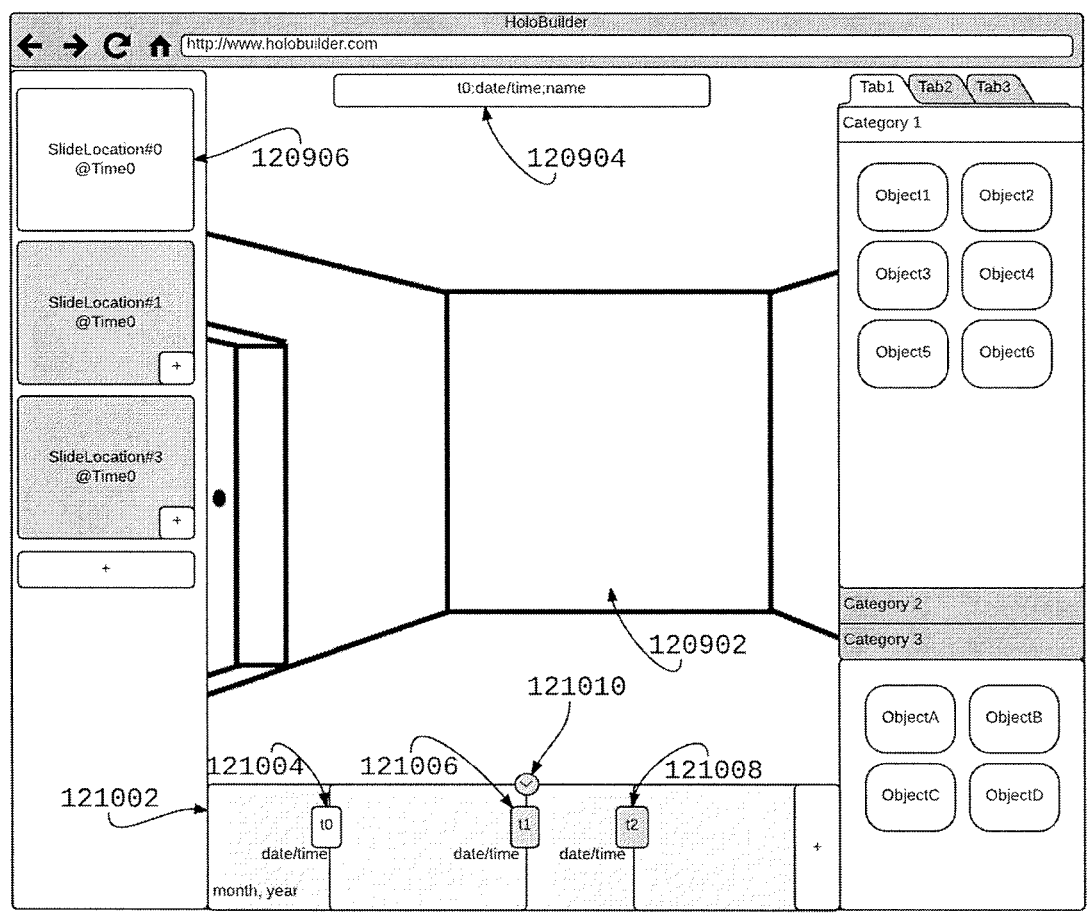
Figure 2K:
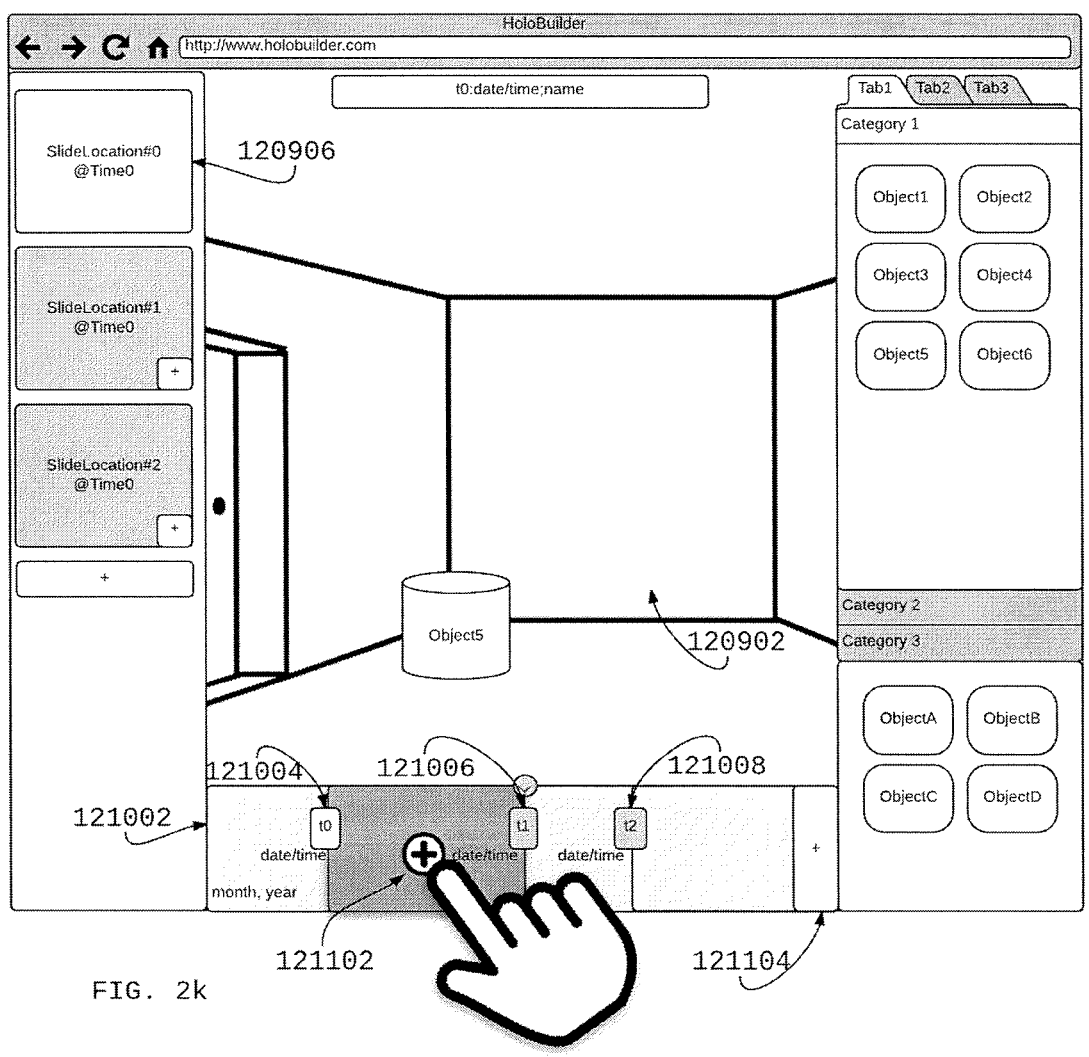
Figure 21:
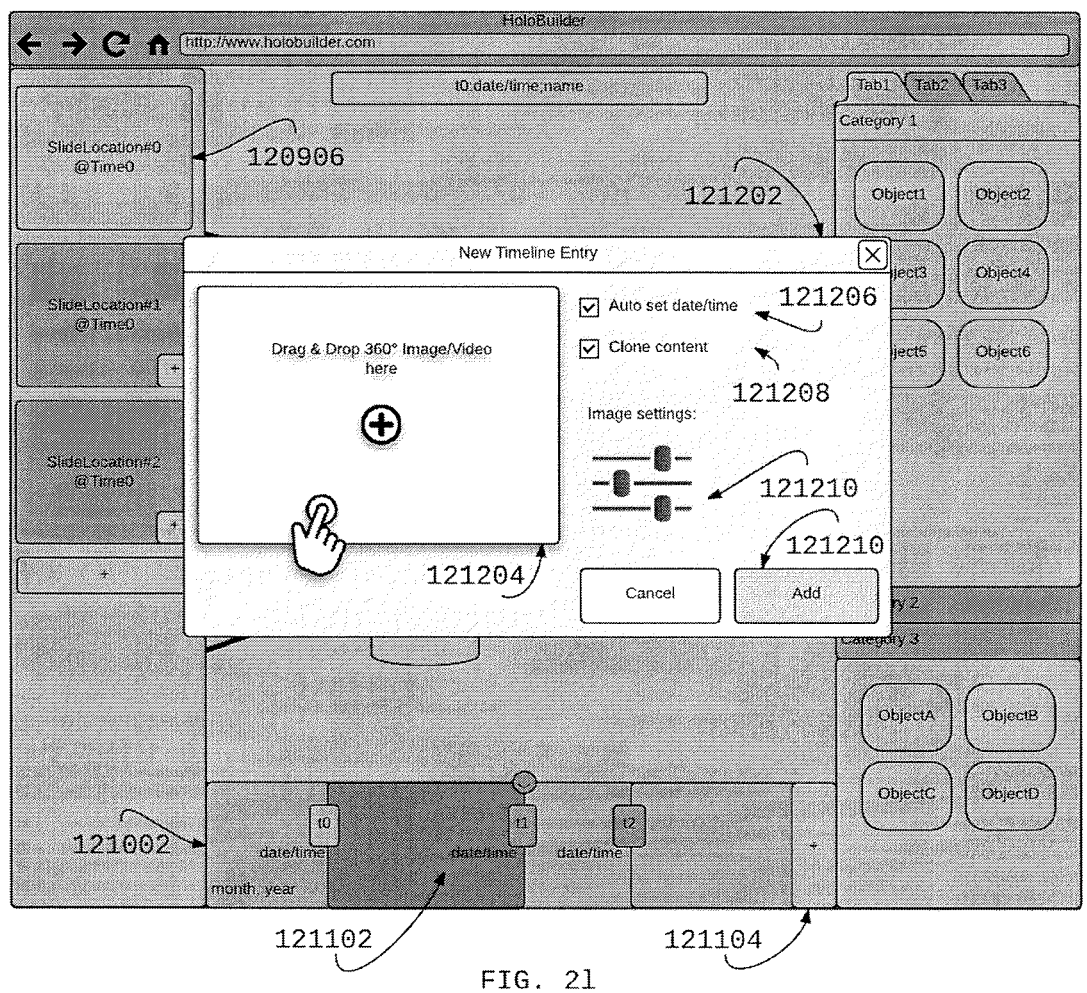
Figure 2M:
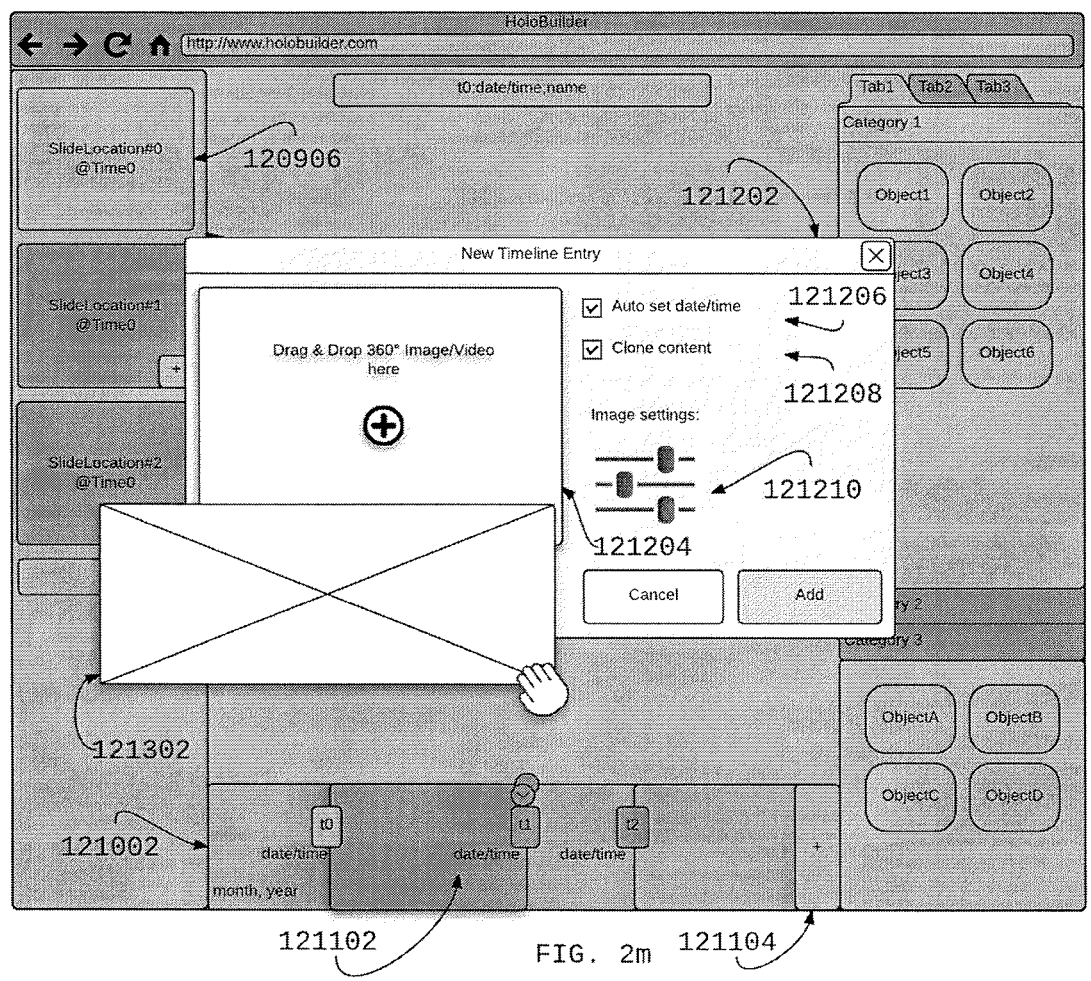
Figure 2N:
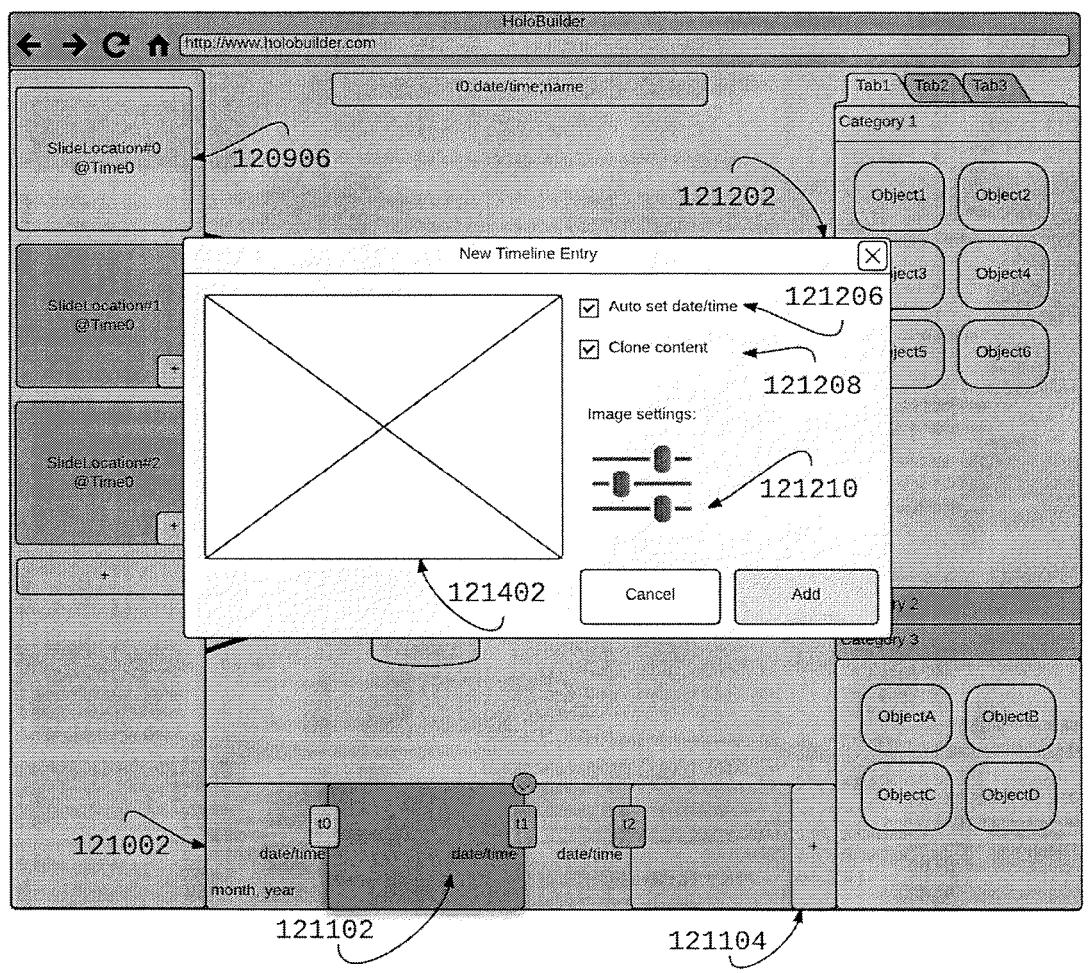
Figure 2O:
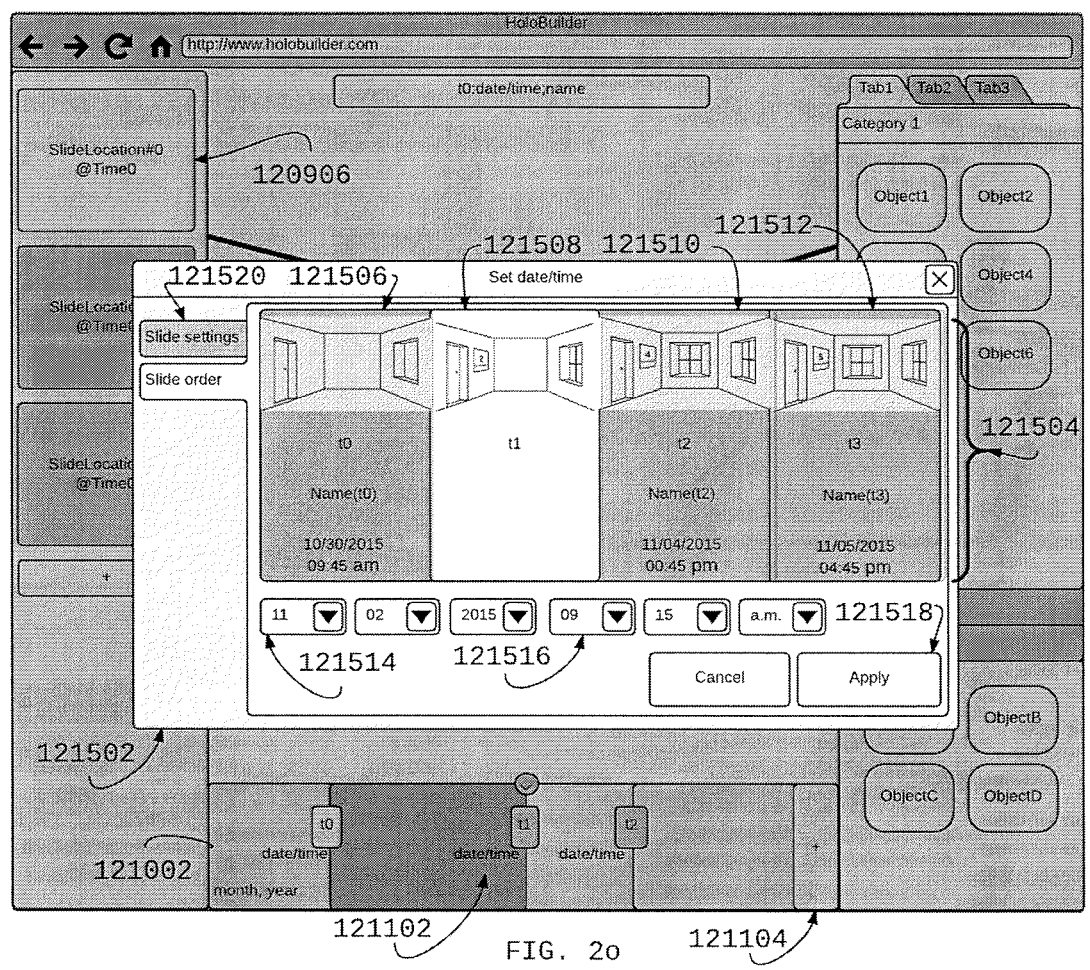
Figure 2P:
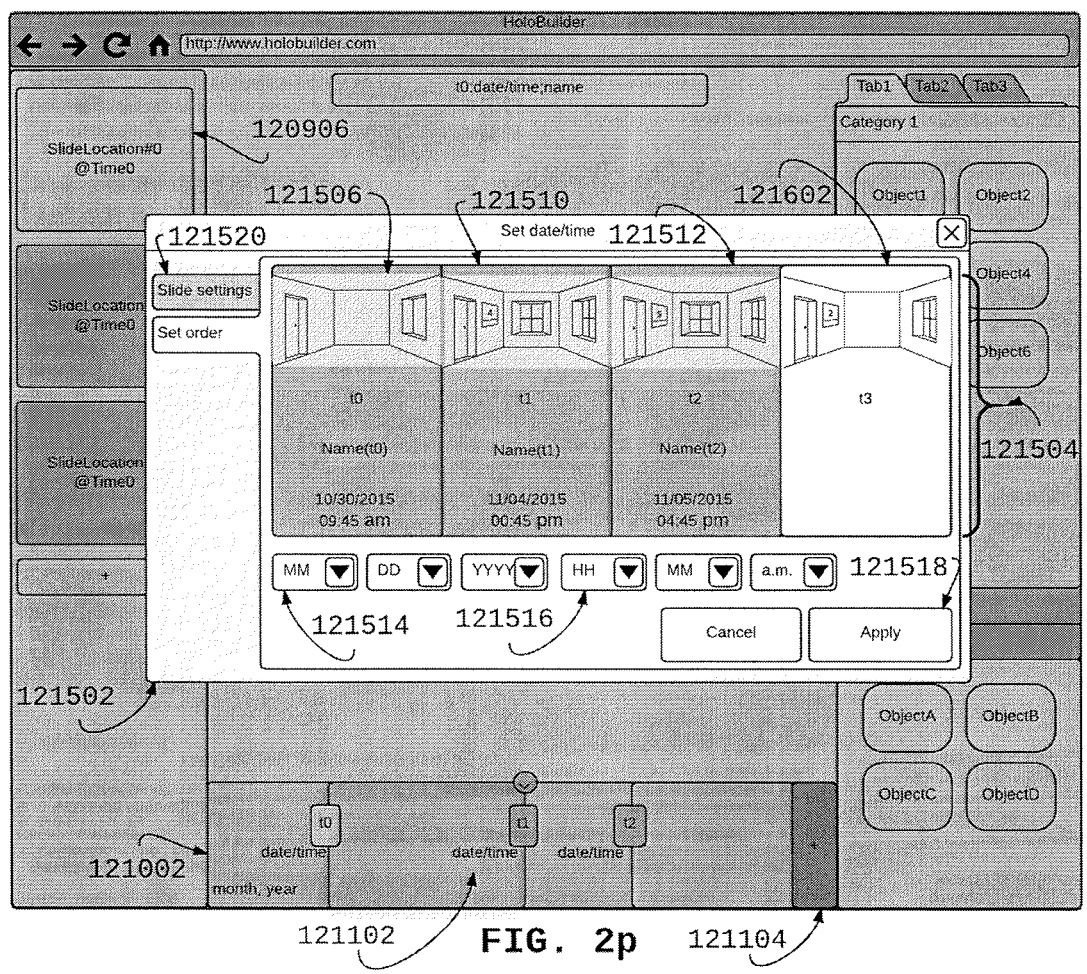
Figure 2Q:
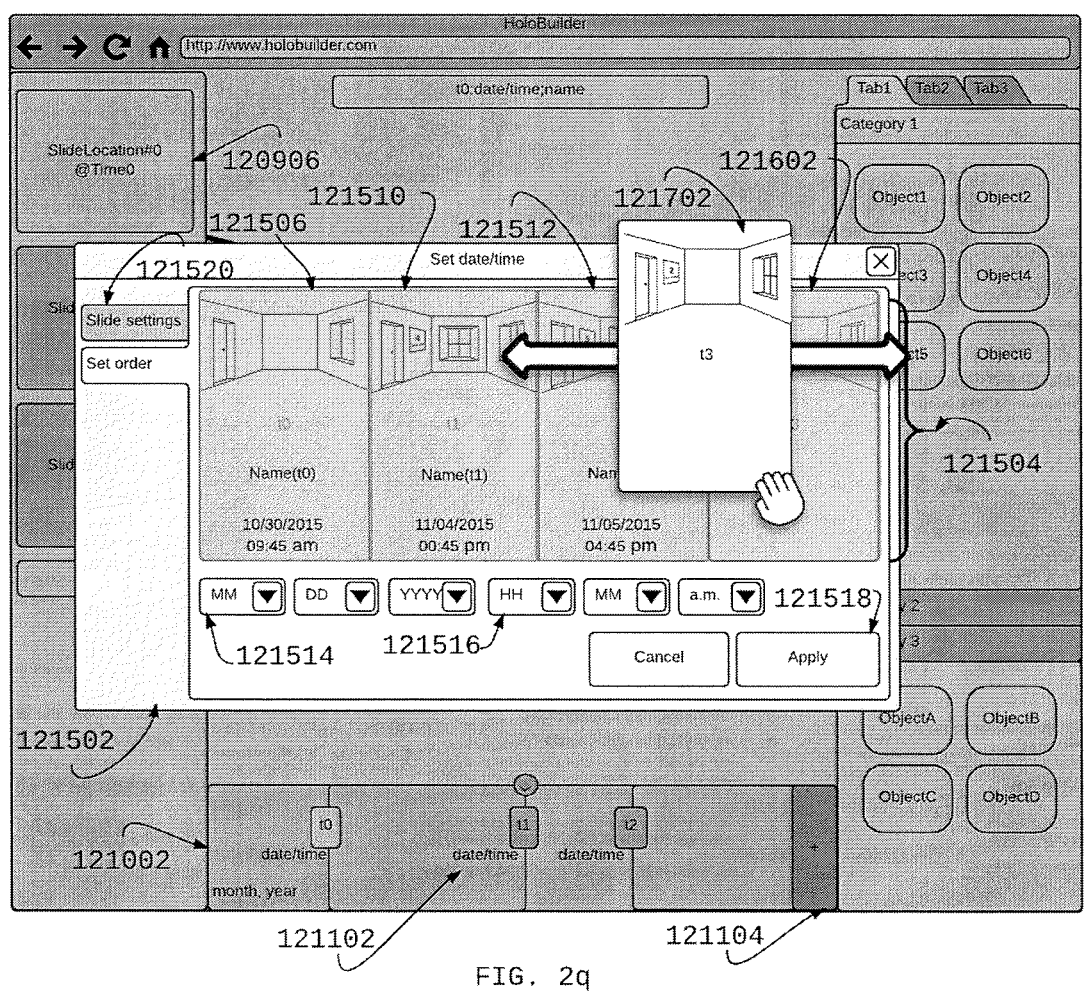
Figure 2R:
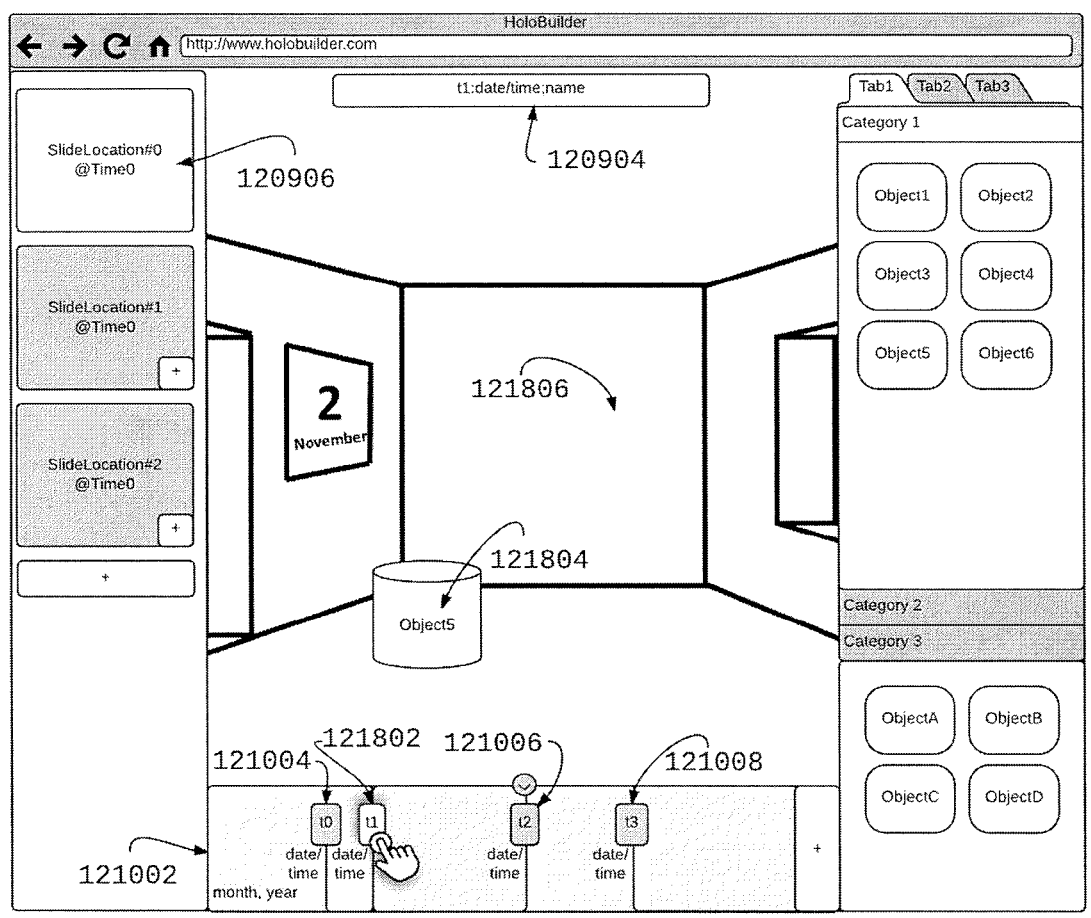
Figure 2S:
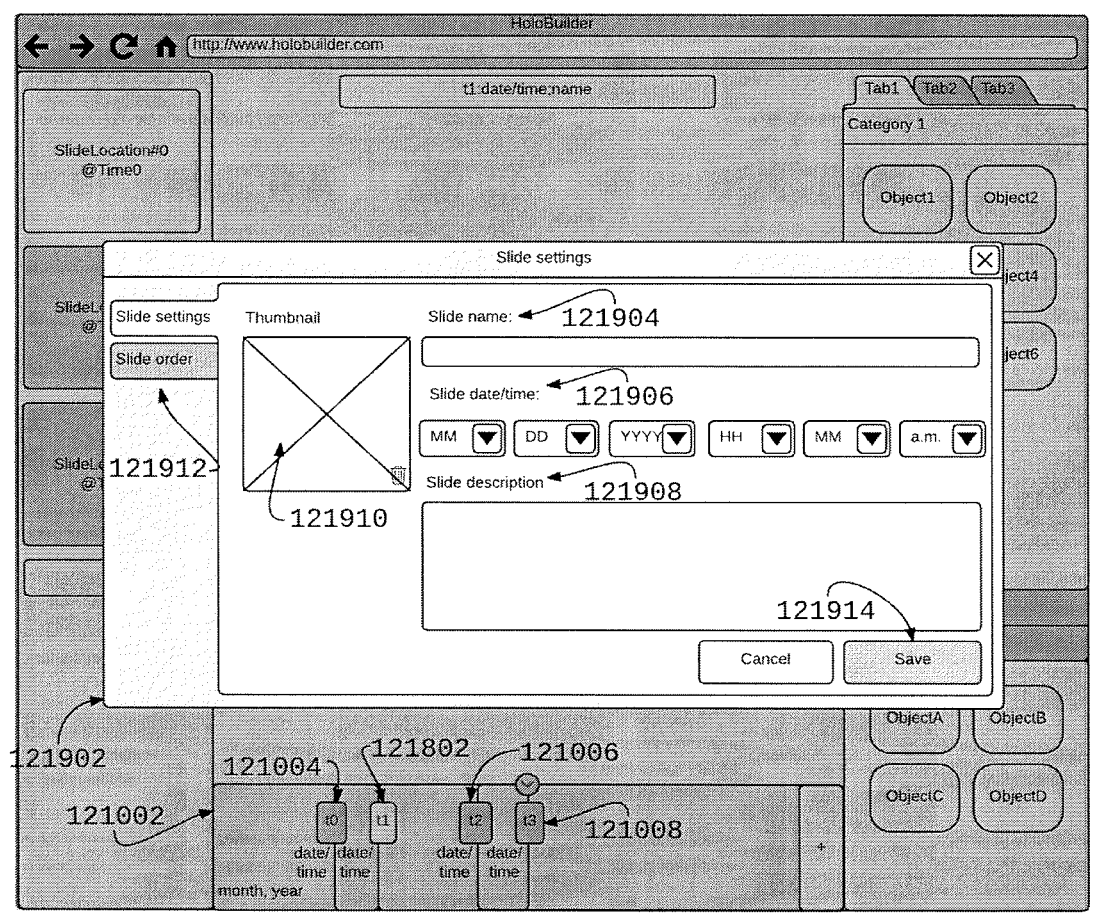
Figure 2T:
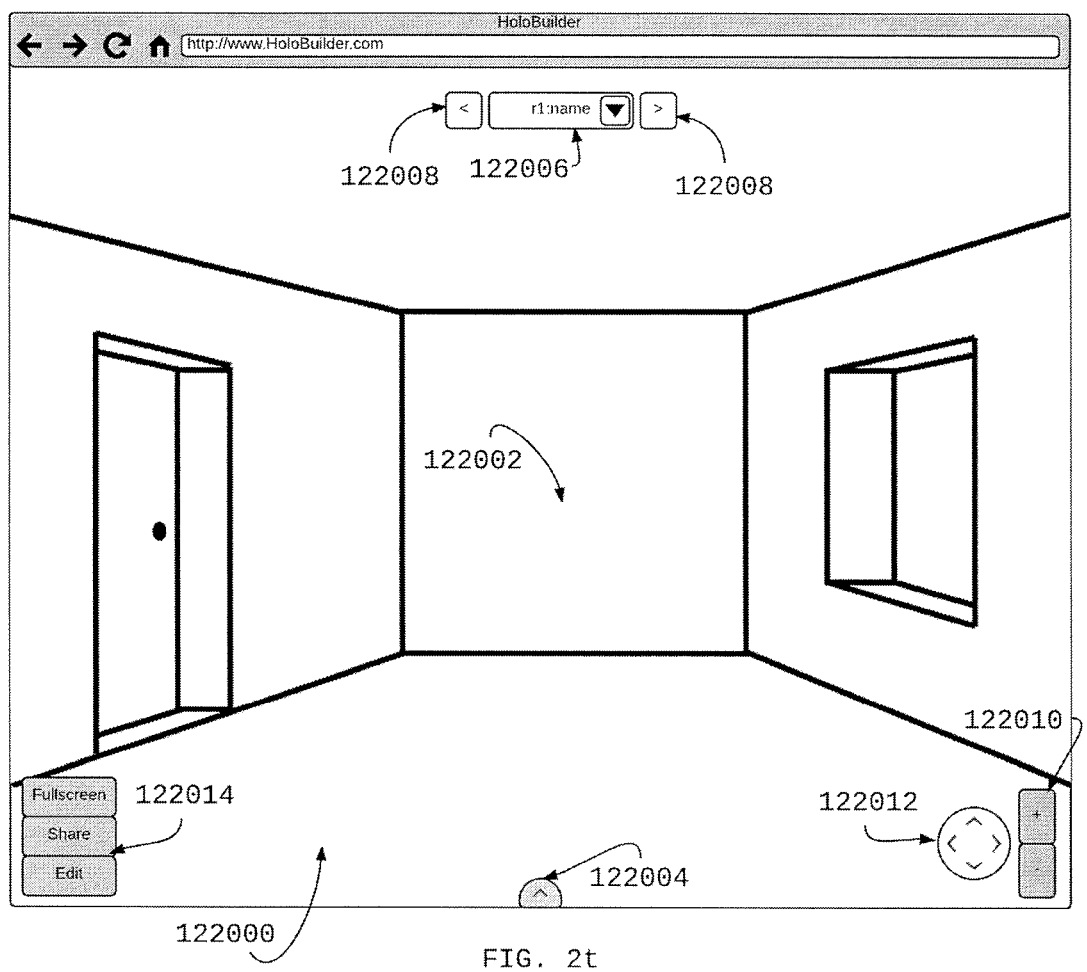
Figure 2U:
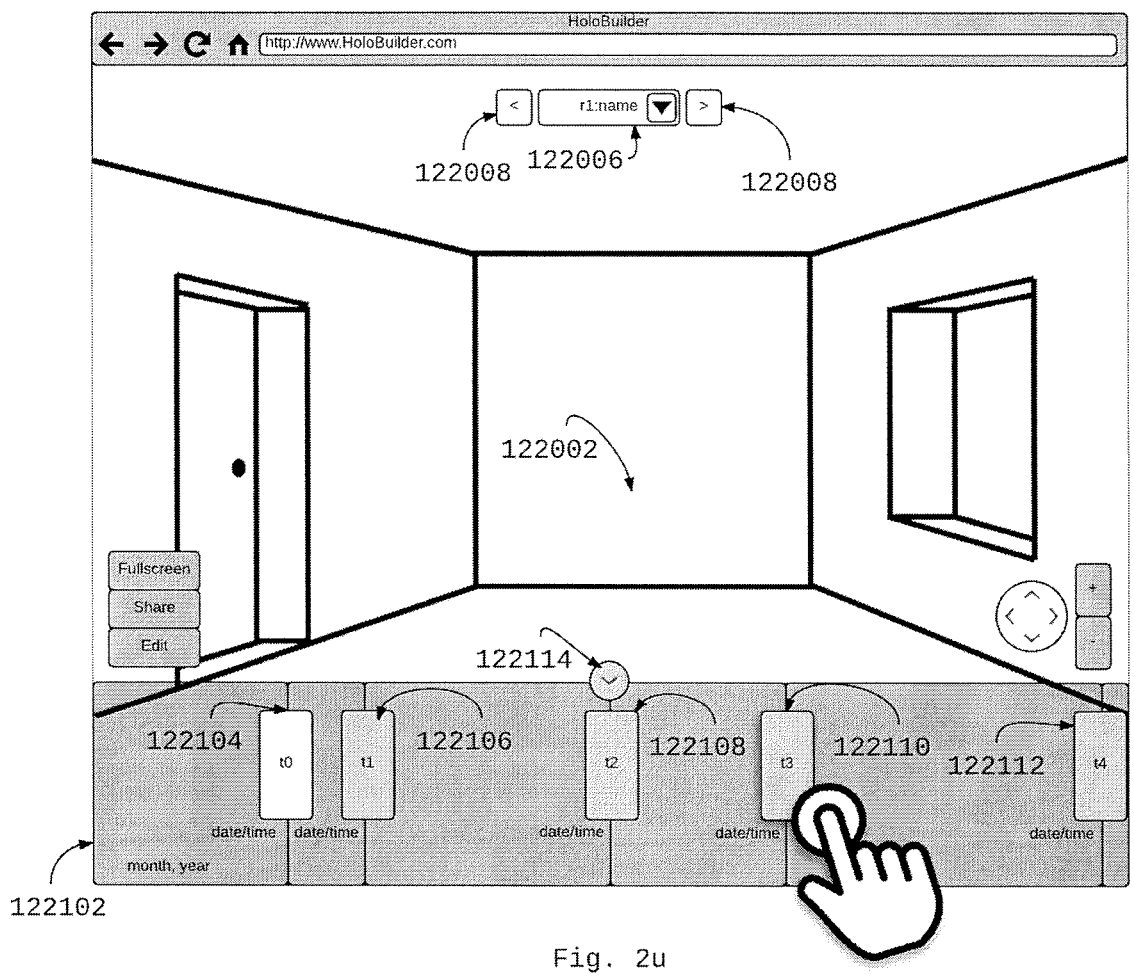
Figure 2V:
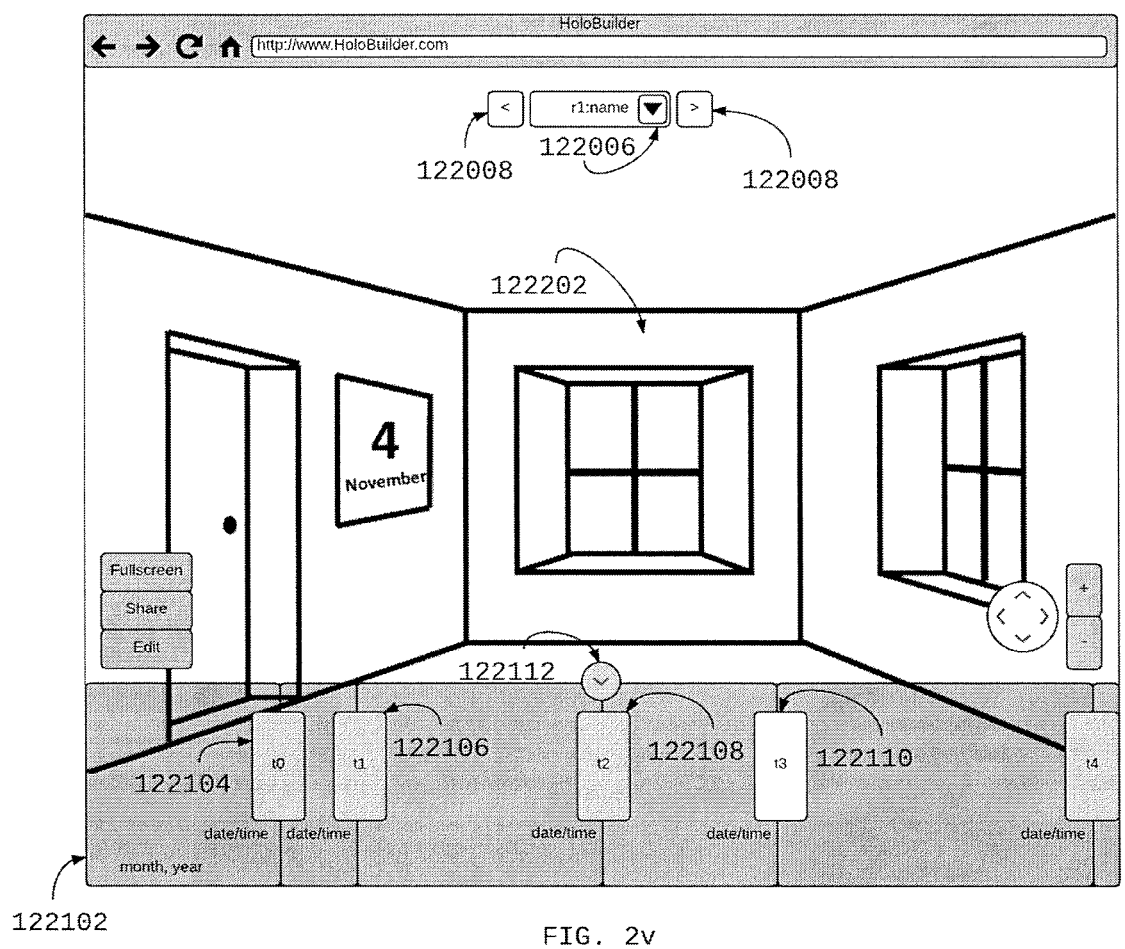
Figure 2W:
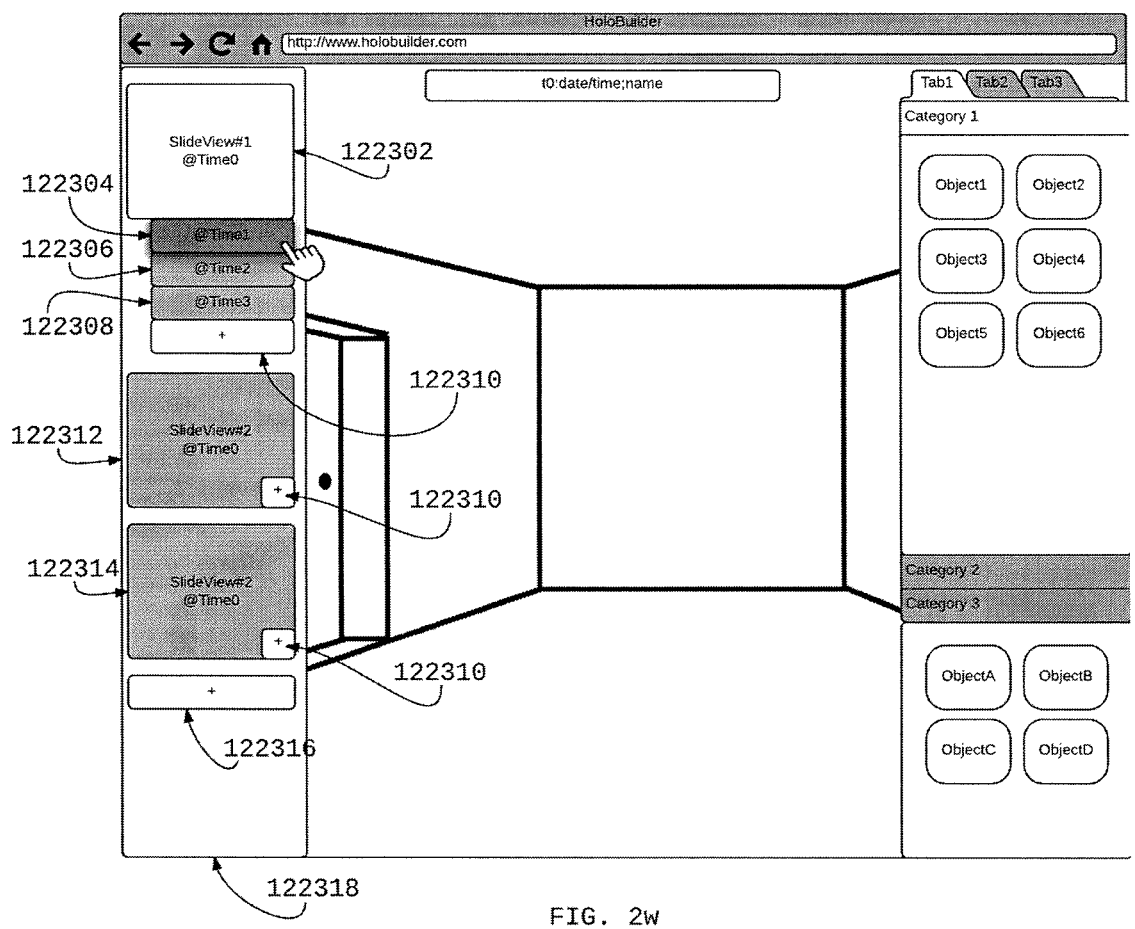
Figure 2X:
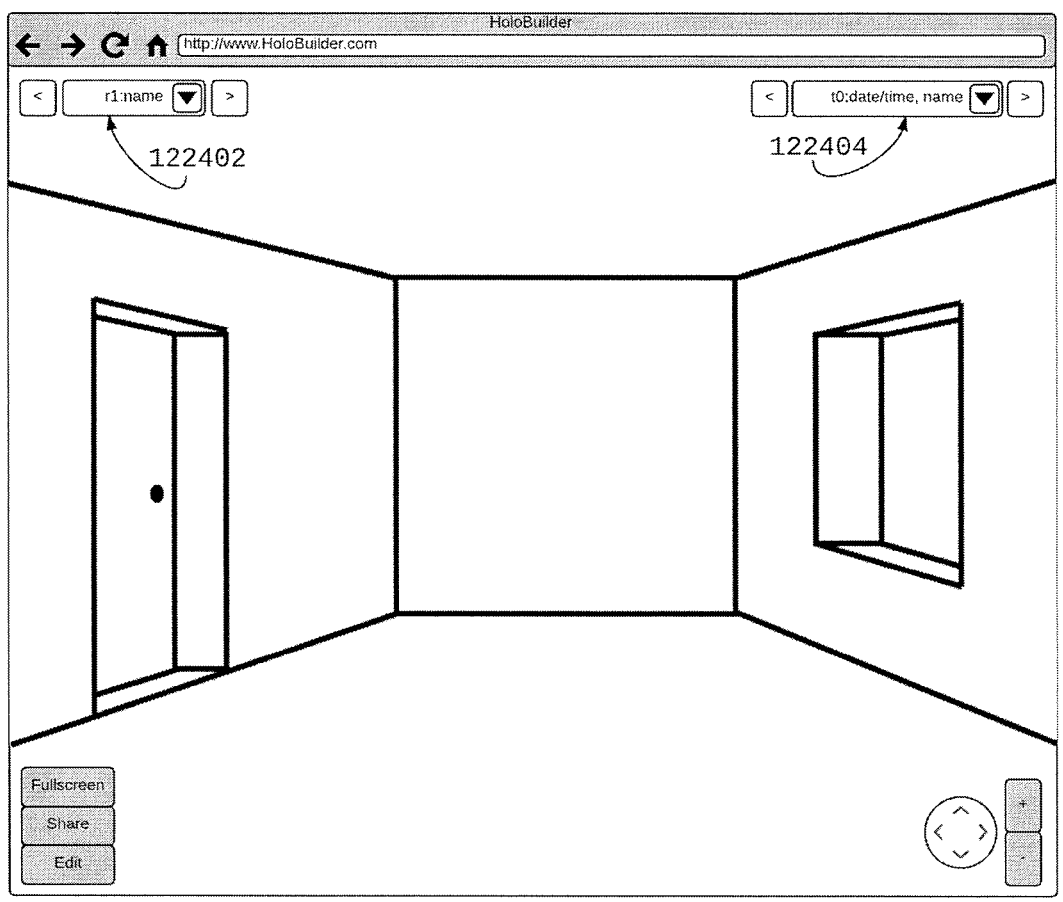
Figure 2Y:
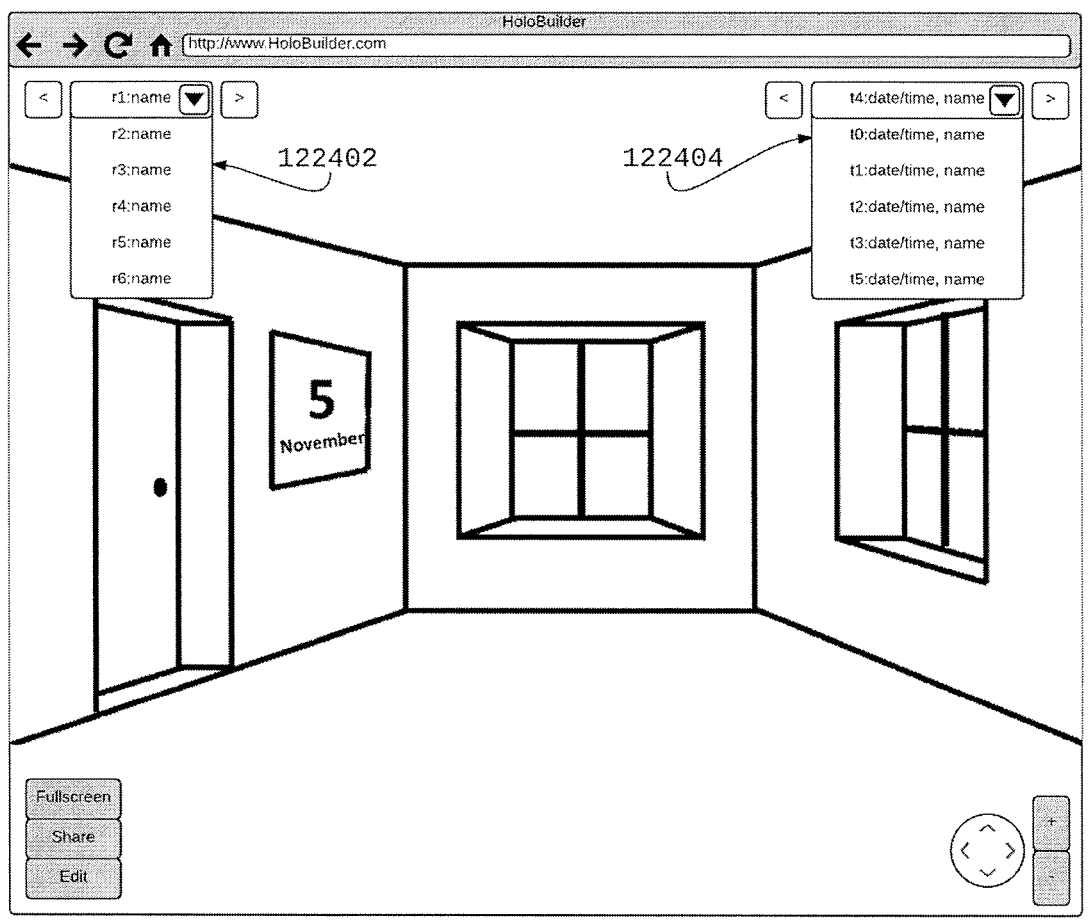
Figure 3A:
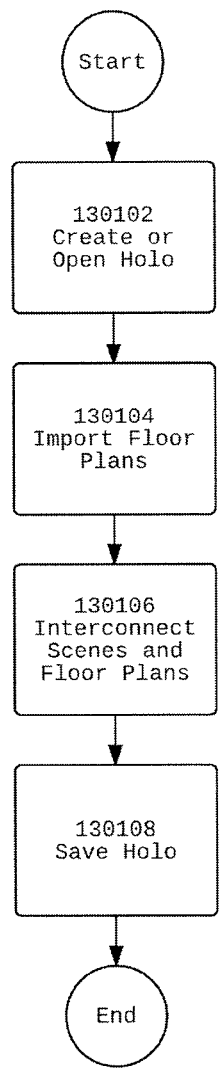
Figure 3B:
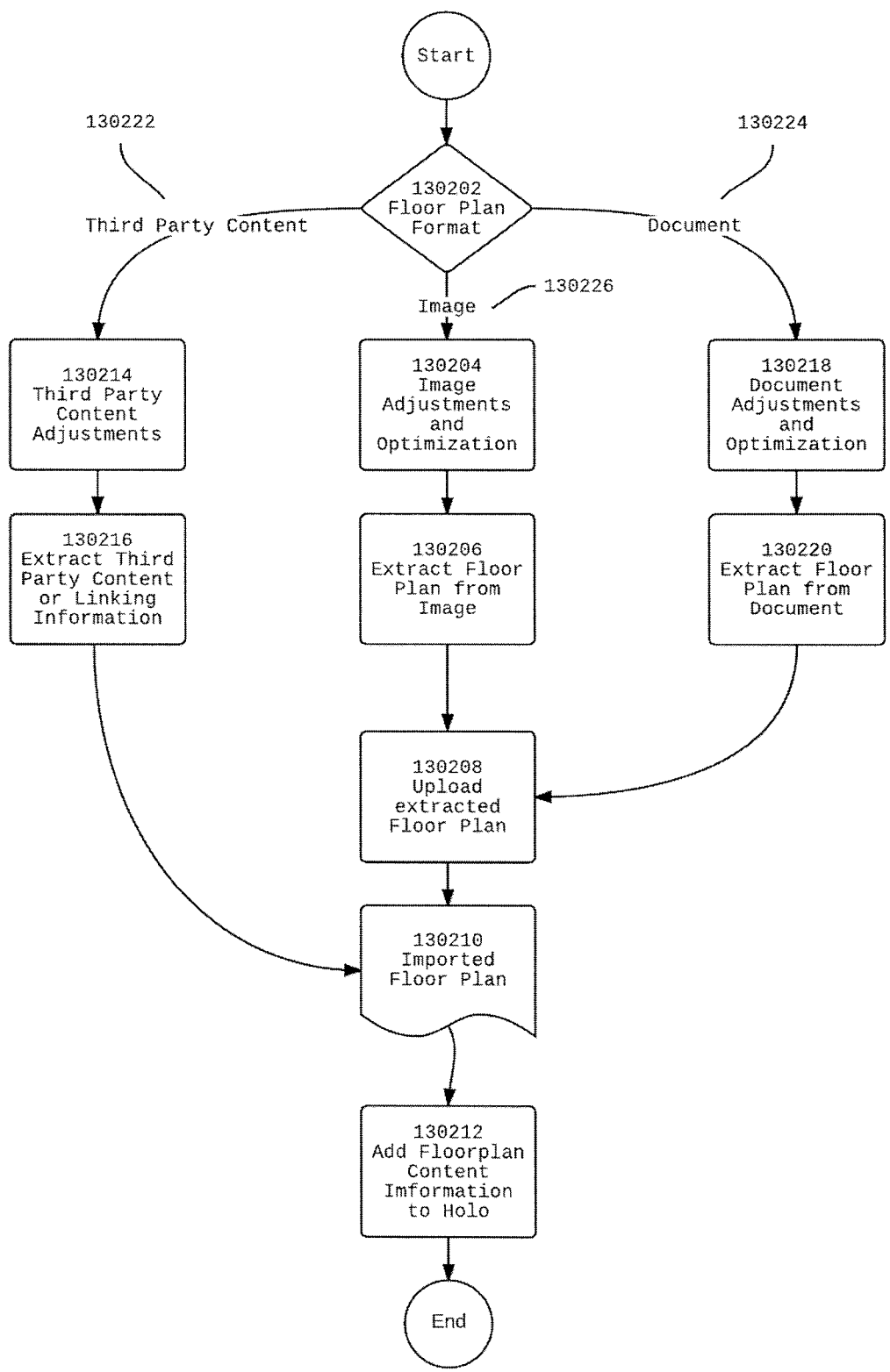
Figure 3C:
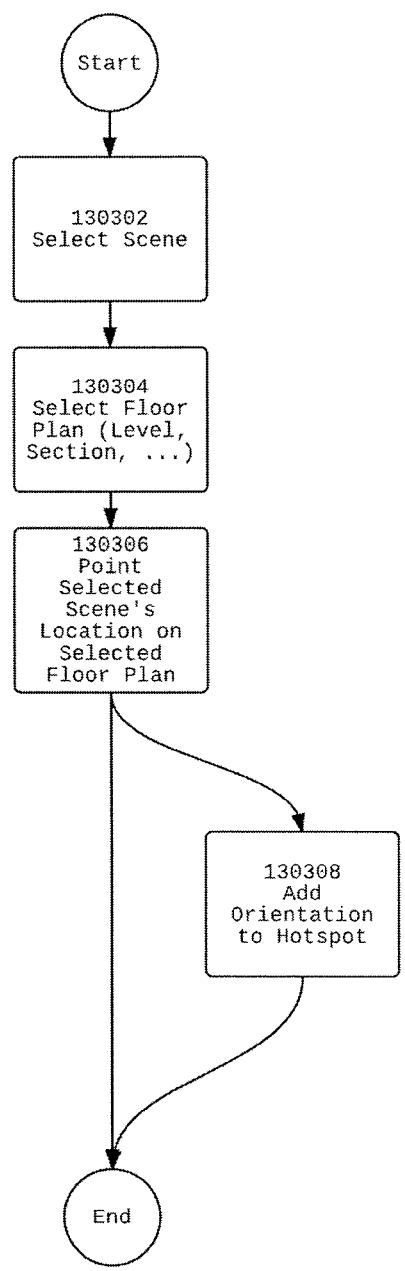
Figure 3D:
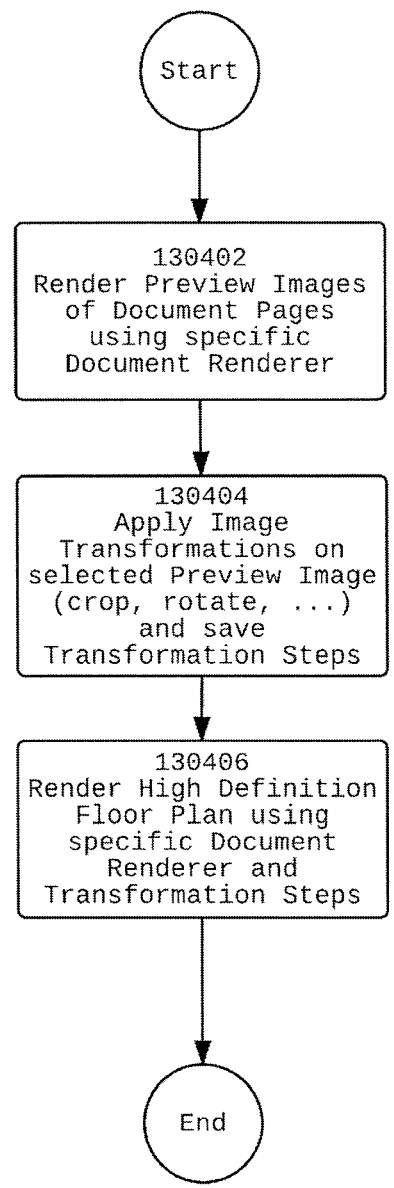
Figure 3E:
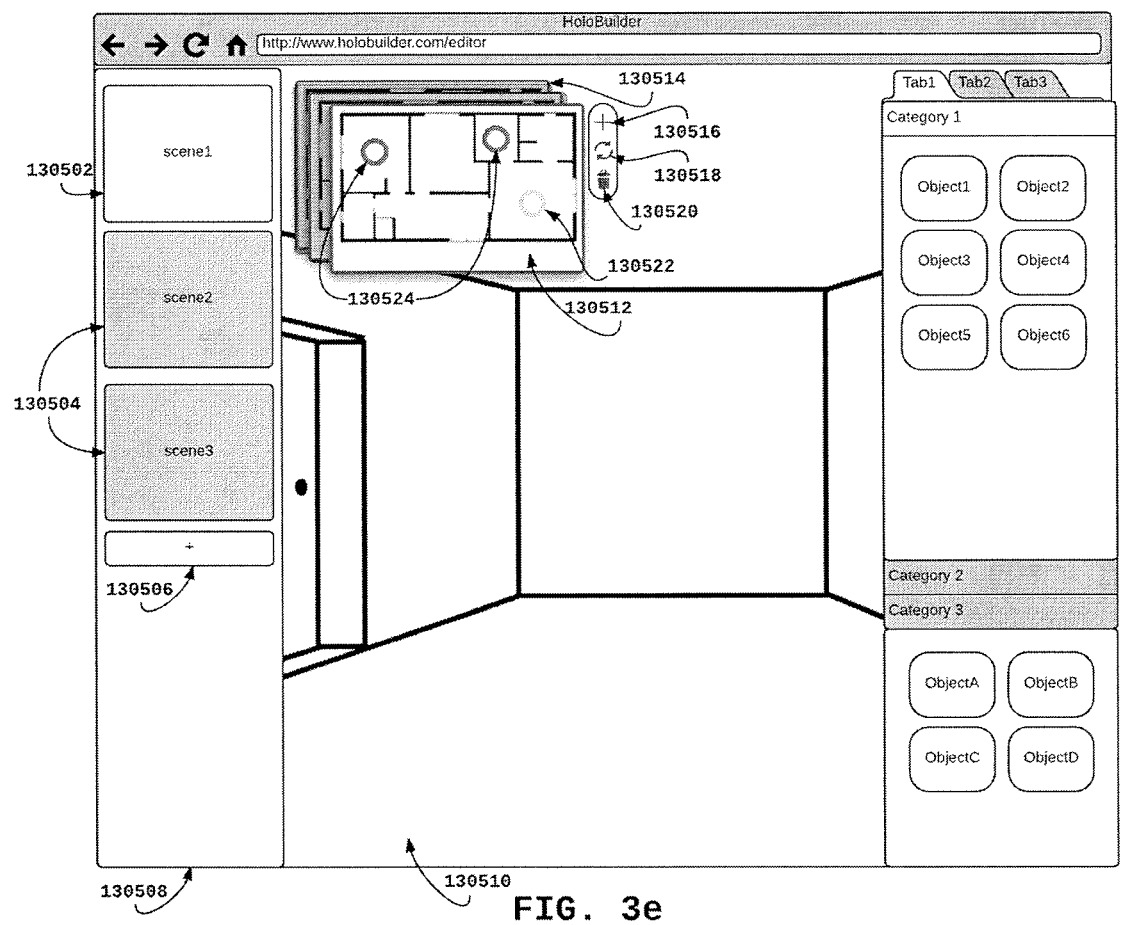
Figure 3F:
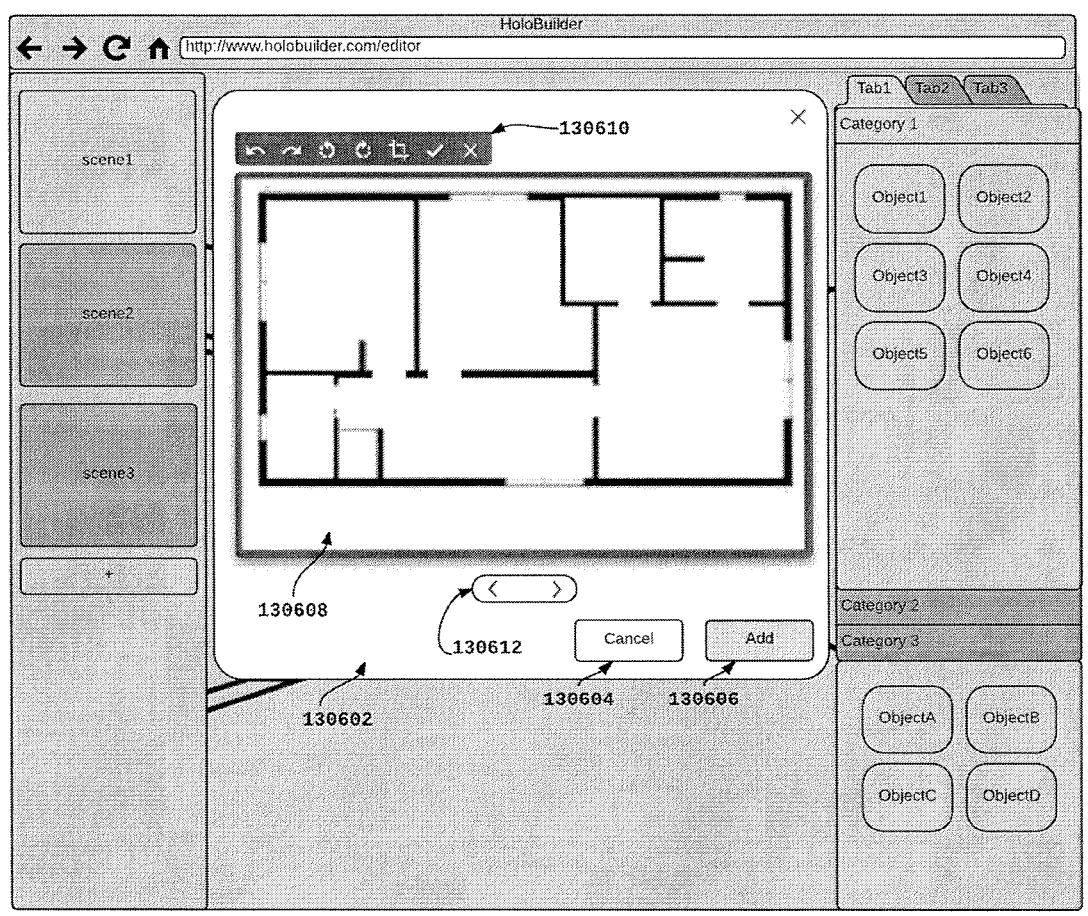
Figure 3G:
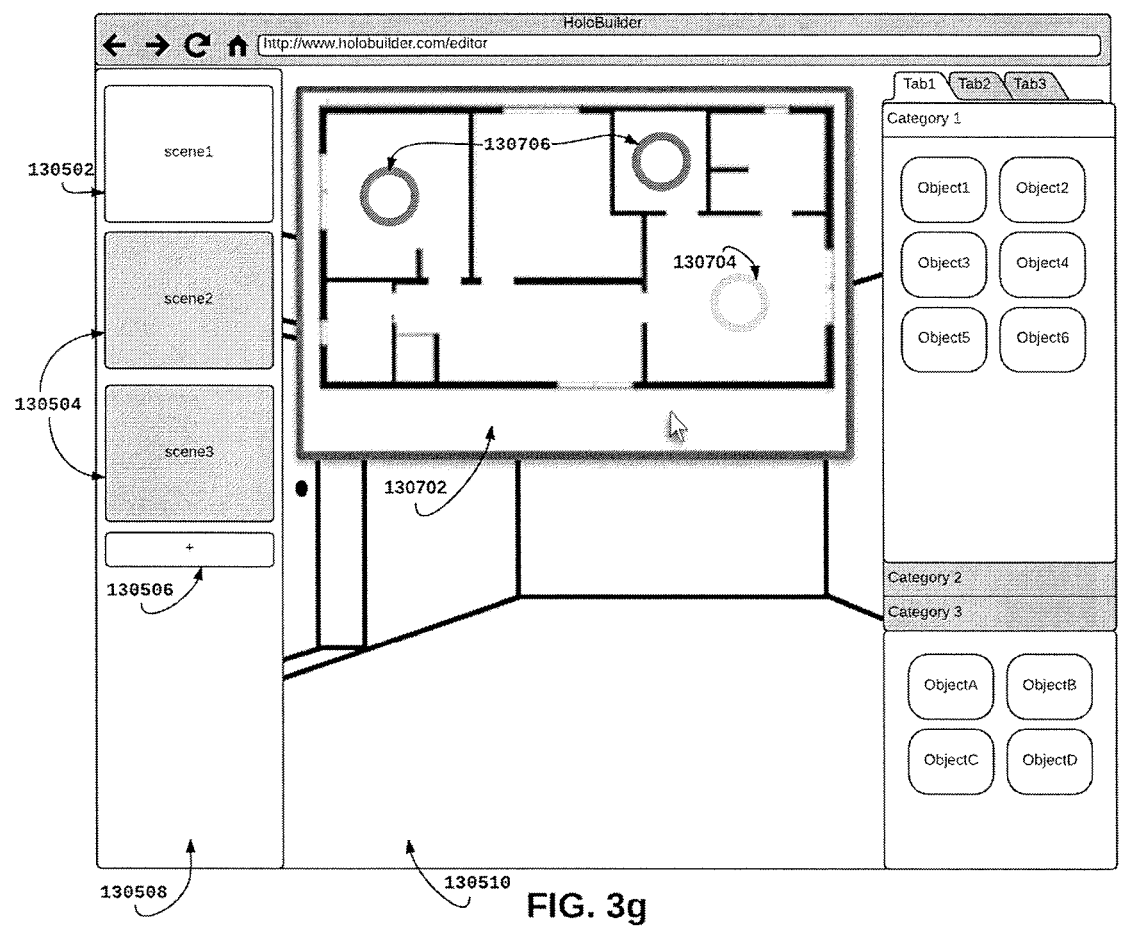
Figure 3H:
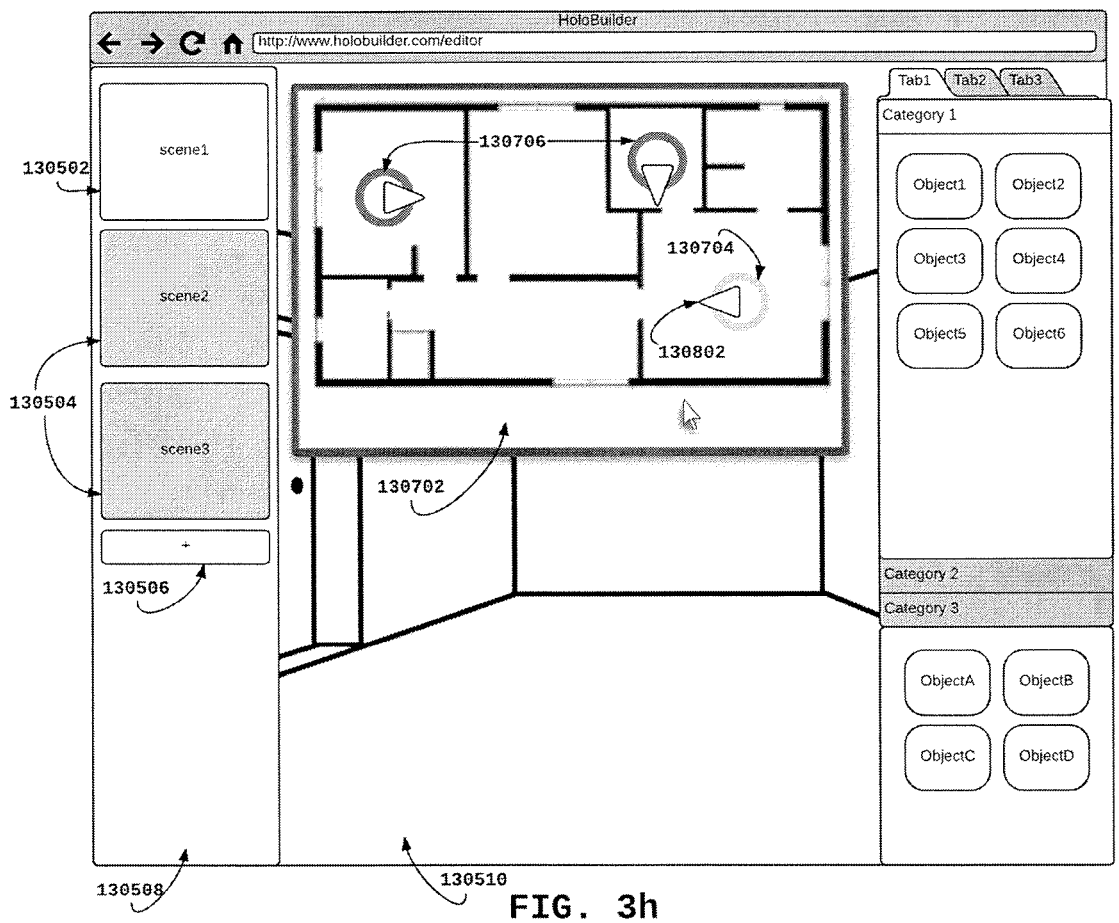
Figure 4A:
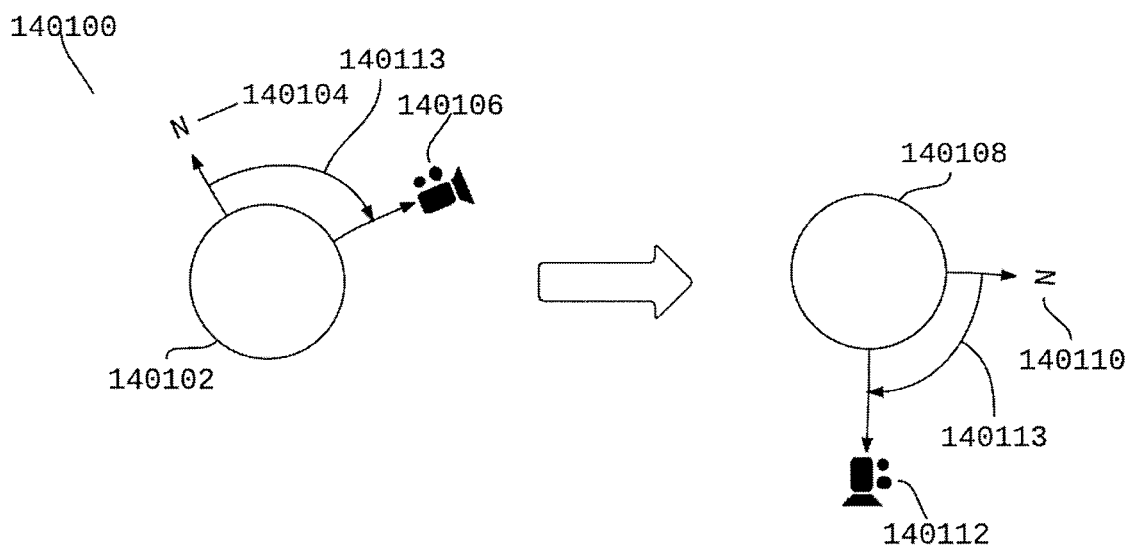
Figure 5A:
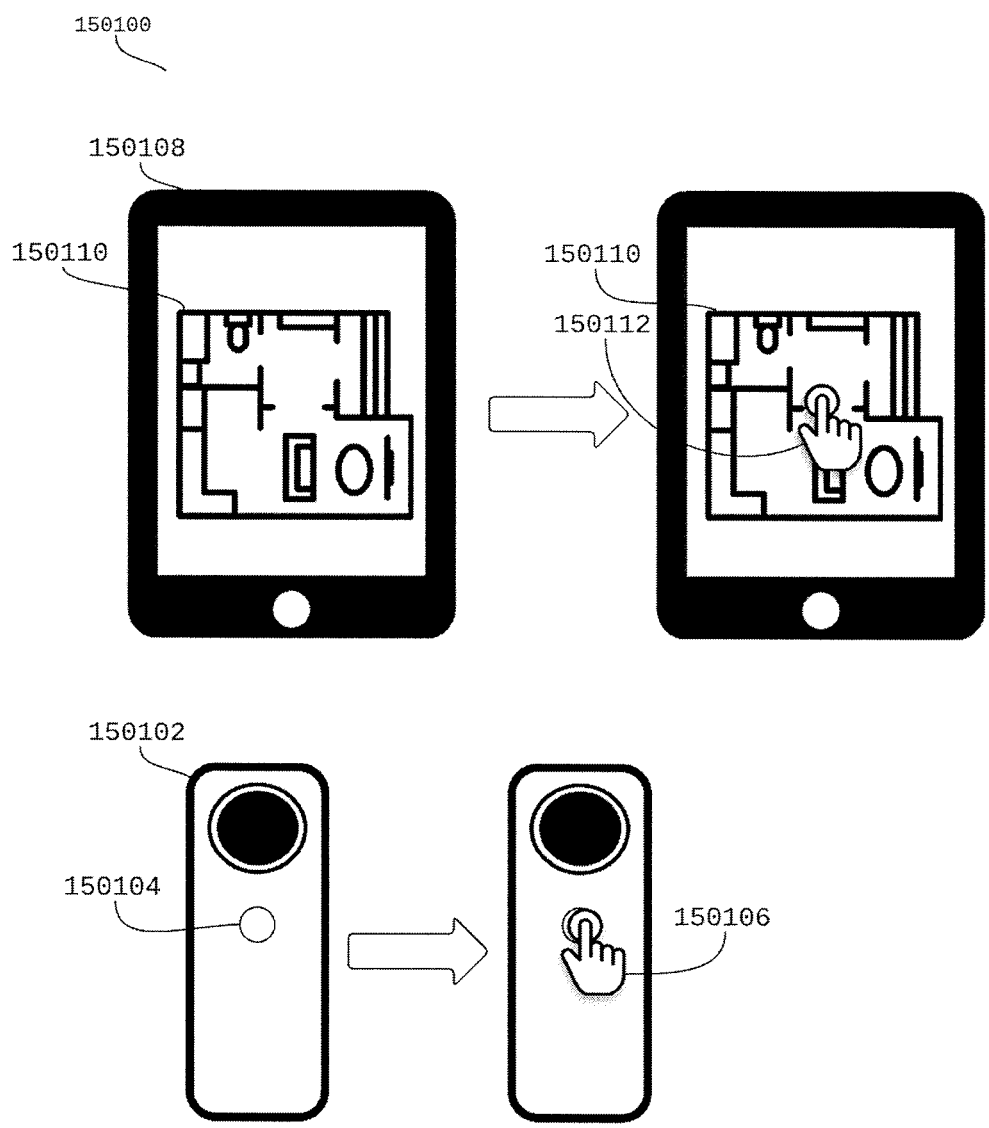
Figure 5B:
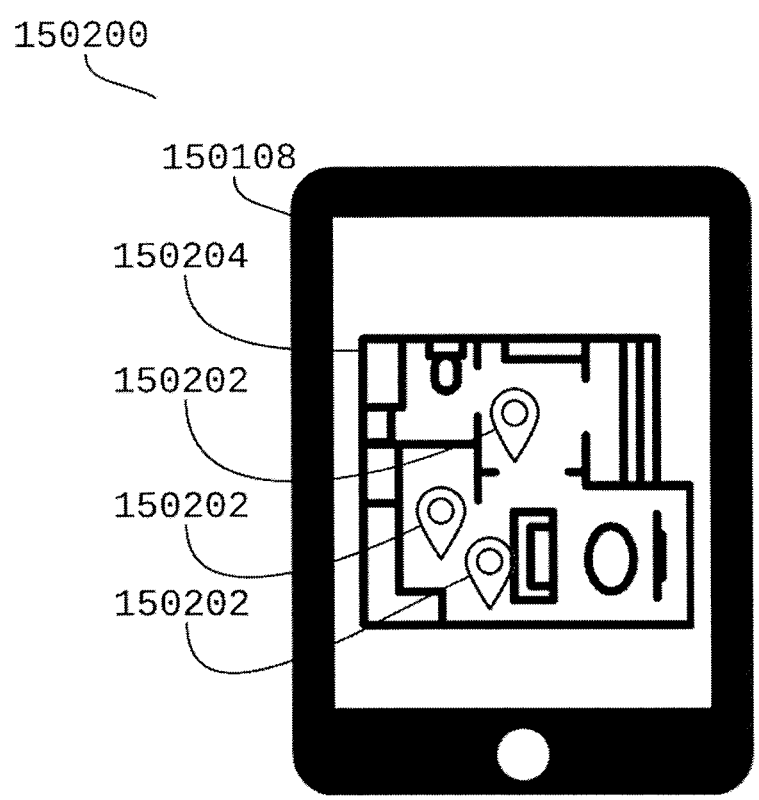
Figure 5C:
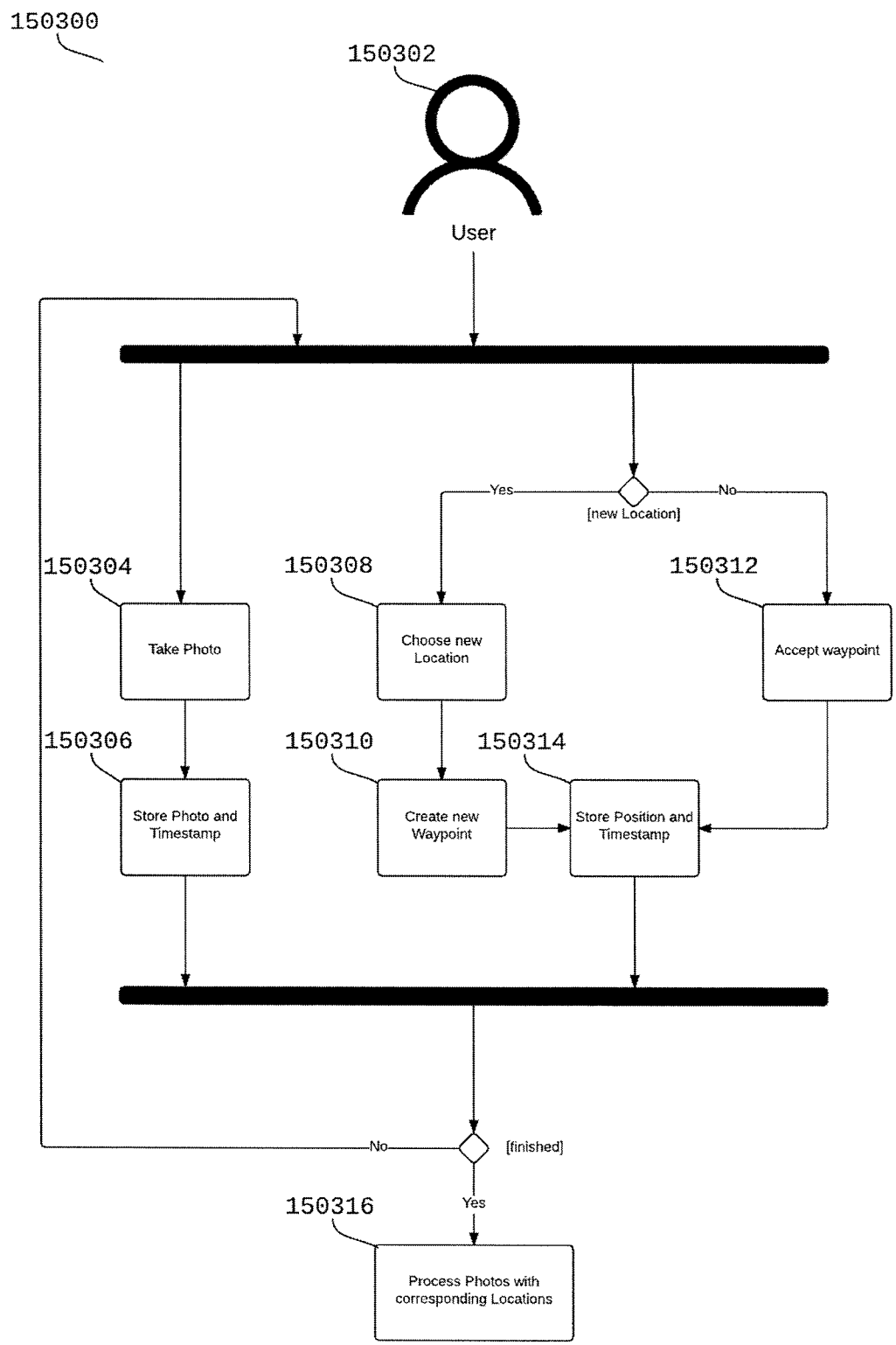
Figure 5D:
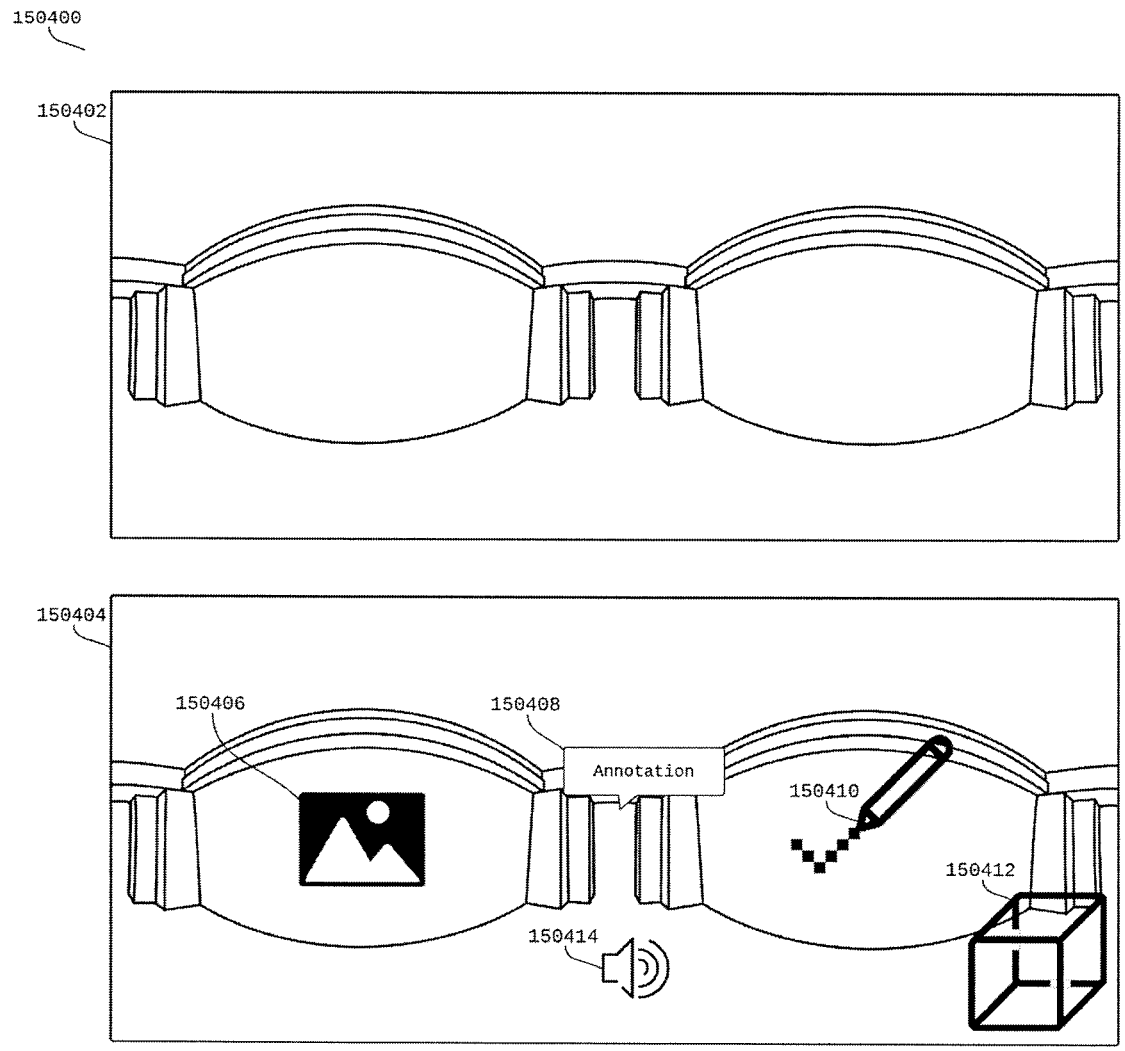
Figure 6A:
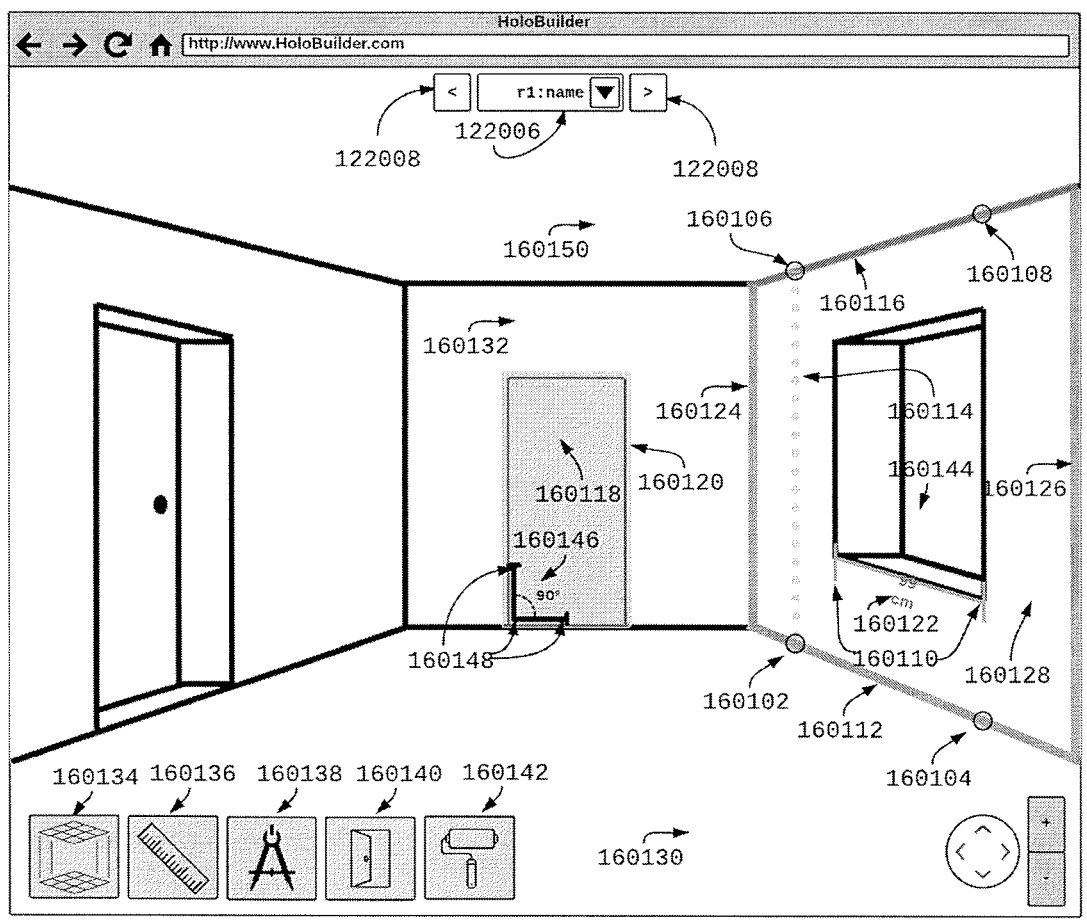
Figure 7A:
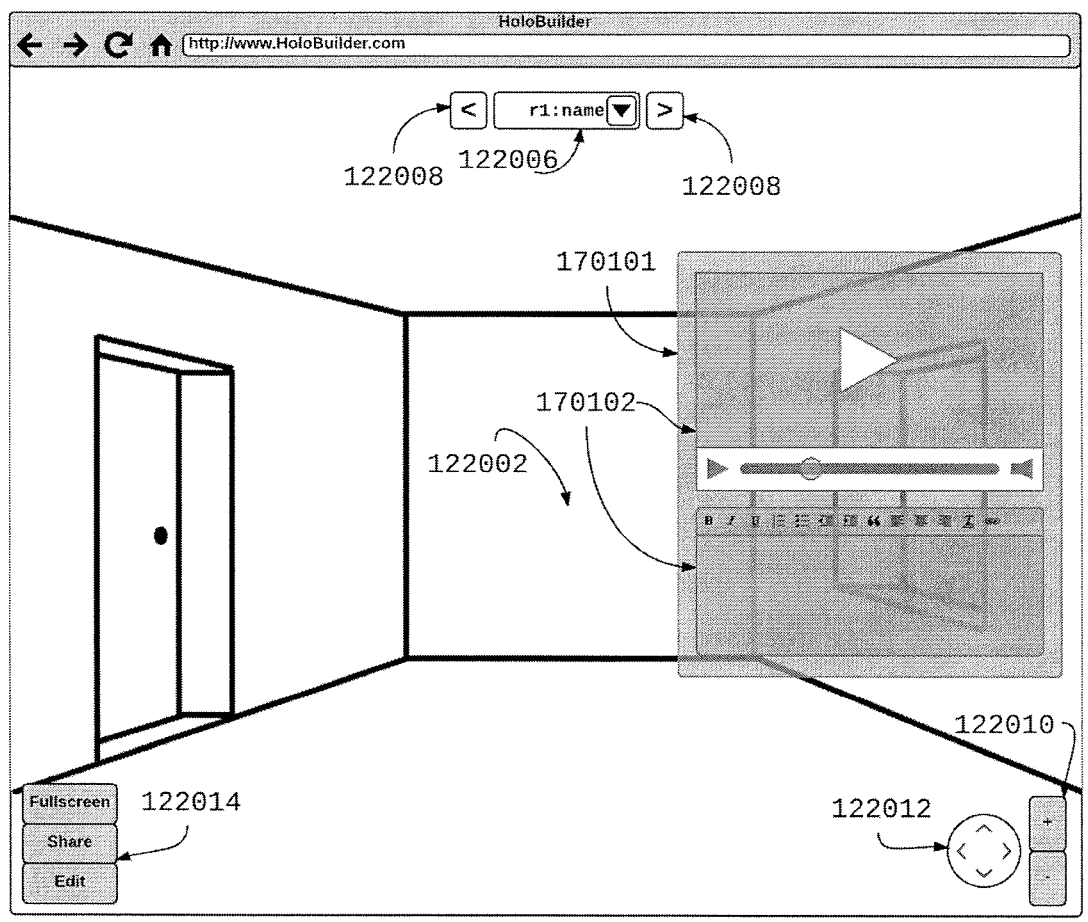
Figure 8A:
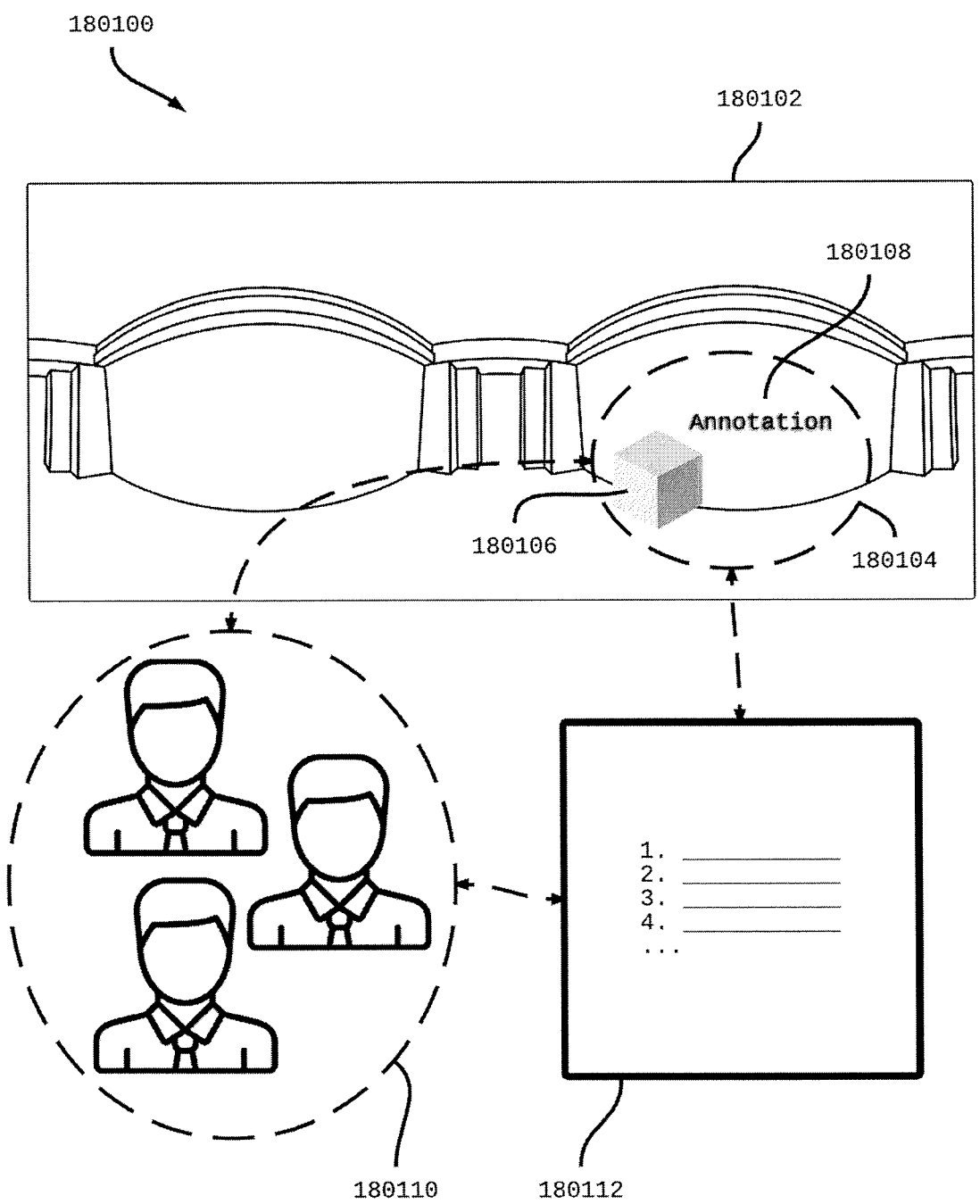
Figure 8B:
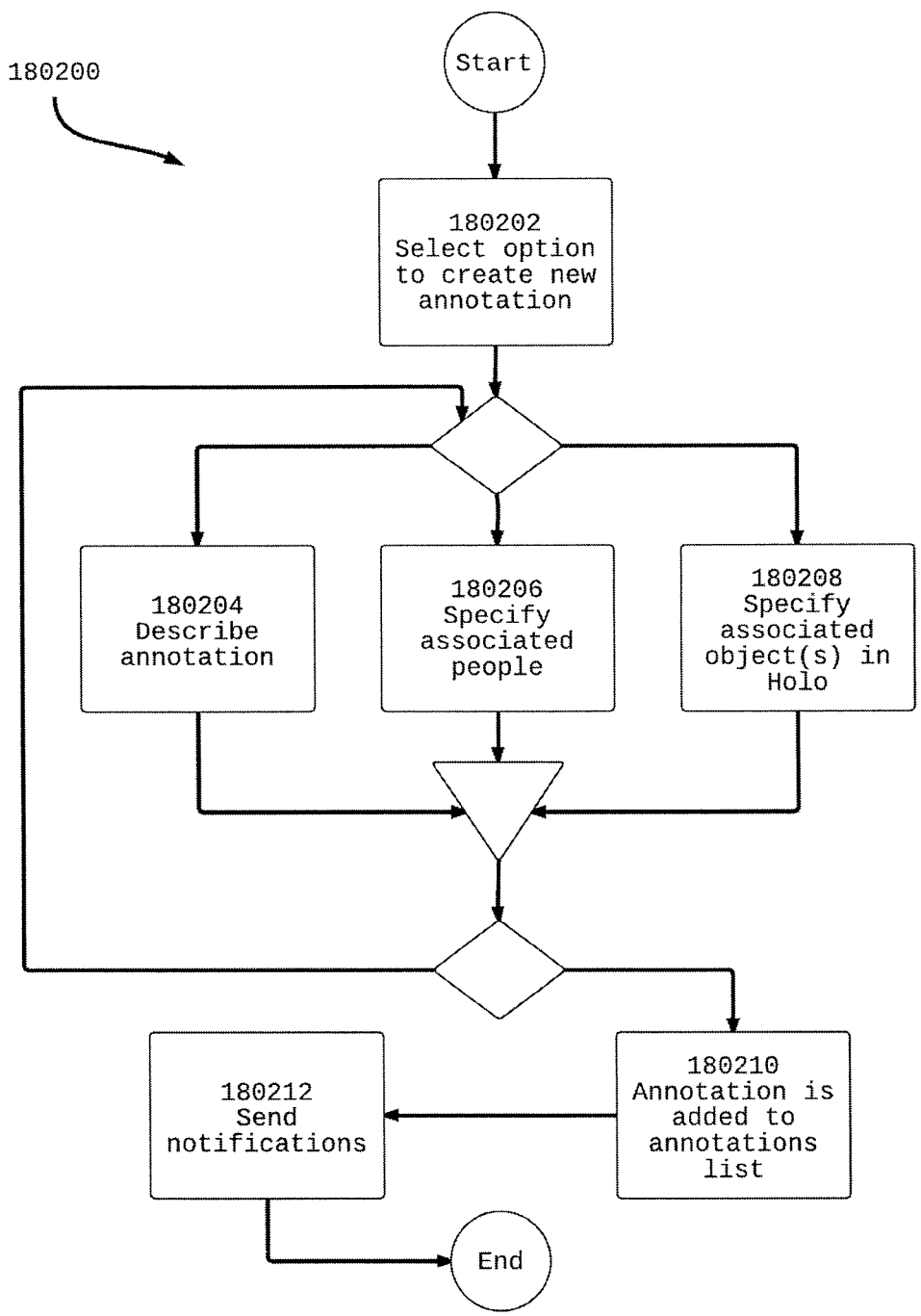
Figure 8C:
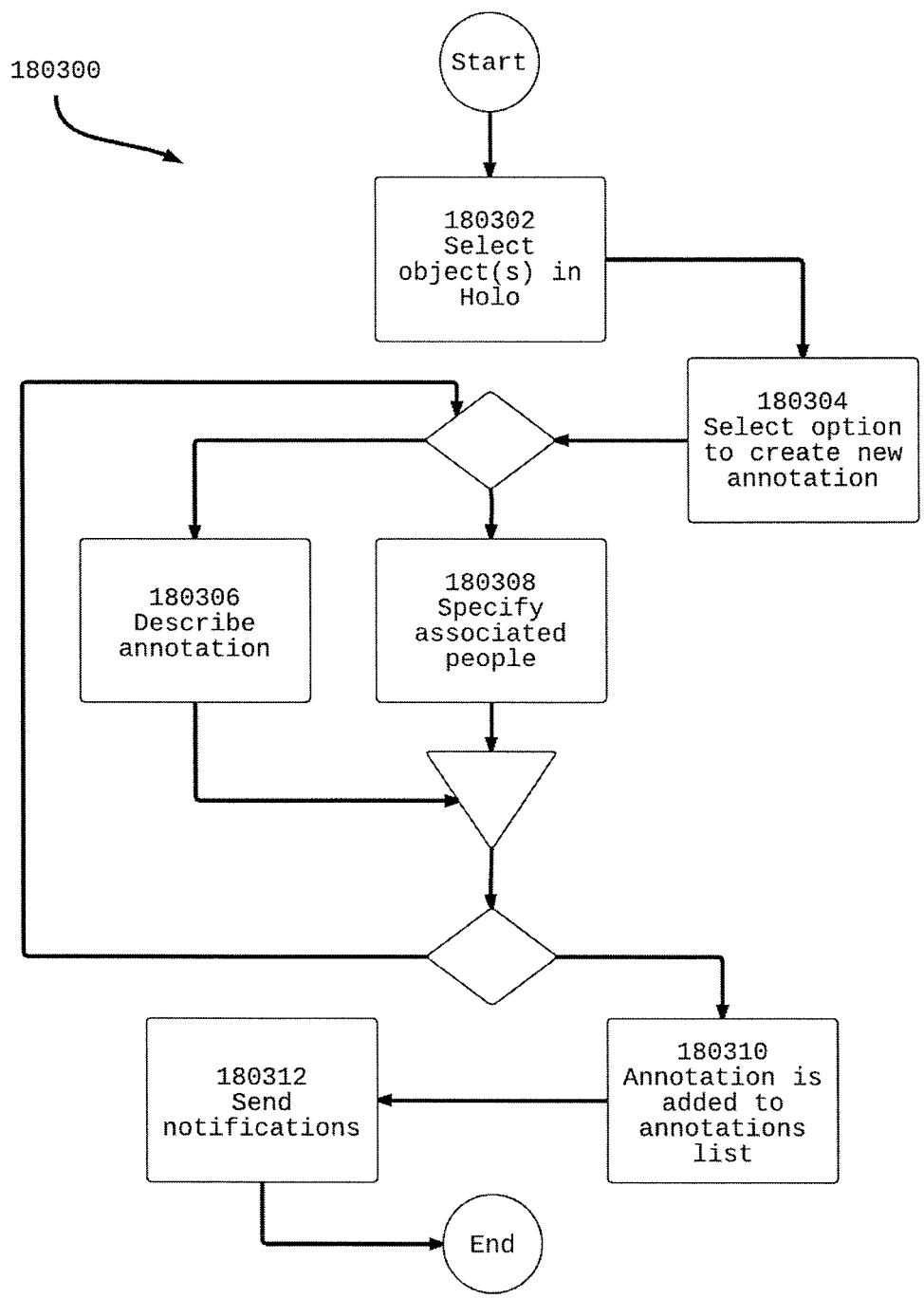
Figure 8D:
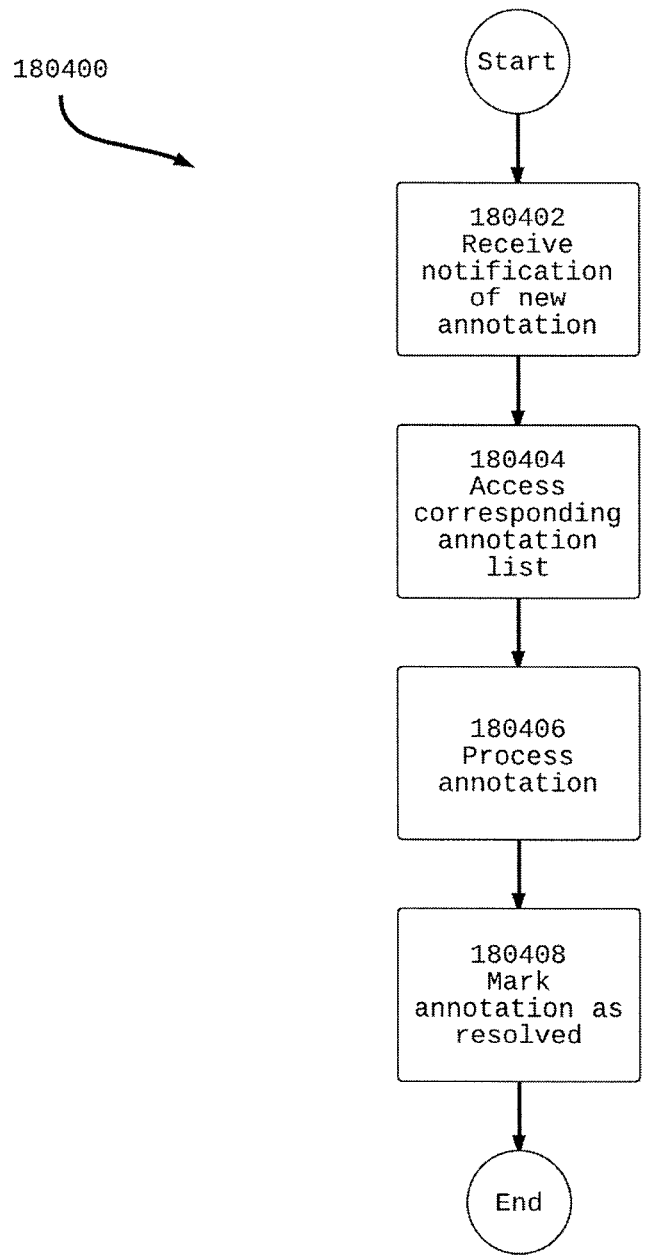
Figure 8E:
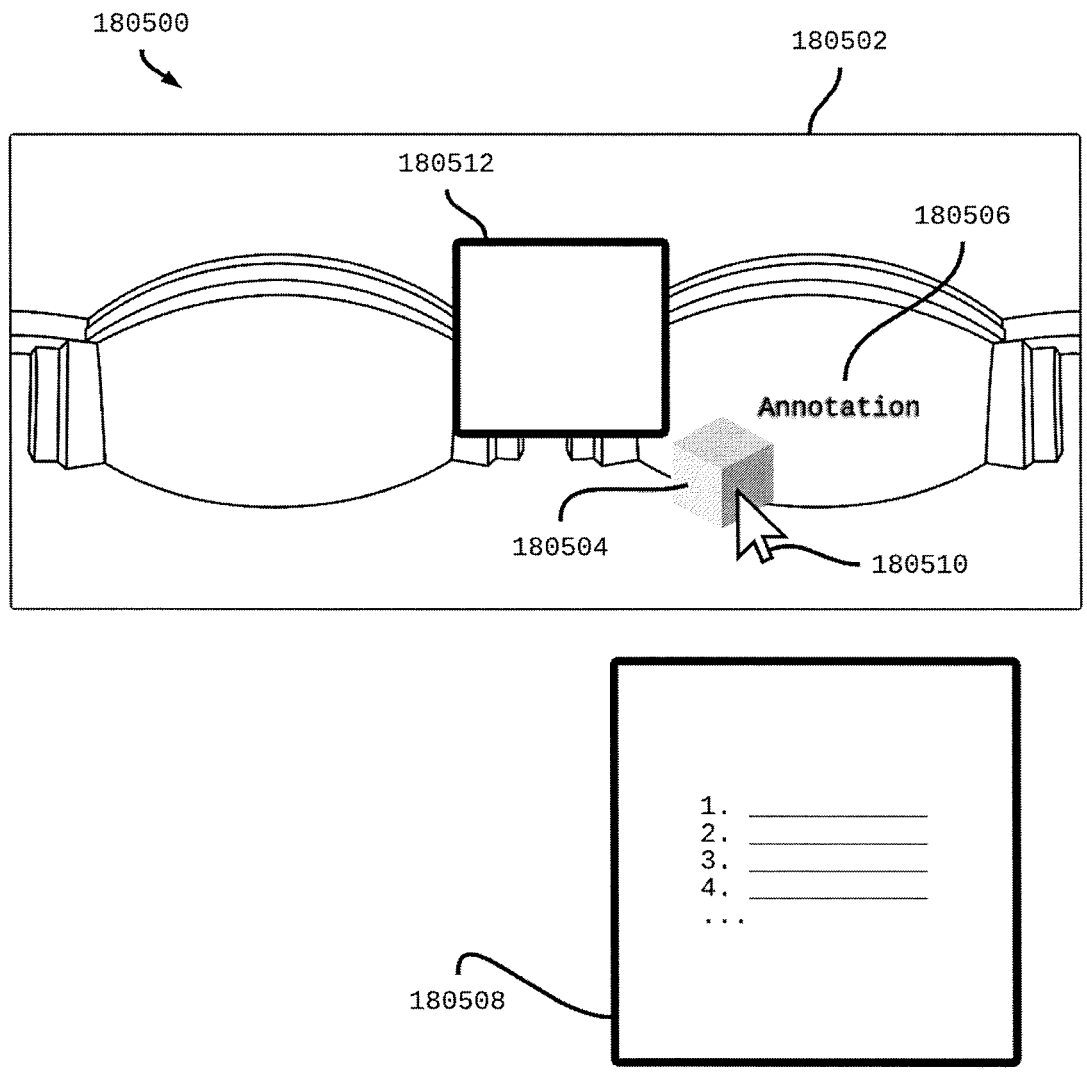
Figure 8F:
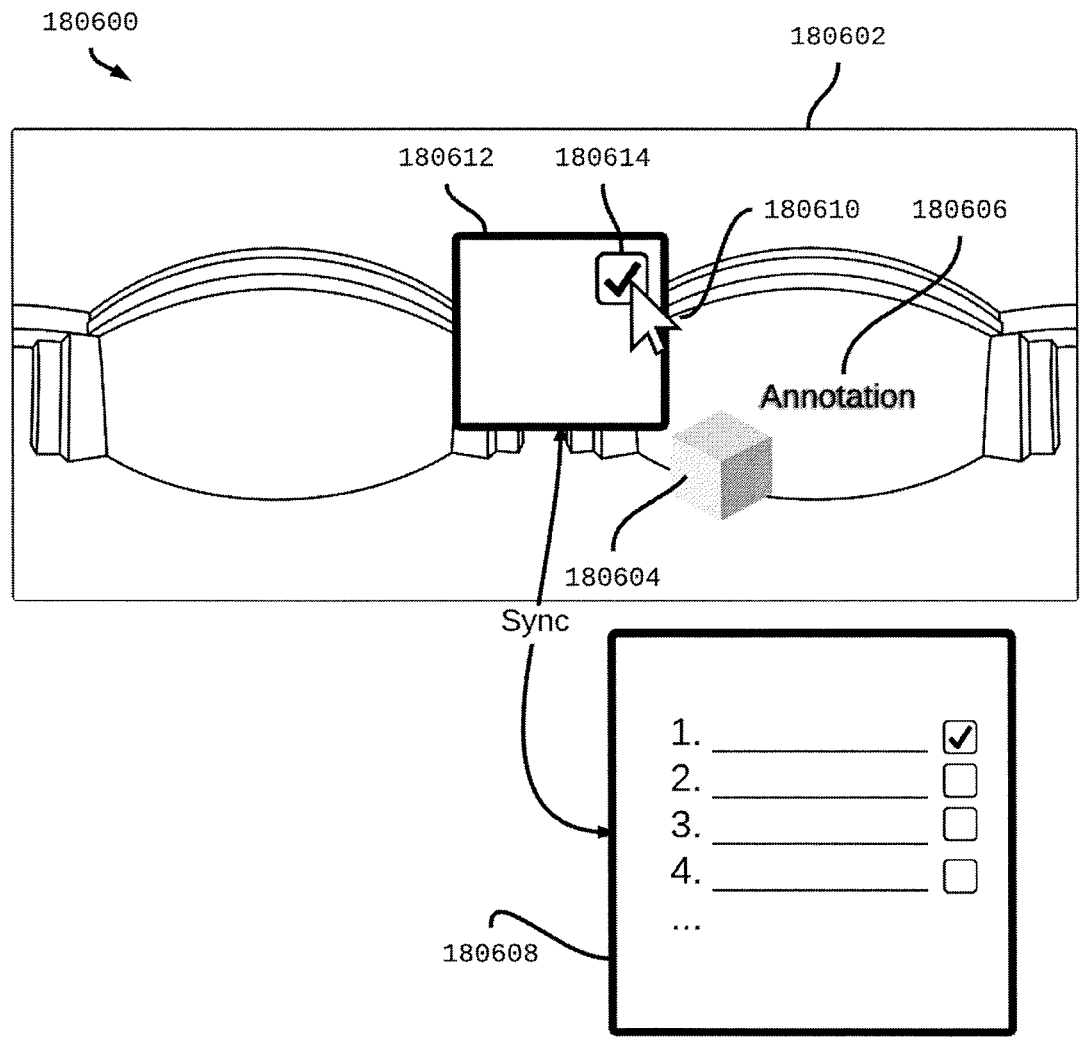
Figure 8G:
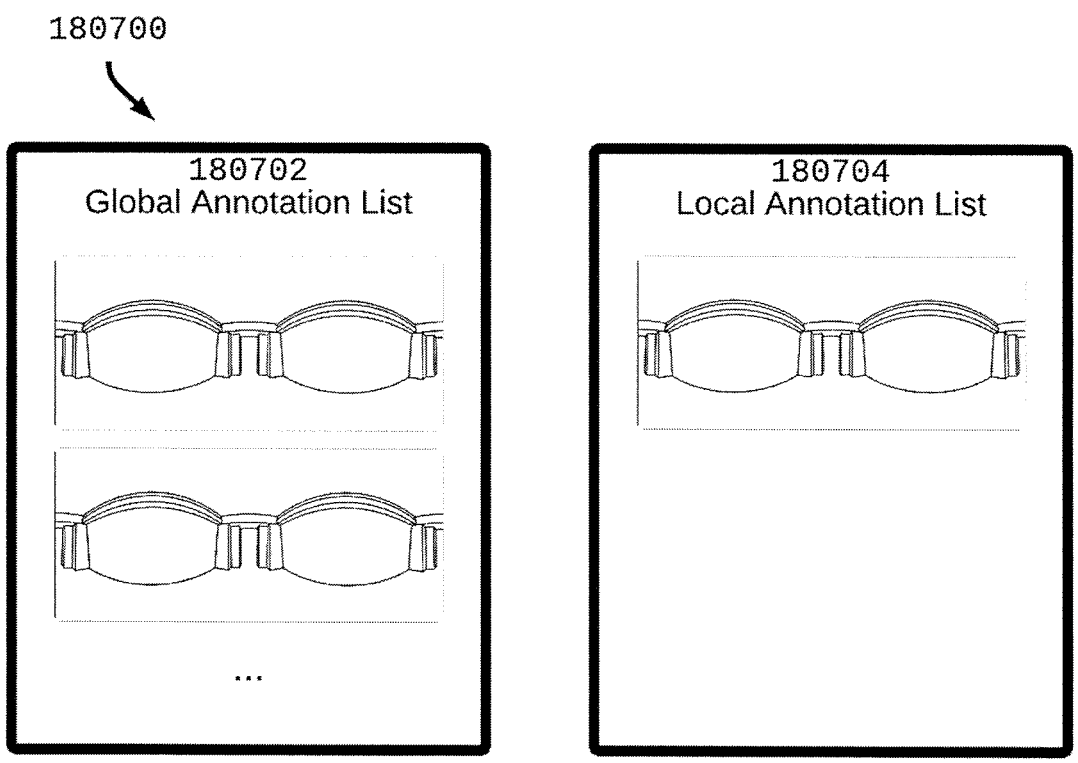
Figure 9A:
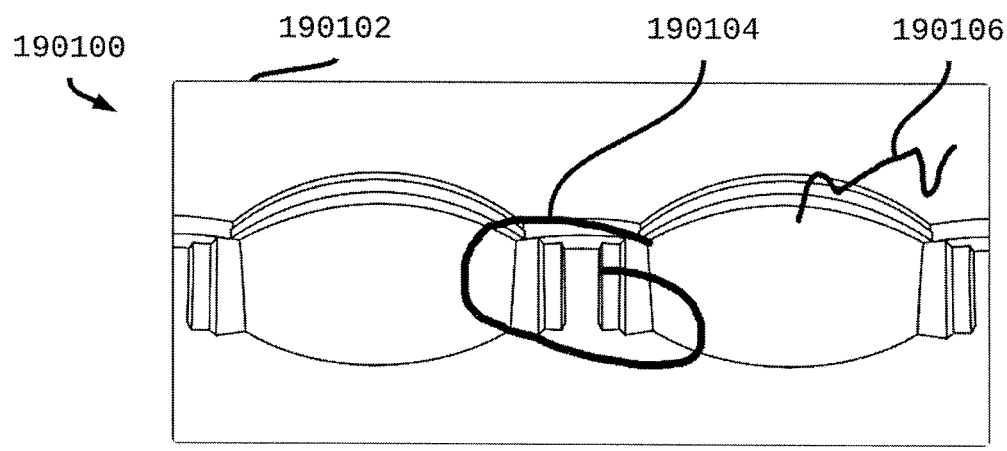
Figure 9B:
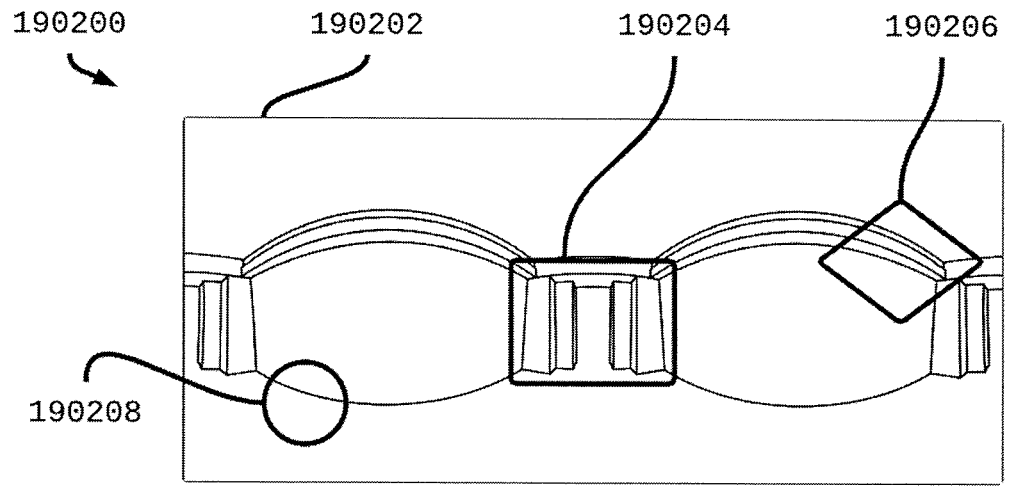
Figure 10A:
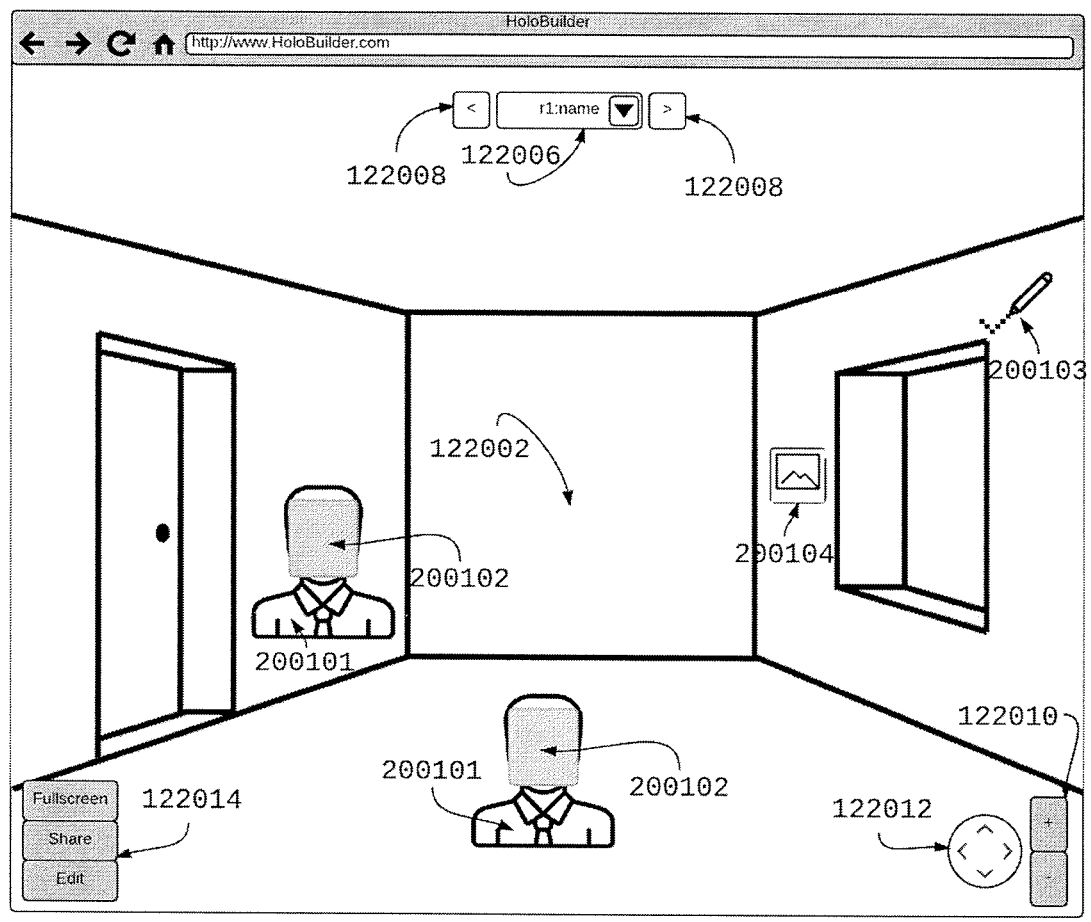
Figure 10B:
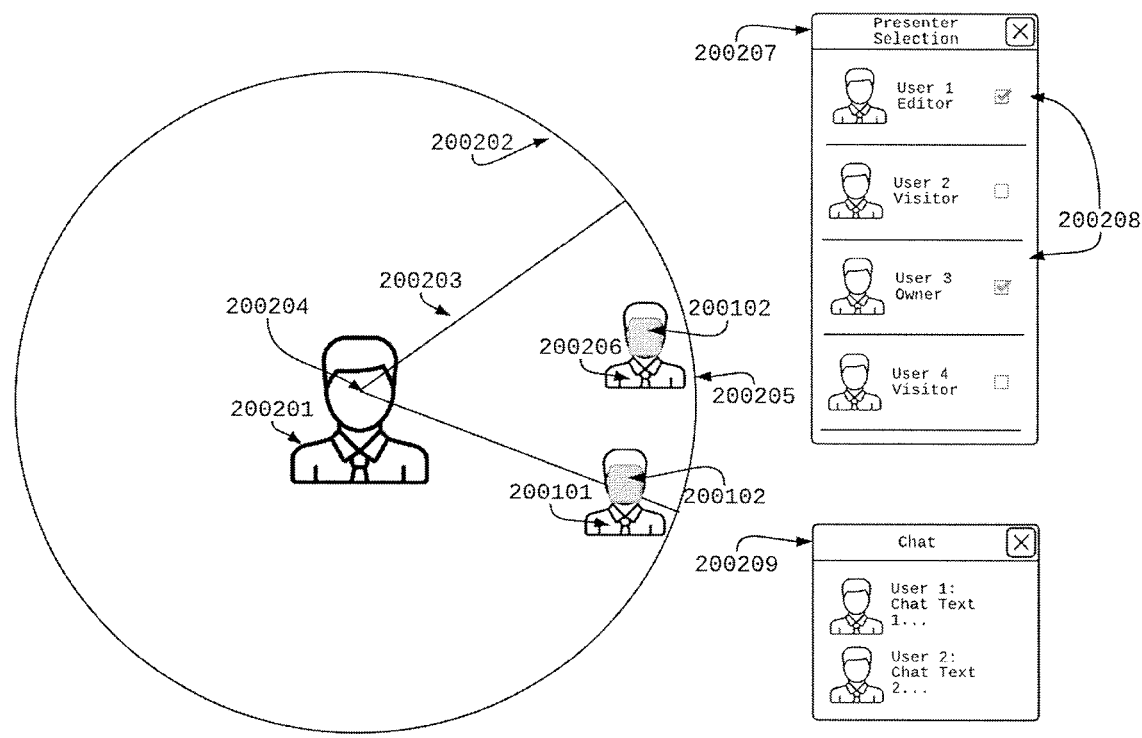
Figure 11A:
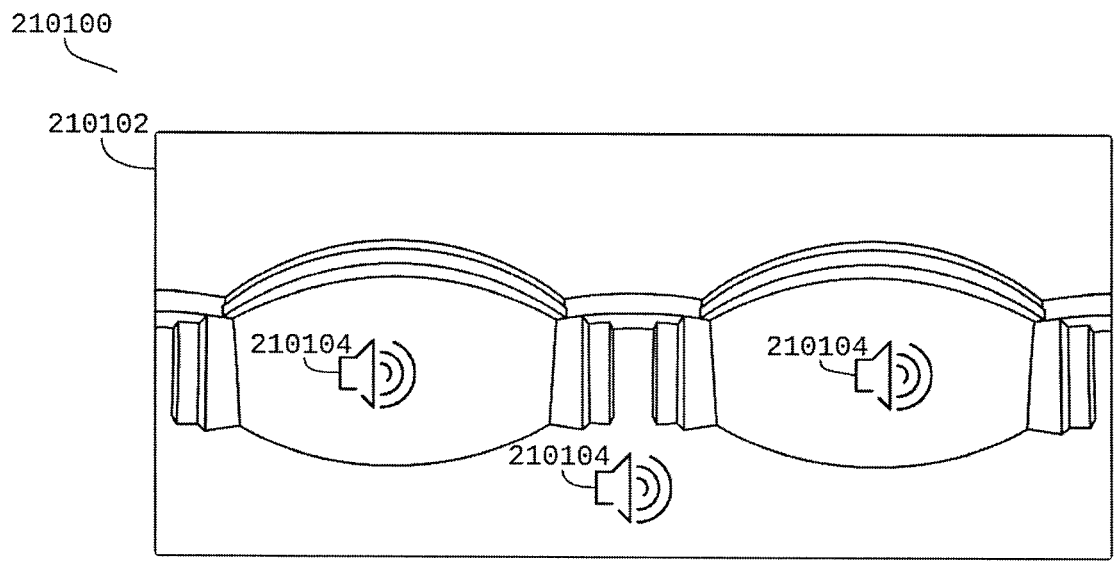
Figure 11B:
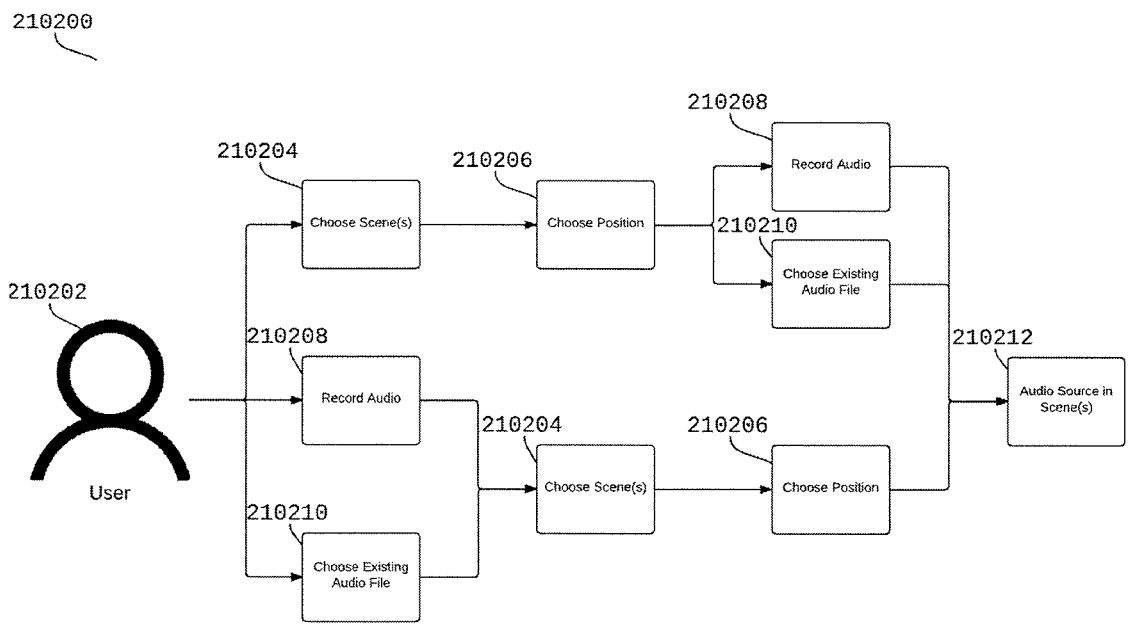
Figure 12A:
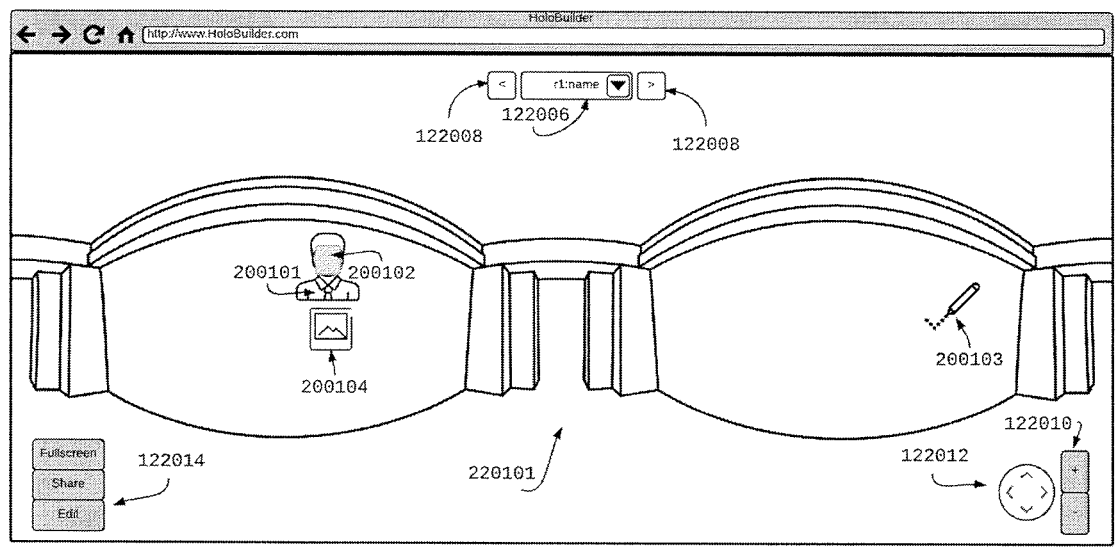
Figure 13A:
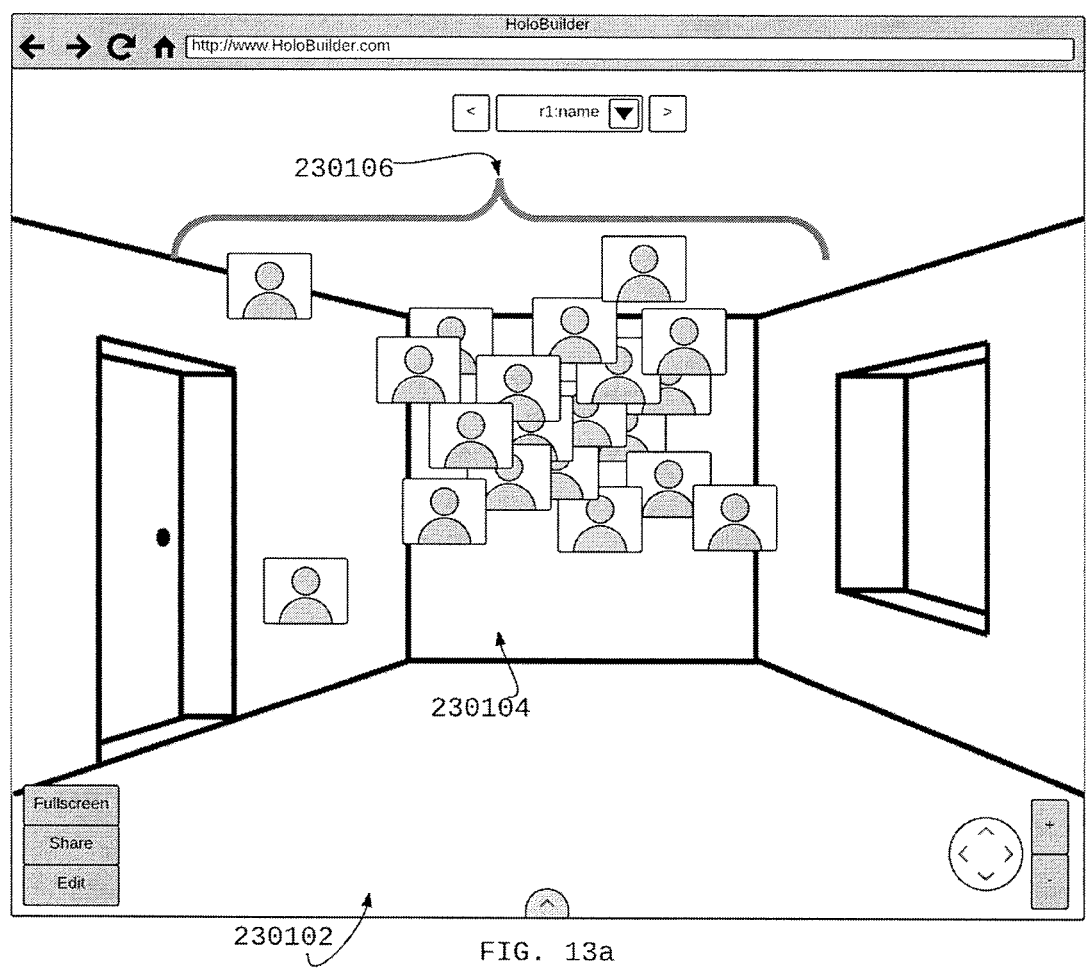
Figure 13B:
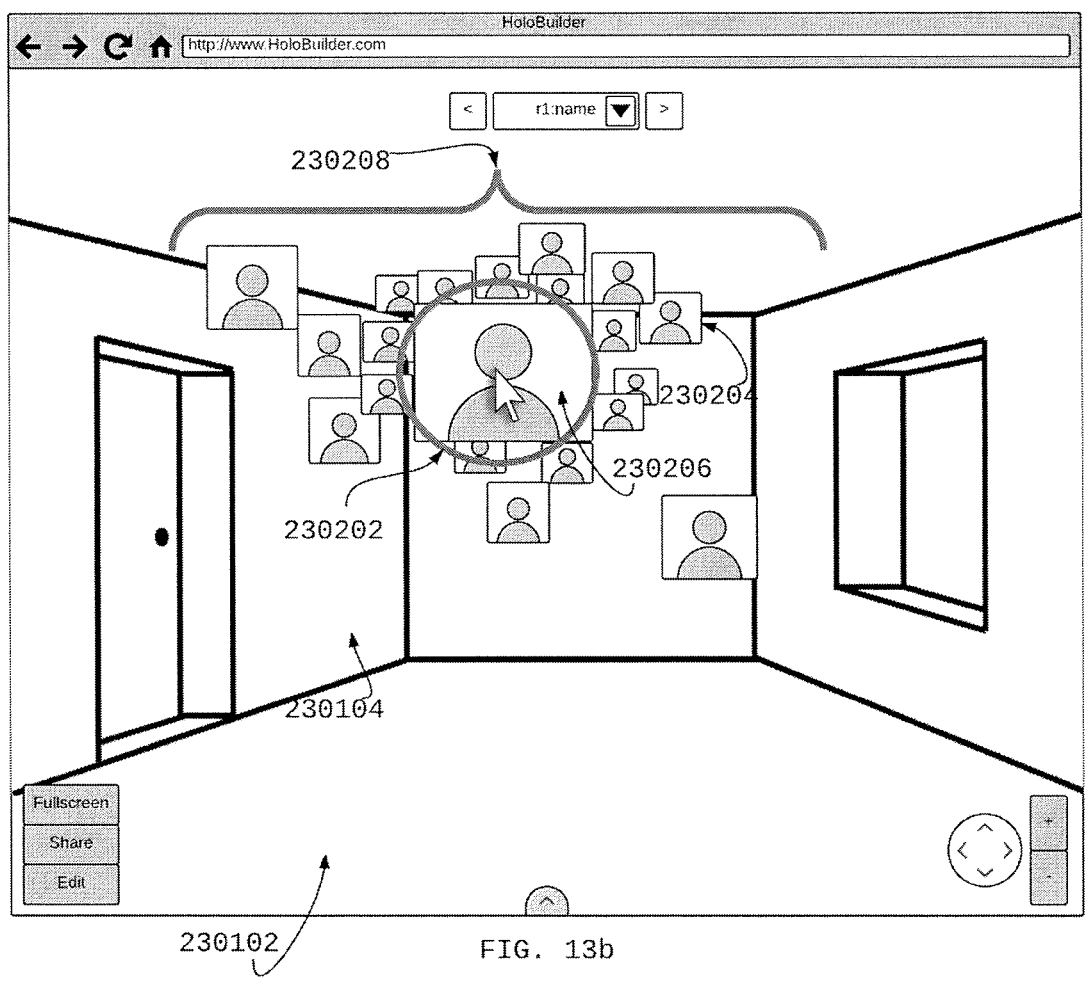
Figure 13C:
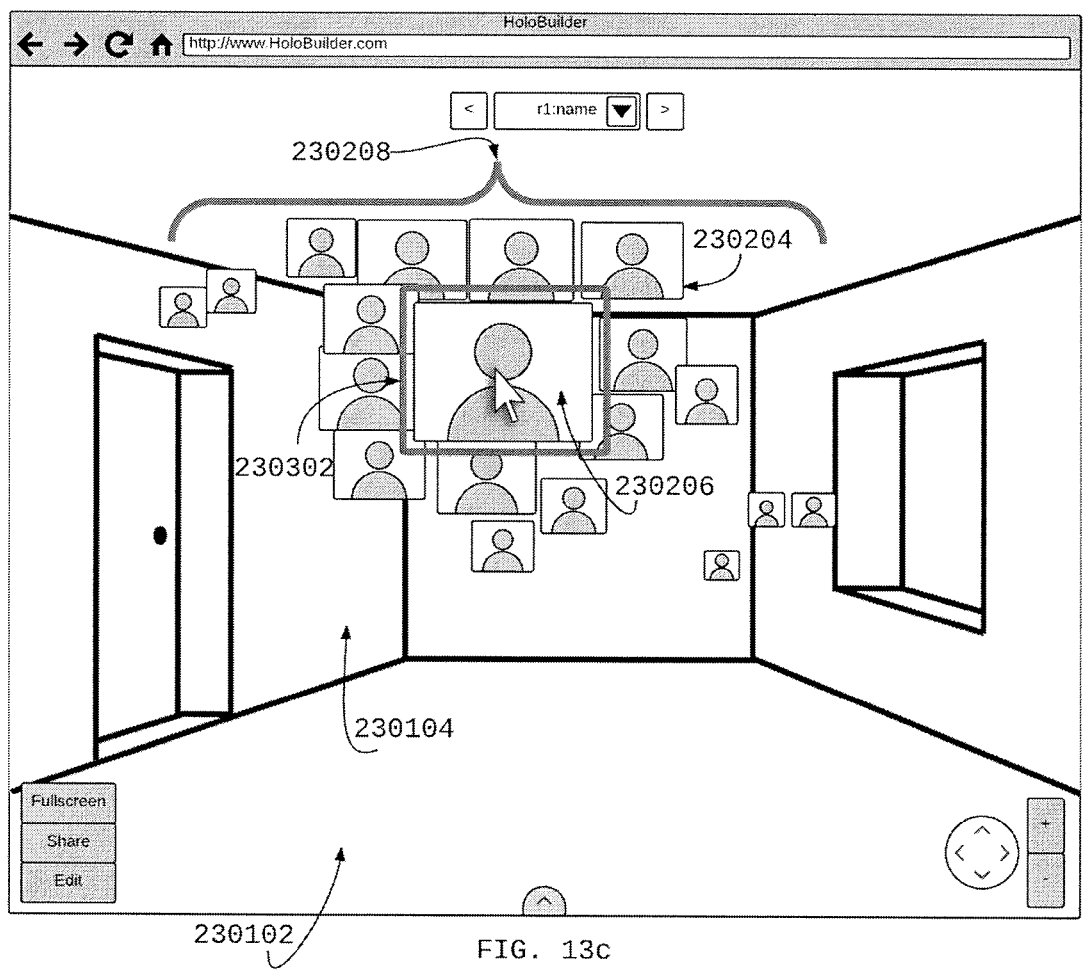
Figure 13D:
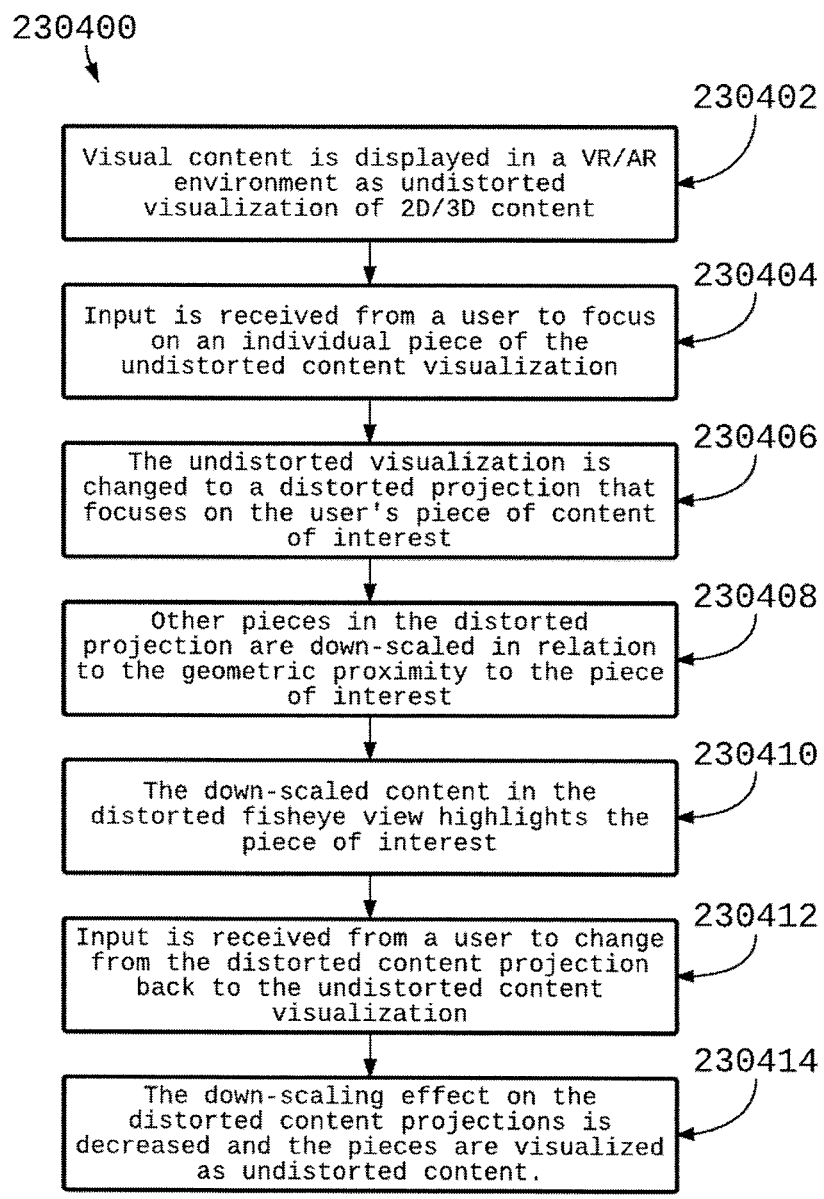
Figure 14A:
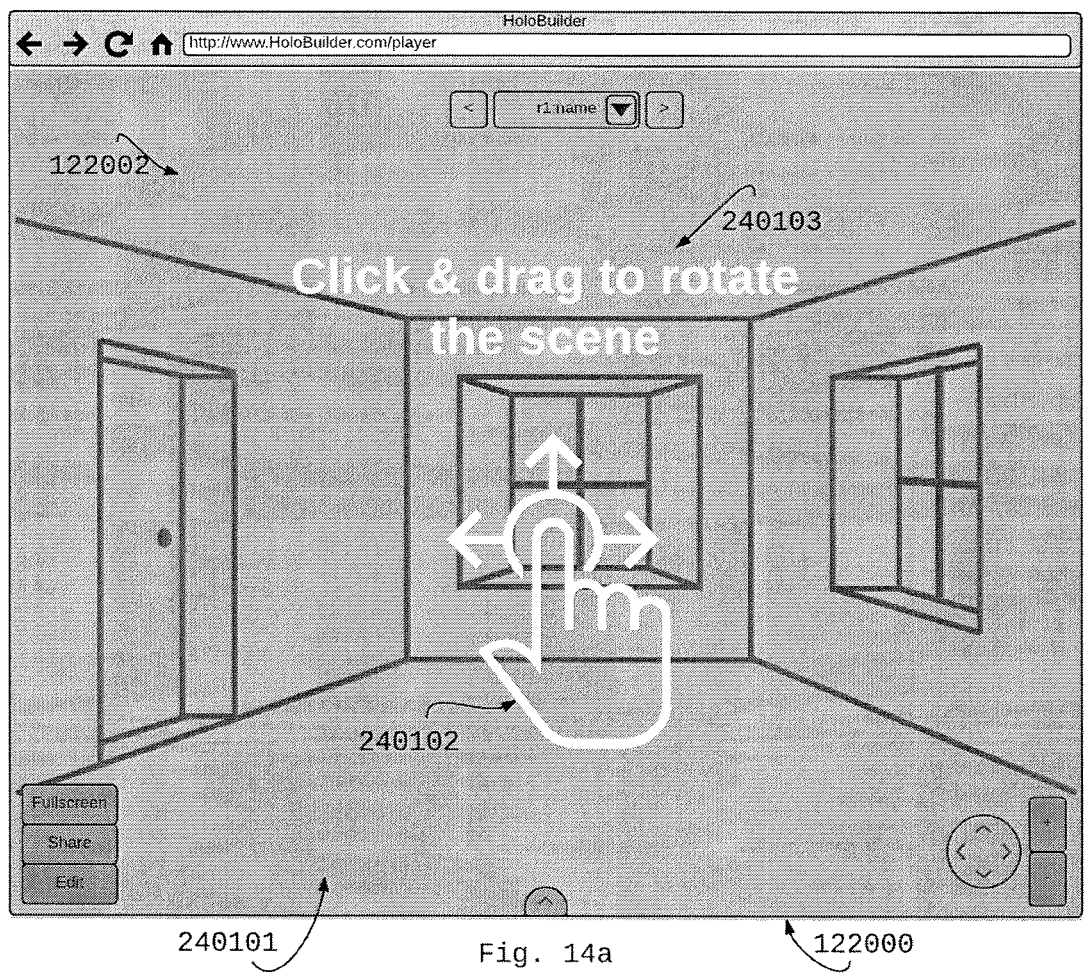
Figure 15A:
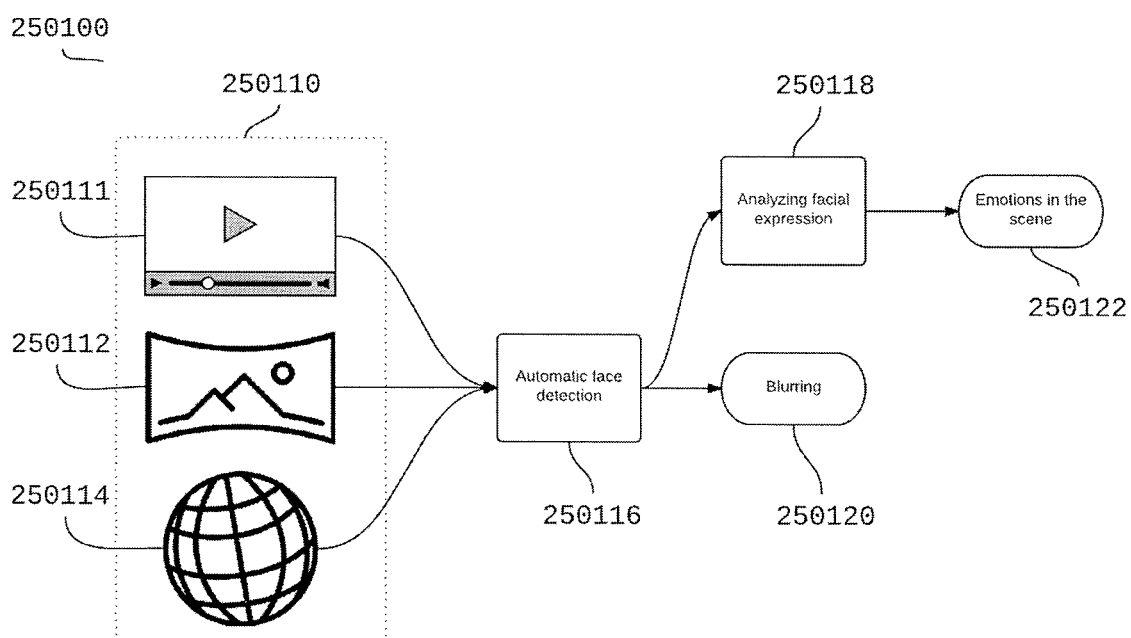
Figure 16A:
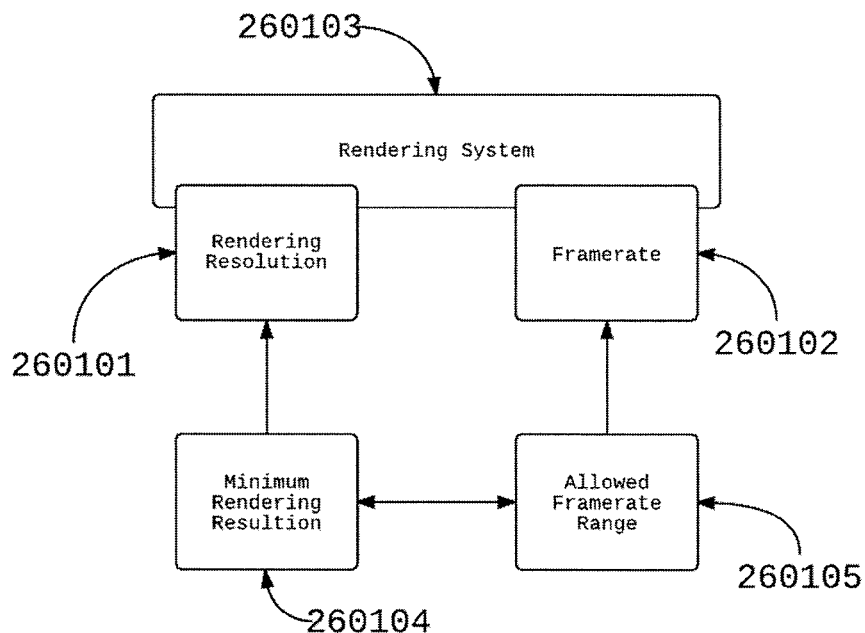
Figure 17A:
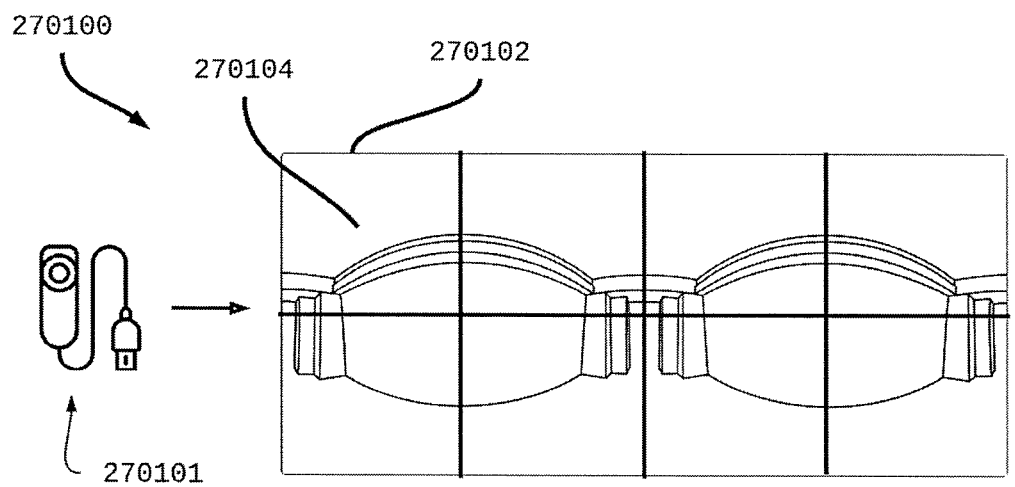
Figure 17B:
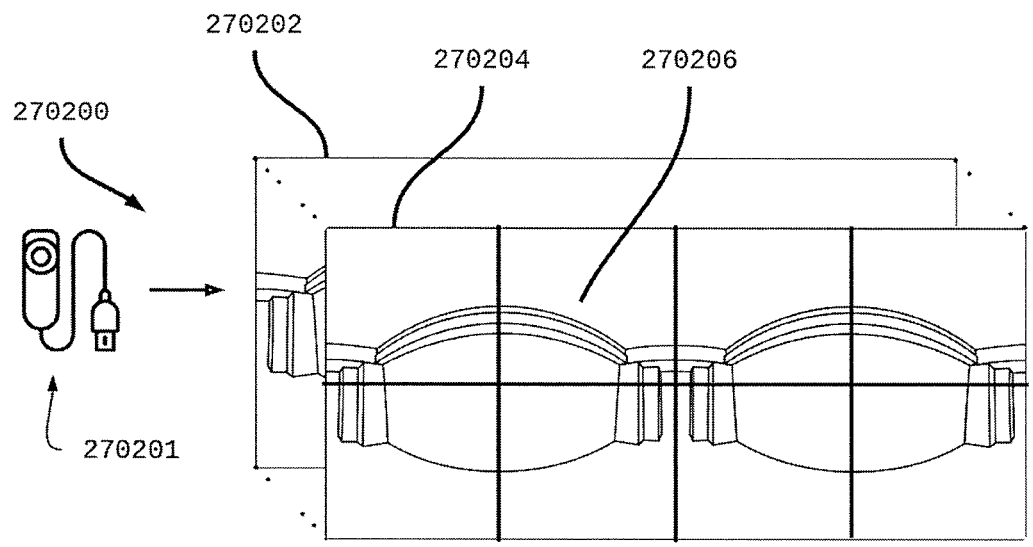
Figure 17C:
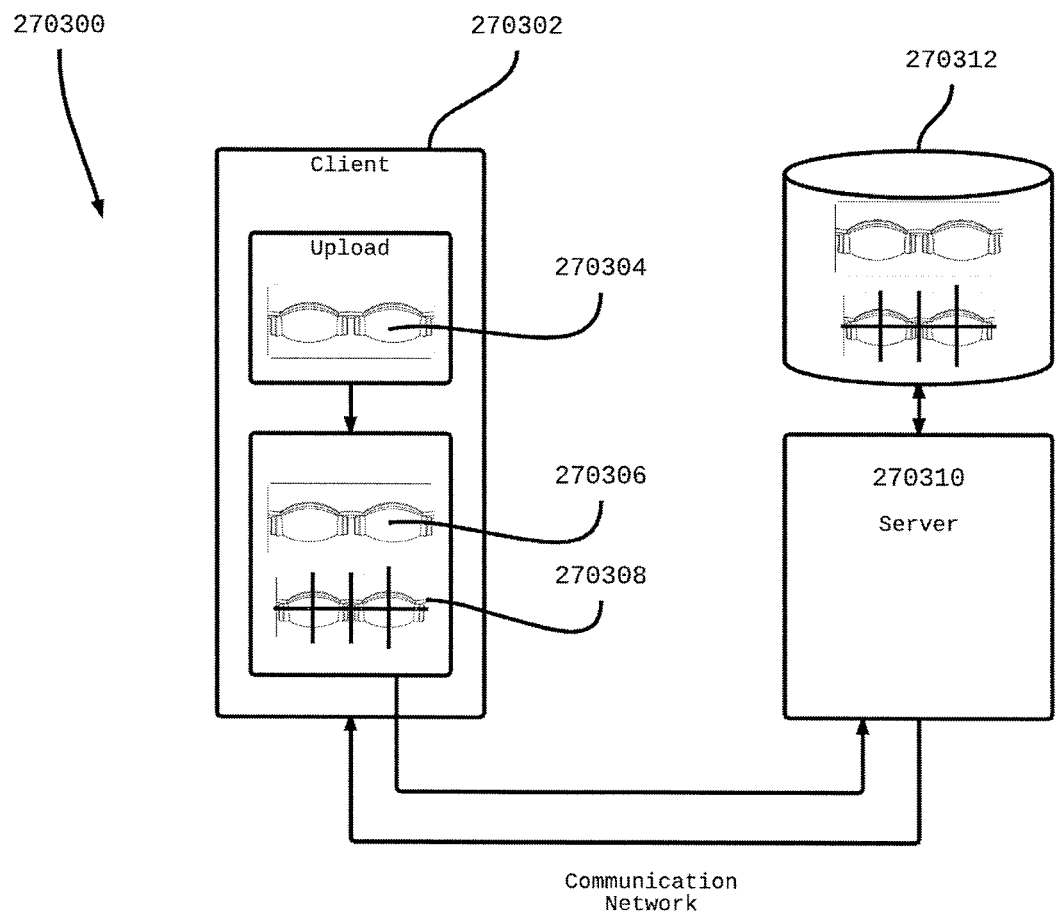
Figure 17D:
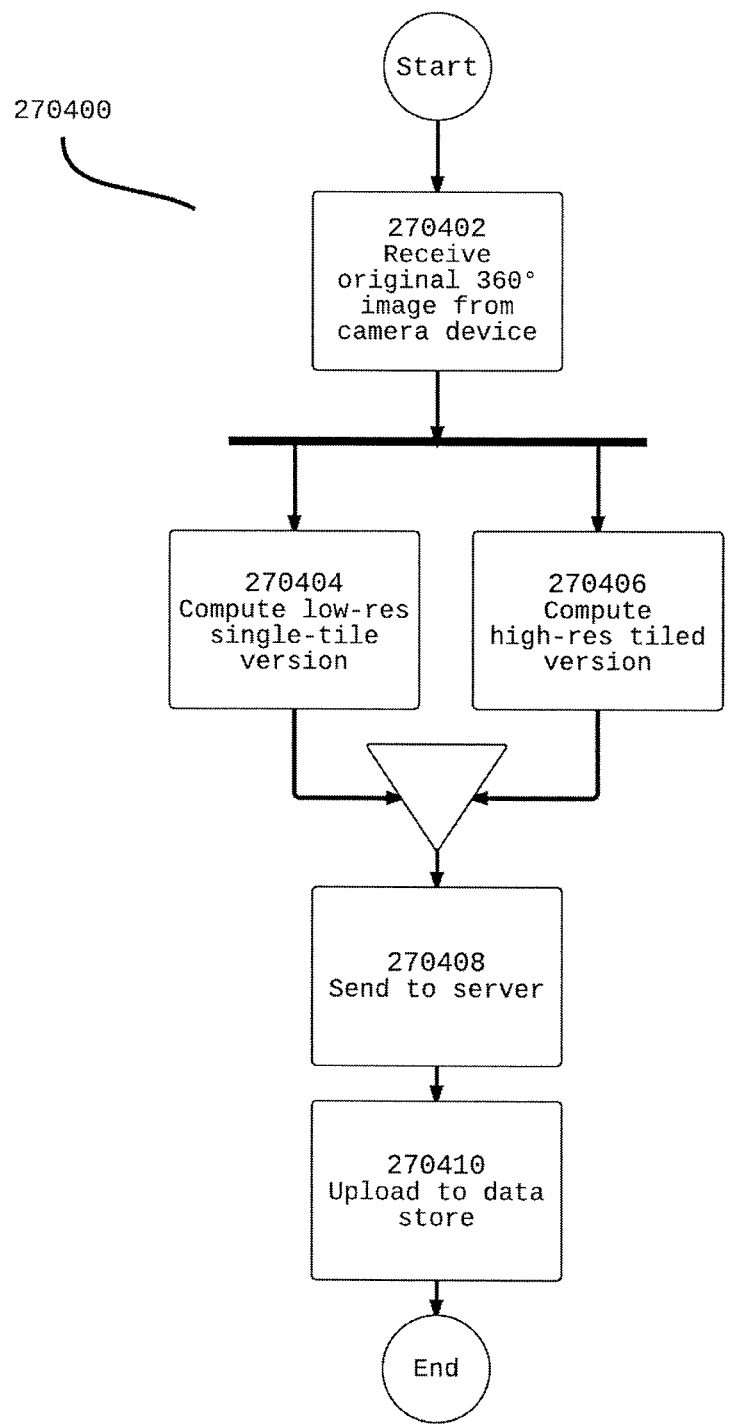
Figure 17E:
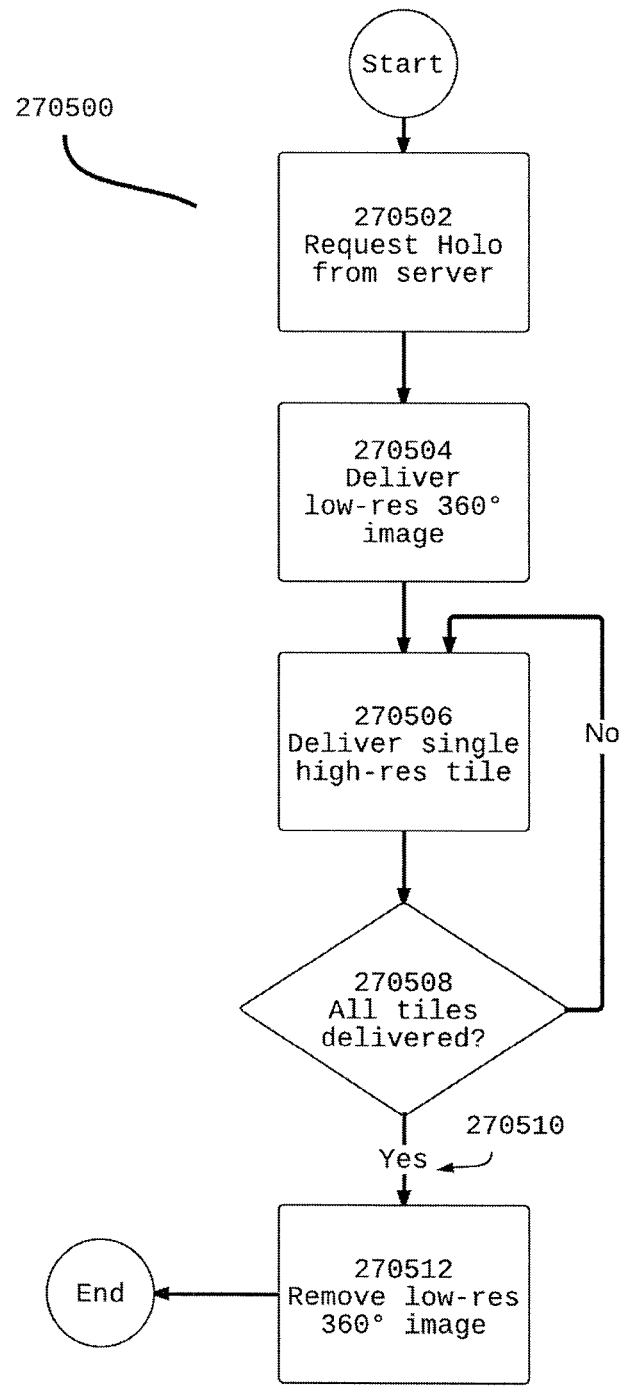
Figure 18A:
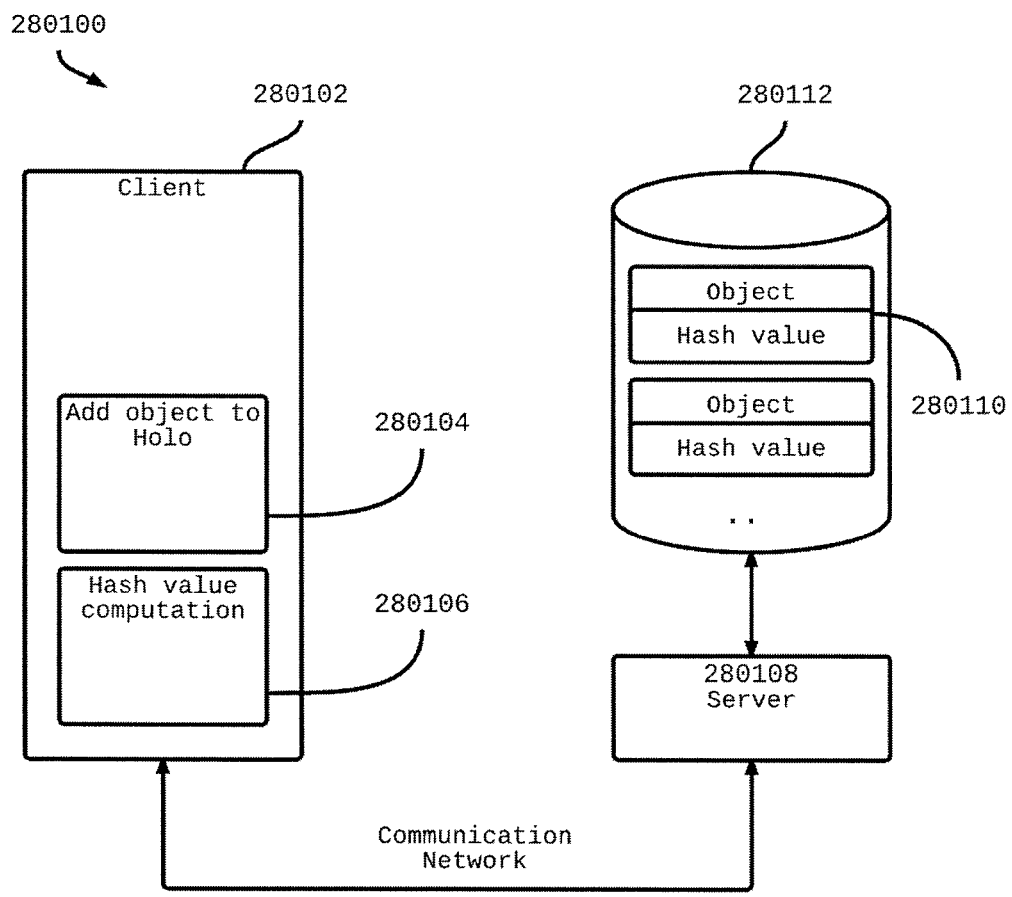
Figure 18B:
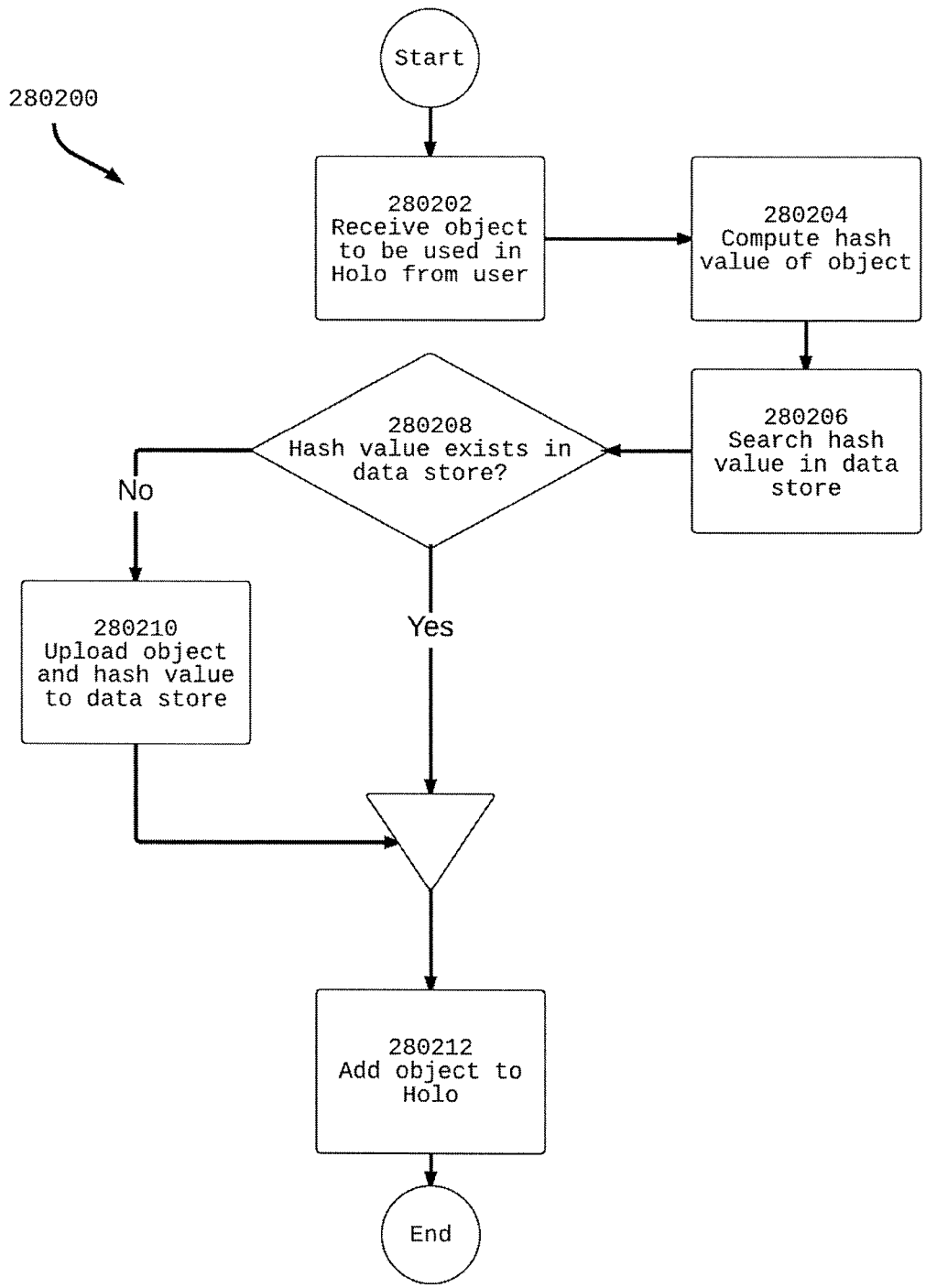
Figure 19A:
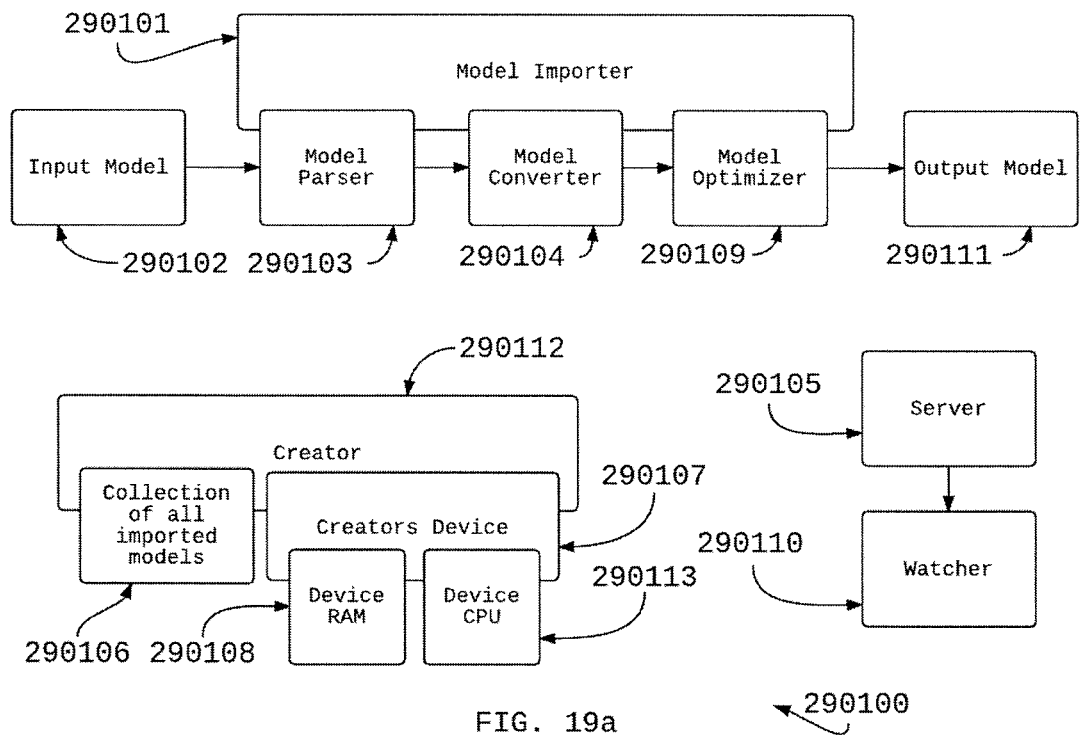
Figure 20A:
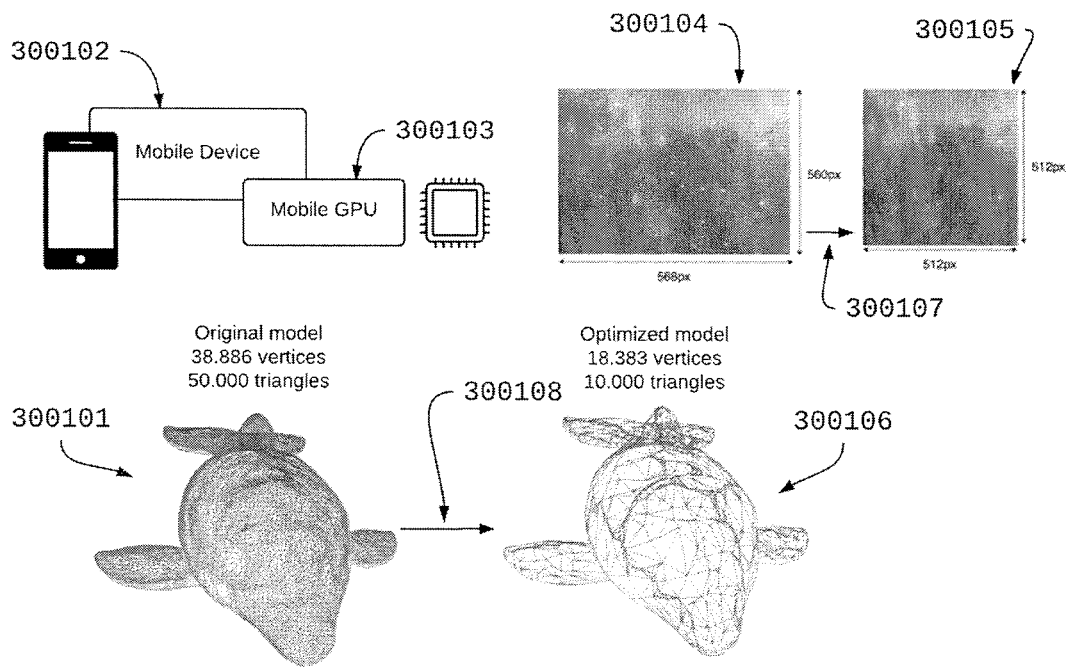
Figure 21A:
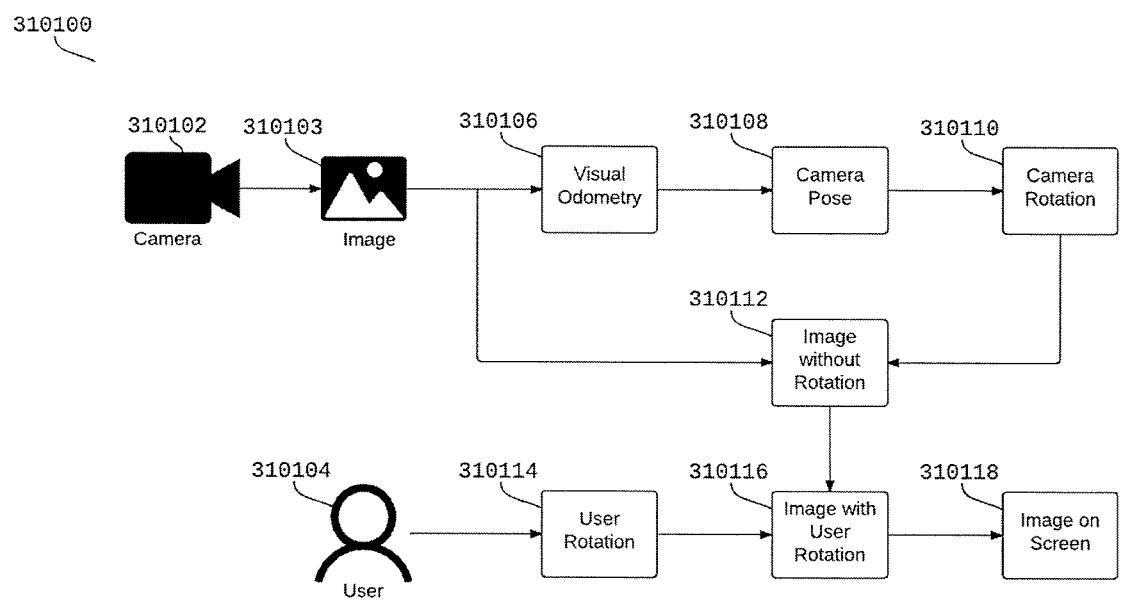
Figure 21B:
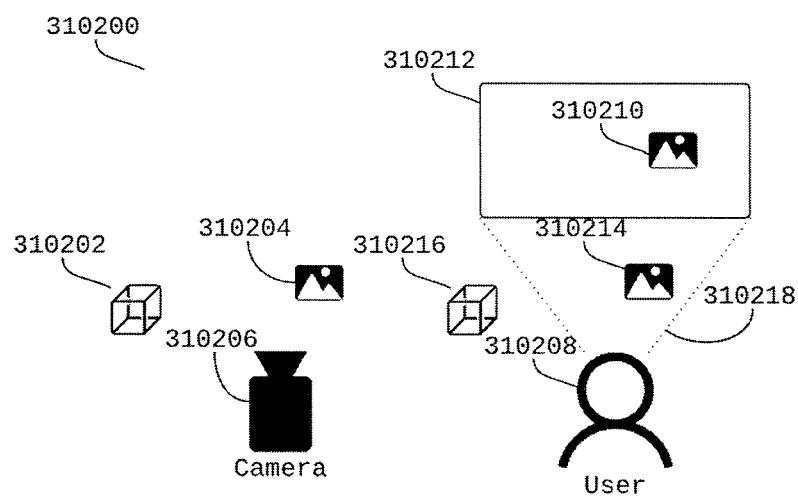
Figure 21C:
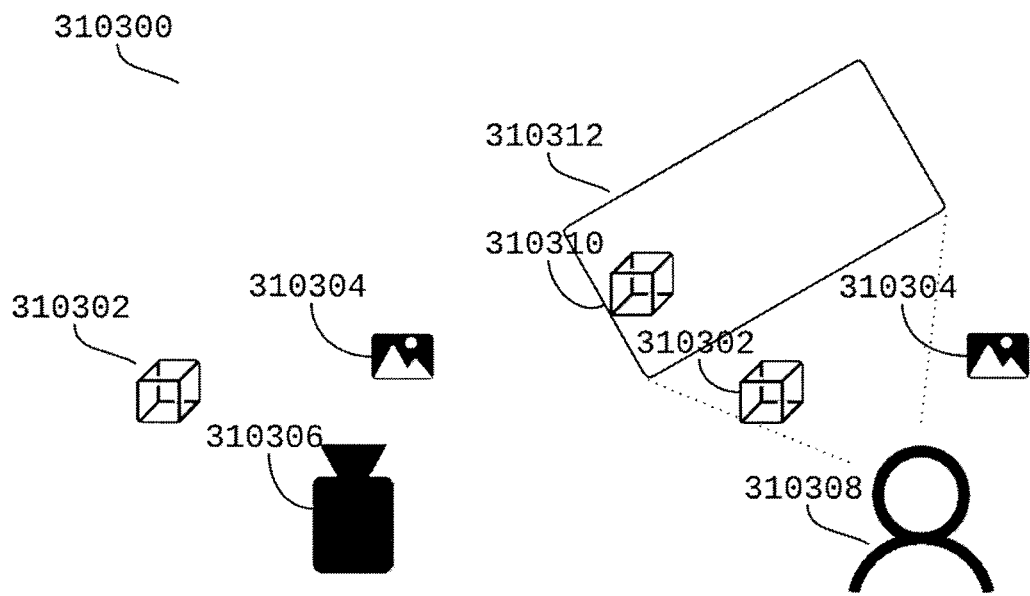
Figure 21D:
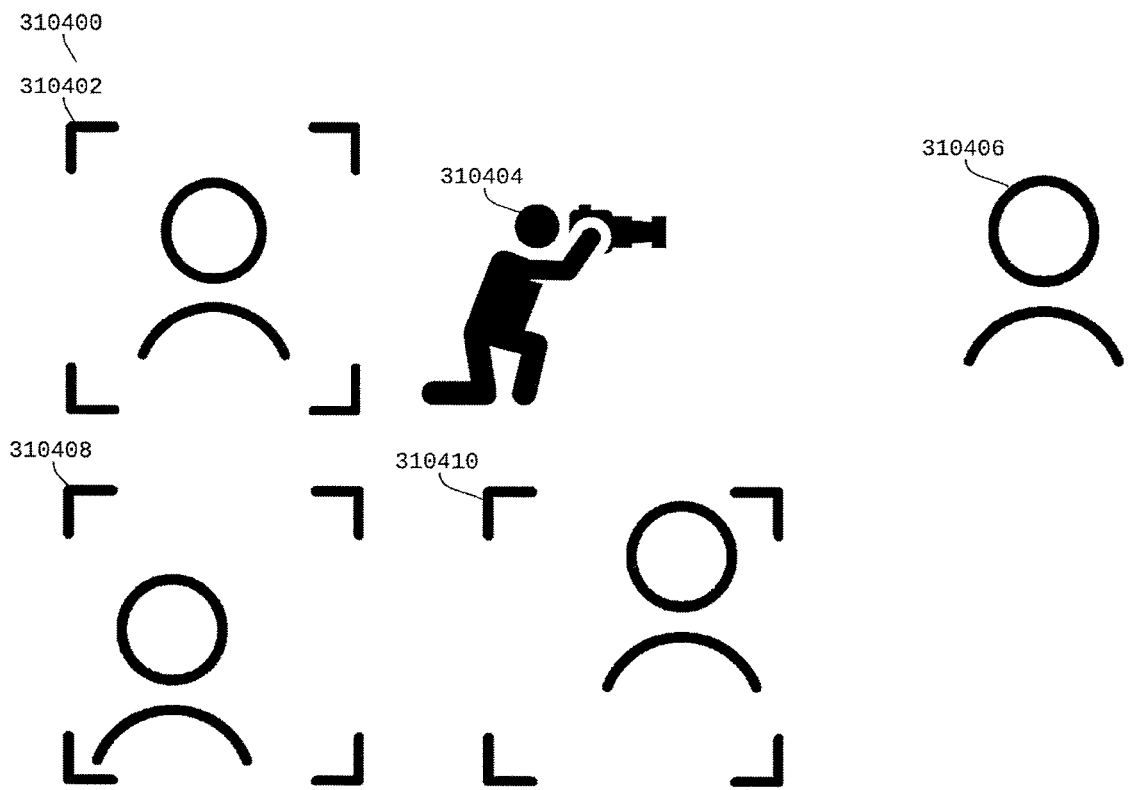
Figure 22A:
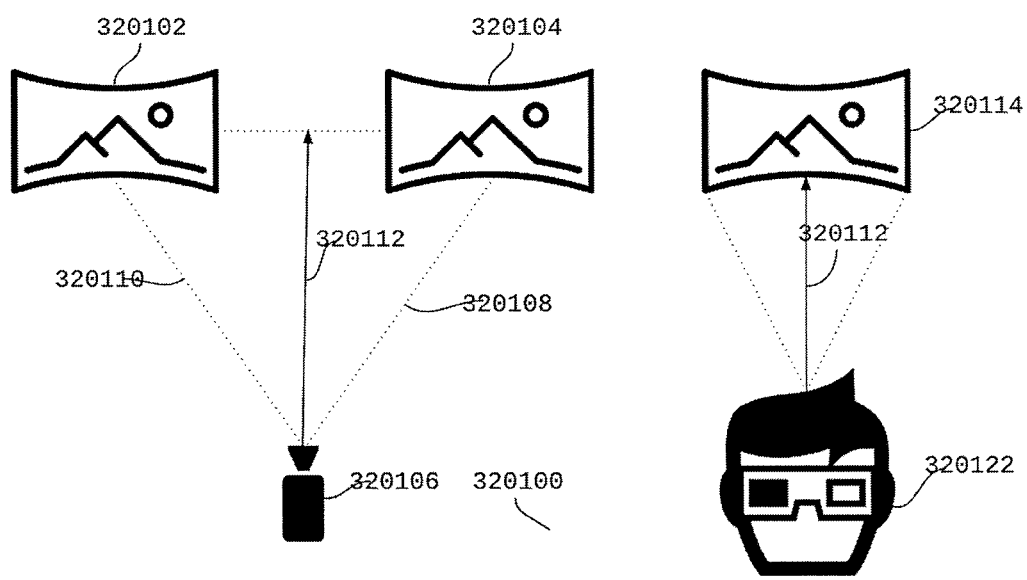
Figure 23A:
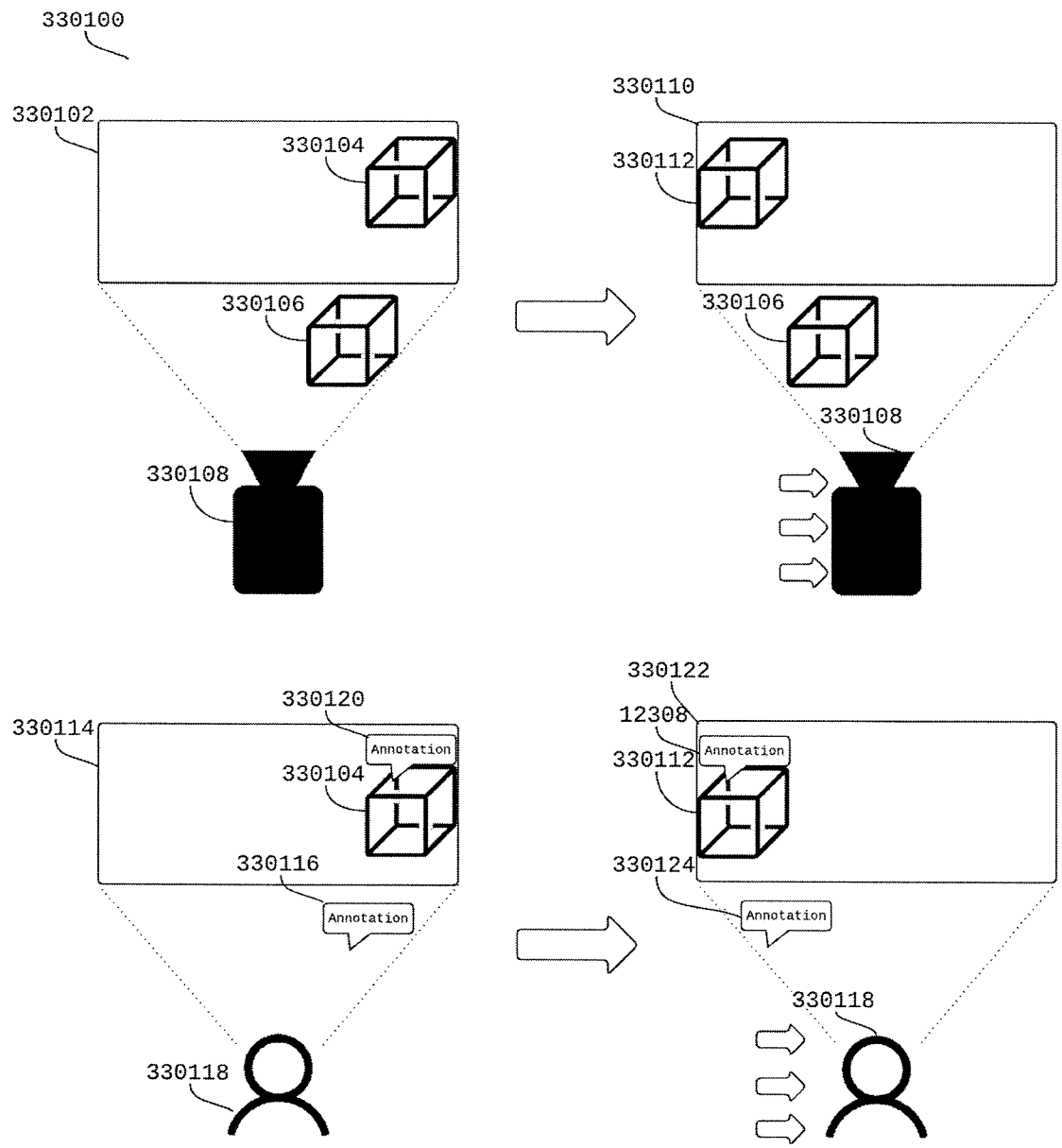
Figure 24A:
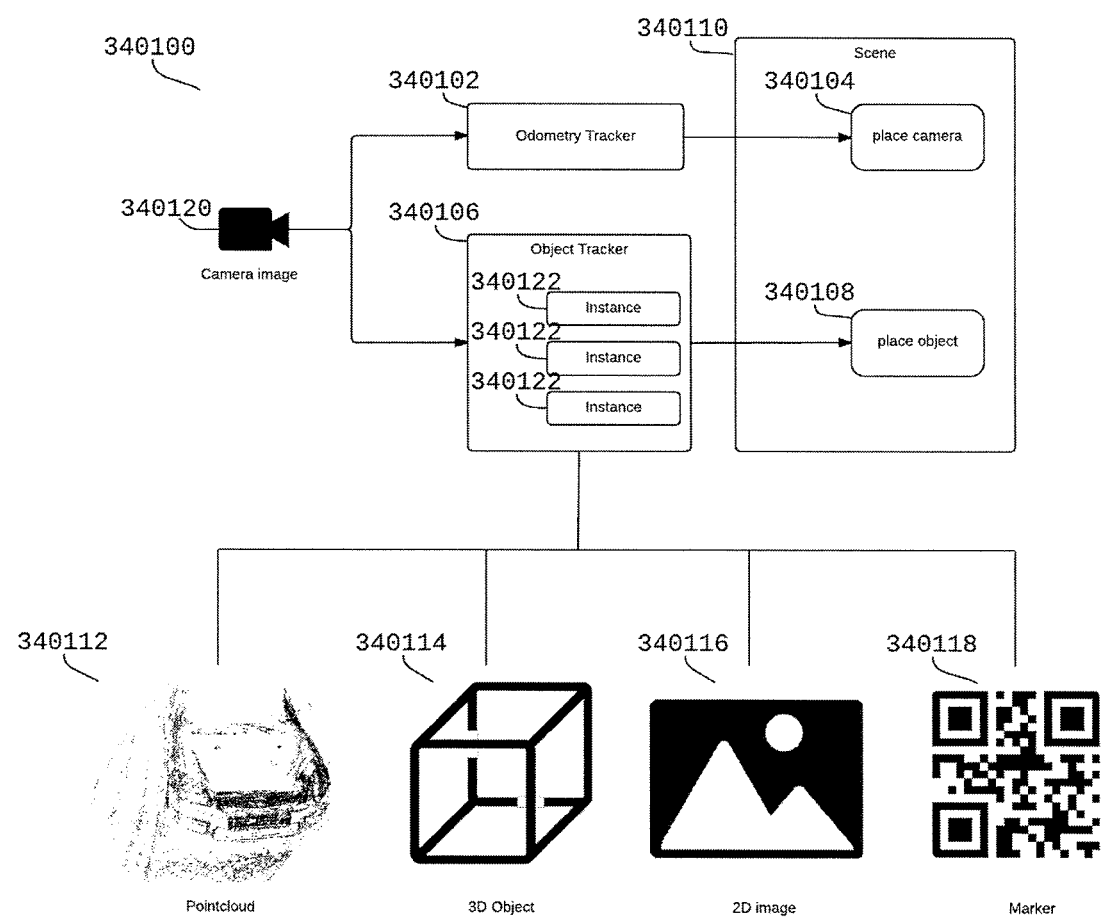
Figure 24B:
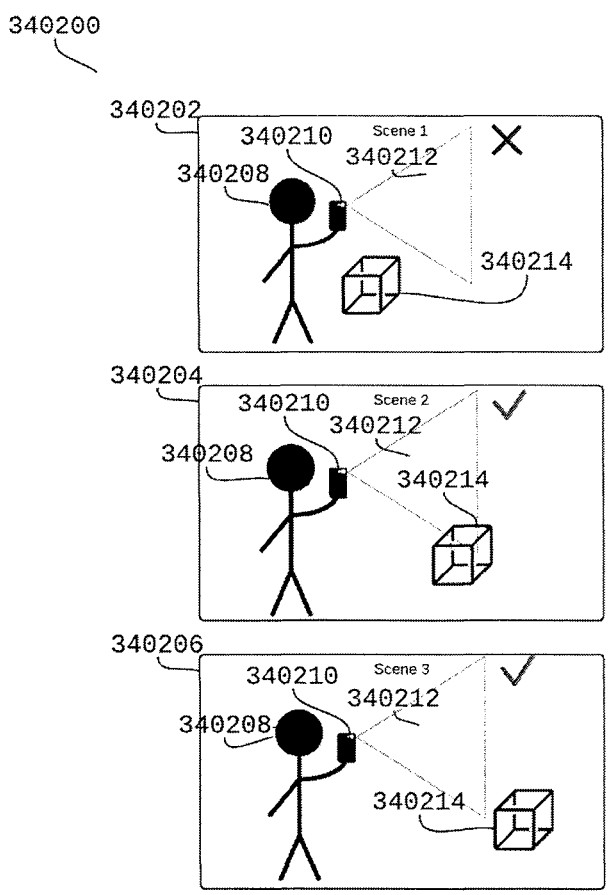
Figure 24C:
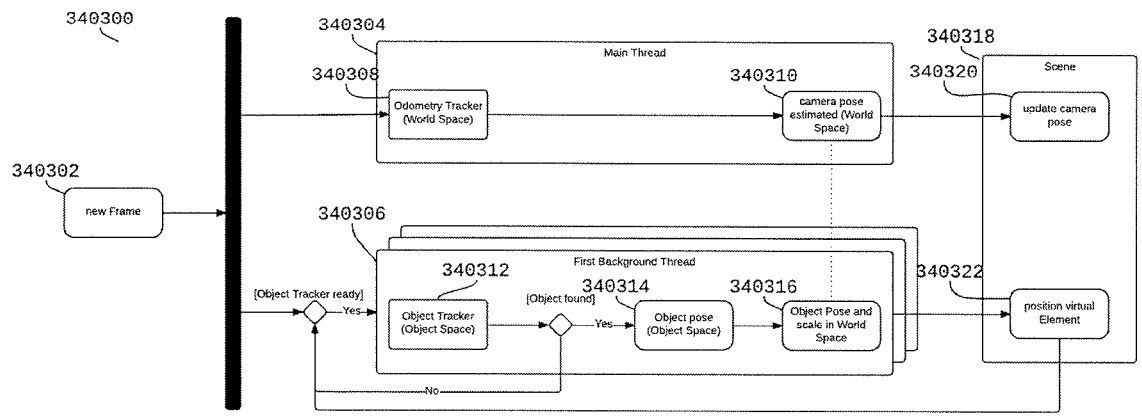
Figure 25A:
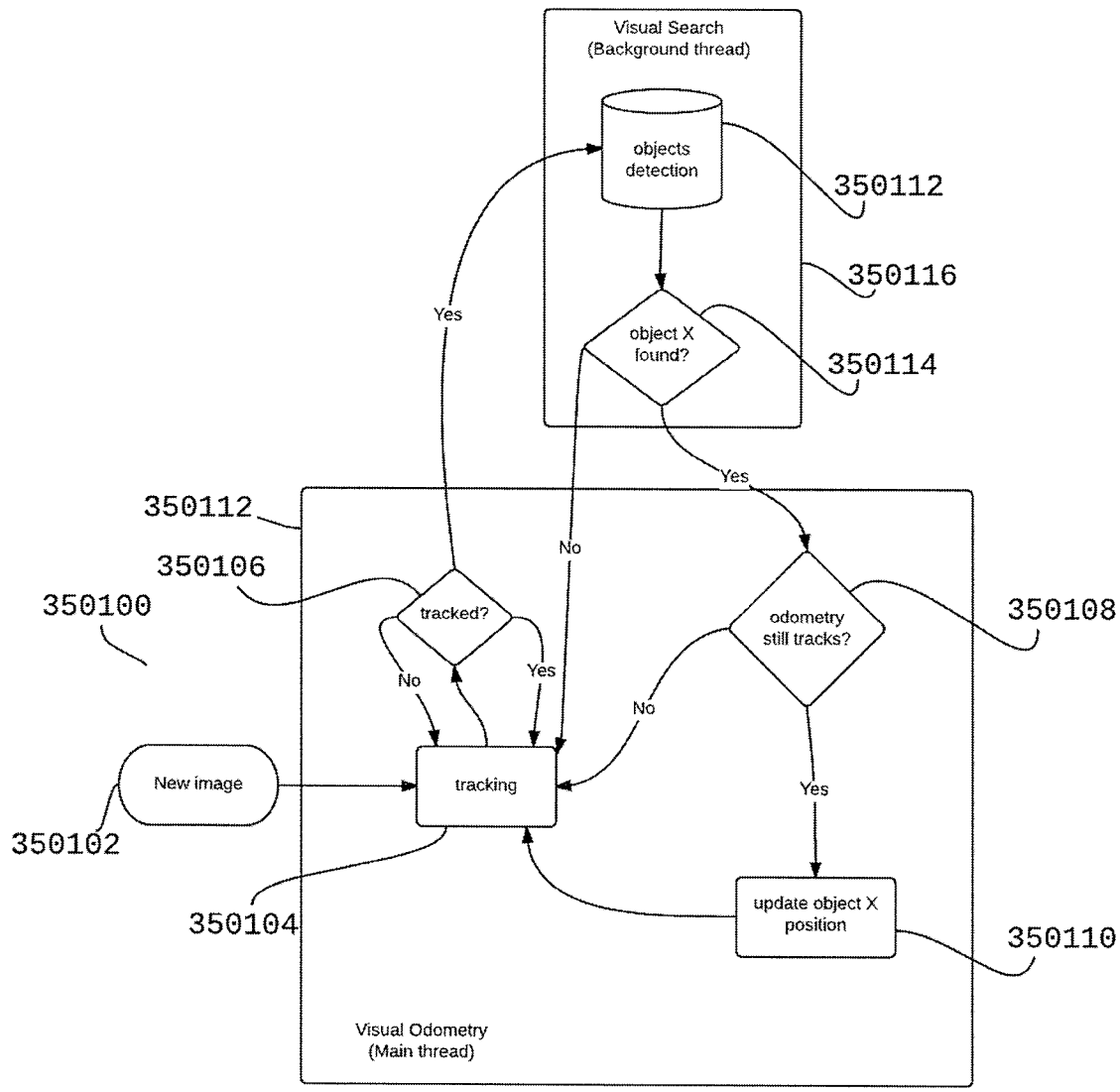
Figure 25B:
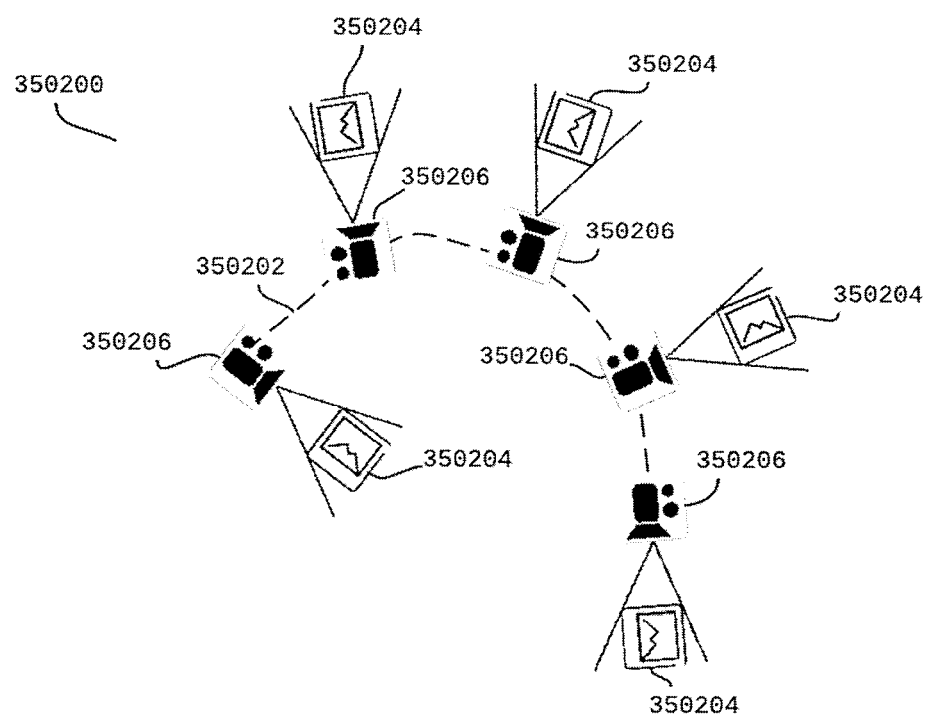
Figure 25C:
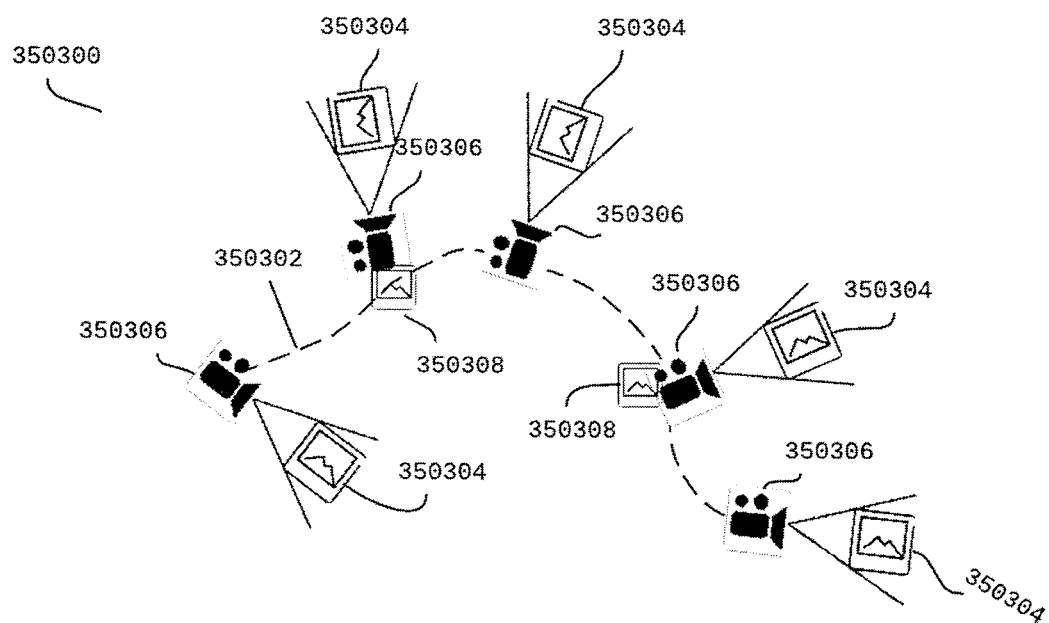
Figure 26A:
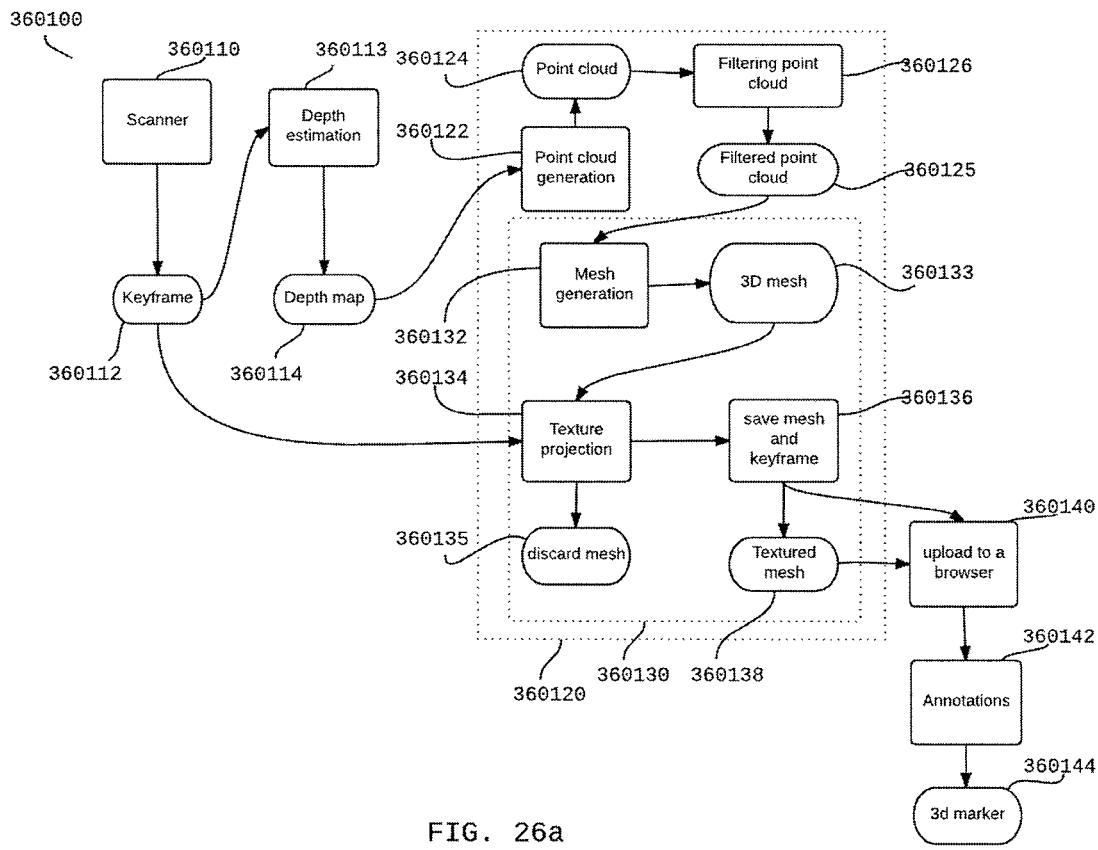
Figure 27A:
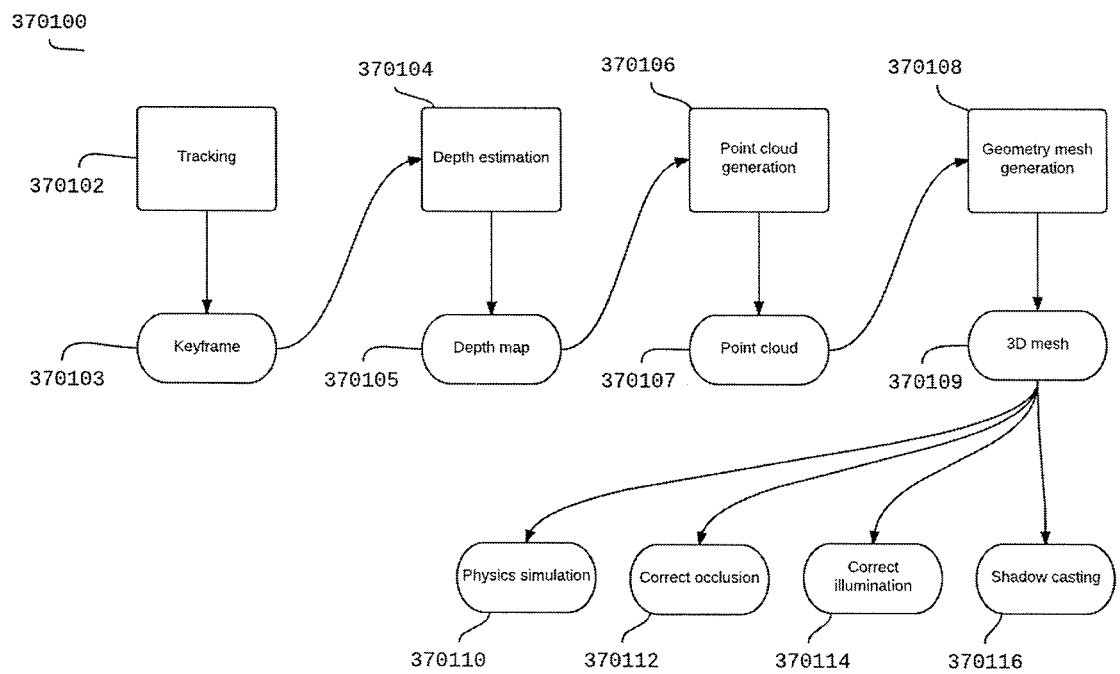
Figure 28A:
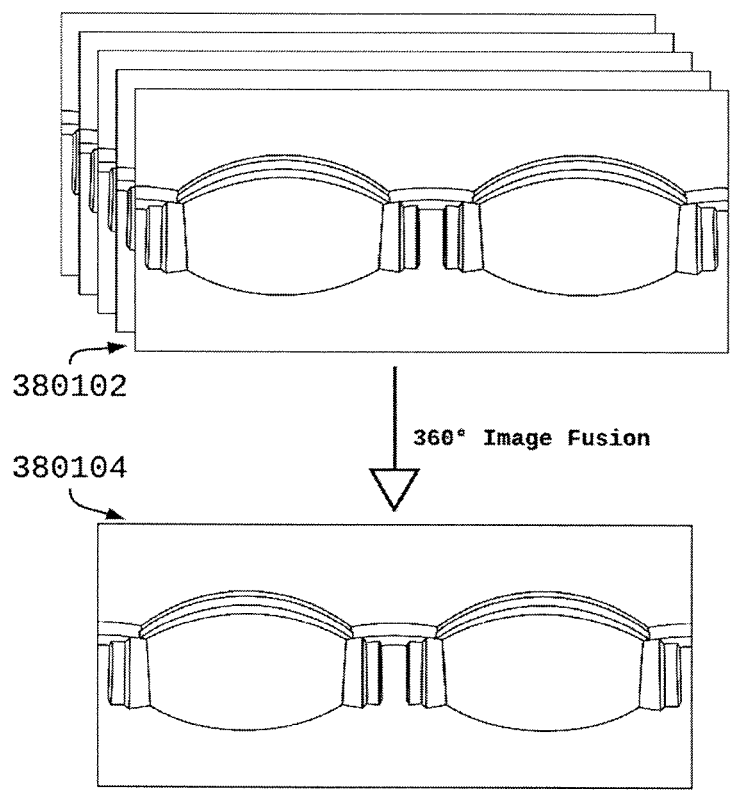
Figure 28B:
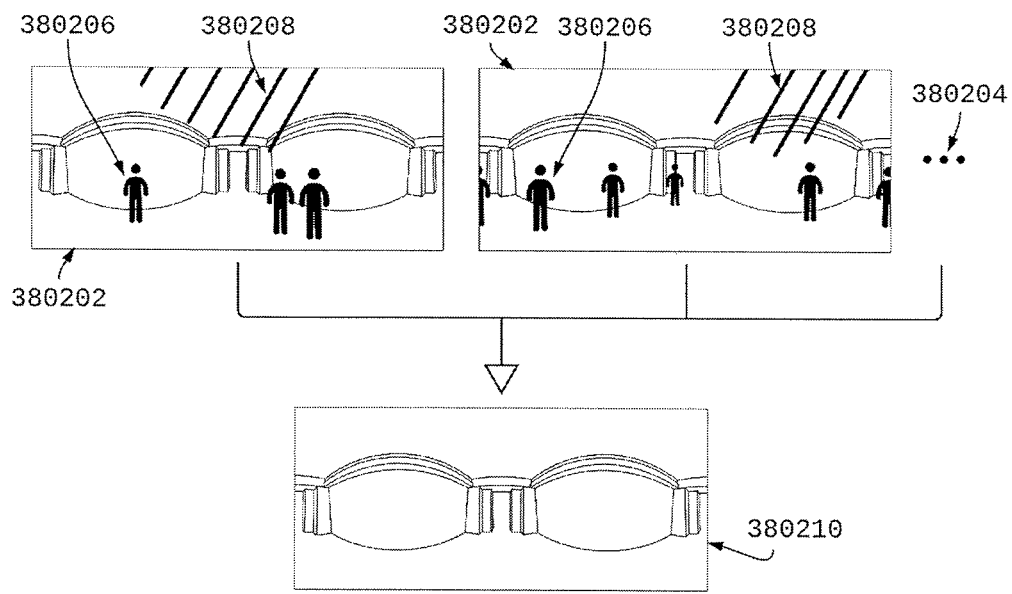
Figure 28C:
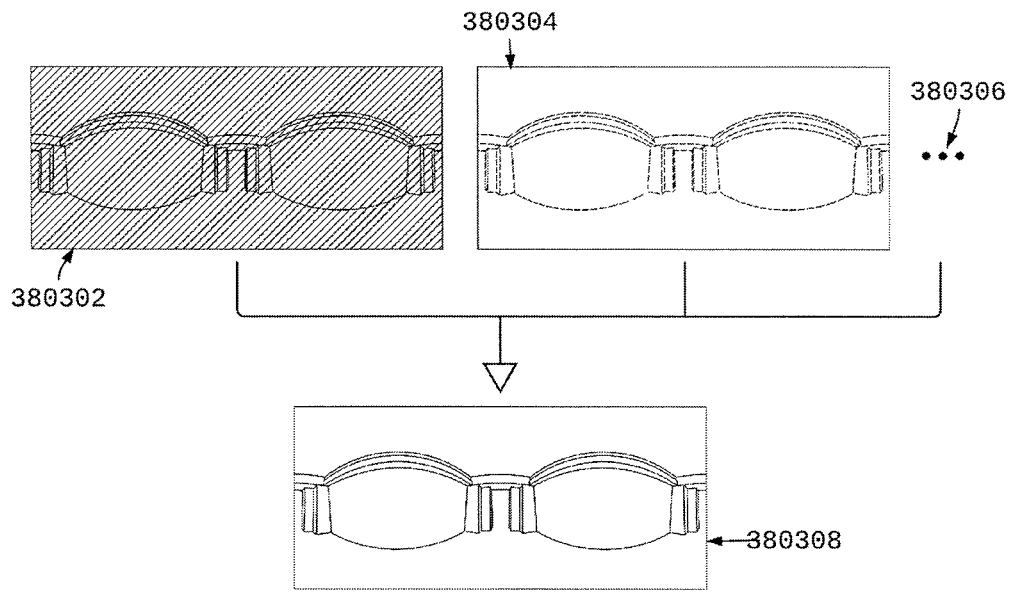
Figure 29A:
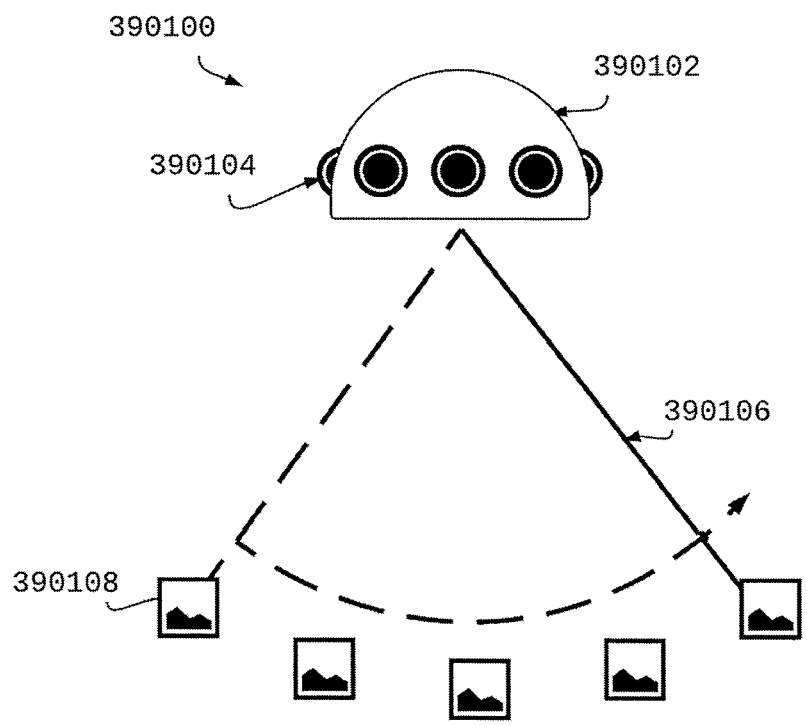
Figure 29B:
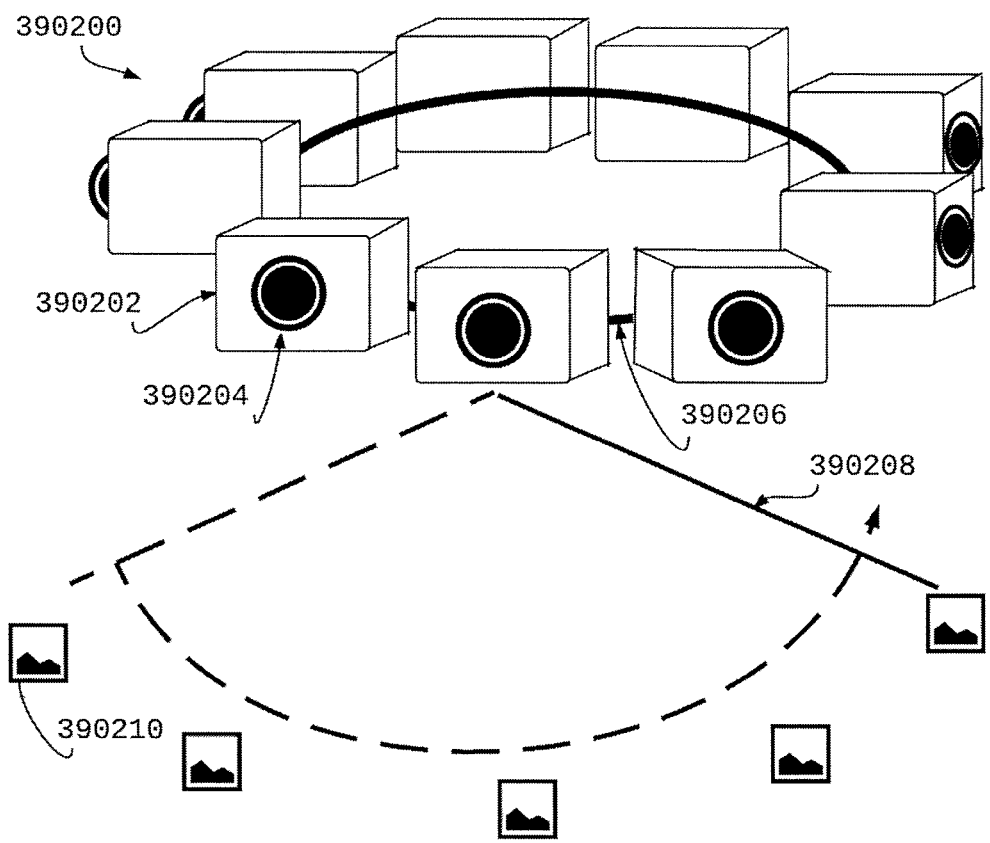
Figure 29C:
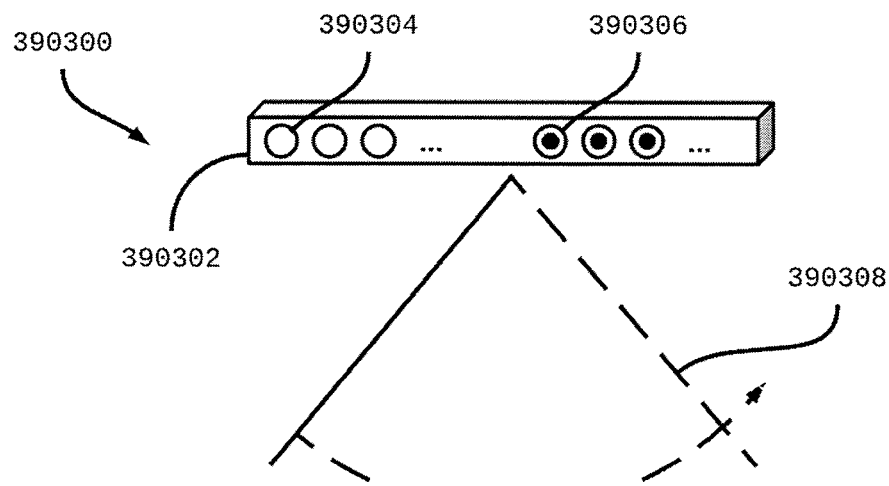
Figure 29D:
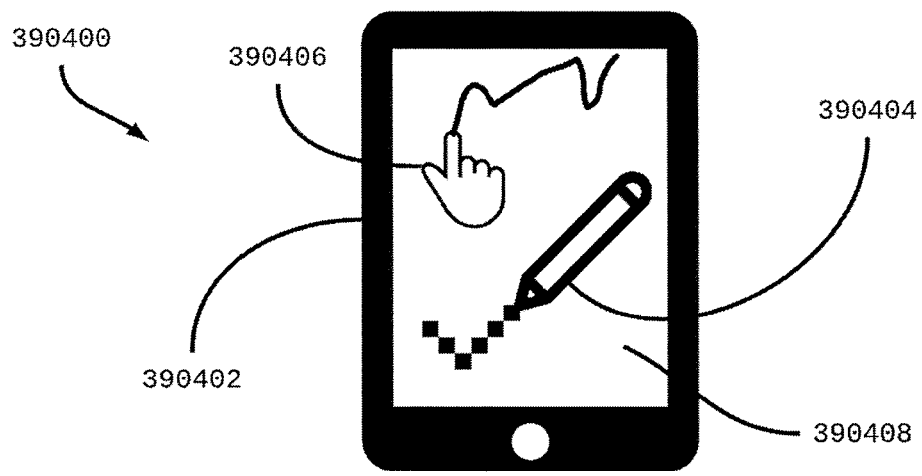
Figure 30A:
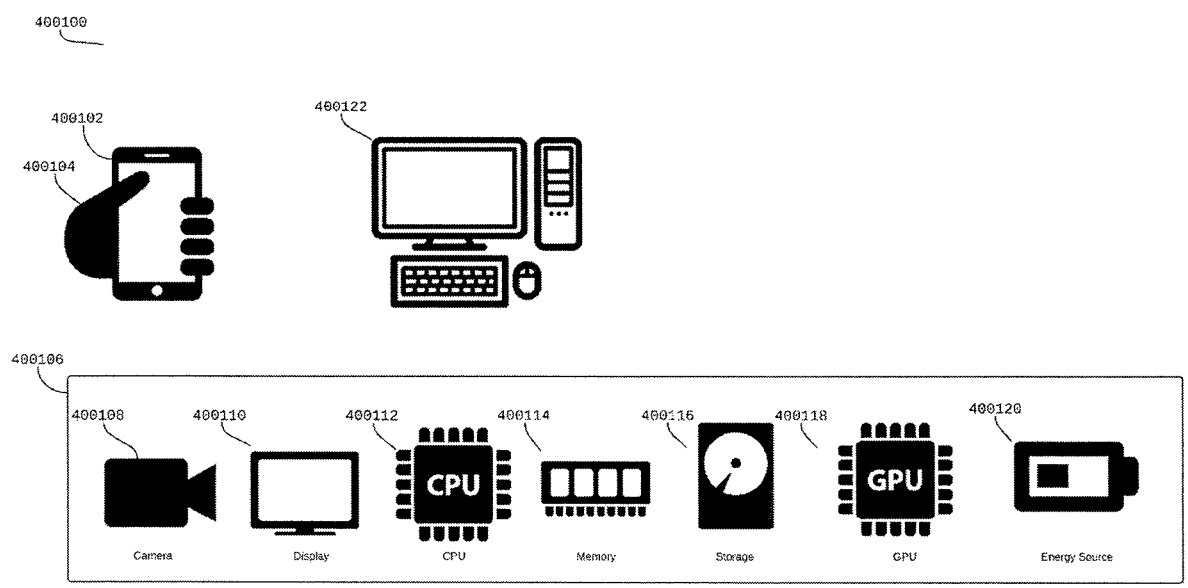
Figure 30B:
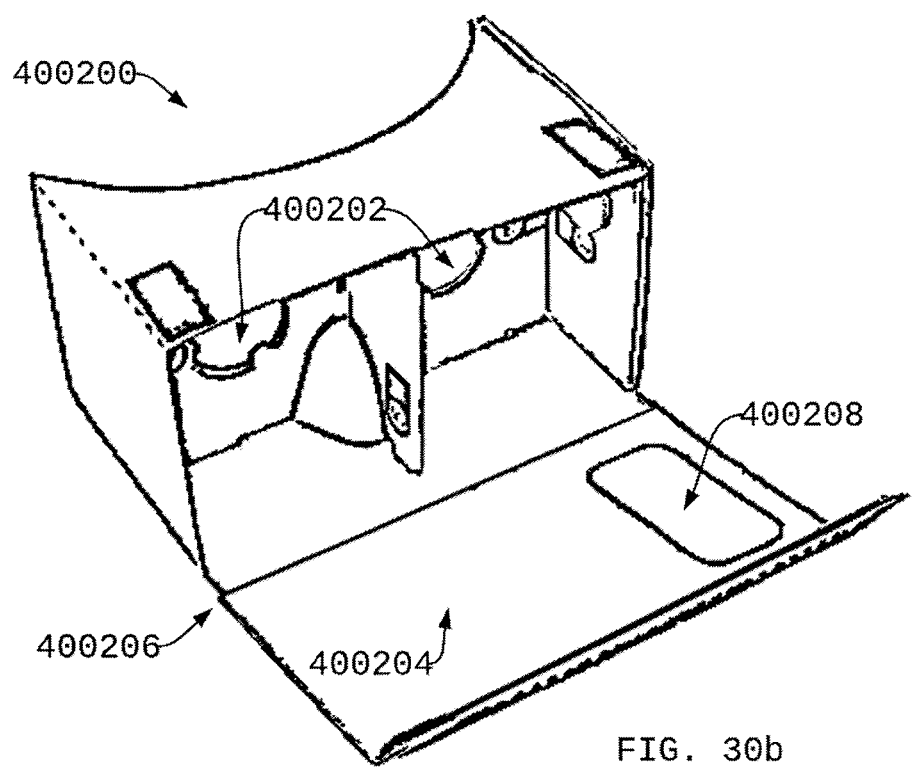
Figure 30C:
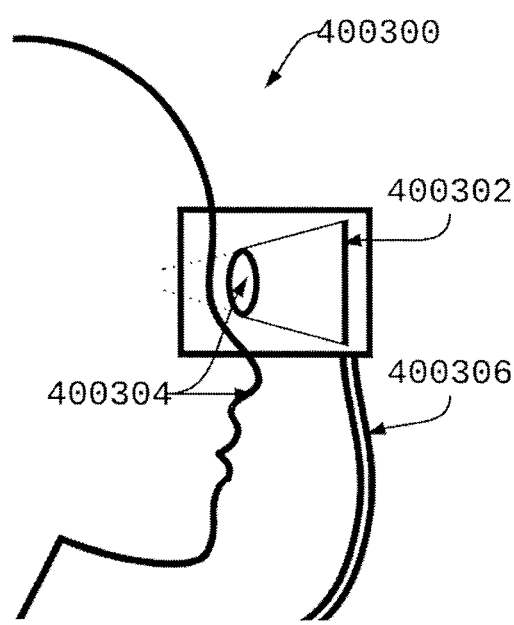
Figure 30D:
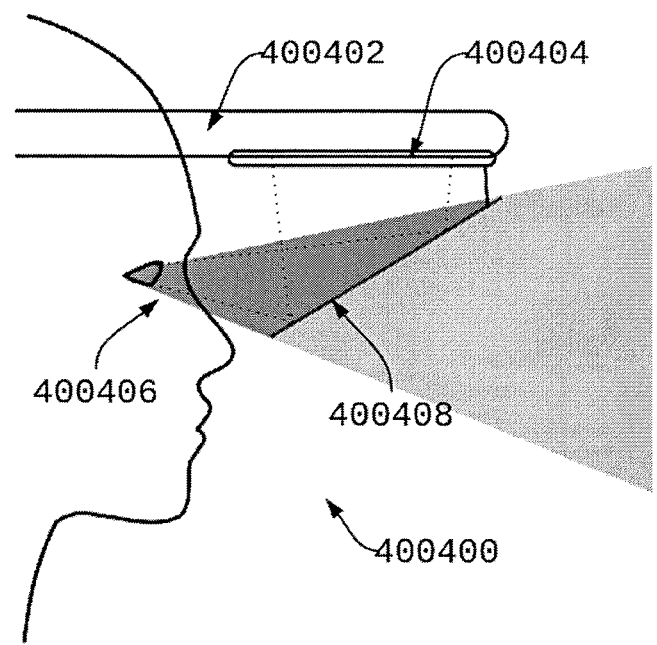
Figure 30E:
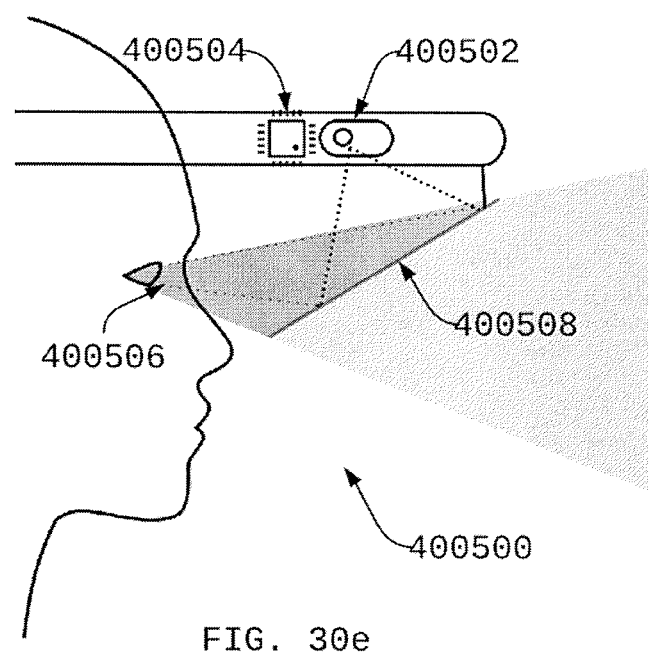
Figure 30F:
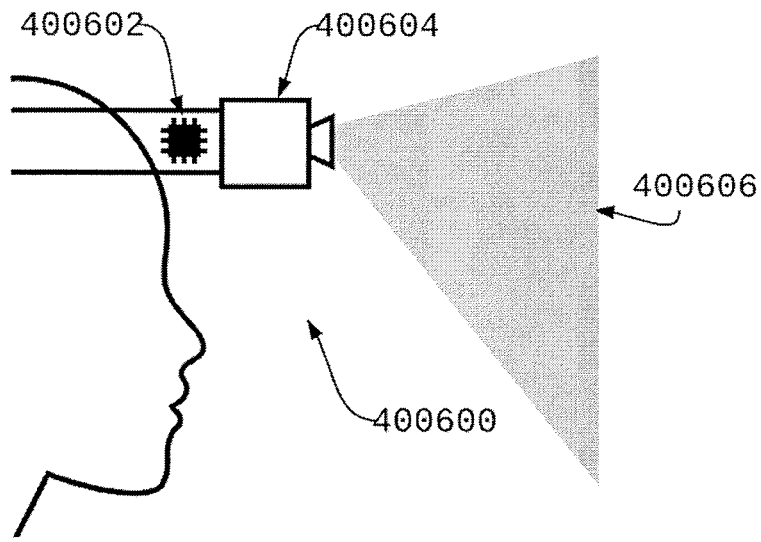

FIG. 2a is an abstract system diagram representing the interaction between certain methods with the embedding system as well as with the different types of users in accordance with certain aspects described herein;

FIG. 2b is a flowchart diagram of an exemplary embedding system for certain methods showing the general workflow in accordance with certain aspects described herein;

FIG. 2c is a system diagram representing the exemplary use of certain methods for the construction-based use case in accordance with certain aspects described herein;

FIG. 2d is a flowchart diagram of the system process for importing 360° images and videos to a timeline-based scene in accordance with certain aspects described herein;

FIG. 2e is a flowchart diagram of the system process for creating and editing the timeline of 360° images and videos in accordance with certain aspects described herein;

FIG. 2f is a flowchart diagram of the system process for adding new timeline-elements to an existing timeline of 360° images and videos in accordance with certain aspects described herein;

FIG. 2g is a flowchart diagram of the system process for adding 2D and 3D content to an existing location- or timeline-based scene of the timeline of a 360° image or video in accordance with certain aspects described herein;

FIG. 2h is a system diagram of the interaction process of the existing embedding system and the timeline system for the processing of the 360° images and video in accordance with certain aspects described herein;

FIG. 2i is an illustration of one possible implementation for expanding the timeline panel for a chosen location in accordance with certain aspects described herein;

FIG. 2j is an illustration of one possible implementation of the expanded timeline of a location at time 0 in accordance with certain aspects described herein;

FIG. 2k is an illustration of one possible implementation of the user interaction to expand the timeline panel to create a new time-based scene for an existing timeline in accordance with certain aspects described herein;

FIG. 2l is a partial diagram of the modal for creating a new time-based scene in an expanded timeline as represented in FIG. 2k in accordance with certain aspects described herein;

FIG. 2m is a partial diagram of the modal for creating a new time-based scene in an expanded timeline as represented in FIG. 2k in accordance with certain aspects described herein;

FIG. 2n is a partial diagram of the modal for creating a new time-based scene in an expanded timeline as represented in FIG. 2k in accordance with certain aspects described herein;

FIG. 2o is a partial diagram of the modal for creating a new time-based scene in an expanded timeline as represented in FIG. 2k in accordance with certain aspects described herein;

FIG. 2p is a partial diagram of the modal for creating a new time-based scene in an expanded timeline as represented in FIG. 2k in accordance with certain aspects described herein;

FIG. 2q is a partial diagram of the modal for creating a new time-based scene in an expanded timeline as represented in FIG. 2k in accordance with certain aspects described herein;

FIG. 2r is a diagram of one possible implementation showing the in FIG. 2k to FIG. 2q newly created time-based scene and the according timeline of the exemplary location at a subsequent time in accordance with certain aspects described herein;

FIG. 2s is a partial diagram of the modal for the user interaction to change the scenes settings of a time-based scene in an expanded timeline as represented in FIG. 2s in accordance with certain aspects described herein;

FIG. 2t is an illustration of one possible embodiment of the viewer for timeline-based VR tours in accordance with certain aspects described herein;

FIG. 2u is an illustration of the expanded timeline navigation panel of the viewer represented in FIG. 2t in accordance with certain aspects described herein;

FIG. 2v is an illustration of the expanded timeline navigation panel of the viewer represented in FIG. 2t at a subsequent time on the timeline in accordance with certain aspects described herein;

FIG. 2w is a more space-saving alternative illustration of one possible implementation of the opened timeline as dropdown of a chosen location at time 0 in accordance with certain aspects described herein;

FIG. 2x is an illustration of an alternative embodiment of the viewer for timeline-based VR tours in accordance with certain aspects described herein;

FIG. 2y is an illustration of the expanded dropdown navigation panels of the viewer represented in FIG. 2x in accordance with certain aspects described herein;

FIG. 3a illustrates the overall process of adding a Floor Plan to an existing or newly created Holo in accordance with certain aspects described herein;

FIG. 3b illustrates the process of importing a Floor Plan from various sources and formats in accordance with certain aspects described herein;

FIG. 3c illustrates the process of interconnecting a selected Scene with a Location on an imported Floor Plan in accordance with certain aspects described herein;

FIG. 3d illustrates the process of extracting a high definition version of a Floor Plan from a document after applying transformations like cropping or rotation in accordance with certain aspects described herein;

FIG. 3e illustrates the user interface of the Editor editing a Holo including Floor Plans in accordance with certain aspects described herein;

FIG. 3f illustrates an exemplary user interface of the Editor for the import of a Floor Plan in accordance with certain aspects described herein;

FIG. 3g illustrates an exemplary user interface for Hotspot navigation and creation on an enlarged Floor Plan in accordance with certain aspects described herein;

FIG. 3h illustrates an exemplary user interface for representation and addition of orientation to Hotspots on a Floor Plan in accordance with certain aspects described herein;

FIG. 4a is an illustration of how the virtual camera is adjusted in multiple panoramic images in accordance with certain aspects described herein;

FIG. 5a illustrates an exemplary way to apply a position to a photo in accordance with certain aspects described herein;

FIG. 5b illustrates how added locations could be visualized in accordance with certain aspects described herein;

FIG. 5c illustrates an exemplary use case where this method can be used in accordance with certain aspects described herein;

FIG. 5d illustrates the possibility of annotating photos in accordance with certain aspects described herein;

FIG. 6a illustrates a possible visualization of the canvas-creation-mode and the resulting features, including but not limited to measuring distances and angles besides extracting and projecting surfaces in accordance with certain aspects described herein;

FIG. 7a illustrates a HTML 2D overlay over a 3D scene, which enables the creator of a Holo to create any HUD for the player mode in accordance with certain aspects described herein;

FIG. 8a is an illustration of the underlying concept of the annotation and task system located in 360° images in accordance with certain aspects described herein;

FIG. 8b is a flowchart illustrating the workflow of creating a new annotation in accordance with certain aspects described herein;

FIG. 8c is a flowchart illustrating the workflow of creating a new annotation from a preselection of objects in a Holo in accordance with certain aspects described herein;

FIG. 8d is a flowchart illustrating the workflow of being notified of, processing and resolving an annotation in accordance with certain aspects described herein;

FIG. 8e is an exemplary illustration of a synchronized annotation list embedded into a Holo in accordance with certain aspects described herein;

FIG. 8f is an exemplary illustration of the synchronization of a resolved task in accordance with certain aspects described herein;

FIG. 8g is an illustration of the difference between global and local annotation lists in accordance with certain aspects described herein;

FIG. 9a is an illustration of an exemplary free-form strokes created with the painting tool in accordance with certain aspects described herein;

FIG. 9b is an illustration of an exemplary predefined geometric figures created with the painting tool in accordance with certain aspects described herein;

FIG. 10a is an illustration of the view for the user in the player mode for a Holo with other users added to the scene as part of the multi-user-experience in accordance with certain aspects described herein;

FIG. 10b is an illustration of the visualization of the user in a 360° scene looking at a specific location in this 360° scene and focusing on a specific user as part of the multi-user-experience in accordance with certain aspects described herein;

FIG. 11a is an illustration that visualizes audio sources in a scene in accordance with certain aspects described herein;

FIG. 11b is a flow chart that visualizes an exemplary import processes for audio sources in accordance with certain aspects described herein;

FIG. 12a is an illustration of a 360° live stream watched and annotated by one or more users at the same time in accordance with certain aspects described herein;

FIG. 13a is an example of an undistorted view of the visual content in a Holo in accordance with certain aspects described herein;

FIG. 13b is an example of a circular fisheye view of the visual content in a Holo in accordance with certain aspects described herein;

FIG. 13c is an example of a Cartesian fisheye view of the visual content in a Holo in accordance with certain aspects described herein;

FIG. 13d is a flowchart-like diagram illustrating steps and features of a systems and/or methods that permits a user to alternate between an undistorted overview of visual content in a Holo and a fisheye view of the visual content in accordance with certain aspects described herein;

FIG. 14a is an example of a possible UI for a loading screen in the player mode of an AR/VR editor and player in accordance with certain aspects described herein;

FIG. 15a is an illustration of the automatic face detection in the VR scene in accordance with certain aspects described herein;

FIG. 16a Automatic dynamic rendering resolution adjustment to keep a stable framerate in accordance with certain aspects described herein;

FIG. 17a is an exemplary illustration of a tiled 360° image for use in a Holo in accordance with certain aspects described herein;

FIG. 17b is an illustration of a low-resolution single-tile 360° image overlaid with an exemplary tiled high-resolution version of the same 360° image for use in a in accordance with certain aspects described herein;

FIG. 17c is an architecture diagram illustrating the computer architecture for uploading, preprocessing, storing and delivering tiled 360° images in accordance with certain aspects described herein;

FIG. 17d is a flowchart illustrating the process of receiving a 360° image, creating a low-resolution and a high-resolution tiled version thereof and storing them in accordance with certain aspects described herein;

FIG. 17e is a flowchart of delivering a tiled 360° image for display in a Holo in accordance with certain aspects described herein;

FIG. 18a is an illustration of the computer architecture for uploading an object to be used in a Holo and checking for an existing hash value in accordance with certain aspects described herein;

FIG. 18b is an illustration of the process of uploading an object to be used in a Holo and checking for an existing hash value in accordance with certain aspects described herein;

FIG. 19a is an illustration of an asynchronous web component running locally in the browser of the client to import and process 3D models of different formats locally without the need to upload them or the need of an active internet connection in accordance with certain aspects described herein;

FIG. 20a is an illustration of an automatic mesh simplification and texture reduction, rescaling and adjusting on left memory when a 3D model is loaded and rendered on mobile devices in accordance with certain aspects described herein;

FIG. 21a is a diagram that describes a method that can apply a user's rotation to consecutive images in accordance with certain aspects described herein;

FIG. 21b is an illustration that shows a user's field of view without any rotation of the user in accordance with certain aspects described herein;

FIG. 21c is an illustration of what should happen to the user's field of view if a user rotates in accordance with certain aspects described herein;

FIG. 21d is an illustration of how stabilization of the field of view can be beneficial in accordance with certain aspects described herein;

FIG. 22a is an illustration of how using depth estimation to correctly display a panoramic image on a stereoscopic device in accordance with certain aspects described herein;

FIG. 23a visualizes how videos can be enhanced by additional elements in accordance with certain aspects described herein;

FIG. 24a is an illustration of the overall tracking system in accordance with certain aspects described herein;

FIG. 24b is an illustration of the benefits of the method by enabling long distance tracking in accordance with certain aspects described herein;

FIG. 24c is an illustration of how the pose of detected objects is determined in accordance with certain aspects described herein;

FIG. 25a is a flowchart illustrating the workflow of the overall system in accordance with certain aspects described herein;

FIG. 25b is an illustration of the first use case of the embodiments in accordance with certain aspects described herein;

FIG. 25c is an illustration of the second use case of the embodiments in accordance with certain aspects described herein;

FIG. 26a is a flowchart of a 3D marker generation using a geometry mesh in accordance with certain aspects described herein;

FIG. 27a is a flowchart of a pipeline of a mesh generation in real time and its usage in accordance with certain aspects described herein;

FIG. 28a shows the general process of 360° image fusion in accordance with certain aspects described herein;

FIG. 28b depicts a series of 360° images containing people and noise in accordance with certain aspects described herein;

FIG. 28c depicts a series of 360° images with different lighting exposures in accordance with certain aspects described herein;

FIG. 29a is an exemplary illustration of a spherical or panorama camera with at least two lenses in accordance with certain aspects described herein;

FIG. 29b is an exemplary illustration of a rig construction of at least four cameras to shoot spherical or panoramic images in accordance with certain aspects described herein;

FIG. 29c illustrates a device for 3D scanning in accordance with certain aspects described herein;

FIG. 29d illustrates a graphics tablet for digital drawing in accordance with certain aspects described herein;

FIG. 30a illustrates a computing device in accordance with certain aspects described herein;

FIG. 30b is an exemplary illustration of a head-mounted device using a smart device for rendering in accordance with certain aspects described herein;

FIG. 30c is an exemplary illustration of a head-mounted device with a built in display system in accordance with certain aspects described herein;

FIG. 30d is an exemplary illustration of a head-mounted device with a smart device and a reflective surface in accordance with certain aspects described herein;

FIG. 30e is an exemplary illustration of a head-mounted device with a projector and a reflective surface in accordance with certain aspects described herein; and FIG. 30f is an exemplary illustration of a head-mounted device with a projector in accordance with certain aspects described herein.

Figure 31A:
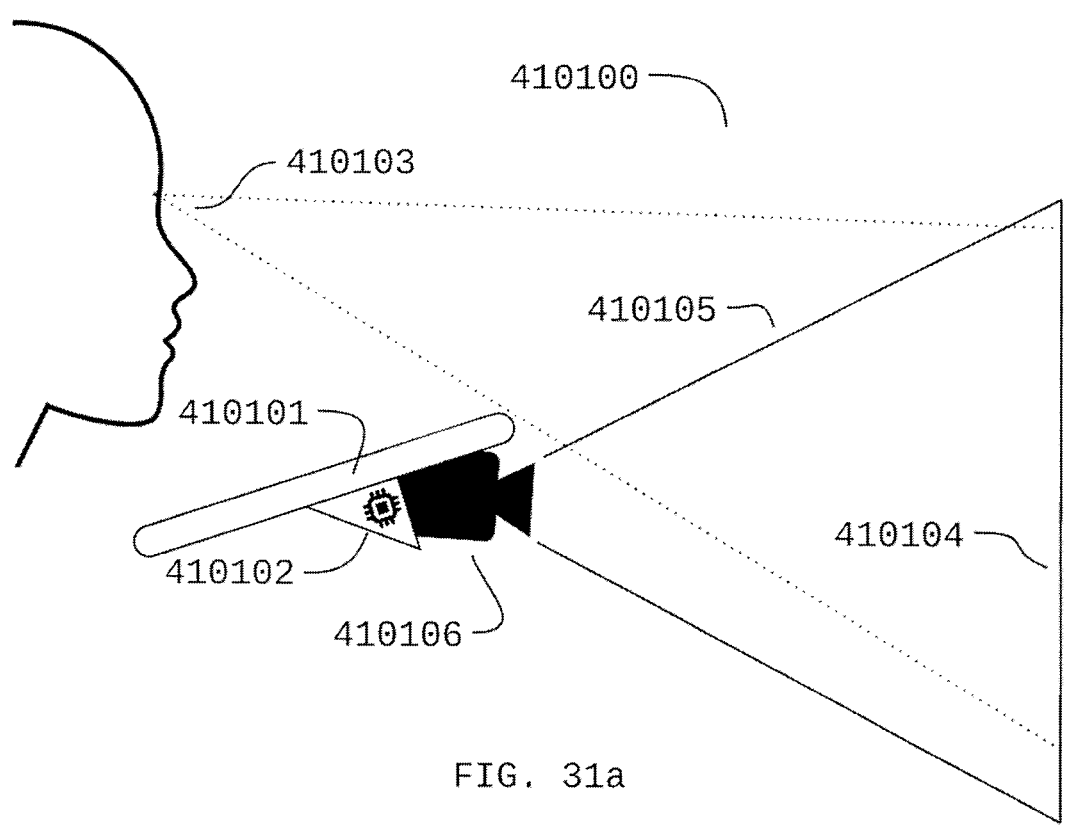
Figure 31B:
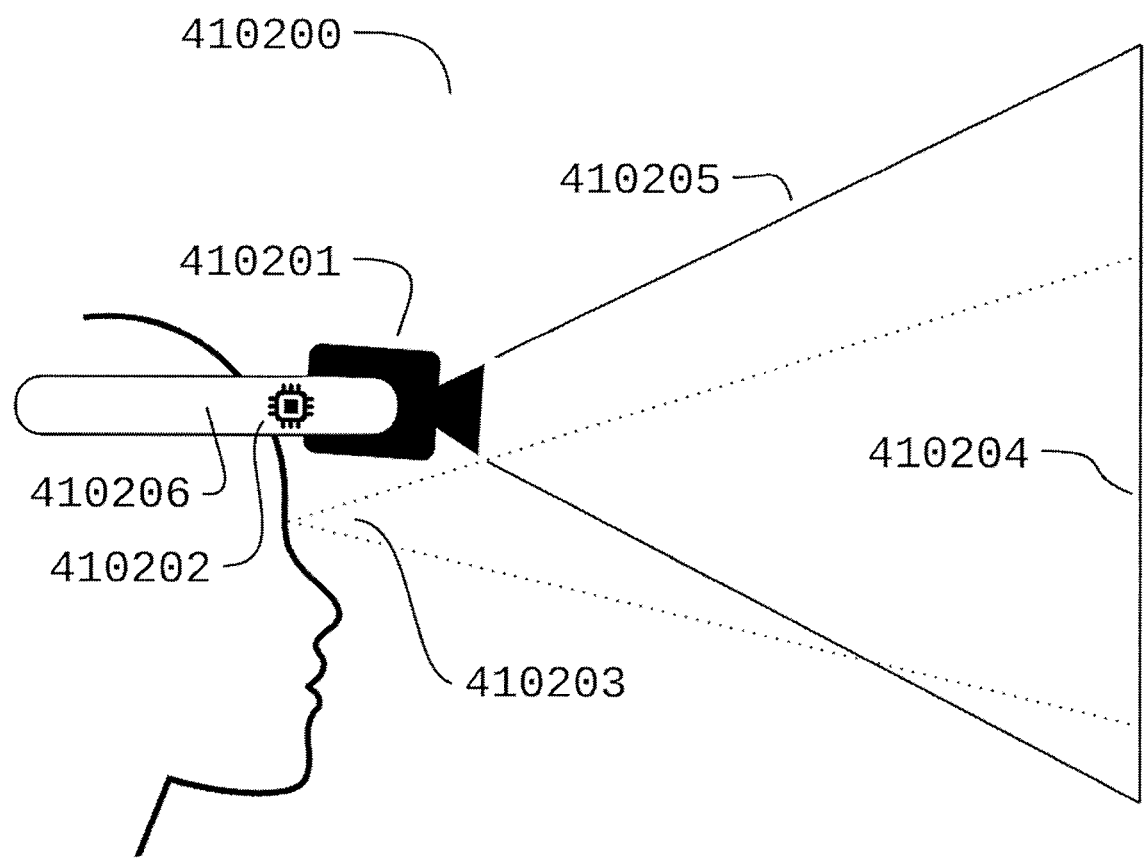
Figure 31C:
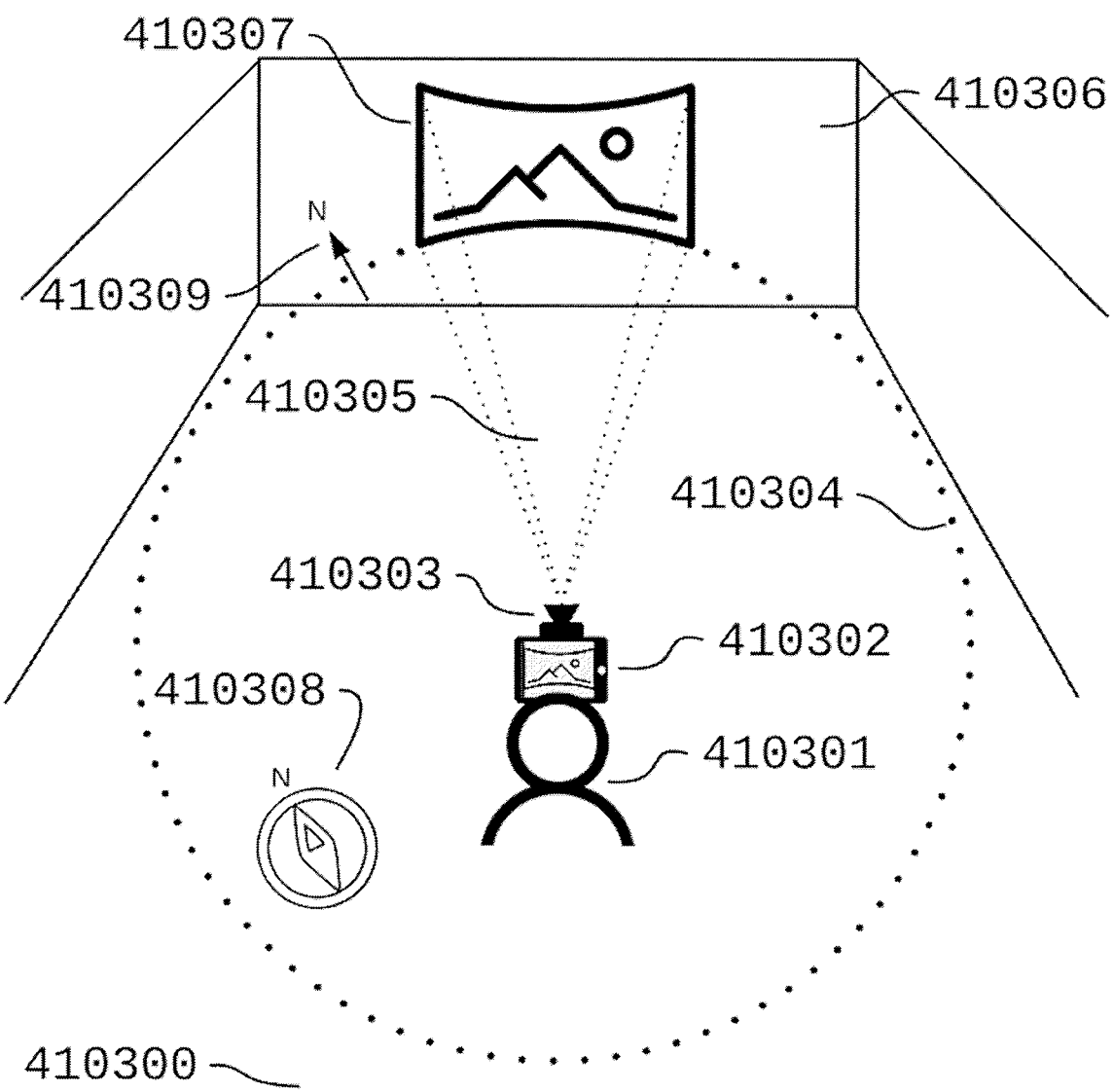

FIG. 31a is an exemplary illustration of an augmentation system comprising a projector unit, sensors and a smart device;

FIG. 31b is an exemplary illustration of a head-mounted device with a built-in projector unit, sensors and a computing unit; and FIG. 31c is an exemplary illustration of the system that aligns the virtual projected content with the physical space.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the particular embodiments. In other instances, well-known data structures, timing protocols, software operations, procedures, and components have not been described in detail so as not to unnecessarily obscure aspects of the embodiments herein.

Overview

Three dimensional virtual reality and augmented reality may be created using modern computer technologies. Users may wear a headset device in order to receive two images, one directed toward each eye, and together may create the illusion of three dimensional space and depth. Additionally or alternatively, certain embodiments may cause the display to move, depending on interaction from the user, for example, if sensors in the headset determine that the user is moving her head, the display is changed to coordinate to the movement. In this way, a user may feel as if she is actually in the virtual computer generated or augmented space.

Virtual reality may refer to images presented to a user which are all computer generated. In some examples, when a user moves her head, the virtual reality display moves in conjunction, in order to give the impression that the user is in another place, a virtually real place, which may be interacted with using various sensors. In some embodiments, a user may be presented with camera images of another place that may be recorded or live or near live conditions. The user may interact in the same way as described with augmented reality features laid into the display. For example, a user in Utah may wear a virtual reality headset in order to feel like he is at a baseball game in Florida. He may move his head to view different angles and see different parts of the field as if he were really in Florida. Computer generated items or displays may be laid into the images he views in order to show him statistics of the game, replays of earlier action, or broadcasters and pundits who comment during the game. Augmented reality may refer to images presented to a user which are based on camera images with additional computer generated graphics. The camera images may be taken from the place the user is located, for example by a smartphone that is also used to generate the images for viewing. These camera images may be augmented with computer generated images in order to add an item or aspect to what the user would see without the technology. For example, a user wearing an augmented reality headset may see a camera image of an office, but instead of a window, the computer generates an image of outer space. Or instead of seeing a coffee mug on their desk, the user sees a cartoon character on her desk instead. Again, these images may be manipulated and interacted with, but are computer generated. Another way how augmented reality content can be consumed is by using a head-mounted device to augment the user's field of view with additional virtual content overlaid perspectively correct on the physical scene. In this case the recorded camera image is not necessarily shown to the user. Another term used in the art is mixed reality. Mixed reality may refer to augmented reality but imposed on a place with physical objects in it. For example, the user is using devices that have a camera through which they view the actual physical world around them, but the computer changes the color of the desk to blue. The user may reach out and touch the physical desk because they are in the room with the desk, but through the computer generated images, the desk color has changed. In this disclosure, terms such as virtual reality, augmented reality and mixed reality may be interchangeably used and are not intended to be limiting.

One problem with VR and AR is that building or modifying scenes for viewing, may be inaccessible to regular users. These regular users may not be able to create their own VR or AR applications without significant knowhow in the software engineering space. Disclosed here are methods and systems including corresponding web-based platforms for enabling average users without specific knowledge in programming and/or design to create AR and/or VR content. The platform lets users create Holos, or one or more AR and/or VR scenes. These scenes may be created by the user and stitched together by the systems and methods here in order to provide an overall experience to the user.

Through the systems described here, AR scenes may be created by dragging and dropping into the platform running in the web browser either 2D or 3D markers for tracking as well as one or more 2D or 3D objects. VR scenes may be created by dragging and dropping into the platform running in the web browser a 360° spherical image or video and/or one or more 2D or 3D objects. Besides the ability to import arbitrary 2D or 3D objects, the platform may also provide a selection of predefined 2D and 3D objects that can be added to an AR or VR scene without the requirement of further resources. In some embodiments, all objects present in a scene may be manipulated, animated and associated with additional information as well as actions such as transferring to a different scene or opening a website, and all created Holos may be saved persistently and consumed in the dedicated player mode of the platform directly in the browser and may be reachable via a URL.

Once the scenes are stitched together, the user may interact by viewing one scene at a time, and navigating to the next scene with interactions such as clicking an arrow in the scene to move the scene to the next scene. Additionally or alternatively, in some embodiments, sensors in user equipment may be used to identify location, movement and/or orientation. Such information may also be used to navigate through scenes created by the systems. In such a way, a user may feel as if she is walking down a street, panning the camera or moving a headset to view various angles including but not limited to 360° around and even up and down, relative to the user as discussed in detail below. It should be noted that in this disclosure, the term "Holo" may be used to refer to one or more AR/VR scenes that may be stitched together. The term is not intended to be limiting, but merely describe a holographic, or Holo scenario, which is not necessarily either one of an AR or VR scene, but any.

Thus, the systems and methods here may, alternatively or in any combination, give a) the ability to enable the creation of both, AR and VR content using the same web platform; b) give average users without specific skills in design and/or programming (end-user design), particularly concerning the possibility to compose AR and VR content via drag and drop; c) provide a completely web-based system to carry these out; d) import and use arbitrary 2D and 3D objects, and also choose from a set of predefined objects; and/or e) create VR scenes directly from 360° spherical images or videos.

It should be noted that computing resources that may be used to carry out what is described here, could be any number of devices including but not limited to a desktop, laptop, tablet, phablet, smartphone, wearable such as glasses, helmets, or other smart computing devices. Wireless communication connections could be any number of things including cellular, WiFi, Near Field Communications, Bluetooth, Pico cell, Nano cell, or any other kind of communication protocol, standard, or method, even those invented after this disclosure was written.

Architecture Examples

FIG. 1a is an illustration of an example overall system architecture. The example methods and systems here are based on a computer architecture comprising a computer 110104 such as a personal computer or mobile computer such as a smartphone, including any number of devices using any number of operating systems 400122 on the client-side and a server 110114 and data store 110116 on the server-side, which are connected by a communications network 110112. The computing systems including the server, data store, client personal computer, may each include components such as a processor, memory, random access memory (RAM), data storage, distributed data storage, network connection, and other peripherals such as still cameras, video cameras, microphones, speakers, infrared cameras, depth mapping cameras, light detection and ranging (LIDAR) systems, radar systems, geographical positioning systems (GPS), acoustical sensors and mapping devices, etc.

where the memory and processors may run any number of software programs as disclosed here on an operating system.

The system implementing the methods here may be delivered by the server 110114 as a service to the user 110102 that they can access using their web browser 110108 with an embedded 3D engine 110110. The provided service may be delivered in terms of static web pages 110124, client-side scripts 110122 and/or dynamic web pages generated by server-side programs 110118 and scripts 110120 that reside in the data store 110116 on the server-side. In some embodiments, in order to effectively use the service, the user 110102 may have a user profile 110126. Their created Holos 110128 containing one or more AR and/or VR scenes may be persistently stored in the data store 110116, along with any imported 2D and/or 3D models 110117. Predefined 2D and 3D models provided by the service 110117 may reside on the data store 110116 as well.

FIG. 1b illustrates example components and functionalities additionally or alternatively contained in the system. The methods and systems comprise a number of components and functionalities that may be distributed between the server and the client side. Both the Server 110204 and the Client 110202 comprises technical devices 400106. The server side 110204 may direct actions involving direct communication with the data store 110116, i.e., user management 110226, e.g., registering an account, logging in etc., and saving/loading Holos and the AR/VR scenes and 2D/3D objects contained therein 110228. On the client side 110202, the user 110202 may interact with the editor 110232 that enables the user to create AR/VR content and the player 110230 that enables them to consume previously created AR/VR content. In particular, the editor 110232 enables the user 110102 to create 110216 and edit 110214 Holos, create 110212 and edit 110210 AR and VR scenes contained in Holos, add 2D/3D objects 110208 to AR/VR scenes and edit existing ones 110206, adding animations 110224 to 2D/3D objects and editing existing ones 110222, and adding triggerable actions 110220 to 2D/3D objects and editing existing ones 110218. Further, a computing system may be used for viewing the AR/VR scenes once built, as described in detail below.

Holo Overview

Additionally or alternatively, the systems and methods here may support certain Holo building and displaying experiences FIG. 1c illustrates an example structure of a Holo 110302 created using a computing device 400106. It comprises several scenes 110304, that are either AR 110306 or VR 110308 scenes, whereas one Holo can contain scenes of both types and may contain at least one scene of any type. In the example, one AR scene 110306 contains a certain number of dedicated tracking markers 110310 that may be either a 2D or 3D object. The tracking marker 110310 may act as the virtual connection to the real world in an AR context, i.e., the created AR content is displayed relative to that marker in a see-through scenario where a user is viewing their own surroundings through a camera or see though device, and the systems are incorporating a marker on a physical object detected and tracked as described herein. For instance, if one wants to augment his real-world laptop with virtual objects in an AR scenario, either a 2D image of the keyboard of the laptop or a 3D scan of the laptop could act as markers. In the editor 110232, virtual 2D 110316 and/or 3D objects 110318 would then be placed in relation to the imported marker (which could be accomplished via drag and drop, or other interaction for example) as they should appear relative to the real laptop in the AR scenario independent of the position of the camera. A 3D scan can be created with a 3D scanning device 390302, the image with a camera 400108. An AR scene 110306 without a marker is an empty scene and can be used to create fully virtual world by importing any number of 2D 110316 and/or 3D objects 110318. One VR scene 110308 contains one 360° spherical image or one 360° spherical video 110314 as the basis. Spherical and panoramic images or videos can be created using a spherical or panorama camera 390102 or using rigs of multiple cameras 390200. That is, the scene is automatically initialized to contain a sphere on whose inside the 360° image/video is placed as the texture. The virtual camera through which the user 110102 consumes the VR scene is then placed at the center of the sphere, so that they have the illusion of standing at the place where the image or video was shot. Any number of objects 110312 can be imported into a scene, in terms of either 2D 110316 or 3D 110318 objects. For instance, in this way a virtual chair and table given as 3D objects can be placed within the 360° image of a living room, which is a potential use case for interior designers. Any number of objects 110312 can be animated 110322 and associated with actions 110320, such as transferring to a different scene or opening a website, which are triggered when the object is clicked.

Web Based System Access Examples

Additionally or alternatively, FIG. 1d illustrates an example workflow to access the system. In this example, a user can open a web browser 110402 on a computing machine 400106. Without the need to install additional software, the system can be accessed by navigating to an URL that identifies the platform 110404. The system can be accessed with help of a web browser 110402 although the system can run on a different computing machine 400106 than the one the user is using. Thus, as shown in FIG. 1a, the servers 110114 and data storage of the systems 110116 may be accessed over a network 110112.

Holo Creation and Loading Overview Examples

FIG. 1e 110500 describes an example workflow of creating or loading a Holo using a computing device 400106. If the user 110102 intends to create a Holo 110504 on a computing machine 400106, they have to decide on the type of the first scene contained in the new Holo 110506, as a Holo may contain at least one AR or VR scene. The initial scene is then created by the editor 110232 in terms of either an AR 110510 or VR 110508 scene template. If the user 110102 intends to instead load an existing Holo, they may choose from a list of Holos 110512 delivered by the server 110114 based on the Holos 110128 associated with the user's profile 110126 in the data store. The selected Holo may then be loaded 110514 and displayed by the editor 110232.

FIG. if 110600 illustrates an example method for creating or selecting an AR or VR scene within a Holo using a computing device 400106. If the user 110102 intends to create 110602 a new scene within a Holo, they may choose between creating an AR or VR scene 110604 or select a scene from a list of scenes 110612. In case an AR scene is created, the user may decide whether or not a marker should be used 110606. If a marker should be used, it may be imported in terms of a 2D or 3D object 110608. In case a VR scene should be created, a 360° spherical image or 360° spherical video may be imported 110610. Contrary to AR scenes, it may not be possible to create an empty VR scene because an empty VR scene has no camera input to display like an AR scene would. If the user instead of creating a new scene decides for selecting an existing one, they may have to choose from the list of scenes 110612 contained in the Holo they are currently editing.

FIG. 1g 110700 illustrates an example workflow of adding or editing a 2D or 3D object to an AR or VR scene contained in a Holo using a computing device 400106. In this example, first, a scene may be selected from the list of existing scenes 110702 in the Holo the user 110102 is currently editing. In case the user wants to add a new object 110704, they may decide 110706 between choosing from a set of predefined 2D and 3D objects provided by the web platform 110708 or importing a custom object 110710. The latter happens by an interaction such as for example, dragging and dropping one or more 2D and/or 3D object files into the web platform. In case the user 110102 wants to edit an existing object rather than creating a new one, they can do so by first selecting the object 110712 either directly within the scene currently displayed by the editor 110232 or choosing from the list of objects for that scene. Then, the object may be edited 110714 in any number of ways including but not limited to position, size, rotation color, and/or texture.

FIG. 1h 110800 illustrates an example method for adding an animation to a 2D or 3D object or editing an existing animation associated with a 2D or 3D object using a computing device 400106. The process of adding or editing an animation to a 2D or 3D object may start with selection of the target object 110802 from the scene currently displayed in the editor 110232. Subsequently, the user 110102 may decide on whether they want to add a new animation or edit an existing one 110804. In examples where they want to add an animation to the object 110806, they can select from a list of given animations or compose a custom animation from sequences of rotating and/or scaling and/or repositioning the object. In some example embodiments, editing an existing animation may only possible if there is already an animation associated with the target object 110808. If an animation exists, it can either be manipulated or replaced 110810. If the user 110102 decides to replace the existing animation, it may be deleted 110812 and they select or compose a new one 110806. Otherwise, the existing animation may be kept, but altered by the user 110814.

FIG. 1i 110900 describes an example workflow of adding or editing a triggerable action associated with a 2D or 3D object contained in an AR or VR scene using a computing device 400106. A triggerable action may be a programmed animation or change that is only imparted upon some programmed trigger event. For example, an animated object may change color if the user comes within a predetermined distance to the object. First, in the example the target object in the scene currently displayed in the editor 110232 has to be selected 110902. Subsequently, the user 110102 may decide on whether a new action should be associated with the target object or whether an existing action should be edited 110904. In case they want to add a new triggerable action to the object, they can select from a list of given actions 110906, set the parameter of the action (e.g., a URL for an "open website" action) 110908 and finally add the action to the target object 110910. Editing an existing action is only possible if there is already an action associated with the target object 110912. If an action exists, it can either be manipulated or replaced 110914. If the user 110102 decides to replace the existing action, it may be deleted 110916 and they select 110906, define 110908 and add 110910 a new one. Otherwise, the existing action may be kept, but its parameters may be altered by the user 110918.

FIG. 1j 111000 describes an example process of saving a Holo using a computing device 400106. In case the Holo is saved for the first time 111002, the user 110102 may provide the Holo a name and optional description 111004. Subsequently, the Holo including all scenes, objects, and metadata may be transferred to the server 110204 by the editor 110232, where it is assigned a URL (if saved for the first time) 111006 and finally saved 111008 to the data store 110228.

Scene Builder User Interface Examples

In certain example embodiments, a user interface may be used to begin to build and edit a Holo as described herein. The example user interface 111100 may be generated by the systems described here and accessed over a network. Thus, a user may access, build and edit a scene from wherever network access is provided. Additionally or alternatively FIG. 1k depicts an example user interface 111100 including options for creating 111102 and loading 111104 a Holo which can be viewed on a computing device 400106. A new Holo may be created by choosing the type of the first scene, i.e., either VR 111106 or AR 111110. The tile labeled 111108 implements the functionality for drag-and-drop interaction required by the methods and systems here. Clicking the tab labeled 111104 shows a list of existing Holos for a logged-in user. From that list, a Holo can be selected and loaded. Existing Holos 110128 are loaded from the data store 110116 and delivered by the server 110114.

FIG. 1l depicts a user interface 111200 of the editor 110232 which may be used for creating AR and VR content, using the methods and systems described here. The user interface 111200 can be viewed and used with a computing device 400106 over a network as described here. Through this main editor interface 110232 a user may build out a scene using new or imported scenes and/or objects.

In the user interface 111200 example shown, a left-hand sidebar is included containing a list of scenes (referred to as "slides" in this case) 111202 in the current Holo as well as an option for creating new scenes, shown with a plus symbol 111210; also shown are a large area for editing the currently selected scene 111206; a right-hand sidebar containing various options for selecting, adding and enhancing objects 111216; and a top menu bar containing options for saving a Holo and editing its meta data 111204 as well as for user management and switching to the scene player mode 111214. Scenes within a Holo may be selected from the list labeled 111202. Objects 111208 can be added to a scene by interactions such as but not limited to dragging and dropping them into the central editor area 111206 or by activating the corresponding tab in the right-hand sidebar and choosing a predefined object 111400. 3D objects can either be imported in terms of a single object file (e.g., in the formats DAE or OBJ), which then triggers an additional dialog asking for the corresponding material and texture files, or in terms of a ZIP file containing all necessary files at once. Once imported or created, all objects can be manipulated using the buttons labeled 111212 (reposition, rotate, scale). The current position, rotation and size of the selected object are given at the bottom of the editor area 111220, separately for each dimension. The buttons labeled 111222 are for zooming, duplicating the currently selected object and deleting the currently selected object. Any kind of object manipulation buttons in any combination may be presented for use in the editor 111200. The tab in the right-hand sidebar 111216 that is activated in FIG. 1l (the leftmost tab) shows the list of all objects in the current scene 111218. Objects can be selected by either clicking directly on them 111208 in the main editor area 111206 or by choosing them from that list 111218. In the example, the non-active tabs of the right-hand sidebar 111216 in FIG. 1l are (from left to right) for adding objects 111400, adding/editing animations 111500 and adding/editing actions 111600 and are described below. It should be noted that any layout could be used, additionally or alternatively to the examples listed here. Screens, menus, options, layouts, could all be placed on any kind of user interface in any kind of arrangement, time sequence or window arrangement.

FIG. 1*m* depicts one possible implementation additionally or alternatively of a user interface 111300 for creating a new AR or VR scene within a Holo (referred to as "new slide" in this case). It can be viewed and used with a computing device 400106. In the example, the user 110102 can choose between VR 111302 and AR 111304 scenes. The area labeled 111306 contains the three options for choosing either no marker, a 2D marker or a 3D marker for the new AR scene (cf. FIG. 1*f*). Accordingly, the two tiles to the right implement the drag-and-drop interaction used by the methods and systems here. When choosing the tab for VR scenes 111302, the user 110102 is presented with the same interface as shown in FIG. 1*k* 111108. Furthermore, there is an option to add 2D scenes 111308 containing only text or checklists, which is, however, secondary in the context of AR and VR.

FIG. 1*n* example shows the right-hand sidebar 111400 (cf. FIG. 1*l*) with the second tab (adding 2D and 3D objects) being active. It can be viewed and used with a computing device 400106. Additionally or alternatively in this example, the button labeled 111402 provides search functionality for 2D icons and 3D objects based on external search application program interfaces (APIs). In some examples, adding custom content 111404 may include (from left to right) functionality for adding, for example but not limited to, 2D text, 3D text, 2D objects and/or 3D objects in any combination. Selection of either a 2D or 3D object may activate modal dialogs implementing the drag-and-drop functionality which may be required by the methods and systems here. Yet, custom 2D and 3D objects can as well be imported by user interface interaction such as but not limited to dragging and dropping them into the main editor area 111206. The areas labeled 111406, 111408, 111410 and 111412 may provide predefined selections of 2D and/or 3D objects that can be directly added to the currently active scene by clicking, tapping, or other interaction. 111406 provides a set of 3D arrows; 111408 a set of 3D shapes (such as but not limited to any combination of, info box, box with question marks, coin, various crosses, cube, cylinder, various diamonds, crescent, hexagon, prism, pyramid, partial pyramid, refresh symbol, various roofs, partial roof, shamrock, sphere, various stars, stop symbol, trapezoid, or other shape); 111410 a set of 2D (square, rectangle, circle, or other 2D shape) and 3D shapes (cube, sphere, cone, tube, or other 3D shape) to which custom textures can be applied. A custom texture may be any kind of 2D image that is applied to the virtual surface of the object 2D or 3D shapes; 111412 a set of 3D tools (various items such as but not limited to any combination of screwdrivers, wrench, hammer, drill, box spanner or other); and 111414 a set of 2D icons (such as but not limited to any combination of bus, cash register, clothes, fork and knife, exit, journal, map, parking, restroom, store, theta, hiking trail, viewpoint, warning sign, speaker, ear, headphones, gramophone, music note, sound off, soundwave or other). The examples of shapes, tools, and icons here are not intended to be limited, and for different use cases, could be customized to aid the users of the tools. The examples of construction tools is not intended to be limiting and could be customized as well.

FIG. 1*o* shows an example right-hand sidebar (cf. FIG. 1*l*) 111500 with the third tab (adding/editing animations) being active. Additionally or alternatively, the example can be viewed and used with a computing device 400106. A set of predefined animations may be presented 111504, which can be directly applied to the currently selected 2D or 3D object by clicking the corresponding tile. The example animations shown here are not intended to be limiting, but include rotating the object, moving the object in a circle, moving the object forward/sideways, pirouette, spinning the object forward/sideways, letting the object pulsate and letting the object bounce up and down. Any kind of object animation could be offered in this example, and used to animate a selected object. Moreover, in some examples, there is the possibility to create custom animations 111502, which may be composed of a sequence of rotation, translation and scaling animations.

FIG. 1*p* shows an example right-hand sidebar (cf. FIG. 1*l*) 111600 with the fourth tab (adding/editing actions) being active. It can be viewed and used with a computing device 400106. The side bar shows example available triggerable commands 111604 which here include any combination of calling a number, opening a web page, transferring to a different scene (named "Open slide" in the figure), showing an info box containing a text, showing a warning box containing a text, sending an e-mail, starting or ending an object animation, displaying or removing an object, and playing a sound. Any kind of triggerable command could be used, these examples not limiting. After having selected a 2D or 3D object in the current scene, the user 110102 can select one of these actions, set the according parameters, e.g., specifying a URL to be opened or choosing a sound file to be played, and the action is then associated with the target object. In some embodiments, each object may be associated with one action at a time that may be triggered when the object is clicked in the systems player mode 110230 or otherwise interacted with by a user. If the currently selected object is already associated with a triggerable action, it may be overwritten with the new action or new parameters if the new action is the same as the existing one (which effectively means editing the existing action). Additionally, or alternatively the existing action can be deleted by choosing the according option 111602. Additionally, a set of OPC UA commands 111606 may be available, which may enable the display of information communicated by a machine to the systems and methods here. For this, an OPC UA server may be specified in the Holo settings. Information available from machines via this server can then be made available in AR and VR scenes. This may enable a number of use cases. To give only one non-limiting example, the temperature of a machine could be displayed relative to a specific part of the machine in an AR scenario.

FIG. 1*q* depicts one possible implementation of a user interface 111700, for preprocessing an imported 360° spherical image before the corresponding VR scene is initialized. The imported 360° spherical image can be viewed and used with a computing device 400106. Systems and methods here may provide predefined filters 111704, particularly for enabling the user 110102 to automatically enhance images. Some filters can be customized for specific devices, for example, the RICOH THETA spherical camera is prone to a certain quality, particularly in low-light settings. That is, when activating the "Theta filter" in the systems here, the quality of a 360° spherical image captured with the corresponding camera may automatically be improved based on predefined heuristics. 360° spherical images can be created using a spherical or panorama camera 390102 or using rigs of multiple cameras 390200. Besides the predefined filters, the user 110102 as well has the option to manually fine-tune contrast, brightness, and color vibrancy 111706 of the image. A live preview may be shown at all times 111702 in certain example user interfaces.

It should be noted that 360° spherical cameras or arrangements of multiple cameras which use software to stitch images together to form a 360° image are used in this disclosure to discuss systems that create images which allow a user to pan in any direction, left, right, up, down, or combination of any of these. The general goal of such a 360° image is to immerse the user in the sights of where the 360° image was taken. For example, a 360° image is taken on a beach. A user may later experience the same scene where the 360° image was taken by viewing on a two dimensional screen or by a viewing apparatus such as a 3D goggle system. Such arrangements may have motion detection or allow for navigation of the 360° image by mouse, keyboard, or other arrangement which may allow a user to turn in any direction to view the image. In goggle arrangements, the headset may be synchronized to the image such that the user's movements are detected, and the image changes correspondingly. These arrangements and uses of 360° images may be known as virtual reality. Similarly, if a camera is used to capture the user's actual environment and then the systems here are used to augment the camera images with computer objects or overlays or other constructs, the user may experience their actual environment, but with added computer imagery. Such arrangements may be known as augmented reality. The terms virtual reality and augmented reality are not intended to be limiting and the systems and methods described here may be used to create either, or both. The terms may be used interchangeably in places and are not intended to be limiting in such a way.

FIG. 1r depicts one non-limiting possible implementation of a user interface 111800 for preprocessing an imported 3D model before it is added to an AR or VR scene. The example can be viewed and used with a computing device 400106. In this example the system provides tools that, first, allow a change to the intensity of the lighting 111808. Second, through the tools presented, the user 110102 can redefine which side should be the top side of the 3D model 111810, which makes it possible to, e.g., flip the model upside down before importing. Third, if the shadow option 111812 is activated, a different material enabling more advanced lighting and shadows may be applied to the 3D model. In some example embodiments, the standard material may be matte. Finally, the user 110102 is as well provided tools to reduce the complexity of the 3D model in terms of vertices and triangles 111814 based on a version of the Stan Melax Progressive Mesh type Polygon Reduction Algorithm specifically adjusted for web-based processing of 3D models. A live preview of the model considering the currently selected options 111802 as well as the current number of vertices in the model 111804 may be shown at any time in a preview scene. In the example, whether that preview scene is automatically rotating or not can be changed using the button labeled 111806.

FIG. 1s depicts one non-limiting possible implementation of a user interface 111900 for creating a custom animation. It can be viewed and used with a computing device 400106. In the bottom part of the user interface, a tool is presented 111902, which may be used to define a custom animation in terms of a sequence of individual rotation, scaling and positioning animations. The user 110102 may set frame points for any of the individual animations on the timeline 111902 and then specify the rotation, size or position of the selected object at that point in time by direct manipulation within the main editor area 111904.

FIG. 1t depicts one non-limiting possible implementation of an interface 112000 for the player mode of the systems and methods here, additionally or alternatively which enable the consumption of previously created AR and/or VR content using a computing device 400106. In the example, to the left, the user 110102 is presented with a collapsible list of the AR and/or VR scenes (referred to as "slides" in this case) 112002 contained in the Holo that is being utilized. The AR or VR content of the currently viewed scene is presented in the main area of the player 112004. At the bottom of the example, a set of controls 112006 is presented that may enable interaction with the three-dimensional scene in terms of panning the field of view to the left/right and top/bottom, zooming in and out, switching to full-screen mode and sharing the currently viewed Holo with other users. In this example, the button labeled with "EDIT" 112008 enables the user 110102 to return to the editor mode 110232 of the system, but may only displayed in case the Holo is actually owned by the user according to the Holo 110128 and user management 110126 data stored on the server side 110116.

The user interfaces illustrated in FIG. 1k-1t represent only example implementations of the methods and systems here and are not intended to be limiting. Any combination of the user interfaces shown in 1k-1t may be used interchangeably and in any combination or order. Additionally or alternatively, any combination of the above elements may be used. In particular, it is possible to provide implementations thereof that, include different elements e.g., features which are different sets of predefined 2D and 3D objects. These pre-defined objects may be for specific use cases such as the construction industry or other industry. Moreover, while the interfaces described above were designed for desktop computers 400122, the methods and systems here could be transferred into the context of devices with different input methods. These could include head-mounted displays 400200 400300 that require hands-free interaction (e.g., pointing a crosshair by moving your head) or touch devices such as smartphones and tablet computers 400102. The latest generation of all of these device classes is powerful enough to display 3D content without judder. In addition, the vast majority are based on Android or iOS as the operating system, which means that web browsers such as the mobile versions of Chrome or Safari are available, which enables the web-based creation and consumption of AR and VR content. Any kind of future operating system and browser or internet access arrangement could be supported.

Other Feature Examples

In certain example embodiments, additionally or alternatively with the examples described above, while it is already possible to add sound to 2D/3D objects in terms of a triggerable action (i.e., the sound plays when the object is clicked), the systems may be extended with ambient sound, i.e., sound that is not bound to a specific object, but automatically starts playing when the user enters the AR/VR scene. In another example, additionally or alternatively, invisible shapes may be introduced that, e.g., can be placed in front of a certain feature embedded in a 360° spherical image. For instance, if a door is visible on a 360° spherical image taken with a spherical camera device 270101 which is described in detail in FIG. 29a, this would make it possible to effectively make that door clickable rather than having to insert a visible 2D/3D object (like a virtual door in front of the photographed one) to realize the click interaction. One non-limiting use case for this may be VR point-and-click adventure games. Additionally or alternatively, painting functionality may be provided, which means that using a brush or pencil drawing tool the user will be able to annotate features directly on the 360° spherical texture in VR scenes. Additionally or alternatively, live streams may be used which may be filmed with a 360° spherical camera 270101 in VR scenes, which can then be annotated with 2D and 3D objects and consumed by multiple users in real time. These non-limiting examples could be combined with any examples listed throughout this disclosure and could be augmented or used alone with other features.

Scene Creation and Timeline Examples

FIG. 2a to FIG. 2y give an example overview of the system providing a method of a timeline-based functionality additionally or alternatively, which includes the functionality of automatic creation of timestamps and chronological structuring of 360°-images and video, as well as rearranging, adding and deleting of timeline-elements by the user. Thus, in the example, the system fulfills the need to have chronologically structured image or video data visualized in a meaningful manner. Basis for the depiction of changes in the user-selected geographical location over a period of time are images and/or videos covering a field of view of up to 360°, including and not limited to, various commercial and non-commercial usage scenarios such as but not limited to construction sites, natural environments, shops, restaurants, offices, museums, parks as well as unrelated personal pictures and the like. In context of this method 360° images and video include, but are not limited to, full-spherical images and video with a field of view up to 360°. The 360° images and video can be supplied by hardware systems including, but not limited to, the devices depicted in FIG. 29a, FIG. 29b, FIG. 29c, FIG. 30a. When added to the system, a 360° images or video can be presented as a Holo that can be further enriched with 2D and/or 3D elements. The resulting Holo can be viewed with, but is not limited to, the hardware systems depicted in FIG. 30a, FIG. 30b, FIG. 30c, FIG. 30d, FIG. 30e, FIG. 30f.

FIG. 2a shows an example how different users 120110, 120118 could be using the proposed systems and/or methods as it describes two distinct use case, non-limiting examples. The user 120110 could either work with an existing system 120120, which uses the systems here 120104 and its interfaces to create and output content, and/or the user 120110 could directly interact with the proposed system 120104. Either way, the user 120110 may provide the data 120106, which he wants to work with, to an existing system 120120 or the proposed system 120104. The user 120110, as well as the data 120106 provided, interact over well-specified interfaces 120108 with either system. The data 120106 may be gathered by hardware systems including but not limited to devices as depicted in FIG. 29a, FIG. 29b, FIG. 29c, FIG. 30a. Both interfaces 120108 may meet the requirements that the user's 120110 needs and system impose, for example a web-browser or smartphone and the like. If the user 120110, 120118 interacts with an existing system 120120, the system can use the systems' interface 120122 to make use of the capabilities it provides. As the system 120104 is able to edit, as well as view content 120116, in certain example embodiments, an existing system 120120 may provide either a player/viewer 120114 module or an editor 120112, or other module 120102 as part of itself. Either system 120120, 120104 may output content 120116 to a user 120118 which another user 120110 produced. The viewing user 120118 can be an arbitrary user with whom the editing user 120110 shared the content 120116 or the user 120110 himself. In any case, an interface 120124 may provide a way in which the viewing user 120118 is able to consume content 120116 on hardware systems including but not limited to devices depicted in FIG. 30a, FIG. 30b, FIG. 30c, FIG. 30d, FIG. 30e, FIG. 30f.

FIG. 2b shows an example additionally or alternatively of a high-level interaction diagram of how a user 120110 may interact either with the proposed system 120104 as a stand-alone application, or with the systems here 120104 acting as an extension to an existing system 120120. The user 120110 may use one of the computer interfaces 120108 to interact with the underlying system to gain access to his content (managed as project entities called Holos 120212). In this example, a Holo 120212 comprises visual data 120106 created by hardware systems including but not limited to devices as depicted in FIG. 29a, FIG. 29b, FIG. 29c, FIG. 30a. This underlying system can be either the proposed system 120104 or another existing system 120120. If it is the later, the existing system 120120 uses the interface 120122 to the systems 120104 to pass stored Holos from the external storage 120210 to the systems 120104 via its API. Otherwise, the system 120104 uses interface 120122 internally. Thus in the example, the user 120110 can now either start a new Holo 120212 from scratch, or load an existing Holo from an external storage 120210. After the system created a new Holo 120212 for the user 120110 by requesting data, such as name and description from him, or loading an existing Holo from external storage 120210 or internal storage 120208, the user 120110 may be able to create a new 360° timeline 120202, or edit an existing 360° timeline 120202. The user can add various 2D/3D content 120204 to the new/existing 360° timeline 120202 through an integrated library or, methods including but not limited to hardware related systems as depicted in FIG. 29d. At any time in between these steps 120202 120204, the user 120110 may be free to preview his creation using the player 120206, saving his Holo to either internal 120208 or external storage 120210 or continue to add/edit 360° timelines 120202 and add content 120204.

FIG. 2c represents an example system's data structure, how the system represents a Holo 120212 and gives an example as to how it allows a user to map locations to various points in time. The systems described here may manage assets such as but not limited to 360° images and videos 120308, represented as OpenGL/WebGL rendered scenes, a scene 120304. A scene in this example may have numerous attributes such as name, description but could have others as well or in combination. Some aspects include data storage for the user's 120110 data 120106 as well as a timestamp 120310 at which the image or video data has been captured. The feature that allows a scene 120304 to have subscenes 120304 enables the system to give various points in time a common parent scene 120304, which represents the location, while its children may denote the various points in time. Scenes may be saved 120304 in a Holo 120212 data-structure called Holo 120302. To give an example, a Holo 120302 may be able to perfectly represent 120312 a construction site. While various locations (here for example, rooms 120314) correspond to top-level scenes 120304, the location's change over time 120316 corresponds to the top-level scene's 120304 children 120306.

FIG. 2d shows an example detailed view on how 360° images and videos are processed and presented to the users. The 360° images and video files 120402 may be conducted with hardware systems including but not limited to devices as depicted in FIG. 29a, FIG. 29b, FIG. 29c, FIG. 30a. After the user 120110 or an embedding system 120120 passes image or video data 120402 to the system 120104 it may generate data-urls 120404 for both image and video data

120402 in order to make them easily embeddable into the desired (web-) page. If the data is not an image nor a video file, the system 120104 may cancel the import and send an appropriate response to the user 120110. In certain examples, as soon as the data-urls 120404 are created, the system 120104 may extract meta data 120406 such as the capture time and other relevant information from the provided data 120402. This information may be used to generate the correct order for time-based scenes. In the next step 120408, a dialog 121202 presents various image and video preprocessing options 121206 121208 to the user 120110. In certain examples, he can select the desired options 121210 and apply them with an interaction such as but not limited to click on the 'Add' button 121212. This may start the process 120410 to apply the settings to the raw image or video data. To provide the user with the best possible experience and reduce process overhead, an application of additional modifications may be made if 120412 the files to import are 360° image files. If the data is a 360° video, a process may be started 120426 to load it from its data-URL and apply it as a texture to a standard high-resolution 360° sphere object 120432 that the user sees. If 120412 the data is a 360° image, the size and proportions may be used as well as custom algorithms to perform adjustments to the 360° image orientation 120414. By adjusting the image's orientation, a more realistic and true-to-life image may be created. Next, in some embodiments, alternatively or additionally a process may be applied 120416 which may be referred to as image slicing.

In order to improve load times and increase performance of displaying images, and because it may be beneficial to show the user 120110 the 360° image as soon as possible, in order to improve the experience and reduce waiting time while looking a progress bar indicating images are loading, the whole 360° image may be divided into multiple smaller parts. These smaller parts can be loaded independently in whichever order the system determines, thus it is possible to display 120428 particular parts immediately while the rest are still loading. In order to keep the image quality on a high level, each slice may have a dimension of 2048 by 2048 pixels for example. In the process of slicing the image, a lower resolution thumbnail 120420 may be created for immediate display 120428 to the users. In such an example, the system may display a slightly blurred image of the final sphere. A process 120424 may be started to assemble all slices into the final sphere and dispose the low-resolution thumbnails to save memory on the users' device. The process 120426 may then be started which loads and applies all high-resolution slices and passes the sphere to the renderer. The whole import in this example finishes by displaying the high-resolution 360° sphere 120430 to the user on hardware systems including but not limited to devices depicted in FIG. 30*a*, FIG. 30*b*, FIG. 30*c*, FIG. 30*d*, FIG. 30*e*, FIG. 30*f*. In some embodiments, only the sphere slices that are viewed by a user are fully downloaded and displayed, those that are not viewed may not be loaded.

FIG. 2*e* depicts an example process for creating and editing a 360°-timeline. The 360° images and video files 120402 may be conducted with hardware systems including but not limited to devices depicted in FIG. 29*a*, FIG. 29*b*, FIG. 29*c*, FIG. 30*a*. Once the data 120106 120402 is imported using the process described, for example, by FIG. 2*d* 120502, the system 120104 checks whether the date from the data's metadata was extracted. If the date metadata was extracted, the system 120104 may save the date into the scene associated with the currently processed data 120402. In some example embodiments, if a user 120110 added additional content, such as 2D/3D objects to a time-based scene, he wants to transfer this data to the following time-based scene. Hence, the system 120104 checks whether there is content available in the previous scene, and if so, clones and/or copies the content and adds it to the new time-based scene representing the current data. Either way, the content for a new scene may be used to create a view 120508 in the user-interface for it. This representation in the user-interface may make up the items (scenes) represented in a timeline. The timeline 121002 may order this representation correctly to put it at the correct position 120510 in the timeline in relation to the already present data. If a series of image or video data is added, the first image to the user 120110 120118 may be displayed in order to increase the user-experience. The system 120104 may use the renderer 120428 to update and display the first low-resolution location-based scene to the user on hardware systems including but not limited to devices depicted in FIG. 30*a*, FIG. 30*b*, FIG. 30*c*, FIG. 30*d*, FIG. 30*e*, FIG. 30*f*. If all the data has been processed, all dates and the order 120512 of the images and videos may be validated. If they are valid the 360° timeline creation process is complete 120516, otherwise the user may get the choice 120514 to adjust, rearrange and edit the whole timeline manually.

FIG. 2*f* details example steps for the user 120110, as well as the system 120104, to add the new data 120402 created with hardware systems including but not limited to devices as depicted in FIG. 29*a*, FIG. 29*b*, FIG. 29*c*, FIG. 30*a* to an existing timeline 121002, which represents the time expansion of a location-based scene. In the example, to add a new time-based scene to a timeline 121002, the users can use several different methods 120602. In either case, the example system 120104 may present a dialog 121202. If the data has been added, for example, dragged onto the timeline 121002 directly in the UI, the preview panel 121204 may be populated 120606 with a thumbnail of the data. Otherwise, users may interact with, for example drag 120605 the data into the panel 121204 beforehand in the example UI. Panel 121204 also offers the user some options 121210, which can be applied 120408 to change the data's appearance (custom filters among others). In certain embodiments, the system 120104 may set 120608 these options and save them into the scene's data storage and if necessary will copy existing content 120506 to the new scene. If the option to auto set date/time 1206 has been checked, the system 120104 will start a process 120504 to set this date/time according to the meta data in certain examples. After the system set the date/time in this example, the user 120110 may see a new dialog 121502. Either the user may accept and apply the order, which the system has determined by clicking 'Apply' 121518, or he can set the new time-based scene to a new date/time, and therefor position in the timeline 121002, using a different process 120514. If he does the former, the system 120104 adds the new element at the specified position according to the set date and time 120510.

FIG. 2*g* shows an example process of adding external content to a scene comprising 360° images or video. The image and video data can be created with hardware systems including but not limited to devices as depicted in FIG. 29*a*, FIG. 29*b*, FIG. 29*c*, FIG. 30*a*. In the example, when the user 120110 selects a scene he will see a new panel 120914 in the UI. An embedding system 120120 can use an interface 120122 to pass 2D/3D models in various data formats to system 120104 that generates a representation for it in this panel 120914. If no data is present, the user 120110 can select data through a process 120706 from his own storage and let the system 120104 import this data for him. If data is already available or has been imported, the user can select this data 120702 from the panel 120914 to pass to the process 120706 which, in the example, will add the selected object to the current scene. Furthermore, the user can edit the objects via another workflow denoted by another process 120704.

FIG. 2h gives example details to make the data flow inside the systems and/or methods 120104 as well as the data flow between an embedding system 120120 more transparent. The used data can be created by hardware systems including but not limited to devices as depicted in FIG. 29a, FIG. 29b, FIG. 29c, FIG. 30a. The data 120106 is passed 120801 either into the existing system 120120 and then to the proposed system 120104 via the interface 120122, or directly 120803 to the system's 120104 UI 120805 which accepts the data and passes it on to the various loaders 120804 which handle the loading and import. After that, alternatively or additionally in certain examples, the image- or video preprocessing units 120806 take care of applying the filters and custom options a user 120110 has set. The processed data 120106 gets passed on to create internally used data structures like scenes 120808 or Holos 120812. In certain examples, there may be more 120810 to the systems than these two, but they are mentioned as they represent the information and data most users 120110 120118 will work with. Now that the data is ready to present itself to the user inside the system 120104, interfaces to WebGL/OpenGL 120814 may be used to render 120816 either the system's canvas 120818 or an external canvas 120820, which can be achieved by using the interface 120122 provided in FIG. 2a.

FIG. 2i illustrates an example combined user interface (UI) of the timeline system 120104 and the existing system 120120 as a VR editor for creating and editing VR tours with 360° images and videos 120902 with closed timeline panel. While this particular UI has been customized for a web-based application, the systems can be used on various devices, like but not limited to computing devices, tablets, smartphones and smartglasses. Depending on the device the usage and thus the UI will vary. Therefore, this and the following UI diagrams are to be understood as one of numerous design possibilities and non-limiting. The image and video files used as exemplary data for the exemplary UI illustrations in the following can be created by hardware systems including but not limited to devices as depicted in FIG. 29a, FIG. 29b, FIG. 29c, FIG. 30a. The output hardware system can be but is not limited to the devices depicted in FIG. 30a, FIG. 30b, FIG. 30c, FIG. 30d, FIG. 30e, FIG. 30f. In the examples, the user 120110 may be able to add and edit 2D as well as 3D content 120914 in the uploaded 360° image or video through the UI. Newly added time-based scenes 121004 121006 121008 can inherit 2D and 3D content 120914 of their preceding location-based scene 120906 120908 or time-based scene 121004 121006 121008. The user 120110 may add at least one location-based scene 120906 120908 to start a new timeline for the depicted location. Each location-based scene may be listed in the scene overview 120916 as scene previews. To create a virtual reality tour for a specified area, the user 120110 may be able to add multiple locations 120912 as location-based scenes 120906 120908. Each location represented as location-based scene 120906 120908 can hold its' own timeline. In some examples, the user 120110 can add a timeline-element to every location-based scene 120908 without any existing time-based scenes with the according 'Add scene'-button 120910 in the UI. The current date and time 120904 as well as a specified name 120904 for either location-based as well as time-based scenes may be displayed anytime (expanded as well as closed timeline panel) in the working area 120900 of the editor UI. To expand the timeline panel for a location-based scene with timeline, the user 120110 may click on the location-based scene (preview) 120906.

FIG. 2j shows a possible visualization of the expanded timeline panel 121002 of the timeline system 120104 in an exemplary embedding system 120120 as introduced in FIG. 2i. A timeline for a specific location-based scene 120906 may hold at least two time-based scenes as timeline-elements 121004, 121006, 121008 with one of the scenes being the location-based scene 121004 marking time t0. Each timeline-element 121004 121006, 121008 may have a date and time and are sorted chronologically by date in ascending order. The user 120110 can change between the created time-based scenes 121004, 121006 121008 by clicking on the according timeline-element 121004, 121006, 121008. The caption 120904 on top of the 360° image or video displays the date and name of the currently selected location-based 120906 or time-based scene 121004, 121006, 121008. To gain more working space or have a better view of the 360° image or video 120902, the user 120110 can hide 121010 the timeline panel 121002.

FIG. 2k illustrates one possible implementation example of the user interface to add new time-based scenes 121004, 121006, 121008 to an existing timeline 121002 of a location-based scene 120906. New time-based scenes 121004, 121006, 121008 can be added by the user 120110 at either a pre-selected area between two existing timeline-elements 121102 or at the end of the timeline 121104. A 360° image or video can either be dragged or dropped at the specified areas 121102, 121104 or be selected through a common browsing function.

FIG. 2l to FIG. 2n represent example modals 121202 for configuring predefined settings of a new time-based scene in an existing timeline 121002 opens when adding 121102, 121104 further timeline-elements. The user 120110 can upload 121204 either 360° images and videos by browsing, as shown in FIG. 2l, or by drag and drop, as depicted in FIG. 2m. If the user already chose a 360° image or video, a preview of the selected image or video may be displayed 121402, as illustrated in FIG. 2n. An uploaded 360° image 121302 or video can be auto-aligned 121206 in the timeline 121002 by the timeline system 120104 or manually by the user 120110 himself. When creating a new timeline-element the 2D and 3D content 120914 of their preceding location-based scenes 120906 or time-based scenes 121004, 121006, 121008 can be cloned 121208 and inserted into the newly added time-based scene. The level the varying quality of the 360° image and video material taken over a period of time, the user can adjust the lightning and contrast with predefined image and video settings 121210.

FIG. 2o to FIG. 2q illustrate example modals 121502 to (chronologically) insert newly added 121508 and reorder 121702 existing time-based scenes 121510, 121512 in the timeline 121002, 121504 of a location-based scene 120906, 121506. Each scene 121506, 121508, 121510, 121512 in the timeline 121504 has a scene preview, name, and date and time as defined in the scene settings which the user 120110 can edit 121520, as further described in FIG. 2s. When adding a time-based scene 121508, 121510, 121512 with auto set date and time or the user 120110 added the new timeline-element at a certain time 121102, the timeline system 120104 will automatically insert the scene between the existing scenes 121506, 121510, 121512 of a timeline 121002 in the timeline overview 121504. Alternatively, the user 120110 can autonomously or automatically set the date

121514 with any calendar or times such as month, day and year, and the time 121516 with hours, minutes and seconds. A new time-based scene 121602 may be inserted at the end of the timeline 121504 if the scene is not added 121104 at a certain time in the timeline 121002. Alternatively or additionally, a user 120110 can reorder newly added as well as existing time-based scenes 121510, 121512, 121508, 121602 in the timeline 121504 subsequent to the location-based scene 121506 at any time by drag and drop 121702. Any changes to the order of the timeline 121504 and date/time 121514, 121516 of a newly added scene, as well as existing time-based scene 121508, 121602, may be confirmed by the user 120110 in order for them to be applied to the timeline panel 121002.

FIG. 2r depicts an example showing the Holo shown for example in FIG. 2k through FIG. 2q newly created timeline-element 121802 chronologically inserted into the timeline 121002 of the exemplary location-based scene 120906 at a subsequent time. The new time-based scene may show a 360° image or video of the location represented in the location-based scenes 120906 at a later point in time. In some examples, the system may clone 2D and 3D content of the preceding scene to the new time-based scene 121802 and place it at the same positions or nearly the same positions in the new 360° image or video 121804. Additionally or alternatively the caption 120904 at the top of the 360° image or video of the scene may show the corresponding date and time as well as the name of the selected scene. By clicking on the selected timeline-element in the timeline panel 121002 the user 120110 may open the modal 121502 for ordering the time-based scenes 121802, 121006, 121008 of a timeline 121002, as well as the modal 121902 for editing the settings of the existing time-based scenes 121802, 121006, 121008 as well as the location-based scene 121004.

FIG. 2s illustrates an example modal 121902 for editing the scene settings 121904, 121906, 121908, 121910 of time-based scenes 121802, 121006, 121008 of an existing timeline 121002 to a location-based scene 121004. In such an example, the user 120110 can name 121904 the current time-based scene, change the date and time 121906, give a description 121908 of the scene to add any of various things including but not limited to, for example, personal notes, and/or a thumbnail 121910 as scene preview. When changing the date and time 121906 of a time-based scene 121802, 121006, 121008, the scenes of the timeline 121002 may be automatically reordered chronologically with ascending date and time. In some examples, the user can also rearrange the scenes by changing the scene order modal 121912, as described in FIG. 2o to FIG. 2q. The user 120110 may save the settings, after he has changed them, by indicating such as by clicking the 'Save' button 121914.

FIG. 2t illustrates one possible implementation of a combined UI 122000 of the timeline system 120104 and the existing system 120120 as a VR player for viewing VR tours with 360° images and videos 122002 with closed timeline panel 122104. The timeline 122004 in the viewer 122000 is expandable by user interaction to navigate through the time-based scenes. In the example, the viewer 120118 can navigate between locations with a separate navigation panel 122006, 122008 with a dropdown menu 122006 or other selection setup, thus enlisting all existing locations and an option 122008 for changing to the previous or following location-based scene. In the example, the dropdown menu 122006 enables the user 120118 to select a specific location of the existing location-based scenes directly. The user 120118 can interact with the scene 122002 through given controls 122010, 122012, 122014.

FIG. 2u and FIG. 2v depict example embodiments of an expanded timeline 122102 as visualization of the timeline system 120104 through which the viewer 120118 can follow the changes in the 360° images or videos 122002, 122202 of a certain location over a period of time. The timeline example 122102 has one location-based scene 122104 and at least one time-based scene 122106, 122108, 122110, 122112. The viewer 120118 can open another time-based scene 122106, 122108, 122110, 122112 by selecting the appropriate timeline-element 122104, 122106, 122108, 122110, 122112 displaying the changed scene 122202 of the location at a subsequent time in contrast to the original scene 122002, as shown in FIG. 2v. When switching 122006, 122008 between location-based scenes 122104 the timeline 122102 changes accordingly. The viewer 120118 can hide 122114 the timeline 122102 to gain a better view on the scene 122002, 122202.

FIG. 2w illustrates an example, additional or alternative implementation design to the user interface presented in FIG. 2i to FIG. 2s for the visualization of the timeline system 120104 as editor for creating and editing VR tours with 360° images and videos. The time-based scenes 122304, 122306, 122308 are represented as dropdown menu attached to the corresponding location-based scene 122302 in a vertically structured scene overview 122318 but could be any kind of user selection setup. In the example, the user 120110 can add 122310 time-based scenes at the appropriate location-based scenes 122302 122312, 122314. Further location-based scenes can be added 122316 to the overview and reordered by drag and drop or other interaction for example. All modals 121202, 121502, 121902 presented in FIG. 2i to FIG. 2s may also be applicable for this user interface.

FIG. 2x and FIG. 2y illustrate an additional or alternative UI for the timeline system 120104 for a VR player for viewing 360° images and videos to the implementation presented in FIG. 2t. The timeline system 120104 is visualized in the example by a dropdown menu 122404 enlisting all existing time-based scenes with date and time as well as name of the scenes but could be any kind of user interaction selection setup. The viewer 120118 can either navigate 122404 to the preceding or succeeding scene or jump directly to a selected scene from the dropdown list 122404 in the example. With a second dropdown list 122402 the viewer 120118 can navigate between location-based scenes, just as in FIG. 2t. FIG. 2y shows the expanded dropdown menus 122402 122404 displaying the contained scenes. Any combination of lists or other displays could be used, the inclusion of two drop down menus is merely exemplary.

FIG. 2i to FIG. 2y illustrate example user interface(s) embodiment(s) of the methods and systems described here. In particular, it may be possible to provide various implementations depending on the use case, e.g. simple, practical UI for construction, more artistically for interior design and/or tailored to the user devices. While the interfaces described above were designed for desktop computers and browsers, the methods and systems here can be transferred into the context of devices with different input methods such as head-mounted displays that use hands-free interaction (e.g., pointing a cross hair by moving your head) or mobile touch devices such as smartphones, laptops and tablets with touch screen interfaces.

Holo Structure Examples

It is to be understood that the disclosed subject matter is not limited in its application to the details of construction and to the arrangements of the components set forth in the descriptions or illustrations herein. The disclosed subject matter is capable of other embodiments and of being practiced and carried out in various ways alone or in combination with any of the other embodiments. Also, it is to be understood that the phraseology and terminology employed herein are for the purpose of description and should not be regarded as limiting.

FIG. 3a illustrates an example additional or alternative overall process of adding a ground based map to work with existing or newly created Holos in order to provide context for the Holos when viewed. For example, the ground based map could be imported from an amusement park which provides a map of its physical space and the user then imports Holos for the various points within the park for the end user viewer to experience. Other example use cases may be for museums, using a map of the physical museum layout with imported Holos for viewing. Another non-limiting example is that of a Floor Plan of a house or other building which may be under construction. By importing a map or building a map in the system of the building, floor by floor, Holos may be created or imported to show the various rooms. The embodiments described below use the term Floor Plan which is not intended to be limiting.

Floor Plan to an existing or newly created Holo using a technical device 400106. The described process is couched as an additional Floor Plan for an existing Holo but is not limited to this usage scenario. The examples starts with a newly created or existing Holo in 130102. In 130104 the system offers an interface for importing one or more Floor Plans from various file formats such as but not limited to documents, images or third party content as described in detail in FIG. 3b. The imported Floor Plans may be interconnected to one or more Scenes of the Holo in 130106 as described in detail in FIG. 3c. Finally in 130108 the created Floor Plans and Hotspots are added to the data structure of the Holo and the Holo is saved to the Server.

FIG. 3b illustrates an example additional or alternative process of importing a Floor Plan from various sources and formats using a technical device 400106. This process can be done numerous times to import multiple Floor Plans. Depending on the file format of the externally created Floor Plan a specific import process is selected in 130202:

For image file formats 130226 like JPEG, PNG or GIF the system may automatically apply adjustments and customizations using various image filters controlled by the user in 130204. The customized image is then used to extract a tailored Floor Plan Image 130206 which is then uploaded to the system in 130208.

Document file formats 130224 like PDF, DOC etc. may be previewed, adjusted and customized under the user's control using a specific Document Renderer in 130218. The tailored Floor Plan Image extraction from the document in 130220 is described in detail in FIG. 3d. The extracted Floor Plan Image is uploaded to the system in 130208.

Third Party Content 130222 for example, from online maps, Computer Aided Design systems, document and/or cartography services or other sources, PDFs, or other file types can be used as Floor Plans either by extracting content or linking to it via deep linking 130216. Adjustments before the extraction or linkage in 130214 may be done either on the platform of the Third Party Content or by a guided assistant in the system using a plugin for the Third Party Content. Finally, in 130212, the information to the uploaded Floor Plan Image or Third Party Content may be added to the data structure of the Holo.

FIG. 3c illustrates an example additional or alternative process of interconnecting a selected Scene with a location on an imported Floor Plan using a technical device 400106. First, in the example, the Scene may be selected 130302 through navigating to the desired Scene. Similarly, the desired Floor Plan may be selected in 130304 displaying it enlarged in the system's user interface. Using the enlarged Floor Plan a location to which the selected Scene should be interconnected to can be pointed out on the Floor Plan 130306. The interconnection between the Scene and a location on the selected Floor Plan may form a Hotspot on the Floor Plan. These Hotspots may be represented in the user interface by overlaying icons on the Floor Plan as illustrated in FIG. 3e, FIG. 3f and FIG. 3g. In 130308 the user can additionally add an orientation to the created Hotspot as shown in FIG. 3h.

FIG. 3d illustrates an example process of extracting a high definition version of a Floor Plan from a document after applying transformations like cropping or rotation using a technical device 400106. In favor of displaying a document including one or more Floor Plan Graphics, in 130402 the system may render preview images of each page in the selected document using an appropriate document renderer. In the example, the user may select a preview image and apply Transformations like cropping or rotation in 130404, using an interface like illustrated in FIG. 3f, in order to extract a Floor Plan or a certain portion of it from the selected document page. Transformations applied by the user may be recorded by the system and the system may update continually and/or on a schedule, preview according to the applied transformations. Finally, in the example, when the user reaches the desired extract of a Floor Plan the system may use the recorded Transformations and render a high definition version of the Floor Plan in 130406, using the appropriate document renderer. This time in a high definition mode in order to produce a detailed high definition Floor Plan Image.

FIG. 3e illustrates an example additional or alternative user interface of the Editor editing a Holo including Floor Plans using a technical device 400106. In the example, a Scene List 130508 in the UI lists the currently active Scene 130502, and further Scenes 130504 in the current Holo. More Scenes can be added using an interface opened by the "Add"-button 130506 or other interaction. The central section 130510 may display the content of the currently active Scene 130502. In such an example, it may be overlayed by the Floorplan Interface 130526 in the top left, or other location. This interface 130526 may comprise a "stack" of Floor Plans 130512 130514 with the active one 130512 on the top and further Floor Plans 130514 of the Holo below. On the active Floor Plan 130512 multiple Hotspots 130522 and 130524 may be overlayed. In the example, the Hotspot 130522 may be interconnected to the active Scene 130502 and overlaid as active Hotspot 130522 on the active Floor Plan 130512. Further Hotspots 130524 on the active Floor Plan 130512 may be overlaid on the active Floor Plan 130512 using a different icon or color. Beside the active Floor Plan 130512, a set of tools for adding another Floor Plan 130516 to the Holo, replacing the active Floor Plan 130518 and removing the active Floor Plan 130520 is shown.

FIG. 3f illustrates an exemplary user interface of the Editor for the import of a Floor Plan using a technical device 400106. As described above and in FIG. 3b if the user imports a Floor Plan based on the file format a corresponding interface is presented. In FIG. 3f an exemplary user interface for image files or documents is illustrated. The dialog 130602 in the example is made of a preview area 130608 with an attached Toolbar 130610, a page selection control 130612 and buttons to cancel 130604 the process or adding 130604 the transformed Floor Plan. As described in FIG. 3b and FIG. 3d the preview area 130608 together with the Toolbar 130610 can be used by the user to apply transformations like cropping or rotation to the previewed image. The buttons and icons in the Toolbar 130610 can vary depending on the possible transformations. Considering the file format of the Floor Plan source the transformed image may be used directly or recreated in a high definition version using the resulting transformation steps as described on FIG. 3b and FIG. 3d. In case of a document source a page selection control 130612 is displayed below the preview area.

FIG. 3g illustrates an exemplary user interface for Hotspot 130704 130706 navigation and creation on an enlarged Floor Plan 130702 using a technical device 400106. An active Floor Plan 130512 as seen in FIG. 3e can be enlarged by the user. The enlarged Floor Plan 130702 may be overlaid (similar to the smaller Floor Plan representation 130512 in FIG. 3e) by the interconnected Hotspots 130704 130706 with different colors and/or icons. If the active Scene 130502 is interconnected to a Hotspot 130704, this Hotspot 130704 may be highlighted compared to Hotspots 130706 interconnected to non-active Scenes 130504. The user may create or rearrange a Hotspot 130704 for the active Scene 130502 by selecting the desired location on the enlarged Floor Plan 130702. Rearranging an existing Hotspot can be done by the user with drag-and-drop or other interaction with the UI. A selection of an existing Hotspot may navigate the user to the interconnected Scene. The colors, icons and positions of the overlaid Hotspots may be updated accordingly.

FIG. 3h illustrates an exemplary user interface for representation and addition of orientation 130802 to Hotspots 130704, 130706 on a Floor Plan 130702 using a technical device 400106. Further to the Hotspots 130704, 130706 shown in FIG. 3g Hotspots 130704, 130706 may be extended with an orientation 130802 which represents the orientation of the interconnected Scene. Similar to simple Hotspots the Hotspot with orientation 130704 interconnected to the active Scene differs from the interconnected ones 130706 to non-active Scenes. Icons of oriented Hotspots 130704, 130706 may be augmented with for example an arrow 130802 or other graphic indicating the orientation 130802 of the interconnected Scene within the Floor Plan 130702. The orientation of a Hotspot 130704, 130706 can be added or edited using different methods or user aided flows. Additionally, turns performed in the Scene's VR interface 130510 may be synchronized with the orientation 130802 of the Hotspot's 130704, 130706 icon.

Orientation Examples

Additionally or alternatively, the systems and methods here may support various orientation features. FIG. 4a is an illustration of a scenario 140100 of an example system orientation example. In the example, the north direction 140104 of a first panoramic image 140102, which is created by a spherical or panorama camera FIG. 29a, is defined, either manually by the user or in an automatic process, for example delivered by the camera device FIG. 29a. Furthermore, each panoramic image may be thought of having its own virtual camera 140106 which represents the direction of the user facing the panoramic image. When multiple panoramic images are connected to each other and the rotation of the virtual camera 140106 on each panoramic image is not synchronized, even though it shares a similar small part of the scene, problems may occur in their display. To overcome these problems, the virtual camera 140112 of the second connected panoramic image 140108 may be determined automatically by calculating the angle 140113 between the previous north direction 140104 and its corresponding virtual camera 140106. This angle 140113 is the same angle 140113 between the north direction in the next image 140110 and its virtual camera 140112. By using these two reference directions, in the two images, without any user input, the orientation of the panoramic images may be synchronized.

FIG. 5a illustrates an exemplary way 150100 to apply a position to a photo in a scene on the system, relative to an imported floor plan. The system in the example comprises a camera 150102, 390102, including but not limited to a fully 360° spherical camera, a computing device 150108, 400106 with a display 400110 that supports user input and is able to run software, including but not limited to, smartphones, tablets and smartwatches. A digital document 150110 that provides a form of orientation to the user may be used including but not limited to maps and/or floorplans. This document may be presented by the display to the user through the device 150108, 400106. Through software running on the device 150108, 400106 the user may be enabled to interact with this document. The device 150108, 400106 in the example does not have to be connected to the camera 150102, 400108, neither via cable nor wirelessly. When the user takes a photo 150106 with the camera 150102, 400108, he can also interact 150112 with the document 150110 on the device 150108, 400106, for example by pressing on the screen. With this interaction 150112, the user can choose the appropriate location on the example document 150110 where the image was taken with the camera 150102, 400108.

FIG. 5b illustrates 150200 how, added locations 150202 could be visualized on a device 150108, 400106. The example method is able to support multiple images and multiple locations 150202. After one or multiple photos have been taken and one or multiple locations 150202 have been chosen, one or multiple locations 150202 could be visualized on a device 150108, 400106 on a map 150204 or other display such as a floorplan, at a place where the user has chosen the locations 150202.

FIG. 5c is an example flowchart that illustrates a use case where a user 150302 regularly revisits locations in the real world which are depicted in the floor plan, to take photos at various points in time of these locations, for example weekly photos of every room in a building where the walking tour could be the same every week. When a user 150302 takes a photo 150304 with a camera 400108, in the example, the photo can be stored together with a timestamp 150306. The user 150302 can additionally or alternatively store a corresponding location on another device 400106. The user 150302 can either choose a new location 150308, or accept a waypoint 150312 that was previously created. If the user chooses a new location 150308, a new waypoint 150310 may be created which can be used in following visits of this location. After the user 150302 has chosen a location, either a new location 150308 or by accepting a waypoint 150312, both the position and a timestamp can be stored 150314 by the system. This process allows the system to automatically assign one location to different photos at different points in time. When the user 150302 wants to visit similar locations in a similar order than before, the system can even predict where the user took the photo by accepting a waypoint 150312 automatically except for the first time a location is added 150308. The user 150302 can skip certain locations, for example if the location is not reachable at a given time. After the user 150302 finishes his tour of the physical location, photos and location information can be processed 150316 on a computing device 400106, for example adding annotations, sorting or uploading to a server. Optionally this can be done during the tour, but doing this afterwards does not require a connection between the photo taking device and the one where the user 150302 chooses the location.

FIG. 5*d* illustrates an example of the system which allows annotation of photos. After a photo 150402 is taken, including but not limited to, full 360° spherical photos, a user can add annotations and other arbitrary elements to it using a computing device 400106, including but not limited to images 150406, textual annotations 150408, 3D elements 150412 and drawings 150410. It is also possible to add audio annotations 150414, either by using an existing audio file or by recording audio with a microphone. The resulting scene 150404 can then be stored additionally to the original photo 150402.

Layout Examples

Additionally or alternatively, the systems and methods here may be used to structure different layouts. FIG. 6*a* illustrates an example visualization of a creation-mode in the system which may be referred to as a canvas and example features, including but not limited to measurement tools used to measure distances and angles. Measurement tools can be used to measure geometric dimensions in the canvas including but not limited to distances and angles within specified canvases. This can be done from devices with touch screen, head-mounted devices as in FIG. 30*c-f*, desktop computing devices as in FIG. 30*a* equipped with a keyboard and a mouse or any other pointing or suitable input device.

Measurements can be made on 360° pictures shot with devices including but not limited to spherical cameras, as in FIG. 29*a*. As shown in FIG. 6*a* in the reference-canvas-creation-mode 160134 a reference canvas may be created 160128 which may be used later as the reference to create shapes on it, measure distances on the canvas 160128, projecting 160142 the sphere texture 160150 onto the canvas 160128 and modifying the canvas 160128 shape until it fits the physical structure (for example a wall) it is representing in the background footage, including but not limited to 360° images and video frames. In an example, to create a canvas, the user can start at the floor 160130 of the scene in the UI to mark the complete floor area 160132 and this way indicating where the walls 160128 are starting. Separate reference canvases 160128 may be created by marking multiple positions on the different borders 160112, 160104, 160106, 160108 of the canvas 160128. One possible user flow example is to first choose a position 160102 on the lower border 160112 of the canvas 160128 and then define the height 160114 of the canvas by clicking on a second position 160106 on the upper bound 160116 of the canvas 160128 or by clicking on a second point 160104 on the lower bound 160112 of the canvas 160128. In the first case the third point 160108 has to be marked on the upper bound 160116 of the canvas 160128. By following these steps, the upper 160116 and lower 160112 bounds of the planar reference canvas 160128 may be defined. Optionally more borders e.g. the left border 160124 and right border 160126 can be marked and then defined to create a rectangular reference canvas 160128.

The correct 3D position and rotation of the reference canvas 160128 can be calculated using information, including but not limited to the height of the camera the content was captured with relative to the floor plane 160130, the angles between the floor plane 160130 and the camera and the angles between the floor plane 160130 and the physical walls 160132. Using this information the 3D position of the intersections 160102 160104 of the floor plane 160130 and the surface 160128 can be calculated. Using the same information then the 3D position of the points 160106 160108 and the top border 160116 of the surface 160128 can be calculated. This approach can be used on including but not limited to triangular and rectangular reference canvases 160128. If the reference canvas 160128 is perpendicular to the floor plane 160130 the angle between the floor plane 160130 and the physical walls 160132 can be automatically received. In the same manner, all other relations between physical surfaces that are that are perpendicular to each other can be used to simplify the creation process 160134 for the user. The created reference canvases 160128 are placed all in the same virtual space and have correct absolute sizes, 3D positions and rotations. One or multiple reference canvases 160128 can be used to measure absolute values including but not limited to distances, angles and volumes. These measurements can be done between canvases because of the absolute position, rotation and scale of all canvases 160128 in the same virtual space representing the same physical space with the same absolute properties. This allows the system to create arbitrary virtual representations of physical spaces by creating for each surface 160130 160132, 160150, 160118, 160114 in the physical space a virtual reference canvas 160128. The scale factor that maps distances and areas in the virtual space to the physical space can be determined by providing a distance or an area inside the image with the correct value and unit of the physical world. This includes but is not limited to the height of the camera.

Additionally or alternatively, this reference canvas 160128 can then be used in the other modes. In some examples, multiple reference canvases 160132 can be created and connected to reflect the complete physical structure of the scene. Reference canvas one 160128 can be used to simplify the creation process of canvas two 160132 if both physical structures represented by the canvases are orthogonal to each other. In this case two points e.g. the height and right start point 160124 of canvas two 160132 may already be defined by canvas one 160128 and only e.g. the length of canvas two 160132 has to be defined to create the second canvas.

The floor canvas 160130 can be defined by the user additionally or alternatively before defining all walls simultaneously by first marking the exact shape of the floor 160130 and as a second step defining the height of all walls in the same way the height 160114 is defined if each reference canvas 160128 is created individually.

In some examples, after at least one canvas 160128 has been defined the measurement-mode 160136 can be used to measure distances 160110 on the canvas 160128. A start point 160110 and an end point 160110 may be marked by the user to start a measurement for one-dimensional distances 160122. In the same manner by marking the start and end point of the measurement two-dimensional areas 160118 and three-dimensional volumes 160144 can be measured on the reference canvas 160128 as well.

Additionally or alternatively, any custom text 160122 and other annotations, drawings, colors, or other content can be placed on the canvas 160128 as they are placed normally without a reference point in 3D space or on the sphere. Using the orientation and other properties of the canvas 160128 the added content 160122 can be respectively aligned with this canvas 160128.

Additionally or alternatively, in a similar way to the measurement-mode 160136 the user can switch to the angle-mode 160138 and measure angles 160146 on the created canvases 160132. To measure an angle, the user may have to define points 160148 on the canvas 160132 marking the angle. Then a 3D UI 160146 may be generated to render the defined value in the 3D space as part of the virtual overlay on top of the canvas.

The projection-mode 160142 may enable the projection of a virtual scene including but not limited to a 360° image of the scene 160150 onto the created canvas 160128. The projection may be done by aligning the edges of the canvases with the corresponding edges on the 360° image and stretching or compressing the rest of the 360° image such that these edges keep aligned. This can be done with all physical structures of the scene which results in a 3D reconstruction of the scene where the underlying original context image 160150 is fully overlaid by the created canvases 160128. In the example, the system allows a conversion of a single 360° image 160150 into a 3D model which can be rendered with correct depth in the stereo mode.

Alternatively or additionally, in the shape creation mode 160140 a shape 160120 which corresponds for example to the physical object (in this example a door) 160118, can be defined on the canvas 160132, which then can be used as, including but not limited to a hitbox area or a 3D object to allow user interactions with this created shape 160120. This way the user can define what should happen when the created shape 160120 is selected, e.g. clicked or tapped. One of multiple possible examples is that as soon as the shape 160120 is clicked the scene switches to a new one using a command system. Another example would be that the user extracts the shape from the canvas to use it as a flat 3D model in the scene, by using the projection-mode 160142. The user could for example select a window 160144 on the canvas 160128, duplicate it and place it next to the original window to modify the scene.

Web Page Examples

Additionally or alternatively, the systems and methods here may support web page features FIG. 7a illustrates an example how the creator of a Holo can create an HTML page which is overlaid over the virtual scene as a special type of overlay for any scene 122002. This overlay 170101 may become visible on top of the virtual scene when the users open the scene later in the player mode. This way any HTML page 170101 with all features supported by HTML and all types of rich content 170102 including but not limited to text, images videos and/or other 3D renderings using WebGL can be placed on top of a virtual scene 122002.

In such examples, the overlaid HTML page 170101 can communicate through a javascript API with the underlying Holo to control and receive information and execute tasks including but not limited to switching the current scene 122002 or rotating the virtual camera when a specific method in the overlaid HTML page 170101 is called.

This technique allows for customization. A few non-limiting examples would be creating custom 2D geographical maps as overlays over the virtual scene 122002 showing up after a video 170102 inside the HTML page 170101 has ended, or the content of the HTML page 170101 changing after a user with a head-mounted display such as the cardboard 400202 turns towards a certain direction.

Annotation Examples

Additionally or alternatively, the systems and methods here may support annotation features. FIG. 8a shows an example UI representation displaying an annotation which alternatively or additionally may be used with the systems and methods described here. An annotation may be an entry in an either global or local annotation list 180112. An annotation may be associated with one or more objects 180104 in a Holo 180102, which include, but are not limited to 3D objects 180106 and text 180108. Moreover, an annotation may optionally be associated with one or more users 180110. An annotation can represent either a task to be done by the associated user(s) or an arbitrary type of note in either textual or visual form.

Additionally or alternatively, FIG. 8b depicts an example diagram of the process flow for a creator of a Holo, or another user with sufficient access rights, wanting to create a new annotation by choosing the corresponding option 180202 in the Holo editor on any devices including, but not limited to, devices described in the FIG. 29d, FIG. 30a. Subsequently, in no particular order, the creator or user may specify the associated object(s) within the Holo 180208, specify the associated user(s) 180206 and describe the annotation either textually or visually as it should appear in the annotation list 180204. In the example, the specification of the associated object(s) and description of the annotation may be required while the specification of the associated user(s) may be optional. Associated users can either be existing users of the system or external persons that can be identified using a global digital identifier like an e-mail address. Once the necessary parameters are present, the annotation may be added to the global or local annotation list 180210, according to the creating user's choice. In case one or more associated user(s) have been specified, they are notified of the new annotation 180212, e.g., via e-mail, and granted access rights to the corresponding annotation list.

Additionally or alternatively, FIG. 8c shows a process flow diagram for creating a new annotation. An annotation can be created by the creator of a Holo, or another user with sufficient access rights, after having selected one or more objects within the Holo using any systems including, but not limited to, devices described in FIG. 29d, FIG. 30a. With the object(s) being selected, the creator or user may choose the option for creating a new annotation 180302. Subsequently, they may describe the annotation either in textual or visual form as it should appear in the annotation list 180306 and optionally specify one or more associated users 180308. Once the necessary parameters are present, the annotation may be added to the global or local annotation list 180310, according to the creating user's choice. In examples where one or more associated user(s) have been specified, they are notified of the new annotation 180312, e.g., via e-mail, and granted access rights to the corresponding annotation list.

FIG. 8d illustrates an example process flow diagram after a new annotation has been created. The annotation process can additionally or alternatively be performed on a device including, but not limited to, devices described in the FIG. 29d, FIG. 30a, and added to either a global or a local annotation list. All users associated with the annotation may be notified 180402. Subsequently, they can access the corresponding annotation list 180404. When accessing the individual annotation, they may automatically be forwarded to the Holo containing the associated objects with the focus on these objects, as illustrated in FIG. 8e. With the given information they proceed however necessary 180406 and can afterwards mark the annotation as resolved 180408.

FIG. 8e depicts an exemplary view which can be seen using any device including, but not limited to, devices described in the FIG. 29d, FIG. 30a, when accessing an individual annotation either from a corresponding annotation list 180508 or directly from a notification, or when selecting 180510 one or more objects in a Holo 180504 180506 that are associated with an annotation 180512. The annotation may be shown directly within the Holo in its either textual or visual form, spatially placed at the perceptibly the same or similar 3D position as the associated objects. In case the associated user was forwarded to the Holo from an annotation list or notification, the associated objects are automatically focused.

FIG. 8f illustrates an exemplary view when marking an annotation using a device including, but not limited to, devices described in the FIG. 29d, FIG. 30a as discussed. In the example, directly within the Holo, the associated user can mark the annotation as resolved, e.g., by clicking a checkbox 180614 or similar. The new state of the annotation may then automatically be propagated to the corresponding annotation list 180608 in some examples, in real time. This synchronization may be of a two-way nature. That is, indicating that an annotation is resolved within the corresponding annotation list affects the displayed state of the annotation within the Holo in real time as well. In case an annotation represents a task, it is globally marked as resolved as soon as one associated user has marked it as resolved. In case the annotation does not represent a task, it may be globally marked as resolved as soon as all associated users have marked it as resolved. An example for the latter case is an important notice that must be read by a specified list of persons.

FIG. 8g shows the scope of a global annotation list example comprising several Holos 180702. That is, additionally or alternatively, the list can contain annotations for all objects within Holos that lie within that scope. In contrast, the scope of a local annotation list may be limited to a single Holo 180704. The type and scope of an annotation list may be defined by the creator of the list. An annotation list can be created either on the fly after having created a new annotation 180210 180310 or using a dedicated, separate interface.

Painting Examples

Additionally or alternatively, the systems and methods here may support painting experiences FIG. 9a depicts an example set of features may be used such as painting tool for Holos and 360° images which may be created by a spherical or panorama image including but not limited to devices described in the FIG. 29a and FIG. 29b. The painting tools may provide the user with a way of creating arbitrary free-form strokes 190104 190106 directly within a Holo comprising a 360° image 190102 which also can be done including, but not limited to, the device described in the FIG. 29d. Any array of painting tools may be provided such as those found in another painting program such as multiple colors, shades, patterns and textures, as well as various virtual paint brush sizes, shapes, as well as virtual pens, pencils, erasers, etc. The strokes may be painted directly onto the surface of the 360° image, as rendered onto the inside of the sphere in the three-dimensional scene, i.e., the Holo, by the user after selecting the free-form painting tool from a corresponding interface. The painting process may be carried out using human-computer interfaces such as, but not limited to, a computer mouse and screen 400110, hand held pointers, joysticks, or other controllers, or a touch screen, FIG. 29d. The free-form strokes can have arbitrary thickness and color, both of which can be determined using a corresponding interface. Particularly, in some examples, free-form strokes can be annotations in the sense of FIGS. 8a, 8b, 8c, 8d, 8e, 8f and 8g, and/or annotations in the sense of FIG. 10a.

FIG. 9b illustrates example painting tools for Holos and 360°-images providing the user with a way of integrating predefined geometric figures 190204 190206 190208 into a Holo comprising a 360° image 190202. Predefined geometric figures include, but are not limited to rectangles 190204, squares, diamonds 190206, ellipses, and circles 190208. The geometric figures may be painted directly onto the surface of the 360° image, as rendered onto the inside of the sphere in the three-dimensional scene, i.e., the Holo. They may be placed by the user after selecting the respective painting tool (e.g., rectangle, diamond, circle) from a corresponding interface. The process of placing the geometric figure and specifying its size may be carried out using human-computer interfaces such as, but not limited to, a computer mouse and screen 400110 or a touch screen, FIG. 29d. The geometric figures can have arbitrary border thickness and color, both of which can be determined using a corresponding interface. Particularly, the geometric figures can be annotations in the sense of FIGS. 8a, 8b, 8c, 8d, 8e, 8f and 8g, and/or annotations in the sense of FIG. 10a.

Multi-User Examples

Additionally or alternatively, the systems and methods here may support multi-user experiences, with objects in the Holo that have avatar features of one or more users. FIG. 10a illustrates an example view of a user in the player mode which part of the multi-user-experience, on a device including, but not limited to, devices described in the FIG. 30a. In the example, a user can invite other users 200101 to a multi-user-experience in any created Holo. As such, users 200101 which join this experience may see the same augmented and virtual content 122002 and additionally other users 200101 in the scene, on a device including but not limited to devices described in the FIG. 30a. A webcam feed 200102 may be used in certain embodiments to see either a visual representation of the user, or another virtual representation like a virtual avatar, which can be chosen by a user, or be a representative or live feed of their face or body. Additionally or alternatively, audio, can be used in some examples for a natural communication between all users 200101 and the spatial position of the audio is the same as the position of the virtual representation as the other user 200101 to hear the voice of this other user 200101 from the correct direction and distance based on the user's own position and orientation. In normal 3D scenes where the camera 400102 can move freely and is not locked in the center of the scene as in 360° scenes, the other users 200101 webcam feed 200102 can be shown at the location where this user's virtual camera is located at a given time. The orientation of the other users 200101 may be projected on their avatars to give an understanding where the other users 200101 are looking. Users 200101 joining the multi-user-experience may obtain certain rights, for example, to add and draw annotations 200103 in the 360° image/video, which can be created by a spherical or panorama camera including but not limited to devices described in the FIG. 29a, which may then be synchronized among all connected clients. Such annotations can in particular be annotations in the sense of FIGS. 8a, 8b, 8c, 8d, 8e, 8f and 8g. Additionally or alternatively, users may paste and place text and other rich content 200104 in the scene. The augmented or virtual scene 122002 may provide the context and the result of the collaboration session is a Holo with the annotations, text, images, links and other creatable content, that can be saved as a new branch of the original Holo with which the session started.

FIG. 10b shows an example if a multi-user-experience contains a 360° scene 200202 with a fixed spatial position 200204 of the virtual camera and only its orientation set by the users 200101. In such an example, the virtual representations of the users 200101 may be placed at the positions 200205 in the 360° scene where the other users 200101 are currently looking. The orientation of the avatars of the other users 200101 may face to the center of the sphere 200204.

The user 200204 may only see the users in his current field of view 200203 like with any other virtual content in the 360° scene. If many users 200101 are looking at the same location, their avatars may all be at the same location 200205. To only show specific avatars and making the other avatars less present in the scene, the user can select the relevant avatars 200208, for example a single presenter 200206 who presents to a large audience, through a selection UI. This selection UI can be for example a separate list 200207 or as another example he picks the target characters using a magnifier effect to separate them from the unwanted surrounding avatars. In some examples, by default, if there is a large audience but only a very small subset of this audience 200208 has edit rights to the Holo, the experience happening in the subset can be selected 200208 as the default selection of highlighted users. In some examples, users with edit rights 200208 to the Holo they are in can change the scene permanently and all other users 200101 may see these changes automatically. Some examples may allow users to exchange textual information such as links and other textual content an optional chat box 200209. In such examples, users with the authority to post information can exchange this information in the system or by using a third party system.

In multi-user examples, users can join the multi-user-experience in any number of ways including but not limited to receiving and opening a link sent by the creator of the session. Logins, links, or other ways may be used as well. In such examples, the session can be either protected by a passcode to allow private sessions with only limited access for users who know the passcode, or public where it is accessible by any user to create digital open spaces for information exchange. This way there may be multiple sessions in the same virtual space without interfering with each other.

Single users can have the management rights to author the created multi user experience session and can have the power to for example mute, hide or ban other users from the session.

Audio Examples

Additionally or alternatively, the systems and methods here may support audio features and/or experiences including using various audio channels in user displays, headsets and computing devices. FIG. 11a is an illustration that visualizes example audio sources 210104 with a 3D position in a virtual scene 210102. The virtual scene 210102 can both be viewed and created with a technical device 400106. This method can embed audio sources 210104 in virtual scenes 210102. Example audio sources 210104 can have a 3D position in a scene 210102. In examples where a sound is intended to be perceived the same from every position and orientation in the scene, it does not need to have a 3D position in this scene. Adding audio in a three dimensional space allows users to hear sound from certain positions. Such sound may depend both on the position and orientation relative to the audio source. The relative position to the audio source may determine the total volume level that could be heard, while the orientation may determine the amount of volume that is played on two audio channels separately, which is less or equal to the total volume level. This method also supports audio sources without considering the distance to the audio source, e.g. by using the same distance for all audio sources. Multiple audio sources 210104 may be supported at the same time, making it possible for a user to hear different sounds from different directions with different volume levels. An audio source can either be played all the time, or be triggered by certain events. Such methods can also be used to annotate different elements in a scene with audio annotations which could be triggered if the viewing user later clicks the virtual element the audio annotation is attached to.

FIG. 11b is a flow chart that visualizes an exemplary import process for audio sources. A user 210202 uses a computing device 400106 to either start by choosing the scenes or by choosing the audio source first.

Example Choice 1: A user 210202 can start by choosing scenes 210204 in which the audio source will later be embedded. After choosing one or more scenes 210204, the user 210202 may choose a position 210206 for each scene that was chosen in the previous step. For reasons of simplicity, the same position can be used for multiple scenes. In such examples, after a position is chosen for every scene, the actual audio source can be chosen. The audio source can either be an existing file on the user's 210202 device 400106 or can be recorded 210208 using a microphone. After this step, the audio source is successfully embedded in the scenes 210212.

Example Choice 2: A user 210202 can start by choosing the audio source first. The audio source can either be an existing file on the user's 210202 device 400106 or can be recorded 210208 using a microphone. After choosing the audio source, the next step is to choose the scenes 210204 in which the audio source will later be embedded. After choosing one or more scenes 210204, the user 210202 has to choose a position 210206 for each scene that was chosen in the previous step. For reasons of simplicity, the same position can be used for multiple scenes. After this step, the audio source is successfully embedded in the scenes 210212.

Embodiments may allow for users to utilize both choice 1 and choice 2 in a Holo or scene as described herein. Describing the two methods is not intended to be limiting in any way.

360° Live Streaming Examples

Additionally or alternatively, the systems and methods here may support 360° live streaming. FIG. 12a shows an example of how the creator of a Holo can use a 360° live-stream 220101 instead of a single 360° photo or video as the context for the virtual scene. Using a 360° webcam FIG. 29a, including but not limited to the Ricoh Theta, makes it possible to stream a 360° live feed 220101 like it would be possible with any normal webcam 400108. This enables the user to apply this 360° live stream 220101 as the context for a virtual scene. Additionally, the 360° live stream 220101 can contain all the other 3D content as any other single 360° photo or a 360-° video Holo scene.

One possible implementation example is one user streaming live from a remote location while other users 200101 use the live collaboration feature to talk to this user and annotate content 200103 in the live stream 220101 like they would in any other Holo scene. Annotated content can be the same content as for any other multi user experience like text, temporal drawings 200103 or other rich content 200104. This way they can annotate the content temporarily visible in the scene and the user streaming the feed 220101 can see these annotations in his virtual scene as any other user 200101 can.

In such examples, if a user 200101 enters a scene where there is no live stream 220101 available, the creator of the Holo can specify a fallback action like displaying a placeholder 360° image or 360° video instead of the unavailable live stream 220101. This functionality can also be used for finite video streams 220101 to play the recorded livestream after the streaming has finished. In such cases the streamed video may be automatically recorded while the streaming is happening and this recorded file automatically specified as the fallback 360° video content as soon as the finite stream 220101 has finished.

Zoom Examples

Additionally or alternatively, the systems and methods here may support zooming displays. FIG. 13*a* illustrates an example fully zoomable VR/AR environment of a panoramic or spherical image 230104 with an undistorted display of several pieces of visual 2D/3D content 230106 on a visual display system 230102. The panoramic image 230104, which may be created by a spherical or panorama camera FIG. 29*a*/FIG. 29*b*, is defined, either manually by the user or in an automatic process, for example delivered by the camera device FIG. 29*a-c*. In such examples, the individual pieces of the 2D/3D content 230106 may overlap and occlude one another from the view of the user. The visual display system 230102 can be viewed through any of multiple display devices for example but not limited to those in FIG. 30*a-f*.

Distortion Examples

Additionally or alternatively, the systems and methods here may support distortion of displays. FIG. 13*b* and FIG. 13*c* depict two exemplary fisheye distortion views 230208 of an undistorted VR/AR environment 230104: the circular fisheye view 230202 and the Cartesian fisheye view 230302. In a fully zoomable VR/AR environment 230104 of a system to display VR and AR environments 230102 holding an undefined number of 2D/3D content 230106 one or more objects 230204 of the inserted 2D/3D content 230106, as shown in FIG. 13*a*, might overlap/occlude one another. The inserted 2D/3D content 230106 might, e.g., be a live webcam stream of users working on a VR/AR environment 230104 simultaneously. With the presented example method of the fisheye distortion 230202 230302, the user can focus his/her view on a certain object of interest 230206. If the named object of interest 230206 is occluded by individual objects 230204 of the geometrically related 2D/3D content 230106, the user can use the fisheye selection process, e.g. 230202 230302, to separate close objects and choose the one he/she is interested in 230206. In the resulting fisheye view 230202 230302, the visualizations of the related 2D/3D content 230208 will up- or downscale dynamically with the curser movement of the user. Clicking on one of these visualizations, may invoke the action related to this object 230206.

FIG. 13*d* illustrates a flowchart showing example individual steps of an example selection process 230400 of the method for transitioning between views of visual 2D/3D content in VR/AR environments 230104, 230208. The example in FIG. 13*d* includes a number of process blocks 230402-230414 displaying the exemplary flow of the process 230400. Though arranged serially in the example of FIG. 13*d*, other examples may reorder the blocks, change one or more blocks, and/or execute two or more blocks in parallel using multiple processors or a single processor organized as two or more virtual machines or sub-processors.

At 230402, a visual content is displayed in an existing Holo as undistorted visualization of the 2D/3D content. Pieces of the visual content overlap and occlude the piece of interest. At 230404, the user triggers a request to focus on an individual at least partially occluded piece of the undistorted content visualization. At 230406, the undistorted content visualization is converted to a distorted projection focusing on the user's piece of interest. At 230408, the pieces in the distorted projection are decreased in size according to the geometric proximity to the piece of interest. The down-sized pieces highlight the piece of interest and invoke a fisheye view on as described at 230410. While highlighting a certain piece of content, the user may interact with the content according to its individual interaction possibilities. At 230412, the user requests to change back to the undistorted content visualization from the distorted content projection. At 230414, after changing back to the undistorted visualization, the downsizing effect on the distorted content projections may be decreased. The content visualization in the example appears without distortion effect.

Loading Examples

Additionally or alternatively, the systems and methods here may support various loading examples. FIG. 14*a* illustrates a VR/AR environment 122002 during the loading process of the AR/VR environment in the player mode 122000 of an AR/VR editor. The panoramic image 122002, which is created by a spherical or panorama camera FIG. 29*a*/FIG. 29*b*, is defined, either manually by the user or in an automatic process, for example delivered by the camera device FIG. 29*a-c*. The visual display system 230102 can be viewed through multiple display devices FIG. 30*a-f*.

While the content of the VR/AR environment 122002 is being loaded in the player mode 122000 a loading screen 240101 may be shown to the user for the duration of the loading process of the VR/AR environment 122002. In this example, the loading screen 240101 may display a quick instruction 240102, 240103 for the user on how to interact with the VR/AR environment 122002. The content 240102, 240103 of the loading screen 240101 may differ according to the usage scenario and is not limited to the in FIG. 14*a* illustrated exemplary implementation.

If the scene is loaded in a device like a head-mounted-display or virtual reality headset which supports rendering the loading screen as a 360° sphere around the user, the full sphere can be used to display the intermediate content like the instruction example 240102 and other information about the loaded scene or a placeholder graphic, video or other rich content which is shown until the full scene 122002 is loaded and ready to be displayed.

Additionally or alternatively, the semi-transparent or semi-transparent design can be configured as, e.g., animated instructions or as a loading progress bar displaying the animated loading screen. Furthermore, a program logic can be provided, which only shows a loading screen 240101 while loading the VR/AR environment 122002, if the duration of the loading process actually exceeds a predetermined loading time. For example, the program can be designed so that the loading screen 240101 is only displayed when the loading process lasted longer than for example 250 milliseconds.

Face Detection Examples

Additionally or alternatively, the systems and methods here may support face detection features. FIG. 15*a* shows an example system configured with automatic face detection in the VR scene. The automatic face detection features set may work with many types of input 250110, delivered by a device including but not limited to devices described in the FIG. 29*a*, FIG. 30*a*. Such examples maybe a panoramic image 250112, a panoramic video 250111, or other virtual reality scenes 250114, including but not limited to a 3D mesh with a texture projection. The input 250110 may be analyzed automatically 250116 by the system. If faces are detected on the input 250110, they may be blurred 250120 automatically, if programmed to do so. Furthermore, facial expressions may be analyzed 250118, so that the emotions present in the scene 250122 can be analyzed. The original input 250110 may not be stored in the database. In such examples may be the original input 250110 may not be accessed later on.

Stability Examples

Additionally or alternatively, the systems and methods here may support stabilizing features. FIG. 16*a* is a flowchart illustrating an example automatic dynamic rendering resolution adjustment to keep a stable frame rate using a technical device 400106. The system in this example automatically adjusts the rendering resolution 260101 according to the current frame rate 260102 of the rendering system 260103.

In some examples, systems with limited processing capability may not be able to display higher resolution images at the frame rate that is possible. The systems here may alter the rendering resolution 260101 by dropping to a defined minimum resolution 260104 until the framerate 260102 reaches a defined range 260105 of acceptable frame rates. This process may be repeated and measured to react on temporary reduction in framerates 260102 due to possible loading procedures which can occur at any given time. Such a loading process of additional content or any other computationally expensive calculations may then reduce the rendering resolution 260101 temporarily until the process is finished and the resolution 260102 is increased again.

The system may automatically employ these methods for devices with hardware which is not as capable of rendering complex 3D scenes as a desktop computer 400122 might be. Slower devices including but not limited to mobile devices 400102 or Head Mounted displays 400300 may benefit from this system which may cause the resolution to be reduced automatically until a constant acceptable frame rate is reached.

Fragmentation and Sphere Examples

Additionally or alternatively, the systems and methods here may support display fragmentation and/or segmentation of a spherical image. Segmentation may refer to analyzing an image and dividing or segmenting them into logical shapes that may be designated using any of various algorithms. The algorithms may then be used to identify certain segmented shapes which may be analyzed, found, counted, loaded in order, etc. For example, an algorithm may identify and segment all windows in a room. These windows may have a consistent shape or color and may be identified by the system through image analysis. Then, over many multiple Holos, the system could count the number of windows and identify where they are located on a Floor Plan.

The higher resolution the image, the more accurate the segmentation may be. This can allow compression in more interesting parts, shapes that are designated, may be loaded more quickly or first before the other aspects of the image. Processes may be sped up in this manner. Other examples include finding shapes using algorithms in images. The higher the resolution, the more accurate the segmentation, the more accurate the shapes may be later found.

Fragmentation may refer to breaking or fragmenting an image into a distinct pattern such as a grid to be split up for faster loading. Instead of identifying specific shapes in an image, fragmentation may merely apply a repeatable pattern to an image to break it into chunks smaller than the entire image which may be loaded in turn. This may save on computing resources as blocks or fragmented portions that are more desirable to load first are displayed before less interesting fragments.

An example of fragmentation is shown in FIG. 17*a* which shows an example tiled 360° image which comprises several distinct parts 270104 in original resolution that have been created by segmentation of the original 360° image 270102 which was taken with a spherical camera device 270101 which is described in detail in FIG. 29*a*. The number of tiles may be changed in the context of the systems and methods here. In certain examples, the number of tiles chosen may be based on an algorithm taking into account the dimensions and resolution of the original image.

In some embodiments, the number of supported devices may be increased when the following two requirements are met by the algorithm: the number of tiles is a power of two and the tiles have a resolution of at most 2048×2048.

FIG. 17*b* describes an example structure of an example sphere. Upon displaying a Holo comprising a 360° image, the systems and methods here may overlay a low-resolution version of the 360° image 270202, which was taken with a spherical camera device 270101 which is described in detail in FIG. 29*a*. This image 270202 may be loaded first, with any of various high-resolution tiled versions of the same image 270204 or portions of the same image. The individual tiles 270206 may be loaded iteratively and asynchronously to the server. As soon as all tiles are present, the low-resolution version of the 360° image may be completely covered and thus removed.

FIG. 17*c* describes an example of how, on the client side 270302 using a computing device 400106, a user can upload the original version of a 360° image 270304. In a preprocessing component, a low-resolution single-tile version 270306 as well as a high-resolution multi-tile version 270308 may be computed from the original image. Transmitting over a communication network, e.g., the Internet, the low-resolution version as well as the individual tiles may be transmitted to a server 270310. That server may be responsible for storing all transmitted data to a persistent data store 270312. It should be noted that all preprocessing steps, particularly including the computation of the low-resolution single-tile version and the high-resolution multi-tile version of the original 360° image, may happen on the client 270302 while the server 270310 may solely be responsible for communication with the persistent data store as well as receiving and delivering the different versions of the 360° image.

FIG. 17*d*, which partly corresponds to FIG. 17*c*, describes how systems and methods here may first receive the original version of a 360° image from the user 270402 taken with a spherical camera device 270101 which is described in detail in FIG. 29*a*. Subsequently, in a parallel process, a low-resolution single-tile version 270404 as well as a high-resolution multi-tile version of the 360° image 270406 may be computed. Subsequently, the low-resolution version as well as all of the computed tiles may be transmitted to a server 270408 and saved to a persistent data store 270410.

FIG. 17*e* describes an example of the sphere loading process. When a user requests a Holo comprising a 360° image from the server 270502, first, the previously computed low-resolution version may be transmitted to the client's computing device 400106 and displayed to the user 270504. After the low-resolution version is displayed the user can start using the system. In some embodiments, only after to low resolution version is fully loaded, the distinct tiles of the high-resolution version 270506 may be transmitted to the client's computing device 400106 in an asynchronous manner 270508. As soon as all individual tiles of the high-resolution version have been successfully transmitted by the server 270510, the low-resolution version of the 360° image may be completely covered and can be removed.

Object Examples

Additionally or alternatively, the systems and methods here may support display objects. FIG. 18*a* shows an example functionality for adding an arbitrary object 280104 including, but not limited to, text, 2D graphics, 3D objects and annotations, located on the client side 280102. In such examples, also on the client side the functionality for computing a hash value may take place, e.g., using an algorithm including but not limited to MD5, for an object to be added to a Holo 280106. Communication with the server side 280108 may happen via a communication network, as described herein, e.g., the internet. In such examples, the server may be responsible for storing objects and hash values 280110 to and retrieving them from any of various data stores 280112, 400106. Objects may persist in that data store 280112 along with their hash values 280110, whereas each pair of hash value 280110 and associated object may be present in the data store 280112 once and only once.

FIG. 18*b* depicts an example process of uploading an object to be used in a Holo and testing for an existing hash value starts with receiving the object from the user 280202 from an arbitrary device FIG. 30*a*. Subsequently, a hash value for that particular object may be computed 280204 on the client side using a computing device 400106. By communicating with the server and transmitting the computed value, it is checked whether the particular hash value is already present 280208 in the data store 280112 from the FIG. 18*a* by performing a corresponding search 280206. In example cases where the hash value is already present in the data store 280112, the user's object may be directly added to the Holo 280212 without further communication with the server. In example cases where the hash value is not yet present in the data store 280112, the user's object may be transmitted to the server and persisted to the data store 280112 along with its associated hash value 280210 before adding the object to the user's Holo 280212.

Processing Examples

Additionally or alternatively, the systems and methods here may utilize different processing techniques. FIG. 19*a* shows an example process that is triggered by a user, when she imports any 3D model file 111800, by any method including but not limited to drag it into an existing virtual scene UI. Such interaction may cause the model import process 290101 to locally start reading the model file 290102 in the memory 290108, 400114 of the creators 290112 device 290107, 400102, 400122. This may allow further parsing 290103, conversion 290104 and processing 290109 of the model to customize it for the different target watchers 290110 it is later shown to. This process may be a completely local series of calculations which do not need a connection to the server 290105 or any other sources. This may enable the system to be used in offline scenarios and protect the user's IP, since no sensitive information may be passed to the backend. This may be useful when using complex CAD documents including sensitive product information to extract the 3D model data 290102 from. The final result of the import 290103, conversion 290104 and customization process 290109 can be uploaded to the server 290105 when an internet connection is available. The resulting model 290111 may be included in the creators 290112 list of imported 3D models 290106.

With the described methods here, the performance of the process may rely on the creator's front end device 290107, FIG. 30*a*, e.g. the computer 400122 the user is using to create the virtual scene, it is executed on. Therefore, the method may decouple the process of the available networking speed making the only possible bottleneck the hardware 290107, 400106 of the creator, e.g. the CPU 290113, 400112 and the available RAM 290108, 400114. Additionally, due to the decentralized processing on the client's devices the backend 290105 cannot become a bottleneck as a result of too many simultaneous requests. Any number of watchers 290110 can use the converter 290104 simultaneously without a waiting queue.

The example import process 290101, i.e. parsing 290103, conversion 290104 and simplification 290109, are performed in the background and do not block any user interactions with the system while running. This asynchronous pipeline 290101 allows importing multiple models 290102 simultaneously. The progress of each import process 290101 can be visualized and returned to the creator 290112 as feedback while the creator can continue to work on the virtual project.

During an example import process 290101 the model 290102 can be customized 290109 for the different target devices as described in the FIG. 20*a*. During customization 290109, textures may be resized 300107 as described in the FIG. 20*a* to be usable on mobile devices 400102. Furthermore, as a preparation for real time mesh simplification on the client rendering the virtual scene the model mesh may be brought into the correct order to be able to perform the mesh simplification algorithm 290109 in real time while the virtual scene is loaded in the player. The process 290109 may be executed during the creation process to allow adjusting the rendering quality to the performance of the watcher's device 290110, FIG. 30*a*.

In some examples, when rendering 3D content 300101 on mobile devices 300102, FIG. 30*a* like smartphones 400102 the hardware may be limited, for example, they may have limited graphics processing (GPU) 300103, 400118 capabilities. Simultaneously loading many highly detailed 3D models 300101 with large texture maps 300104 which are targeted for desktop GPUs 400118 may not be feasible on mobile GPUs 300103, 400118. Future developments may help with these situations, allowing processing to take place on any of various devices including mobile devices.

FIG. 20*a* illustrates an example using an automatic process to reduce the detailed 3D models 300101 to more simple models which originally might include hundreds of thousands of vertices and meshes. The example method may reduce this number automatically when the model 300101 is loaded on a device 300102, 400102, 400122 with a mobile GPU 300103, 400118 e.g. a Smartphone 400102. Objects which include multiple meshes can be merged to a single mesh during this customization process to reduce the workload for the GPU 300103, 400118 furthermore.

Additionally, the original high resolution texture maps 300104 may automatically be shrunk down to a second texture 300105 with reduced size which may consume less memory and load faster into the mobile GPU 300103, 400118 memory than the original texture arrangement 300104.

Such a combination of mesh reduction 300108 and texture reduction 300107 may be applied on the mobile device 300102, 400102 itself the first time the model 300101 is loaded and then the simplified version 300106 is cached internally on the device 300102, 400114 for reuse when the model 300101 is requested the second time. This may increase the loading time significantly the second time the customized model 300106 is loaded in comparison to loading the original model 300101.

Rotation Examples

Additionally or alternatively, the systems and methods here may support various display rotation techniques. FIG.

21*a* is a diagram that describes an example method to apply a user's rotation to videos, including but not limited to fully spherical videos, instead of the original rotation the camera 310102 400108 had when it took the image 310103. In some embodiments, multiple images can be used as long as they can be sorted in a consecutive order. Those multiple, consecutive images, can come from one or multiple sources. Each image 310103 may be processed by a visual odometry system 310106 340102 resulting in the camera pose 310108. Odometry may refer to the estimation of positional change over time based on any number of data sources including images, motion sensors, known location anchors, updated location information, etc. The odometry subsystem may be used to inform the systems and methods here to estimate camera and object positions as well as update and estimate positions relative to one another and the camera systems. Odometry may also refer generally to measuring distances traveled over time by any object or camera.

Augmented Reality Using Camera Images

As explained, Augmented Reality AR may utilize images captured by a camera, and import computer generated graphics into the camera images (e.g. computer generated digital graphics other than the camera image which is technically computer generated by the camera itself.)

The camera pose 310108 may include the translation and rotation 310110 the camera 310102 400108 had when it took the image 310103. Knowing the camera rotation 310110, the image 310103 may be processed such that the rotation 310110 is removed from the image 310103. For the resulting image 310112, no matter how the camera was oriented, afterwards all images would be directed to the same direction. The user 310104 can look at this video with a technical device, including but not limited to virtual reality headsets 400300. The user 310104 can rotate and decide which part of a video is to be shown independently from the camera rotation 310110. The user's rotation 310114 can be applied to the image 310112 where the rotation was removed. This may result in an image 310116 that is oriented in the same or similar way the user 310104 is oriented. The user's rotation 310114 and the field of view determine the image 310118 on a screen, which is typically only a part of the full image.

FIG. 21*b* illustrates an exemplary situation where the camera 310206 and the user 310208 are rotated to the same direction. Outside of Virtual Reality, this is the common situation for videos and images. In this situation, a user 310208 cannot rotate. Instead, she adopts the camera's rotation which means the user 310208 always looks in the same direction as the camera when it shot the frame 310212 the user 310208 currently sees. For panoramic or spherical videos, the user usually only sees a subset of the video 310212 at each point in time because humans do not have a 360° field of view. Only objects inside the field of view 310218 of both the camera 310206 and the user 310208 may be seen in the displayed image 310212. In the provided example, the cube 310202 is outside of the field of view 310218, while the photo 310214 is inside of the field of view 310218. Therefore, the user sees the photo 310210 on his display 310212 while he does not see the cube 310216.

FIG. 21*c* illustrates an exemplary situation where the camera 310306 is rotated differently than the user 310308. Especially in case of virtual reality scenarios, it may be desirable that the user 310308 to be able to rotate independently of the camera 310306. In this example, the environment the camera 310306 is in includes two objects: a cube 310302 and a photo 310304. The user 310308 in the example, sees the projected cube 310310 on his display 310312 but no projection of the photo 310304 although the camera 310306 is oriented in the direction of the photo 310304.

FIG. 21*d* illustrates an exemplary situation to make clear how stabilization is beneficial. A cameraman 310404 is usually affected by unwanted motions, including but not limited to up and down movements for handheld cameras 400108 while walking. When a cameraman 310404 captures something, e.g. a person, those unwanted movements can affect the image he captures. This can result in movements in the captured images 310408 310410. The presented method will reduce or even eliminate potential unwanted movements in the captured images 310402. A virtual camera corresponds to the user's view, meaning that the virtual camera will follow the user's movements. The virtual camera can be decoupled from the physical camera which means that it doesn't follow the movements of the physical camera. Decoupling the virtual camera from the physical camera can be achieved by applying the position and rotation provided by the odometry system to the virtual camera. The virtual camera determines which part of the image is projected onto the display 310312.

Depth Examples

In AR situations where cameras are used to capture an initial image, a depth of each pixel may be useful in constructing an AR scene. Additionally or alternatively, the systems and methods here may calculate and utilize various depths in different ways. FIG. 22*a* shows an example depth estimation 320112 of each pixel in a stereoscopic panoramic image 320114, which may be created by a spherical or panorama camera including, but not limited to the depiction in FIG. 29*a*, with respect to a camera 320106, 400108 as illustrated in FIG. 30*a*, can be calculated by using at least two panoramic images 320102, 320104 that share the same features of a scene and thus can be used for depth estimation using including but not limited to optical flow and a camera 320106, FIG. 30*a*, 400108 that is facing toward each panoramic image 320110, 320108. In one non-limiting example, depth estimation may be determined based on pixel triangulation of the same feature in the two panoramic images and a third point such as camera position and/or height.

Optical flow may refer to a more complicated algorithm beyond triangulation of pixels and may be further improved using other sensor data. For example, if the camera was moved or two frames were moved, the depth may be estimated using the movement and distance estimations.

Sensors data may be used in these calculations to augment the pixel triangulation.

The extracted depth information 320102 may be used to render the panoramic scene 320114 in a stereoscopic device 320122, including but not limited to devices described in the FIG. 30*d*, FIG. 30*e*, with a correct sense of depth using the extracted depth information 320102 instead of rendering the panoramic images 320102, 320104 side by side on both eyes of the user. Such example embodiments may enable the user to rotate his or her head arbitrarily without destroying the immersion of 3D depth of the scene 320114. It additionally enables the user to move the point of view, the head of the user 3320122, in a low range and this way allow a certain degree of positional movement in the reconstructed scene 320114.

Enhancement Examples

Additionally or alternatively, the systems and methods here may support display enhancement of Holos. FIG. 23*a* shows how a video can be enhanced by additional example elements. A camera 330108 400108 captures its surrounding environment and creates a video showing the surroundings.

As an example, the surrounding could contain a cube 330106. One exemplary frame 330102 of the video could show this cube 330104. If the camera 330108 400108 moves relative to the cube 330106, the cube 330112 in the frame 330110 should be at a different position compared to the cube 330104 in the frame 330102. The frame 330110 can be viewed on a technical device 400106 400300. Systems and methods here can position additional elements in a three dimensional space that is afterwards shown as if it were part of the video. As an example, a speech bubble 330120 can be positioned above a cube 330104. When the original camera moves, the cube 330104 in frame 330114 could become the cube 330112 in frame 330122 in the video. In such examples, the cube moved accordingly to the movement of the camera and its position relative to the camera. This method can be used to calculate how the camera moves, therefore the additional elements can also move accordingly. In the example, the speech bubble 330124 would have a different position relative to the user 330118 for the second frame 330122, in contrast to the speech bubble 330116 that is used for the first frame 330114. In such examples, not only would the speech bubble 330128 stay on top of the cube, or any other designated object, it can even change its displayed size perspectively correct when the camera moves closer to or farther away.

Object and Camera Tracking Examples

In some AR examples, a camera may change its field of view by panning, zooming, or otherwise moving in the 3D space. In some examples, objects within a camera's field of view may move independently of the camera, and move in and out of the camera's field of view. For example, a bird may fly into view and out again behind a tree. In some example embodiments, it may be desired to track objects that are stationary or move relative to the camera used to capture the scene image. By using the systems and methods below, objects may be tracked and the camera position may be tracked. In some examples, both of these position trackings may be combined when both an object and camera move independently of one another.

Additionally or alternatively, the systems and methods here may support tracking images and objects within a scene. FIG. 24a illustrates an example overall tracking system. Images 340120 taken with a camera 400108 may be used for this method. These can be provided by either a live image stream from a camera 400108, or through a pre-recorded video. An example Odometry Tracker feature 340102 may run on a computing device 400106 and calculate for every image the pose of the camera it had when it captured the image. The pose of the latest image may then be used to place the virtual camera 340104 in the scene 340110 such that the movement in the scene 340110 corresponds to the movement of the camera 340104 in the real world. The scene may be displayed by a technical device 400106. In such examples, the Object Tracker 340106 may detect and track arbitrary objects in the camera images 340120 and place those objects in the scene 340110 accordingly. Several instances 340122 of the Object Tracker 340106 may run in parallel, where each instance is searching for at least one object. Some examples of objects that can be tracked are including but not limited to: point clouds 340112, 3D objects 340114, 2D images 340116 and artificial markers 340118.

The Odometry Tracker 340102 can internally create a map of depth hypotheses for a subset of pixels in a previous image and use this map to warp pixel coordinates onto a new image. It can calculate an error value for the current pose between the two images by comparing the pixel colors in both images. It can optimize the pose between the images in an iterative process to find a warp that corresponds to a minimum error value. The system can use the information of the estimated pose to calculate a new depth measurement for each pixel that is visible in both images. It can update the depth hypotheses in the previous image with information from the new measurement through the use of a filter method. In some examples, additionally or alternatively, the Odometry Tracker 340102 can select tracked frames as Keyframes and insert them into a connected graph.

Keyframes may be chosen based on the pose and depth measurements estimated by the Odometry Tracker 340102. The first frame in a sequence of images is always the first Keyframe. New frames are tracked relative to a previous Keyframe. A new frame may be declared Keyframe when the distance of its pose to the current Keyframe is above a certain threshold. A new frame may also be declared Keyframe when the its depth measurements deviate significantly from the depth hypotheses in the current Keyframe. Selection of keyframes allows the system to avoid computations on all frames, and thereby increase computer efficiency, decrease drain on processing resources, and provide faster as well as more accurate and clear images to display.

The Odometry Tracker can perform pose graph optimization methods on this graph to find a globally optimal pose for each Keyframe. The Odometry Tracker 340102 can utilize the existing depth maps in this optimization to correct scale drift within the previously estimated poses of the Keyframes. This may be done by estimating similarity transforms between the Keyframes. In addition to the visual input the Odometry Tracker 340102 can also process readings from additional sensors such as but not limited to, e.g. gyroscope, accelerometer, compass or GPS. The Odometry Tracker 340102 can combine the readings of the different sensors into factors that can integrate them in a factor graph together with the error functions of the tracked images. It can marginalize these factor graphs into probability distributions which it might utilize as priors in the estimation of poses for new frames. Additionally the Odometry Tracker 340102 can perform local optimization on the factor graph for poses that have not yet been marginalized.

FIG. 24b illustrates an example of how the method may benefit a user 340208. The different scenes 340202, 340204 and 340206 in the example are ordered chronologically in time. A user 340208 holds a device with a camera 340210 400102. The user 340208 wants to track an object 340214. There is an area 340212 in which objects can be detected. In some examples, there may be objects that are not visible, obscured, or are otherwise too far away cannot be detected at any given time. In the first scene 340202 the object 340214 is outside the detection area 340212. The system does not detect the object in this scene because it is not shown in the camera image. In the second scene 340204, the user 340208 moves further away such that the object 340214 can be detected. In the third scene 340206, the user 340208 moves further away. The object 340214 is so far away that it cannot be detected by the Object Tracker 340106, running on a computing device 400106, anymore.

In one example, a hologram of a user is placed in a chair, even if the camera pans away from the hologram of the user, the system keeps track of where the hologram of the person stays. Thus, when the camera field of view shows the chair again, the hologram is still shown in the same place.

Even though the object in the example cannot be detected anymore by the camera, or is otherwise outside the field of view of the camera, the Odometry Tracker 340102 may continue to function and track the camera position as well as the object. Because the Odometry Tracker may update the position of the camera 340210, the system may also estimate where the object 340214 is relative to the camera 340210, 400102 if it does not move by maintaining a relative position and direction indicator between camera and object, and in some embodiments, be able to estimate the position of a moving by using last known position and motion over time. This may enable tracking of objects over an arbitrary distance after it is detected once, even though they may be not visible in the camera image the whole time. The system may track an object, even if the object is obscured by another feature or the camera field of view moves off of the feature. The system them allows for the camera field of view to move off the target object, and later come back to it and still be able to track its position.

FIG. 24c illustrates example ways the pose of detected objects may be calculated and transformed from the object space to the virtual space. The process of finding objects may be decoupled from the process of estimating the camera pose. While the camera pose 340310 may be calculated for every frame 340302 that was taken with a camera 400108, the calculation to determine the camera pose 340310 may take several frames until the calculations are completed. In that case, some frames may be ignored by the Object Tracker 340312. The Odometry Tracker 340308, 340102 may run on the main thread 340304, and estimate the camera pose in the virtual space 340310 each time a new frame 340302 is provided. This can directly be used to update the camera pose 340320 in the scene 340318 examples. Several background threads 340306 may run in parallel, where each thread has its own instance of the Object Tracker 340312. Once an instance of the Object Tracker 340312 detects an object, it may calculate its pose in the object space 340314. The translation and rotation may have to be transformed from the object space 340314 into the virtual world space 340316. In addition to translation and rotation, the correct scale of the object in the virtual world space 340316 has to be calculated. With these values, virtual elements can either be added or updated 340322 in the scene 340318. All calculations can be performed on a computing device 400106.

FIG. 25a illustrates an example odometry system 350112 which is performed on a computing device including, but not limited to the components 400106 displayed in FIG. 30a, starts tracking 350104 as soon as a new image 350102 is available, which is delivered by a device including but not limited to devices described in the FIG. 29a, FIG. 30a, 400108. If the virtual odometry successfully tracked 350106 the coming image, it may provide the virtual pose of the image, including but not limited to position and orientation. The visual odometry may trigger the visual search thread 350116, which may run on the background asynchronously, and pass the image 350102 on to it 350116. Simultaneously, or closely, the odometry system 350112 may continue with the tracking 350104. In case of losing the tracking, the odometry system 350112 may wait for a new image 350102 to arrive and begin with the tracking again.

In some examples, it may be useful to identify an object based on its shape, color, or other visual attributes, and then use that identification to track the object. Object detection using a visual search engine 350116 may be processed in multiple ways, e.g. directly on the device, locally, including but not limited to devices described in the FIG. 29a, FIG. 30a, 400108, in this case no internet connection may be needed, or in a networked arrangement which may provide more resources and thereby a better performance. The visual search thread 350116 may notify the main thread 350112 after it finished processing the image. If no objects were found 350114, the odometry tracker 350112 340102 may continue the tracking 350104. Otherwise, it may check if the odometry tracker 350112 340102 still has not lost the tracking since the last visual search has been triggered. If it lost the tracking 350108, the result of the visual search 350116 may be ignored. Otherwise, the position of the detected objects on the current image may be updated 350110. Either way, the main thread 350112 may continue with the tracking 350104.

In various examples, the number of detected objects can vary. It is possible that hundreds of objects may be detected with the same label on an image. Assuming that those objects are stationary, they still can be positioned correctly using the combination of the visual odometry and the visual search.

FIG. 25b shows an illustration of one possible use case of the systems and methods here. In the example. a camera 350206 including but not limited to FIG. 29a, FIG. 30a, 400108 is moving along a path 350202, while it tracks the coming image 350204, which is delivered by a camera including but not limited to devices described in the FIG. 29a, FIG. 30a, 400108. In some examples, simultaneously, or at nearly the same time, the image 350204 is being processed by the visual search engine 350116 on the background thread to detect objects. Once the visual search engine 350116 detects objects, it may notify the main thread 350112. The main thread 350112 may then update the absolute pose of objects found using the result given by the background thread.

FIG. 25c shows an illustration of a second possible use case of example systems and methods. In the example. a camera 350306 including but not limited to devices described in the FIG. 29a, FIG. 30a, 400108 is moving along the path 350302, while it tracks the coming image 350304, which is delivered by a camera including but not limited to devices described in the FIG. 29a, FIG. 30a, 400108. The visual odometry 350112 determines whether or not the coming image 350304 is a keyframe 350308. A keyframe 350308 in the visual odometry system 350112 is a frame with a depth map and a position that is used for non-keyframe frames to calculate the relative position to a keyframe 350308 and further refine the keyframe's depth map. Keyframes are used as a reference for all following frames until a new keyframe is created. The frames between two Keyframes improve the accuracy of the last keyframe by combining the information collected in each individual frame in the Keyframe over time.

The visual search engine 350116 may then process the coming image to find the keyframes 350308 previously defined. The visual search engine 350116 has a set of images with a known position, which means that the absolute position is known for keyframes 350308 that are found by the visual search engine 350116. The visual search engine thread 350116 may notify the main thread as soon as it finds the keyframe. Using this result, the main thread can calculate the camera absolute pose, because the virtual odometry alone can only provide the virtual pose of each keyframe and also it is often not stable enough through the time.

FIG. 26a shows an illustration 360100 of an example workflow of a 3D marker generation by using a geometry mesh, which is performed on a computing device including but not limited to 400106, FIG. 29c. The 3D scanner application 360110 may generate, in some embodiments continuously, 360122 a point cloud 360124 in the background thread 360120 using an estimated depth map 360114 of a keyframe 360112 in combination with the keyframe's pose. The depth value of pixels in a keyframe are estimated 360113 using for example optical flow, this way a depth map 360114 can be built based on this depth estimation. Estimating depth values and creating a depth map can be performed by the Odometry Tracker 340102.

In some example embodiments, alternatively or additionally, the point cloud 360124 used to generate 360132 a 3D mesh 360133 of the scene may be stored in a voxel tree to improve the performance, which may be done in a separate thread. The point cloud 360124 generated using a depth map 360113 may still contain noise, which may be filtered before the filtered point cloud 360125 can be used to generate a mesh 360133. A voxel is a volumetric pixel in a three-dimensional space. Using a voxel tree may speed up this filtering process 360126 in certain embodiments. The voxel tree is a data structure (octree) designed to work with spatial data, therefore it can provide a better performance to process 3D points from the point cloud 360124. It can filter the point cloud 360124 360126 by smoothing and removing the noise points. Using the voxel tree to filter the point cloud 360124 360126 can reduce the number of the noise points, therefore optimize the point cloud to improve performance for further computations. Furthermore, it can reduce the error of the resulting 3D mesh 360133.

The 3D mesh 360133 generation process uses a filtered 360125 or unfiltered point cloud 360124 and keyframe poses as an input source. As a first iteration of the process, the system can compute a normal vector for each point in the input point cloud. The normal vector for each point is calculated based on its neighboring points. As a next iteration, the 3D mesh 360133 generation system can check and orient a normal vector of each point toward the camera pose of the keyframe that the point belongs to.

By taking the point could with normal vectors as an input the system can perform a 3D mesh reconstruction. The system can utilize a depth and a number of samples parameters to control performance of the system, accuracy, quality of details of the resulting 3D mesh 360133. The system can utilize the data structure properties of the resulting 3D mesh 360133 to trim the resulting 3D mesh 360133 to achieve better quality 3D model. Furthermore, the system can apply texture 360134 to the generated 3D mesh 360133.

In some embodiments, the system may recognize that the 3D mesh built of an object has erroneous points associated with it. In an example, the object is a box but there is one pixel that is far from the box and if considered part of the object, would make it not a box. The system may use algorithms of known features, in this example knowing a box has six sides of equal dimensions, and identify erroneous points and trim them points away from the 3D mesh. The algorithms may compare points to known relative distances, or compared to input shapes. Points included in error may be trimmed away from the 3D mesh.

In some example embodiments, alternatively or additionally, a texture projection 360134 may be used as an optional step with the generated mesh 360133 to give the 3D mesh a particular look. For example, the system creates a 3D mesh of a house and uses camera images to project onto the house pictures of it. In other words, the mesh may have a corresponding keyframe 360112 as its texture. Various options may be given for the texture projection 360134: Projecting a single texture and projecting and combining multiple textures on one mesh. A single texture projection 360134 may project the latest keyframe image onto the 3D mesh. In some cases, the biggest part of the mesh is left untextured, because it is not covered by the keyframe. In such examples, when the multi-texture projection 360134 is applied, multiple keyframe images may be projected 360134 onto the 3D mesh and on areas with overlapping keyframes the different keyframes may be merged to a single texture. Merging of multiple keyframes to a single texture is done by weighting the keyframe's distance to the mesh surface and the keyframe's angle relative to the mesh surface. This process may provide a better quality of the textured mesh 360138 and decrease the untextured region of the textured mesh. When multiple keyframes are used to create the texture, the best suitable keyframe for each part of the mesh's texture may be used to improve the overall texture quality. The result can even be further enhanced by not only using the best suitable keyframe for each part of the mesh's texture, instead using a combination of keyframes to create the texture for this part of the mesh's texture.

In these examples, the user can save 360136 this textured mesh 360138 into a 3D model and its corresponding keyframe 360112 on the device including but not limited to devices described in the FIG. 30*a* or discard 360135 the mesh. The keyframe 360112 may be used to extract keypoints, which may be needed for the tracking process in the virtual scene when it is used as an augmented reality overlay over the physical scene.

In certain examples, in the browser 360140, the generated textured mesh 360138 may be used either as a usual 3D model in a virtual scene or as a 3D marker 360144 in the virtual scene when it is used as an augmented reality overlay over the physical scene. From a user point of view, annotating 360142 a textured mesh 360138 as a 3D marker 360144 for a virtual scene may be more efficient and user friendly than using a point cloud 360124 for the annotation process.

FIG. 27*a* shows an example usage of a mesh generation in real time, which may be performed on a computing device including but not limited to 400106. During the monocular tracking example 370102, each time a new keyframe 370103 is found, the depth information of the new keyframe is estimated 370104 by the odometry system and from this depth estimation 370104 a depth map 370105 may be reconstructed and stored in the memory 400114. The depth map 370105 may be used as the input for the point cloud generation process 370106 and a corresponding point cloud 370107 may be created. This point cloud 370107 may be used in the final step, the geometry mesh generation step 370108, so that a 3D mesh 370109 may be reconstructed based on the point cloud input 370107.

The generated mesh 370108 may be used for different usage scenarios which often require a fast or real time reconstruction of the scene while the user is moving through the scene. For a realistic augmentation of virtual objects in the physical scene the 3D mesh 370109 may be used in any combination of the following ways:

The 3D mesh 370109 can be used as an invisible layer during the tracking for a physic simulation 370110, for example letting a virtual object move on top of the surface of the geometry mesh 370109.

The real time generated 3D mesh 370109 can be used for correct occlusion 370112 of virtual objects behind physical objects. From the user's point of view, this generated 3D mesh has the same shape and position as an existing physical object. The 3D mesh can be invisible, meaning a user won't see the mesh, but can be used to show other virtual objects differently. Full or parts of virtual objects that, from the user's point of view, are behind the invisible 3D mesh won't get rendered. From the user's perspective, this looks as if a physical objects occludes the virtual object. For example, placing virtual objects behind a physical wall, so that when the user moves around the physical scene the virtual object is only visible if the physical wall would not occlude it.

The 3D mesh 370109 can be used for illumination 370114 since the lighting on the virtual object has to be applied correctly to the physical scene and on the other hand the conditions of the physical scene have to be applied to the virtual objects. For example, a virtual object which is placed under a physical table has to be illuminated differently the object placed on top of the table.

The 3D mesh 370109 can be used for shadow casting 370116 of virtual objects on physical objects and also shadow casting of physical objects on virtual objects. The virtual object has to receive and cast shadows realistically which interact not only with the other virtual objects but also have to interact with the physical scene which requires the reconstructed 3D mesh 370109 as the representation of the physical scene.

Filtered Examples

FIG. 28a depicts the abstract concept of 360° image fusion using a computing device 400106. 360° images can be created with a spherical camera 390102 and the fusion can be performed on a computing device 400106. Multiple 360° images 380102 can be merged to one improved image 380104 by using a filter. These images 380102 may be taken from the same position, which can be achieved for example with a 360° camera on a tripod. In such examples, a minimum of two 360° images can be used and the more input images are used the better the resulting filtered image can be. The filter used to merge the images can be a median or high-dynamic-range filter, although additional filters would be possible. The median filter can be used to remove moving objects like people or reduce image noise from bad lighting conditions. The high-dynamic-range filter creates one HDR 360° image from multiple 360° images.

FIG. 28b shows the fusion of multiple 360° images using the median filter. 360° images can be created with a spherical camera 390102 and the fusion can be performed on a computing device 400106. The shown 360° images 380221 contain people 380206 who moved through the scene while the images were taken and changing noise 380208 from bad lighting conditions. The dots 380204 indicate that more than the depicted two 360° images were taken from the same position and used as input for the filter. The median filter may compare the individual pixels of each image and recognize the areas that repeatedly stay the same, while removing the areas that change depending on the image. The resulting 360° image 380210 contains only the static background without the noise. While this example uses people, other moving objects could also be removed.

FIG. 28c shows example fusion of multiple 360° images using the high-dynamic-range filter. 360° images created with a spherical camera 390102 and the fusion performed on a computing device 400106. The top row depicts the original 360° images including a 360° image with shadow detail but fewer highlight information 380302 and a 360° image with highlight detail but fewer shadow information 380304. The dots 380306 indicate that more than the depicted two 360° images were taken from the same position, with changing exposure, and used as input for the filter. The high-dynamic-range filter uses the exposure data of the different 360° images to combine them to a new 360° image containing the full dynamic range 380308.

FIG. 29a depicts a spherical or panorama camera 390100 for shooting images with a wide field of view 390106 of 360° or less. FIG. 29a is one exemplary illustration of a spherical or panorama camera 390100 which will be used as a representation for the described camera. A spherical or panorama camera 390100 has at least two lenses 390104, each covering a different field of view of the total possible 360°. To gain the final panoramic or spherical image, each image 390108 of each lens 390104 may be stitched automatically within the device 390102 software.

FIG. 29b shows a rig construction 390200 example with more than one camera 390202 with one or more lenses 390204 attached to a mobile architecture 390206. FIG. 29b is one exemplary illustration of a rig architecture 390200 for shooting wide range spherical or panoramic images with a field of view 390208 of 360° or less. Each camera 390202 in the example shots simultaneously an image 390210. The images 390210 of each camera may be stitched together with the corresponding images 390210 of the other cameras 390202 to cover the whole field of view 390208.

FIG. 29c illustrates a 3D scanner 390302 for content creation in accordance with certain embodiments which comprises one or more camera lenses 390306 and/or one or more other sensors 390304. The other sensors 390304 can include, but are not limited to any combination of, infrared sensors, lasers, sonic, radar, camera, GPS or other distance measuring systems. The range 390308 covered by the scanner 390302 may be variable in any direction, depending on where the lenses 390306 and sensors 390304 are placed on the device 390302. This includes, but is not limited to, 3D scanning a complete room that surrounds the 3D scanner and scanning a single discrete object. The outcome of the 3D scanning process using a corresponding device 390302 may be a model comprising a set of points in 3D space as well as potential additional information associated with those points, such as various geometric entities and/or color. Models that originate from a 3D scanning process using a corresponding device 390302 may act as an input resource to the systems and methods here, by which they are used, processed and/or enhanced.

FIG. 29d illustrates an example graphics tablet for digital drawing 390402, used for content creation in accordance with the systems and methods here, comprising a physical surface 390408 as well as one or more physical input devices 390404 390406. The physical surface 390408 may detect the input generated by the physical input devices 390404 390406 and translate it into digital graphical information using a processor, random access memory and potential additional components for computation or transmit the detected input information to a separate computing device for the generation of digital graphical information. The physical input devices for generating input information on the physical surface 390408 can include, but are not limited to the user's hand 390406 and a stylus 390404, i.e., a pen-like drawing apparatus.

Additionally or alternatively, the systems and methods here may utilize various computing devices. FIG. 30a illustrates a computing device 400106, which can be any kind of mobile device 400102, including but not limited to smartphones and tablets, or a stationary device, including but not limited to personal computers 400122. A mobile device 400102 is light and small enough so that it can be carried around 400104. The computing device 400106 can comprise several components. Those components can either be included in a single all-in-one device, or spread over multiple devices that work together. A computing device 400106 is a is a technical device that needs an energy source 400120 to function. For computation, several hardware components may be used: a CPU 400112 and RAM 400114 to perform calculations and some kind of storage 400116 to store software and other files. A GPU 400118 can be used to perform the visual processing. A display 400110 can show information and other arbitrary things to the user. Some displays 400110 can even be used to interact with the computing device 400106, including but not limited to touch input. A camera 400108 can be used to capture the surrounding.

Additionally or alternatively, the systems and methods here may utilize various display devices. FIG. 30*b* describes a non-limiting example head-mounted display device 400200 which comprises two lenses 400202 for the user's eyes, an area or apparatus 400208 where a smartphone or similar computing/display device is placed in and which is then brought into a position 400206 so that the display of the device is in front of the lenses 400202 and the user has a clear look on the two display halves. Additionally, there can be an adequate left-out area 400208 on the backside 400204 of the head-mounted device 400200 so that the camera of the smart device may transmit a live-stream view while placed in the head-mounted device 400200. The integrated components which, among others, can be contained in the head-mounted device 400200 are described in detail in FIG. 30*a*.

FIG. 30*c* describes a head-mounted device 400300 which comprises two lenses 400304 (compare 400202 in FIG. 30*b*) and a display 400302 which is placed relative to the lenses 400304 so that it is visible for the user when the device 400300 is mounted to the user's head. The content displayed on the screen 400302 of the device is provided through a connection 400306 to an external source including, but not limited to, a desktop computer as described in FIG. 30*a* which provides the computational power to render the virtual scenes. The additional components which, among others, can be contained in the head-mounted device 400300 are described in detail in FIG. 30*a*.

FIG. 30*d* describes an example head-mounted device 400400 which comprises of a mounting system 400402 where a smart device 400404 like a mobile phone may be placed into. The example includes a passive display 400408 which depicts the content shown on the screen 400404 by reflecting it into the user's eyes 400406. In some examples, this passive display can be semitransparent to show the virtual content in combination with the physical world as an Augmented Reality overlay. The additional components which, among others, can be contained in the head mounted device 400400 are described in detail in FIG. 30*a*.

FIG. 30*e* describes an example head mounted device 400500 which comprises a projector 400502 mounted on the user's head and an onboard processing unit 400504 which allows all needed calculations and renderings to be done on the head mounted device 400500 without the need of an external computing system. The projector in the example, projects the displayed images either directly into the user's eyes 400506 or through a surface 400508 which can be semitransparent to show the virtual content in combination with the physical world as an Augmented Reality overlay. The additional components which, among others, can be contained in the head mounted device 400500 are described in detail in FIG. 30*a*.

FIG. 30*f* describes an example head mounted device 400600 which comprises a projector 400504 and an onboard processing unit 400502 which allows all needed calculations and renderings to be done on the head mounted device 400500 without the need of an external computing system. The projector 400504 in the example may be used to project the digital content on the physical scene 400506 so the user and other users can see the virtual content without the need to project the content directly into the user's eyes. The additional components which, among others, can be contained in the head mounted device are described in detail in FIG. 30*a*.

Additionally or alternatively, FIG. 31*a* describes an augmentation system 410100 which comprises a smart device 410101 including but not limited to a smartphone or a tablet, a sensor component 410102 and a projector system 410106 which is attached to the smart device 410101 and receives the images generated on this smart device 410101 and projects them on a target projection surface 410104. Such surface 410104 is overlaid with the digital content from the smart device 410101. The sensors 410102 can include but are not limited to: accelerometer, gyroscope, compass, GPS and/or camera. The sensors 410102 may be used by the smart device 410101 to project the virtual content correctly aligned on the surface area 410104. The users field of view 410103 may be overlapping with the parts of the projector's field of view 410105 so that he or she can see the augmented content on top of the real environment 410104. Such augmented content can be among others captured spherical 360 image or video content which was recorded in the past and is now projected onto the same physical location where it was captured to show to the user the changes that happened to the physical location since the original recording happened. The correct parts of the spherical image are aligned using the build in sensors 410102 or a manual alignment by the user is also possible.

FIG. 31*b* describes an augmentation system 410200 using a head-mounted device 410206 which comprises a projector 410201, sensors and a computing unit 410202. The sensors 410202 can include but are not limited to: accelerometer, gyroscope, compass, GPS and/or camera. The head-mounted device 410206 projects a virtual image on a physical scene 410204. This physical surface 410204 is overlaid with the aligned virtual content from the projector 410201 based on the projector's field of view 410205 and the projectors pose in the physical scene calculated by the sensors 410202 of the head-mounted device 410206. Using a head-mounted device 410206 shown in FIG. 31*b* instead of an augmentation system 410100 as shown in FIG. 31*a* has benefits including but not limited to: the position of the head-mounted device 410206 relative to the user's head does not change because the user wears the head-mounted device 410206, the head-mounted system 410206 can be aligned such that the projector always projects his images in the direction where the user looks at the environment 410204, the user has both hands free while using the head-mounted device 410206 and nevertheless can use the head-mounted device 410206 wherever the users wants it to use. The user's field of view 410203 is overlapping with the projector's field of view 410205. Knowing the projector's 410201 position relative to the user's eyes enables the head-mounted device 410206 to project the augmented content in correct perspective. The augmented content is projected on top of the real environment 410204. The augmented content includes but is not limited to 360 images or videos recorded in the past. For this exemplary use case the augmented content would be projected onto the same physical location in the environment 410204 where it was captured originally to show the user the changes that happened to the physical location since the augmented content was recorded. The augmented content can be aligned to the real environment 410204 automatically using built in sensors 410202 or manually by the user.

FIG. 31*c* describes the process details how the user 410301 uses the computing device 410302 with the attached sensors 410102 410202 and projector 410303 to project the virtual content 410307 onto the physical surface 410306.

When capturing the content, including but not limited to 360 images and videos, that should later be used as virtual content to augment the physical environment 410306, the content can be enhanced with additional meta information. This additional meta information can include but is not limited to position and orientation. When sensors 410102 410202 are available, those can be used to gain this information. Otherwise, or in addition to using the sensors, meta information can be set manually. The meta information can either be saved together with the content or stored separately. This meta information can be used for the automatic alignment when the content should be projected on top of the physical environment 410306.

The computing device 410302 may calculate the parts of the virtual scene 410307 that is projected by the projector 410303 of the overall virtual scene 410304 which is projected by the projector 410303 on the physical surface 410306. The physical position and orientation of the device 410302 can be applied to a virtual camera in the virtual scene 410304 so that this virtual camera moves through the virtual scene 410304 in the same way the physical projector 410303 moves through the physical scene 410306. The field of view of the virtual camera uses the identical values as the field of view 410305 of the physical projector so that the projected image 410307 matches on top of the physical surface 410306.

The device's orientation and position can be calculated automatically using the sensors including but not limited to the visual tracking system of the computing device 410301. The visual tracking system as described in 350100 can use the features of the physical scene 410306 in combination with the other device sensors to calculate an absolute global position and align the virtual overlay 410307 with the physical scene 410306 by using the metadata of the virtual scene 410307 including but not limited to GPS and orientation data.

Manual alignment of the section of the virtual scene 410307 can be done by the user 410301 using the input of the computing device 410302 to allow the user 410301 adjusting the section shown 410307 of the overall virtual scene 410306. The manual alignment can replace the automatic alignment and therefore also support computing devices 410302 without sensors 410102 410202. Manual alignment is also used by the user 410301 if the metadata of the virtual content 410304 is not available or incorrect. Alternatively, the manual alignment can be used in addition to the automatic alignment. The benefits of manual alignment after automatic alignment include but are not limited to correcting distortions by the physical scene and correcting tracking errors of the sensors 410102 410202 of the computing device 410302.

The virtual content shown 410304 including but not limited to 360 images and videos, has stored the needed meta information including the orientation to north 410309 of the camera when the data was captured. This meta information is then used to adjust the orientation of the virtual scene 410304 so that the orientation to north 410309 of the virtual scene 410304 aligns with the orientation to north 410308 of the physical scene 410309 where the user 410301 is standing in.

If this virtual content 410304 lacks the needed meta information like the orientation to north 410309, it is rotated manually by the user 410301 so that it aligns with the physical scene 410306.

Conclusion

As disclosed herein, features consistent with the present embodiments may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the embodiments, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the descriptions have been specifically described herein, it will be apparent to those skilled in the art to which the descriptions pertains that variations and modifications of the various implementations shown and described herein may be made without departing from the spirit and scope of the embodiments. Accordingly, it is intended that the embodiments be limited only to the extent required by the applicable rules of law.

The present embodiments can be embodied in the form of methods and apparatus for practicing those methods. The present embodiments can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the embodiments. The present embodiments can also be in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the embodiments. When implemented on a general-purpose processor, the program code segments combine with the processor to provide a unique device that operates analogously to specific logic circuits.

The software is stored in a machine readable medium that may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: disks (e.g., hard, floppy, flexible) or any other magnetic medium, a CD-ROM, DVD or DVD-ROM, any other optical medium, any other physical storage medium, a RAM, a PROM and EPROM, a FLASH-EPROM, any other memory chip, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

Various examples are set out in the following numbered paragraphs:

NP1. A method for creating a virtual reality scene, the system comprising: by a server computer with a processor and a memory, receiving a 3D image data; mapping a position in the image data; mapping markers in the image data; and inserting an object to the marked position in the image data.

NP2. The method of NP1 wherein the inserting an object is by selecting the object from a pre-defined list.

NP3. The method of NP1 or NP2 wherein the inserting an object is by selecting the object from a newly created list.

NP4. The method of any one of NP1-NP3 further comprising, by the computer, appointing a trigger with the object to cause an event.

NP5. The method of NP4 wherein the trigger is a click or motion detection.

NP6. The method of NP4 or NP5 wherein the event is at least one of dialing a phone number, opening a web page, transferring to a different scene, displaying a text box, sending an e-mail and playing a sound.

NP7. The method of any one of NP4-NP6 wherein the event is at least one of causing display of a new object or obscuring an object with an invisible object.

NP8. The method of any one of NP1-NP7 further comprising, by the computer, receiving a second 3D image data; mapping a position in the second image data; mapping markers in the second image data; storing the mapped image data and the second mapped image data in a data storage; indicating the relationship of the image data and second image data as linked scenes.

NP9. The method of any one of NP1-NP8 wherein the objects are animated objects.

NP10. The method of any one of NP1-NP9 wherein the objects are received over the network.

NP11. The method of any one of NP1-NP10 wherein the objects are selected from a predefined set of objects.

NP12. The method of any one of NP1-NP11 wherein the image data is a 360 degree image.

NP13. A method of creating a virtual reality scene, comprising, by a computer with a processor and memory, receiving an image data over a network; estimating a depth map of a keyframe of the received image data using estimated depth values of pixels in the keyframe; and generating a point cloud using the estimated depth map of the keyframe; generating a 3D mesh using the generated point cloud.

NP14. The method of NP13, further comprising, by the computer, receiving a second image data over the network, receiving second tracking markers for the second image data; receiving second objects for the second image data; causing display of, the image, the second image data and the received second objects using the second tracking markers.

NP15. The method of NP13 or NP14 wherein the received image data is two or three dimensional image data.

NP16. The method of any one of NP13-NP15 further comprising, by the computer, projecting a texture on the generated 3D mesh for display.

NP17. The method of any one of NP13-NP16 further comprising, by the computer, inserting an object occlusion into the image data.

NP18. The method of any one of NP13-NP17 wherein the image data is mapped to a floor plan.

NP19. The method of any one of NP13-NP18 wherein the image data is included in a timeline.

NP20. The method of any one of NP13-NP19 further comprising, by the computer, adding annotations including at least one of text, drawings, and 3D images.

NP21. The method of any one of NP13-NP20 further comprising, by the computer, causing live streaming display of the image data over the network.

NP22. The method of NP14 further comprising, by the computer, causing display of the image on multiple user displays.

NP23. The method of NP14 or NP22 further comprising, by the computer, detecting facial features in the image.

NP24. The method of any one of NP14, NP22 and NP23 further comprising, by the computer, causing display of a list of images scenes and features to allow addition of new image scenes.

NP25. The method of any one of NP14 and NP22-NP24 further comprising, by the computer, causing display of an edit area for a currently selected scene.

NP26. The method of any one of NP14 and NP22-NP25 further comprising, by the computer, inserting an object into the image data at a marked position.

NP27. The method of NP26 further comprising, by the computer, causing animation of the inserted object.

NP28. The method of NP26 or NP27 further comprising, by the computer, associating a triggerable command with the inserted object, activated by a user in the image scene by an interaction.

NP29. The method of NP28 wherein the triggerable command is opening a web page or transferring to a different scene.

NP30. The method of NP28 wherein the triggerable command is causing display of a text box or playing a sound.

NP31. The method of NP28 wherein the triggerable command is sending an email.

NP32. The method of any one of NP28-NP31 wherein the interaction is a click.

NP33. A method for creating a virtual reality scene, the system comprising: by a server computer with a processor and a memory, receiving a first 3D image data, wherein the image data includes a first timestamp; mapping a position in the image data; mapping markers in the image data; and inserting an object to the marked position in the image data; receiving a second 3D image data, wherein the image data includes a second timestamp; causing display of, the first 3D image and the second 3D image according to the first and second timestamps.

NP34. The method of NP33 wherein the first 3D image scene is a parent scene and the second 3D image scene is a sub child scene.

NP35. The method of NP33 or NP34, wherein the first timstamp is metadata included in the first 3D image data.

NP36. The method of any one of NP33-NP35, wherein the first 3D image data is a 360 degree image and the computer is further configured to apply the first 3D image as texture to a sphere object for display.

NP37. The method of NP36 wherein the orientation of the first 3D image may be adjusted for display.

NP38. The method of NP36 or NP37 further comprising, by the computer, slicing the 3D image data into parts to load independently for display.

NP39. The method of any one of NP33-NP38 wherein the first 3D image is a video.

NP40. The method of any one of NP33-NP39 further comprising, by the computer, causing display of an edit layout for a user to view, preview, edit and arrange image scenes.

NP41. The method of NP40 wherein the edit layout includes image caption and timestamp of an image scene.

NP42. A method for creating a virtual reality scene, the system comprising: by a server computer with a processor and a memory, receiving a 3D image data; mapping a position in the image data; mapping markers in the image data; and inserting an object to the marked position in the image data; receiving a floor plan for the image data; receiving placement of the received 3D image onto a position in the floor plan.

NP43. The method of NP42 further comprising, by the computer, receiving an image filter for the 3D image data; applying the image filter to the received floor plan.

NP44. The method of NP42 or NP43 wherein the floor plan is at least one of, a computer aided design file, a pdf file, or an online map.

NP45. The method of NP44 wherein the placement of the received 3D image onto a position in the floor plan is through a plugin.

NP46. The method of any one of NP42-NP45 further comprising, by the computer, receiving an indication of a hotspot on the floor plan; causing display of an icon on the hotspot on the floorplan.

NP47. The method of any one of NP42-NP46 further comprising, by the computer, receiving a second floor plan and stacking the second floor plan.

NP48. The method of NP46 or NP47 further comprising, by the computer, associating a triggerable command with the hotspot, activated by a user in the image scene by an interaction.

NP49. The method of any one of NP46-NP48 further comprising, by the computer, moving the hotspot on the floorplan by a click-and-drag operation from the user.

NP50. The method of NP48 or NP49 wherein the triggerable command is navigation to another image scene.

NP51. A method for creating a virtual reality scene, the system comprising: by a server computer with a processor and a memory, receiving a first 3D image data, wherein the first 3D image data is a 360 degree image data and the computer is further configured to apply the first 3D image data as texture to a sphere object for display, and wherein the first 3D image data includes a first directional indicator corresponding to a direction the image was originally taken; mapping a position in the first 3D image data; mapping markers in the first 3D image data; receiving a second 3D image data, wherein the second 3D image data includes a second directional indicator corresponding to a direction the image was originally taken; using the first and second directional indicators for the first and second data to orient the first and second data for display.

NP52. The method of NP51 wherein, the using the first and second directional indicators for the first and second data to orient the first and second data for display, includes using a virtual camera and an angle between the virtual camera and the directional indicator.

NP53. The method of NP51 or NP52 wherein the first 3D image data includes a timestamp.
NP54. The method of NP53 wherein the first 3D image data includes a waypoint location identifier.
NP55. The method of NP54 wherein the second 3D image data includes a waypoint and timestamp, and using the timestamp and waypoint of the first 3D image data to correlate the waypoint and timestamp of the second 3D image data.
NP56. The method of NP55 further comprising, by the computer, receiving annotation information for the first 3D image data and correlating the received annotation information with the first 3D image data for display.
NP57. The method of NP55 or NP56 further comprising, by the computer, receiving audio information for the first 3D image data and correlating the received audio information with the first 3D image data for display and playback.
NP58. A method for creating a virtual reality scene, the system comprising: by a server computer with a processor and a memory, receiving a 3D image data, wherein the 3D image data is a 360 degree image data and the computer is further configured to apply the 3D image data as texture to a sphere object for display, and mapping a first and second position in the 3D image data; calculating distances between the first and second positions in the display of the 3D image data.
NP59. The method of NP58 further comprising, by the computer, mapping objects in the display of 3D image data; calculating angles of objects in the display of 3D image data.
NP60. The method of NP58 or NP59 further comprising, by the computer, receiving a floor plan for the image data; receiving placement of the received 3D image data onto a position in the floor plan; calculating distances between a first and a second position in the floor plan.
NP61. The method of any one of NP58-NP60 further comprising, by the computer, adding boundaries of a canvas object to the 3D image data, the boundaries including borders of the canvas object.
NP62. The method of NP61 further comprising, by the computer, adding boundaries of a second canvas object to the 3D image data, the boundaries of the second canvas object including borders of the second canvas object; and calculating distances between a first and second position on the canvas object and second canvas object.
NP63. A method for creating a virtual reality scene, the system comprising: by a server computer with a processor and a memory, receiving a 3D image data, wherein the 3D image data is a 360 degree image data and the computer is further configured to apply the 3D image data as texture to a sphere object for display, and causing display of an overlay over the 3D image data, wherein the overlay includes an web page.
NP64. The method of NP63 further comprising, by the computer, resizing the texture for display on a mobile device.
NP65. A method for creating a virtual reality scene, the system comprising: by a server computer with a processor and a memory, receiving a 3D image data, wherein the 3D image data is a 360 degree image data and the computer is further configured to apply the 3D image data as texture to a sphere object for display, and mapping a marker in the 3D image data at a position; inserting an object to the marked position in the image data; and adding an annotation to the object.
NP66. The method of NP65 further comprising, by the computer, receiving a selection of the added annotation from a list of annotations; and causing display of the 3D image data with the corresponding added annotation.
NP67. The method of NP66 wherein the display of the 3D image data with the corresponding added annotations focuses on the annotated object.
NP68. The method of NP66 or NP67 wherein the annotated object may be interacted with by a user.
NP69. The method of NP68 wherein the list of annotations includes a status update after the annotated object was interacted with by a user.
NP70. A method for creating a virtual reality scene, the system comprising: by a server computer with a processor and a memory, receiving a 3D image data, wherein the 3D image data is a 360 degree image data and the computer is further configured to apply the 3D image data as texture to a sphere object for display, and providing painting tools for graphic addition to the 3D image data.
NP71. The method of NP70 wherein the painting tools include input from hardware user interfaces.
NP72. The method of NP71 wherein the hardware user interface is at least one of a computer mouse, a hand held pointer, a joystick, or a touch screen.
NP73. The method of any one of NP70-NP72 wherein the painting tools include free form painting tools.
NP74. The method of any one of NP70-NP73 wherein the painting tools include pre-defined geometric shapes.
NP75. A method for creating a virtual reality scene, the system comprising: by a server computer with a processor and a memory, receiving a 3D image data, wherein the 3D image data is a 360 degree image data and the computer is further configured to apply the 3D image data as texture to a sphere object for display, and providing input for multiple users in the display of the 3D image data.
NP76. The method of NP75 wherein the display includes avatars of the multiple users.
NP77. The method of NP76 wherein the avatars in the display are oriented in the 3D image data according to data received by the computer from their corresponding user hardware indicating orientation.
NP78. The method of any one of NP75-NP77 wherein the multiple users are remotely located from one another and interact with the server computer over a network.
NP79. A method for creating a virtual reality scene, the system comprising: by a server computer with a processor and a memory, receiving a 3D image data, wherein the 3D image data is a 360 degree image data and the computer is further configured to apply the 3D image data as texture to a sphere object for display, and positioning an audio source in the 3D image data, wherein the positioned audio source in the 3D image data is played for users using multiple channels.
NP80. The method of NP79 wherein the position of the audio source is able to be moved relative to the 3D image data.
NP81. The method of NP79 or NP80, wherein the audio source is triggered by a user interaction.
NP82. A method for creating a virtual reality scene, the system comprising: by a server computer with a processor and a memory, receiving a 3D image data, wherein the 3D image data is a 360 degree image data and the computer is further configured to apply the 3D image data as texture to a sphere object for display, and causing display of the 3D image data to a user in a data stream over a network.
NP83. The method of NP82 wherein the 3D image data is from a 360 degree camera.

NP84. The method of NP82 or NP83 further comprising by the computer, causing display of a placeholder image if the data stream is interrupted.

NP85. The method of any one of NP82-NP84 further comprising by the computer, causing display of a zoomed portion of the 3D image upon interaction by a user.

NP86. A method for creating a virtual reality scene, the system comprising: by a server computer with a processor and a memory, receiving a 3D image data; mapping a position in the image data; mapping markers in the image data; inserting an object to the marked position in the image data; and causing a distortion of the 3D image upon selection by a user.

NP87. The method of NP86 wherein the distortion is a fisheye distortion configured to allow a user to focus on an object in the 3D image.

NP88. A method for creating a virtual reality scene, the system comprising: by a server computer with a processor and a memory, receiving a 3D image data; mapping a position in the image data; mapping markers in the image data; analyzing and identifying the 3D image data for facial features.

NP89. The method of NP88, further comprising, by the computer, blurring an identified facial feature in a display of the 3D image data.

NP90. A method for creating a virtual reality scene, the system comprising: by a server computer with a processor and a memory, receiving a first resolution 3D image data; receiving a second resolution 3D image data; segmenting the first and second 3D image data into segments; causing display of an image using both segments from the first resolution 3D image data and segments from the second resolution 3D image data.

NP91. A method for creating a virtual reality scene, the system comprising: by a server computer with a processor and a memory, receiving a 3D image data, wherein the 3D image data is a 360 degree image data and the computer is further configured to apply the 3D image data as texture to a sphere object for display, and applying a rotation to the 3D image data for display.

NP92. A method for creating a virtual reality scene, the system comprising: by a server computer with a processor and a memory, receiving a first 3D image data, wherein the first 3D image data is a 360 degree image data and the computer is further configured to apply the first 3D image data as texture to a sphere object for display, and receiving a second 3D image data; comparing the first 3D image data and the second 3D image data to correlate features common to both; calculating depth of the correlated features of the first and second 3D images; and using the calculated depth of the correlated features to render a stereoscopic image display.

NP93. The method of NP92 further comprising, by the computer, applying a filter to the first 3D image data and the second 3D image data; merging the first and second filtered 3D image data for display.

NP94. The method of NP93 wherein the filter removes moving objects.

NP95. The method of NP93 wherein the filter removes changing light conditions.

NP96. A method for creating a virtual reality scene, the system comprising: by a server computer with a processor and a memory, receiving a 3D image video data, wherein the 3D image data is a 360 degree image data and the computer is further configured to apply the 3D image video data as texture to a sphere object for display, and analyzing the 3D image video to identify an object; and tracking the identified object in the 3D image video.

NP97. The method of NP96 further comprising, by the computer, determining a position of a camera used to capture the received 3D image video data; using the determined position of the camera and the identified object to track the identified object.

NP98. The method of NP96 or NP97 wherein the analysis of the 3D image video is by a visual search engine.

NP99. The method of NP97 or NP98 further comprising, by the computer, updating an absolute pose of the object.

NP100. The method of any one of NP96-NP99, further comprising, by the computer, estimating a depth map of a keyframe of the received 3D image video data using estimated depth values of pixels in the keyframe; and generating a point cloud using the estimated depth map of the keyframe; generating a 3D mesh using the generated point cloud.

NP101. The method of NP100 further comprising, by the computer, extracting keypoints from the keyframe; using the extracted keypoints in the tracking of the identified object.

NP102. The method of NP100 or NP101 further comprising, by the computer, providing tools for annotating the textured mesh.

NP103. The method of NP101 or NP102, wherein the textured mesh is used for shadow casting in the 3D image video data.

What is claimed is:

1. A method of creating an augmented reality scene, comprising,
    by a computing device with a processor and memory,
        receiving image data over a network, the image data being generated from a camera including multiple frames;
        estimating a depth map of a keyframe of the multiple frames of the received image data using estimated depth values of pixels in the keyframe;
        generating a point cloud using the estimated depth map of the keyframe; and
        generating a 3D mesh using the generated point cloud;
        wherein the 3D mesh includes multiple keyframe images, wherein the multiple keyframe images are overlapping keyframes merged to a single texture;
        wherein the keyframe is a frame with a depth map and a position;
        for non-keyframe frames, calculating a relative position to a keyframe using the depth map and position of the keyframe; and
        refining the keyframe depth map;
    wherein the 3D mesh is generated by,
    computing a normal vector for each point in the point cloud, based on neighboring points;
        orienting the computed normal vector of each point toward the camera pose of the keyframe that the point belongs to.

2. The method of claim 1 wherein the merging of multiple keyframes to a single texture is by weighting a keyframe distance to a mesh surface and a keyframe angle relative to the mesh surface.

3. The method of claim 2, further comprising, by the computer,
    receiving a second image data over the network,
    receiving tracking markers for the second image data;
    receiving objects for the second image data;
    causing display of, the image, the second image data and the received objects using the tracking markers.

4. A system for creating an augmented reality scene, comprising, a computing device with a processor and memory, configured to,
  receive image data over a network, the image data being generated from a camera including multiple frames;
  estimate a depth map of a keyframe of the multiple frames of the received image data using estimated depth values of pixels in the keyframe;
  generate a point cloud using the estimated depth map of the keyframe; and
  generate a 3D mesh using the generated point cloud;
  wherein the 3D mesh includes multiple keyframe images, wherein the multiple keyframe images are overlapping keyframes merged to a single texture;
  wherein the keyframe is a frame with a depth map and a position;
  wherein the computer is further configured to,
    for non-keyframe frames, calculate a relative position to a keyframe using the depth map and position of the keyframe; and
    refine the keyframe depth map;
  wherein the 3D mesh is generated by, the computer further configured to,
  compute a normal vector for each point in the point cloud, based on neighboring points;
    determine an oriented computed normal vector of each point toward the camera pose of the keyframe that the point belongs to.

5. The system of claim 4 wherein the merging of multiple keyframes to a single texture is by weighting a keyframe distance to a mesh surface and a keyframe angle relative to the mesh surface.

6. The method of claim 5, wherein the computer further configured to,
  receive a second image data over the network,
  receive tracking markers for the second image data;
  receive objects for the second image data;
  cause display of, the image, the second image data and the received objects using the tracking markers.

7. A non-transitory computer-readable medium having computer-executable instructions thereon for a method of creating an augmented reality scene, the method comprising:
  by a computing device with a processor and memory,
    receiving image data over a network, the image data being generated from a camera including multiple frames;
    estimating a depth map of a keyframe of the multiple frames of the received image data using estimated depth values of pixels in the keyframe;
    generating a point cloud using the estimated depth map of the keyframe; and
    generating a 3D mesh using the generated point cloud;
    wherein the 3D mesh includes multiple keyframe images, wherein the multiple keyframe images are overlapping keyframes merged to a single texture;
    wherein the keyframe is a frame with a depth map and a position;
    for non-keyframe frames, calculating a relative position to a keyframe using the depth map and position of the keyframe; and
      refining the keyframe depth map;
    wherein the 3D mesh is generated by,
  computing a normal vector for each point in the point cloud, based on neighboring points;
    orienting the computed normal vector of each point toward the camera pose of the keyframe that the point belongs to.

8. The non-transitory computer-readable medium of claim 7, wherein the merging of multiple keyframes to a single texture is by weighting a keyframe distance to a mesh surface and a keyframe angle relative to the mesh surface.

9. The non-transitory computer-readable medium of claim 8, further comprising, by the computer,
  receiving a second image data over the network,
  receiving tracking markers for the second image data;
  receiving objects for the second image data;
  causing display of, the image, the second image data and the received objects using the tracking markers.

* * * * *